INVERTING AND GATE

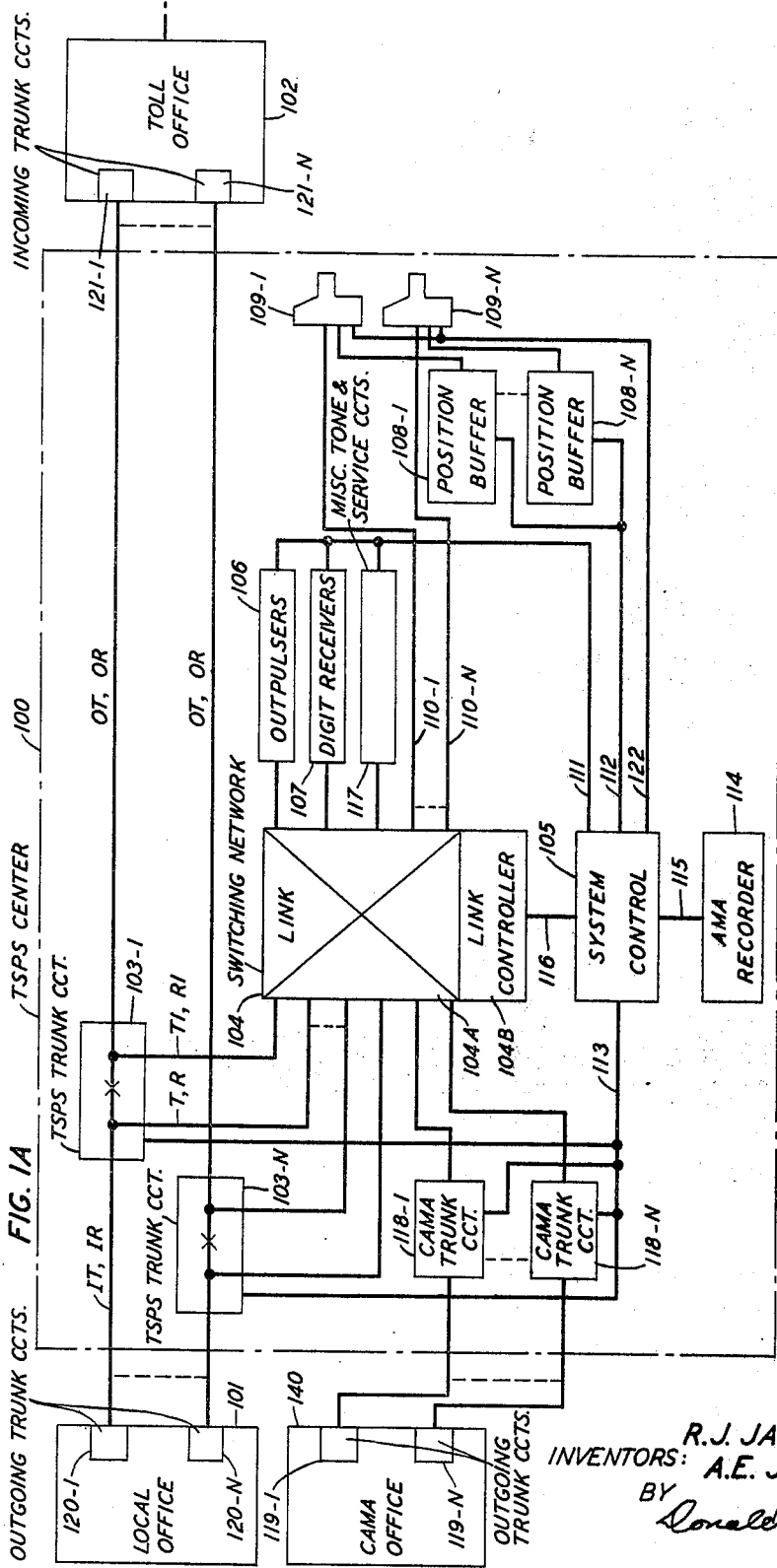

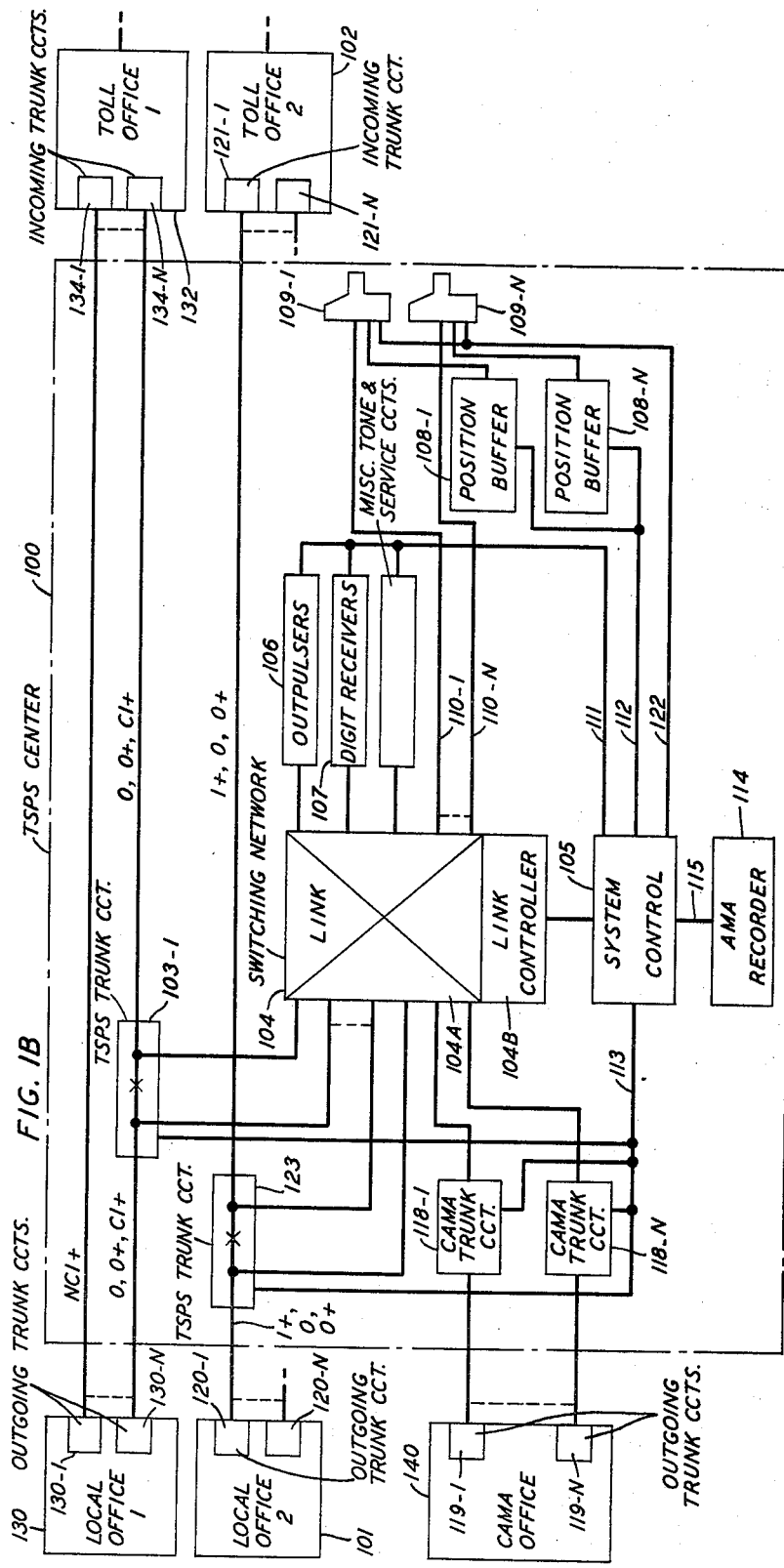

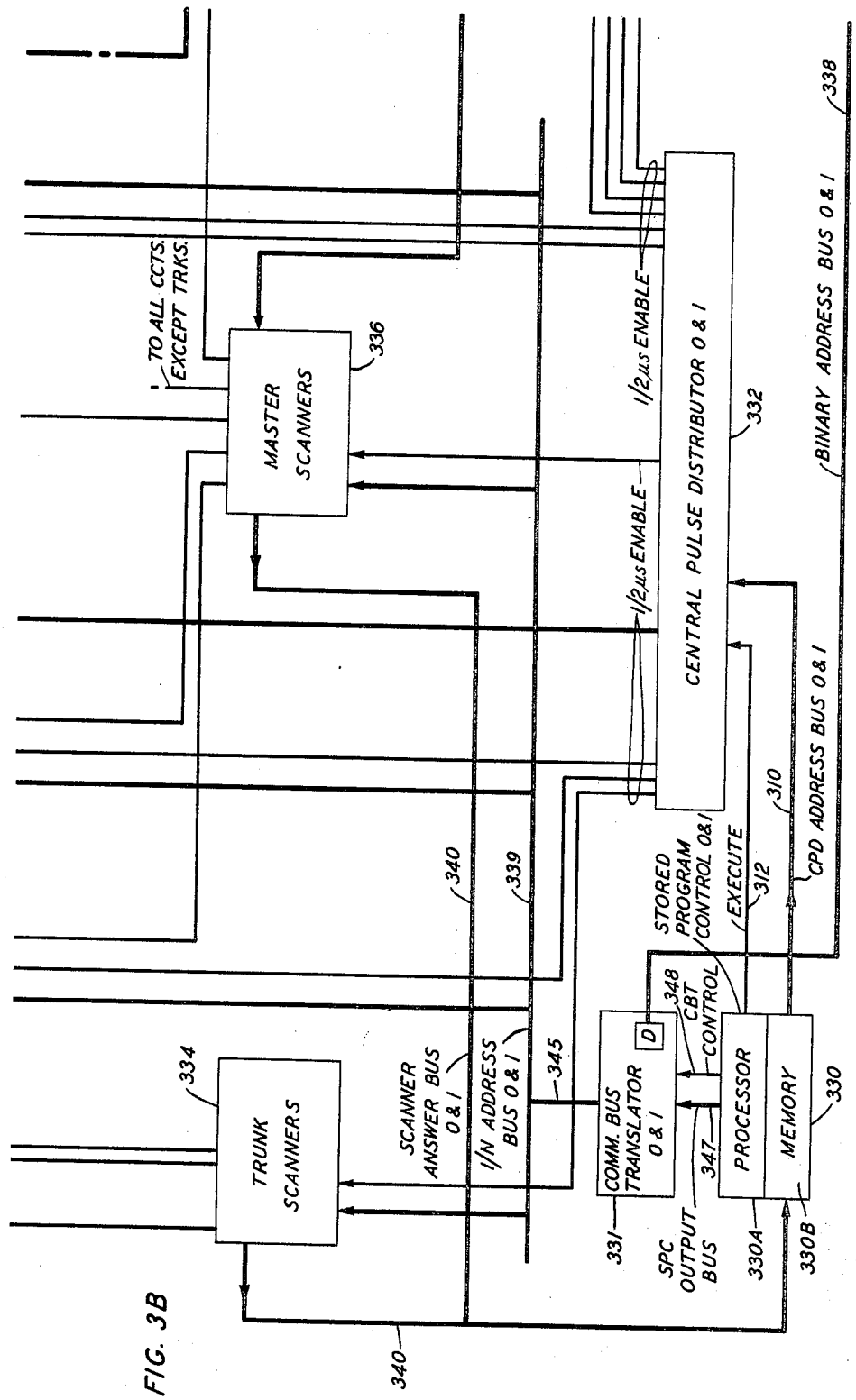

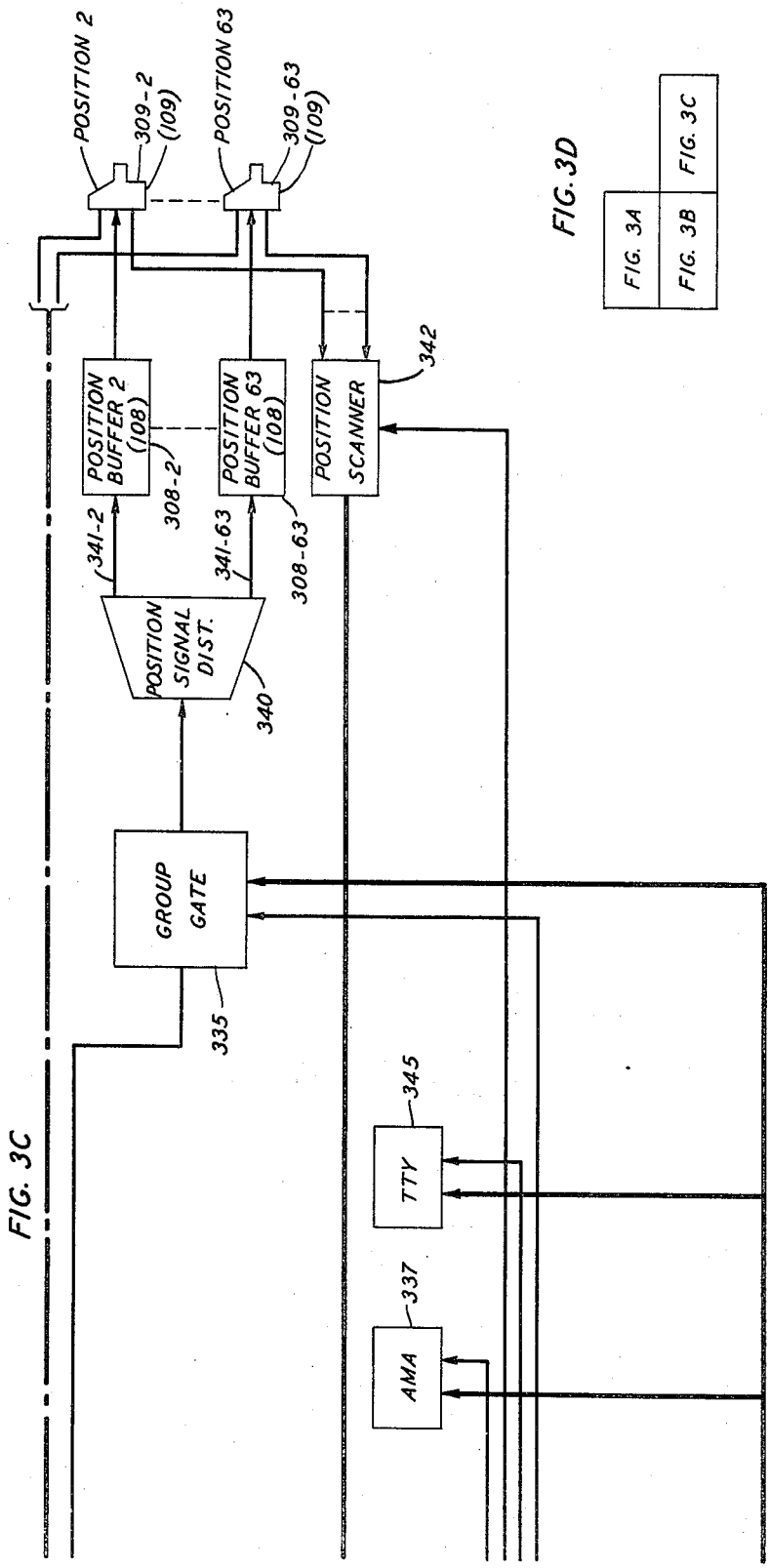

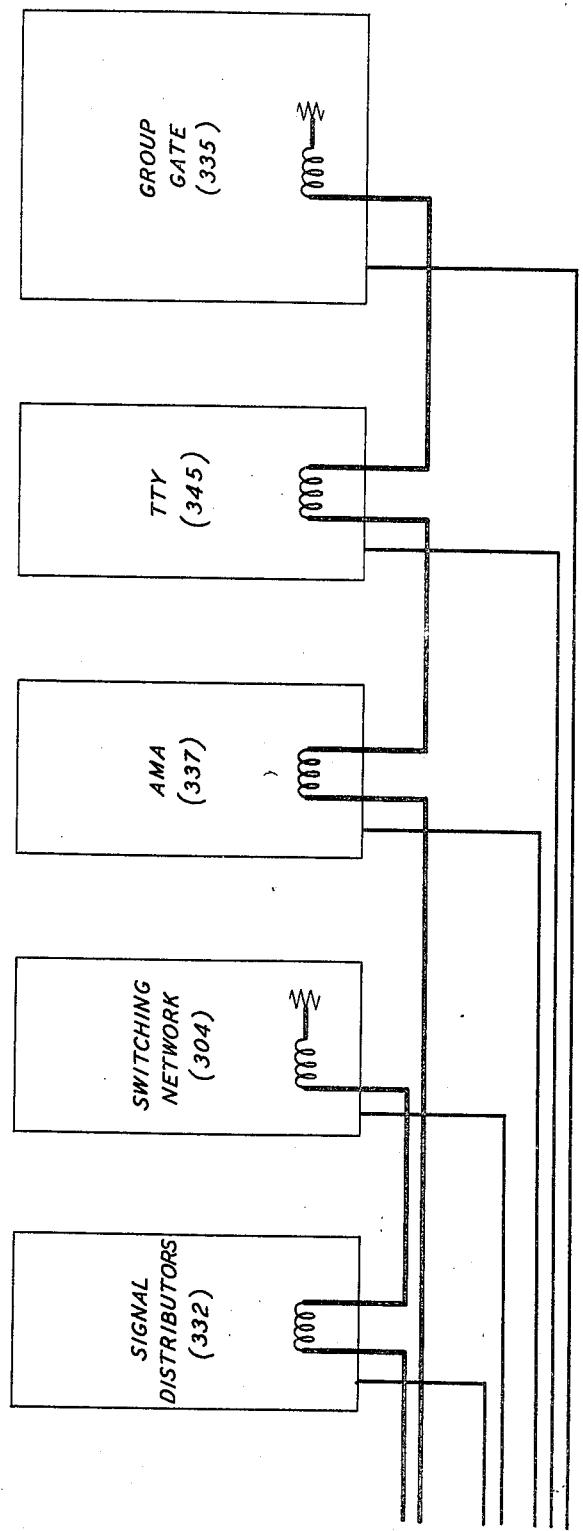

NON-INVERTING AND GATE

INVERTING OR GATE

NON-INVERTING OR GATE

INVERTING OR GATE

FLIP-FLOP

FLIP-FLOP

BUS CIRCUIT
CABLE RECEIVER

DUPLICATED INPUT CCT.

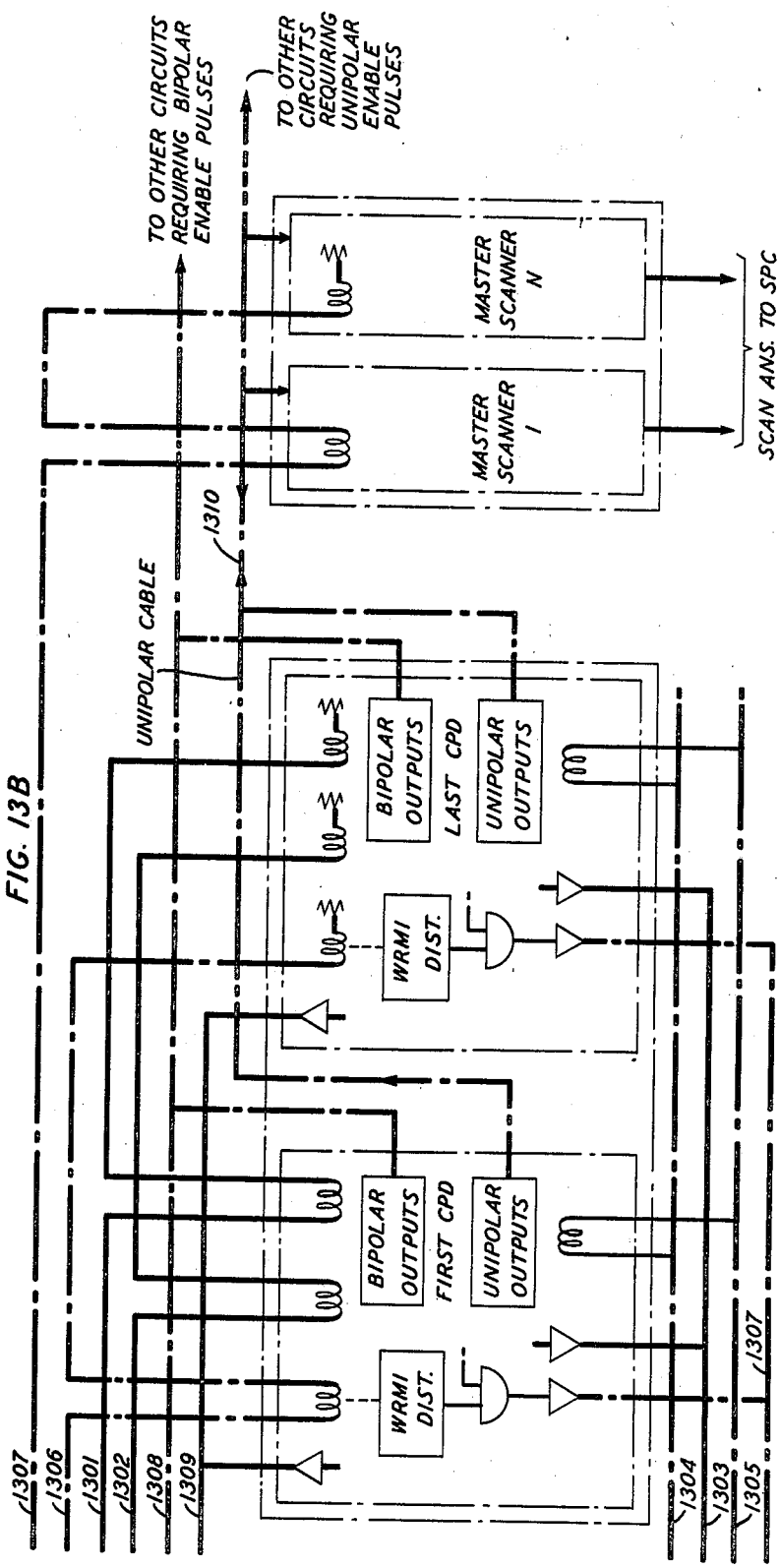

FIG. 15

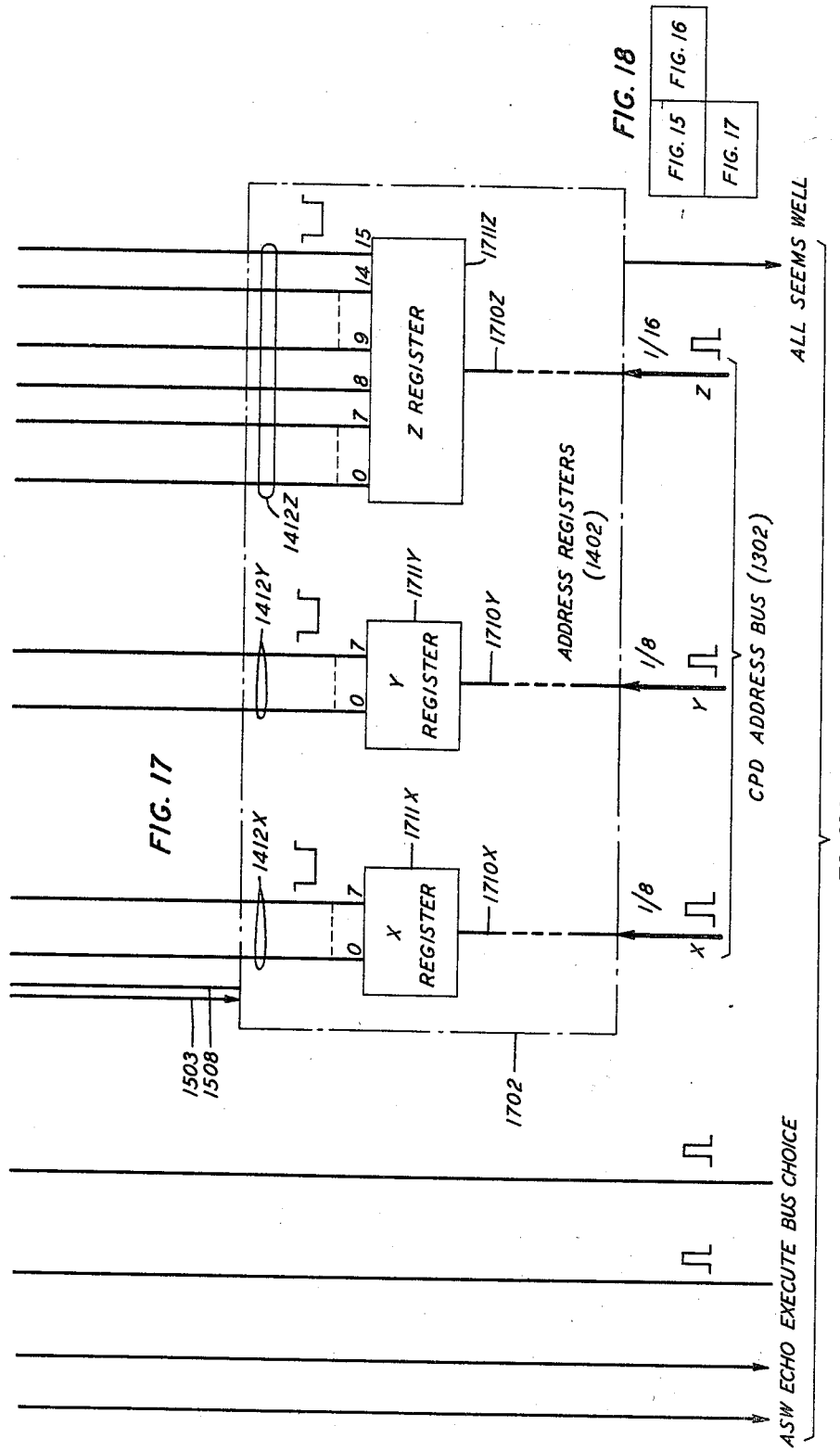

| FIG. 28 | FIG. 31 |
| FIG. 29 | FIG. 32 |
| FIG. 30 | FIG. 33 |
|         | FIG. 34 |

FIG. 38

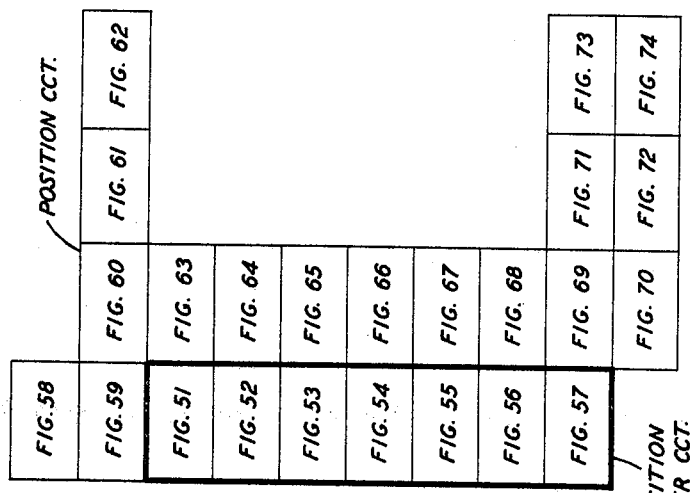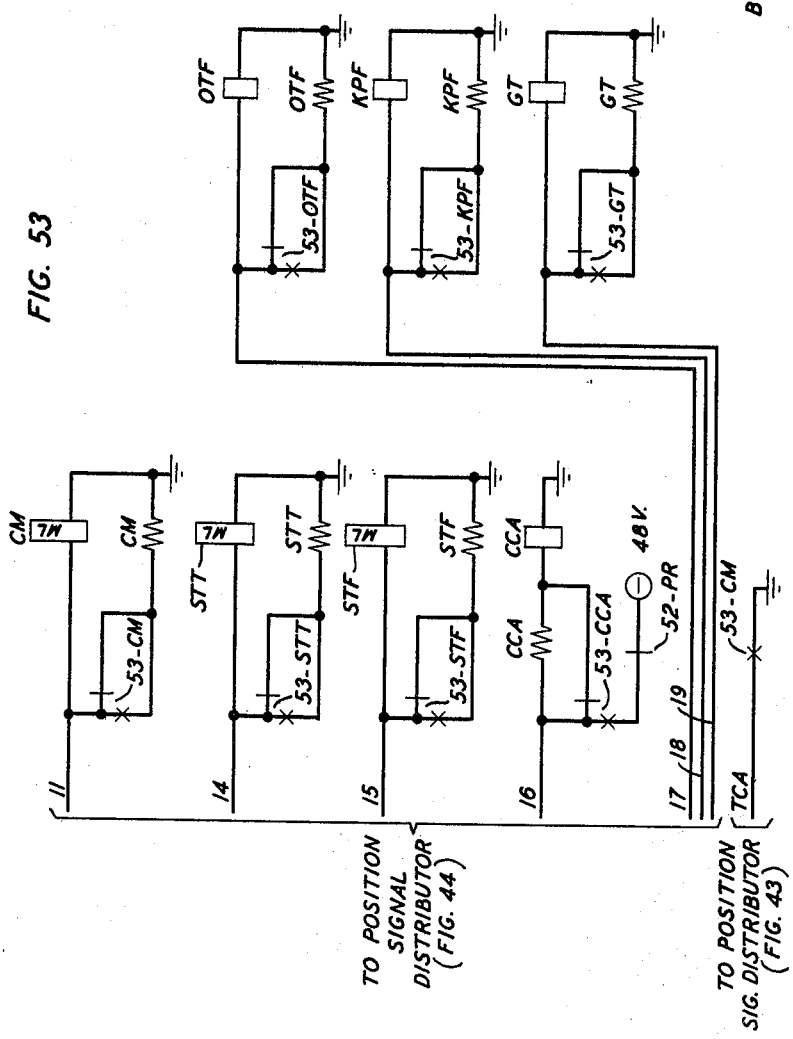

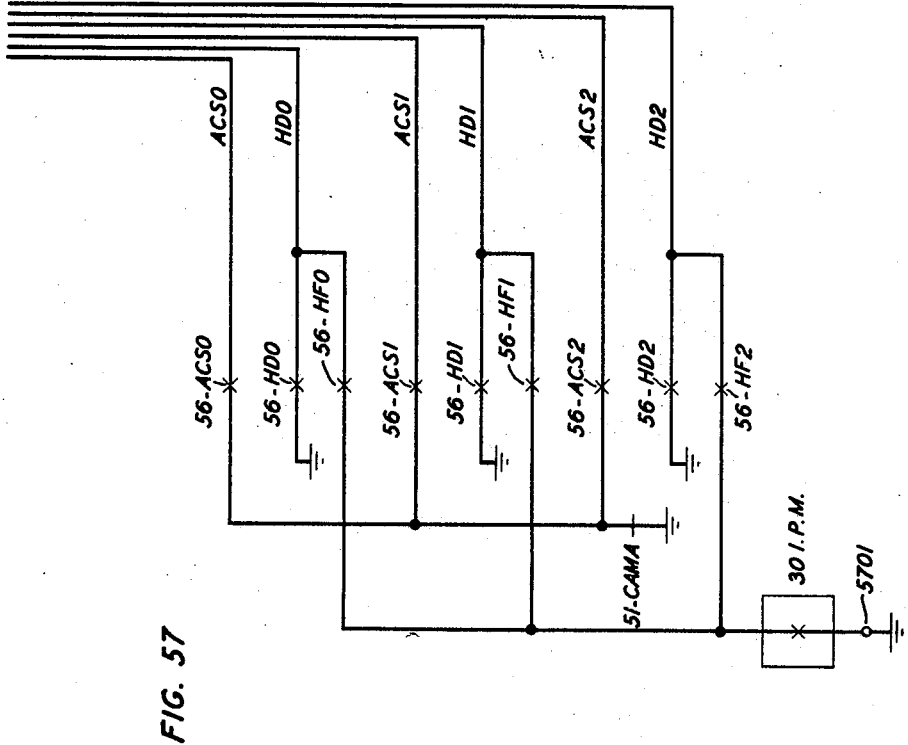
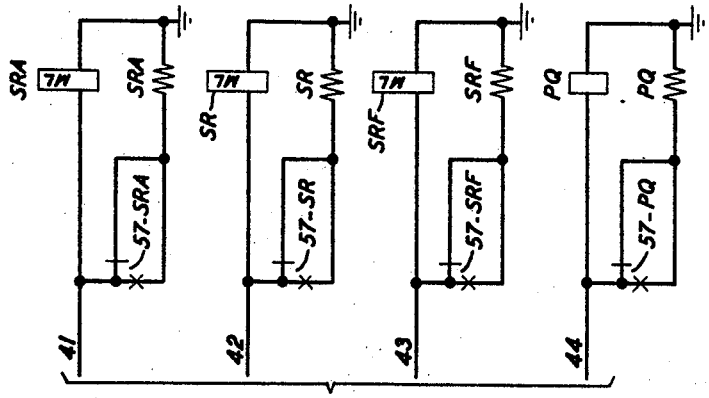
FIG. 57

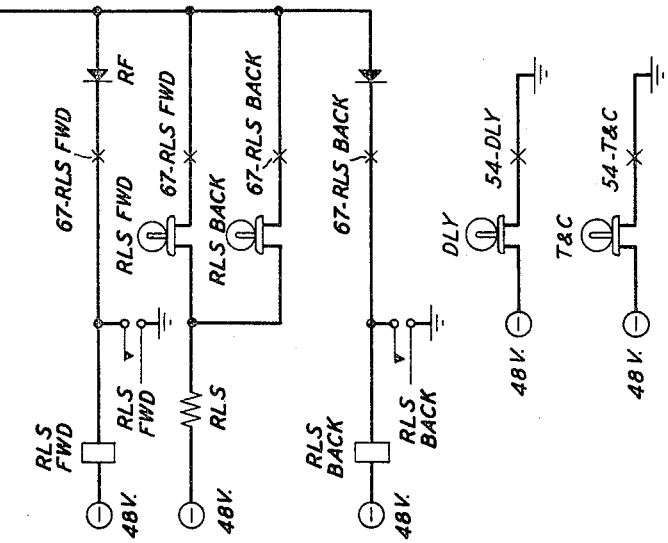
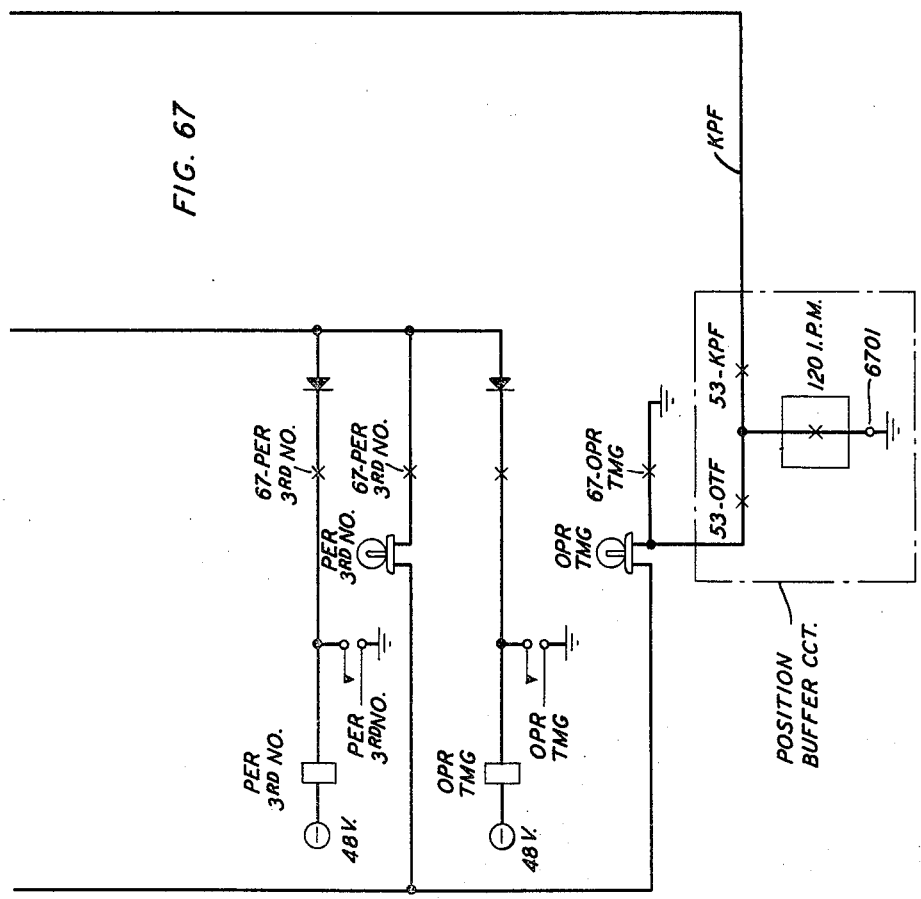
FIG. 67

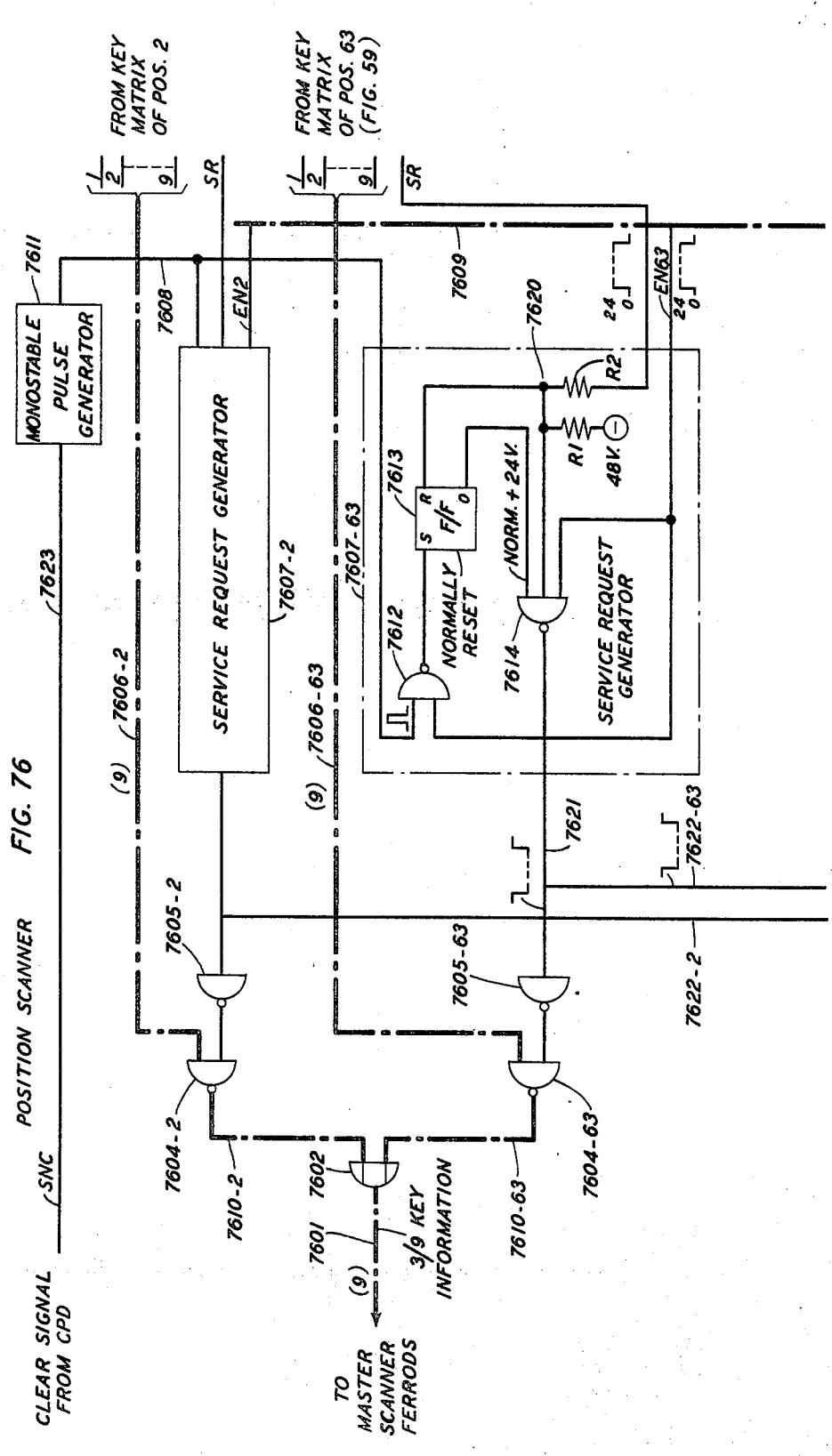

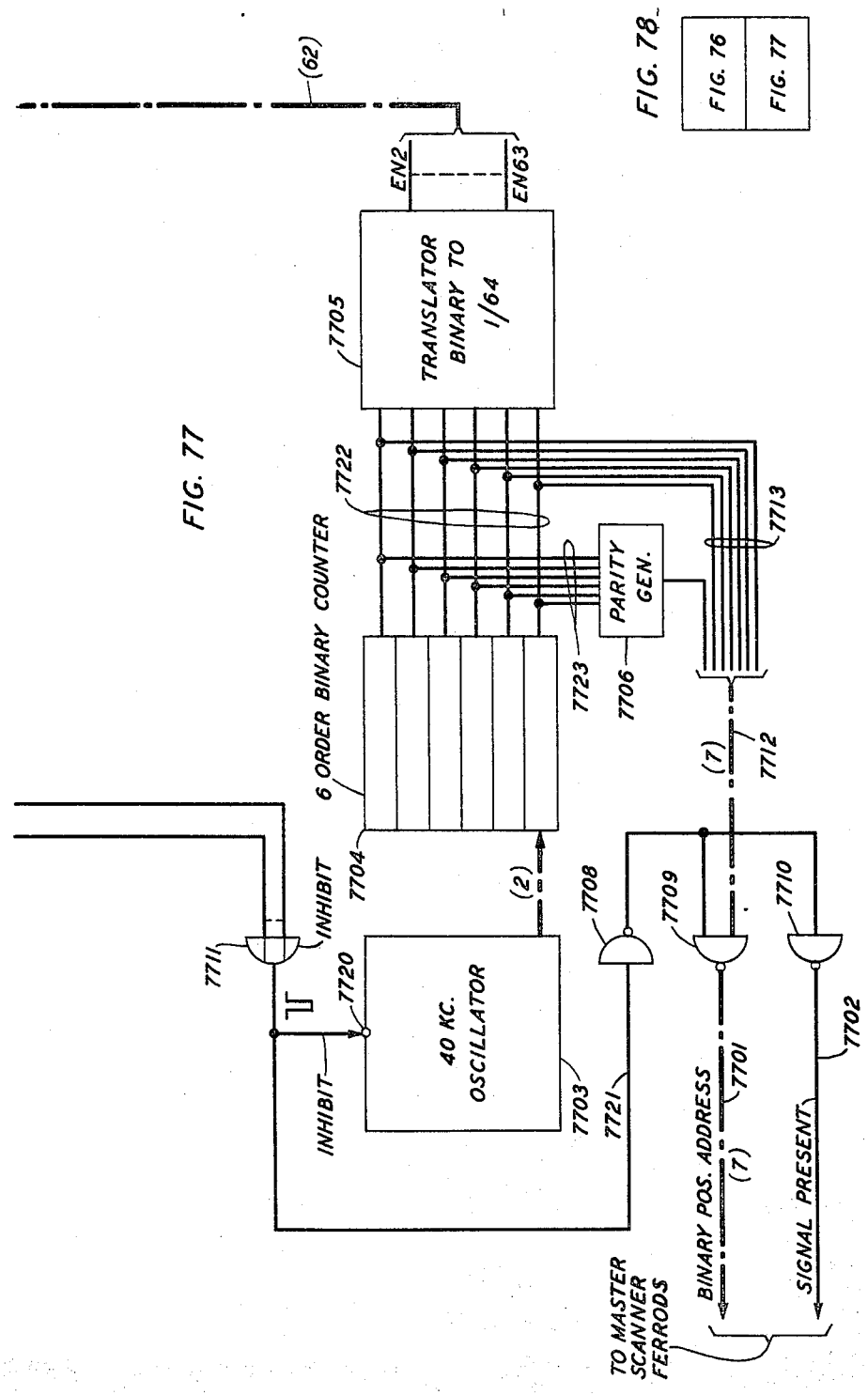

FIG. 83

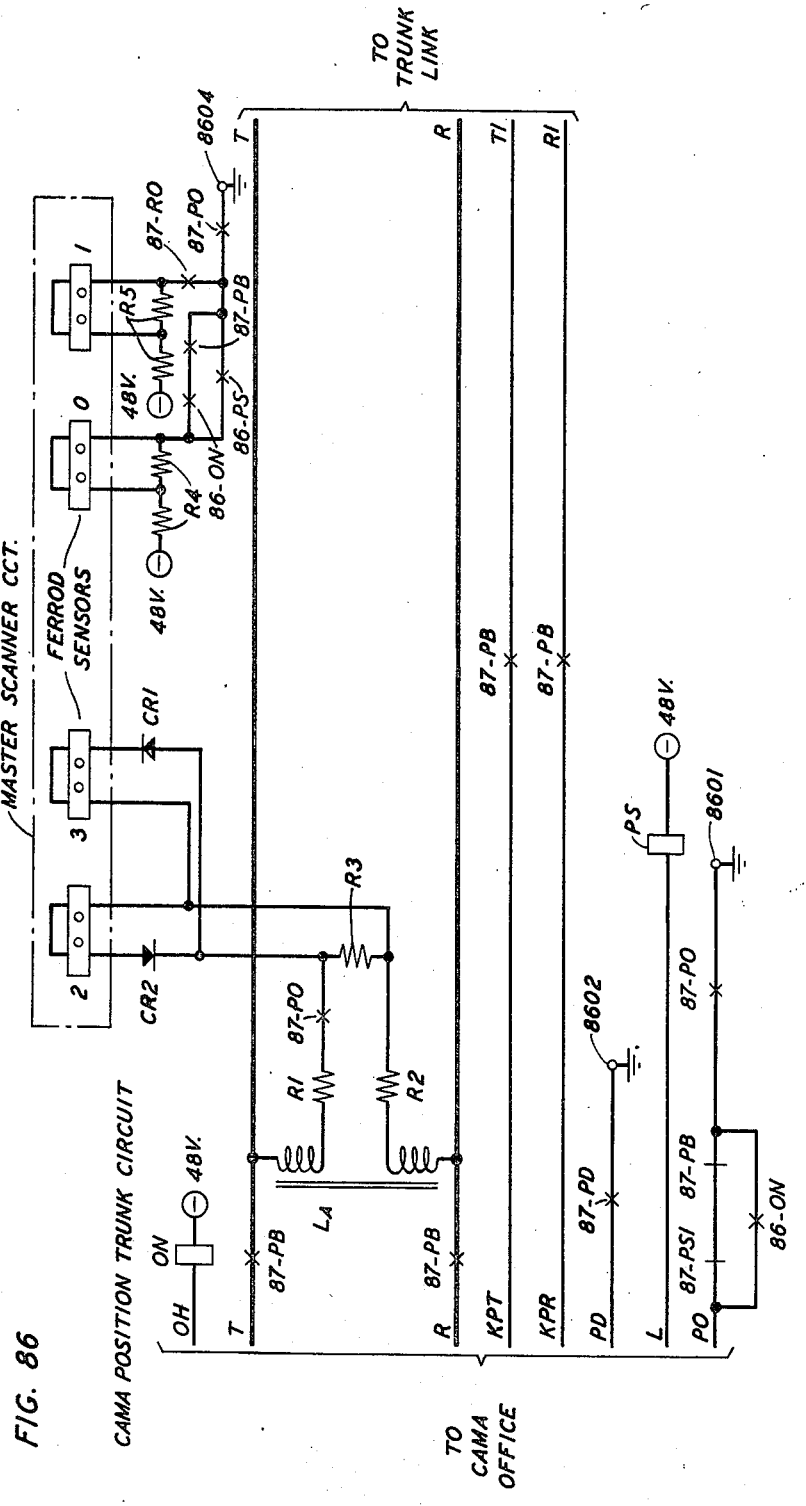

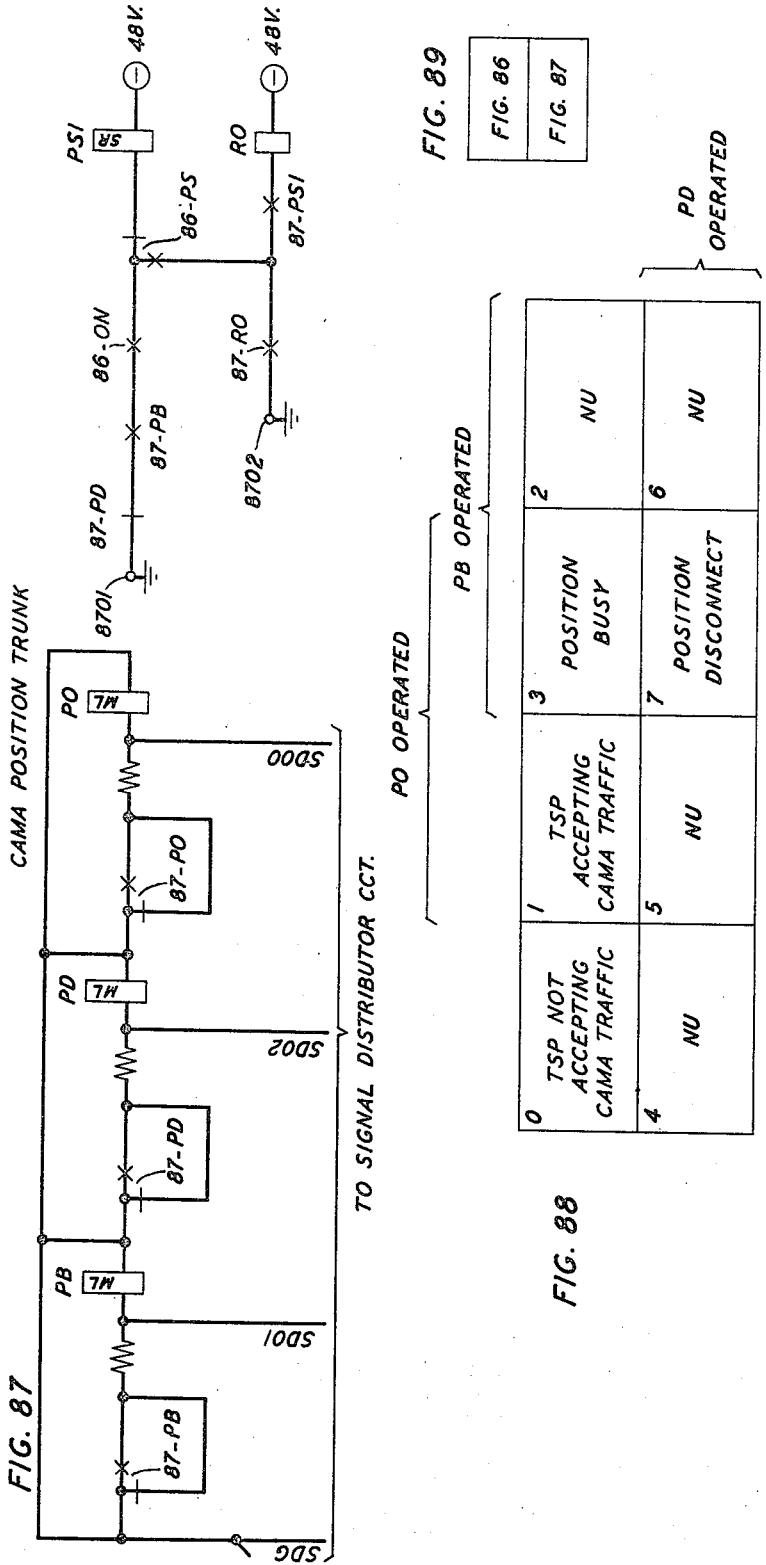

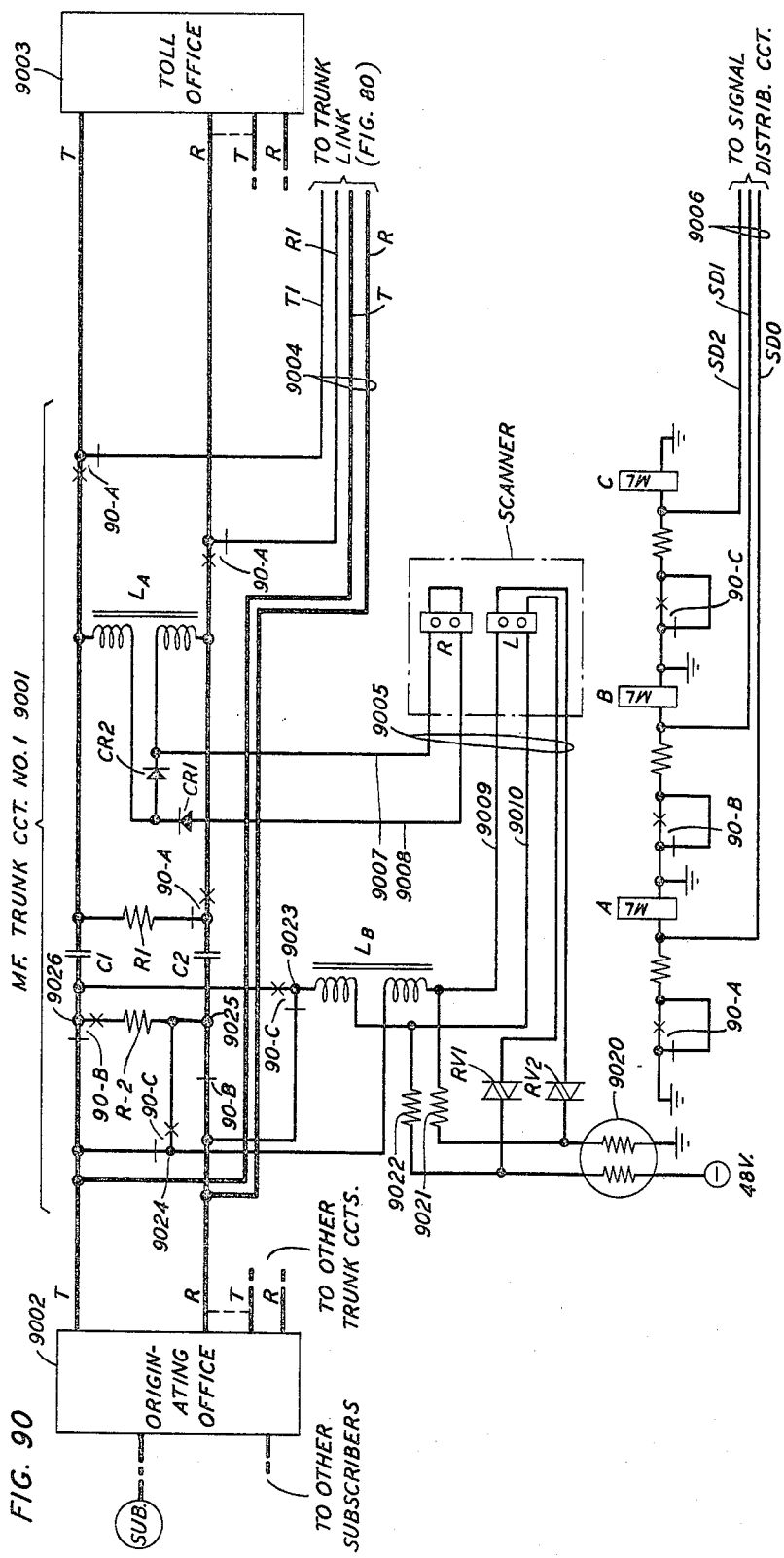

| | 1 NOT USED | 2 NOT USED | |
|---|---|---|---|
| 0 IDLE | | | 6 HOLD |
| 4 STOP SIGNAL; OPR. ATTACHED; OUTPULSER ATTACHED; RLS. FWD.; OUTPULSE CLD. NO.; MB | 5 CUT-THRU | 7 COIN CONTROL OR RINGBACK | |

FIG. 91
M.F. TRUNK CCT.

DIAL PULSE TRUNK CCT.

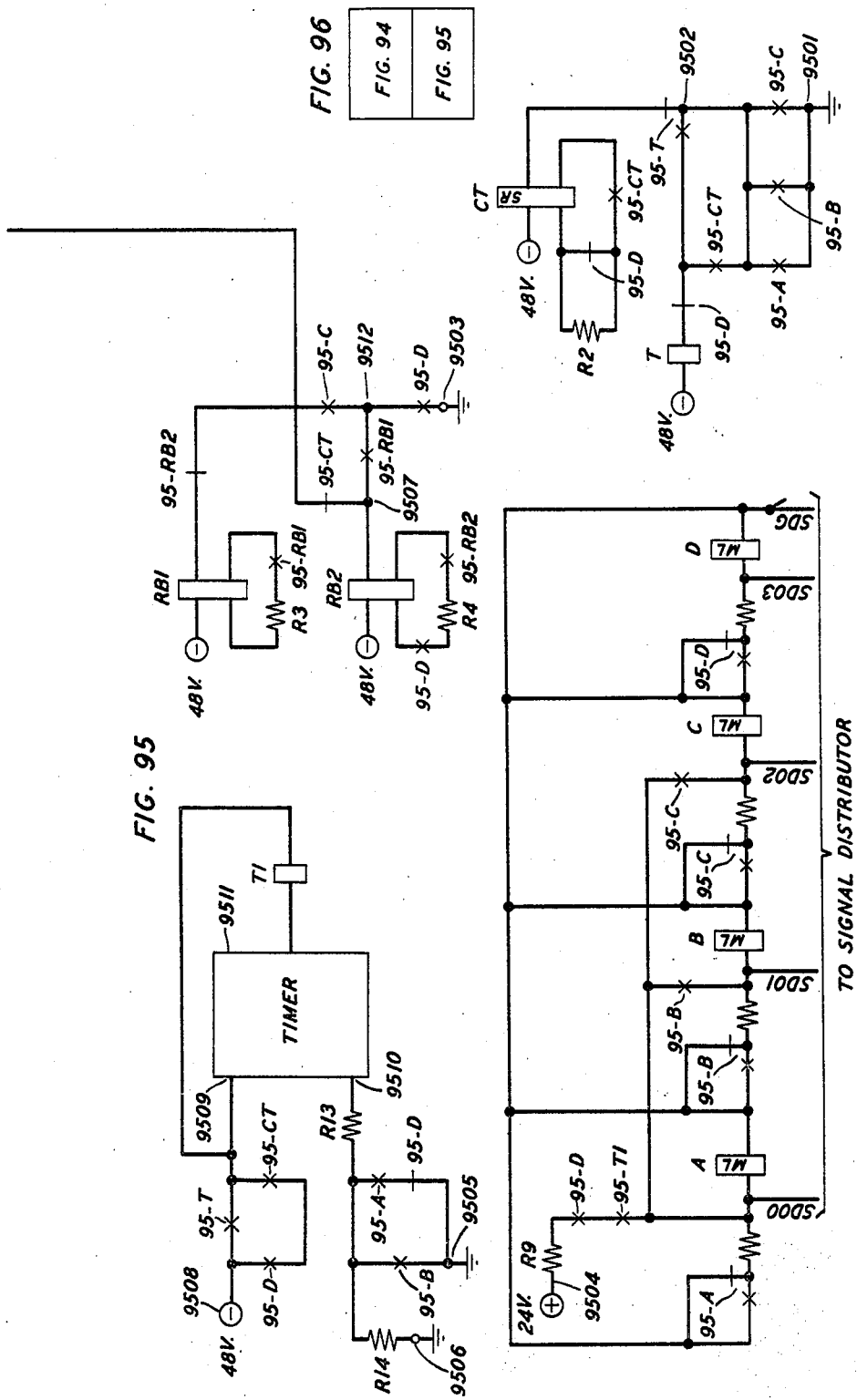

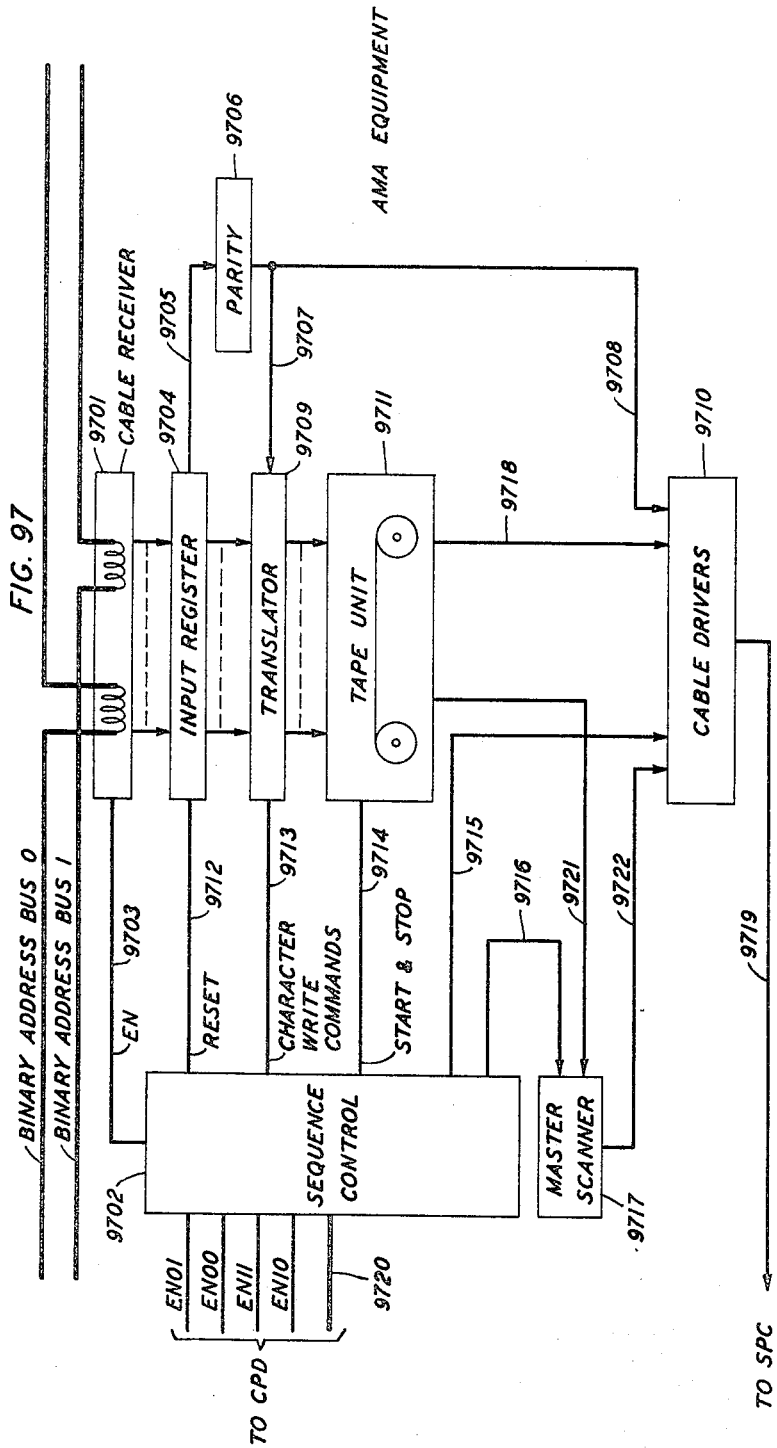

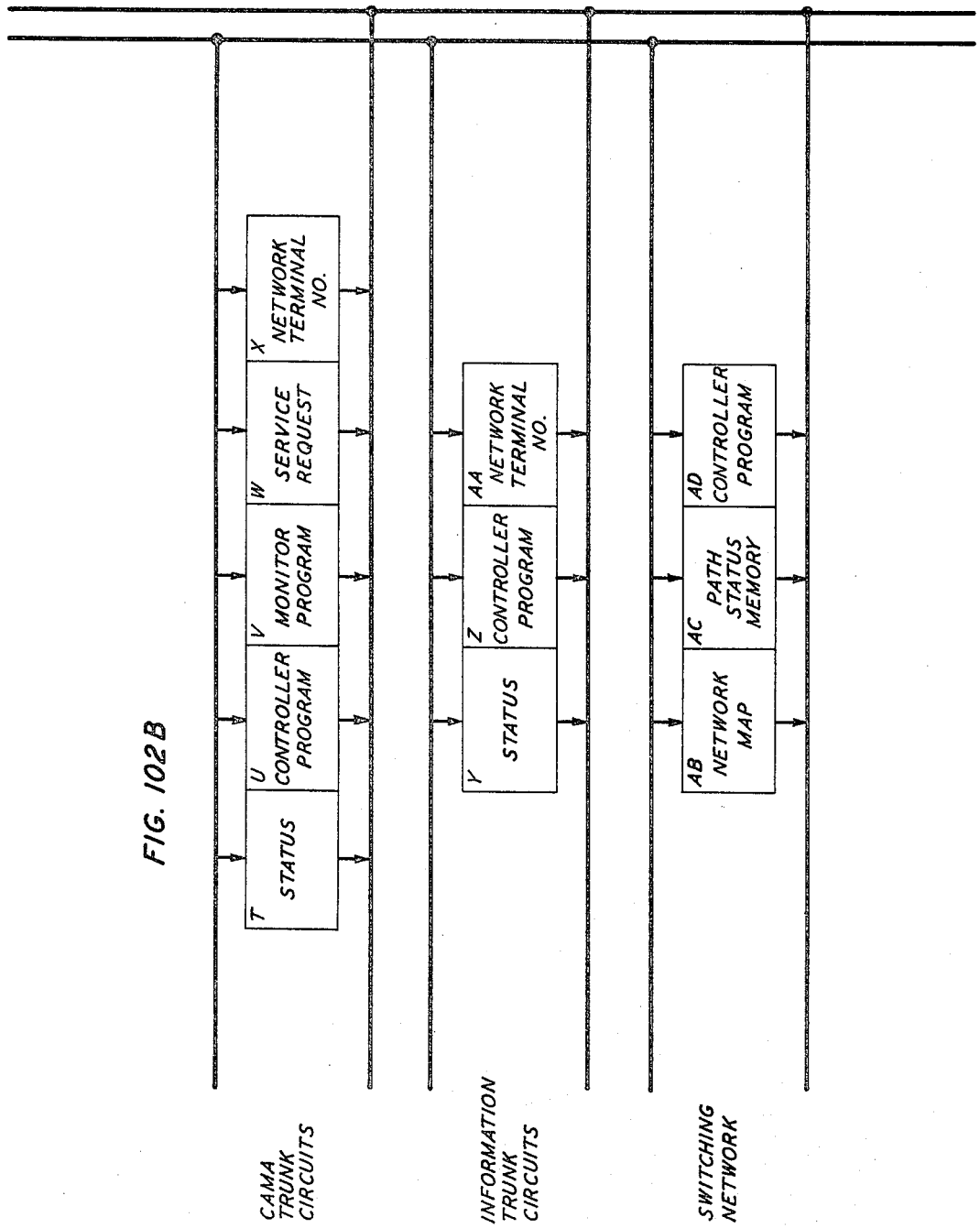

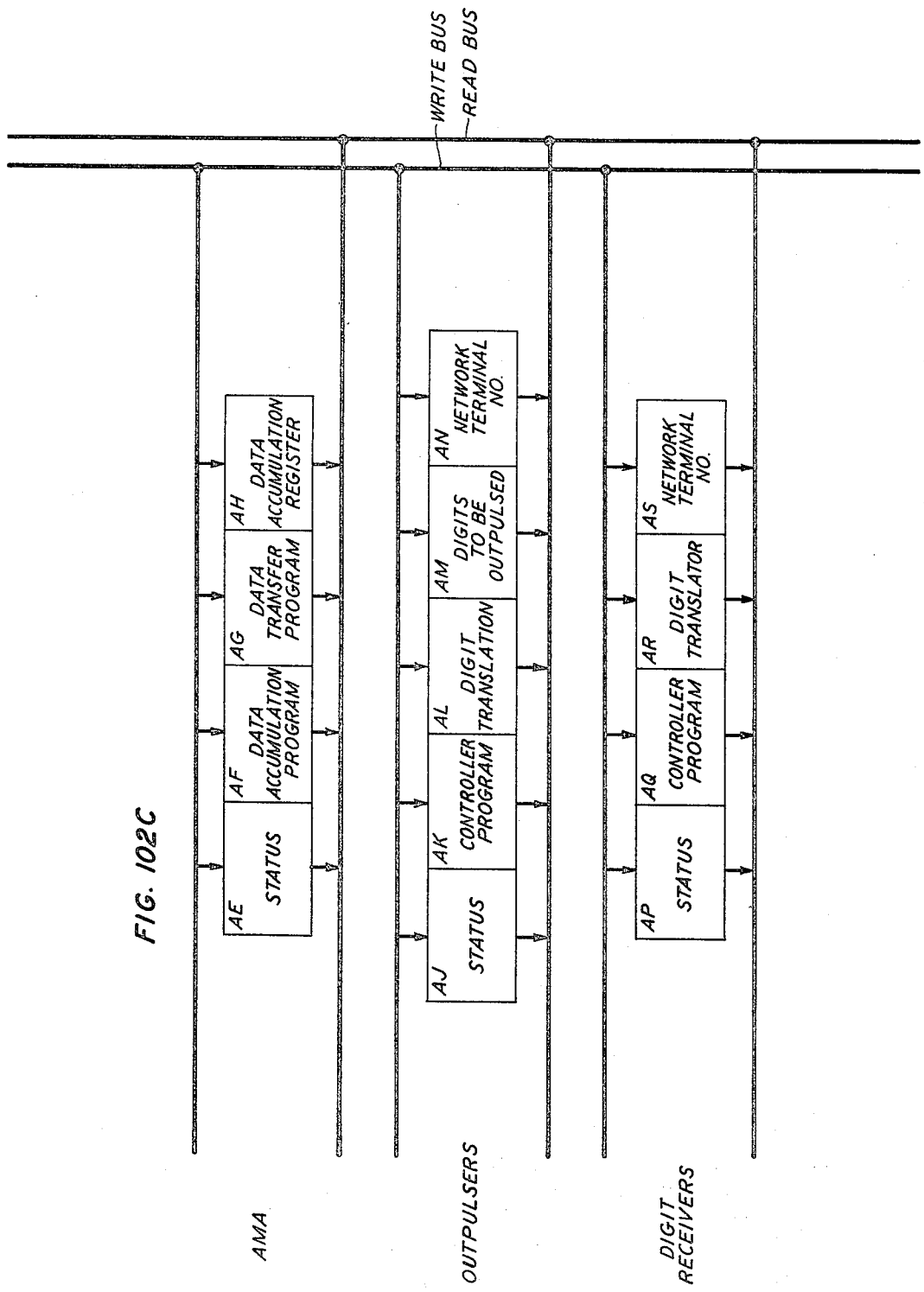

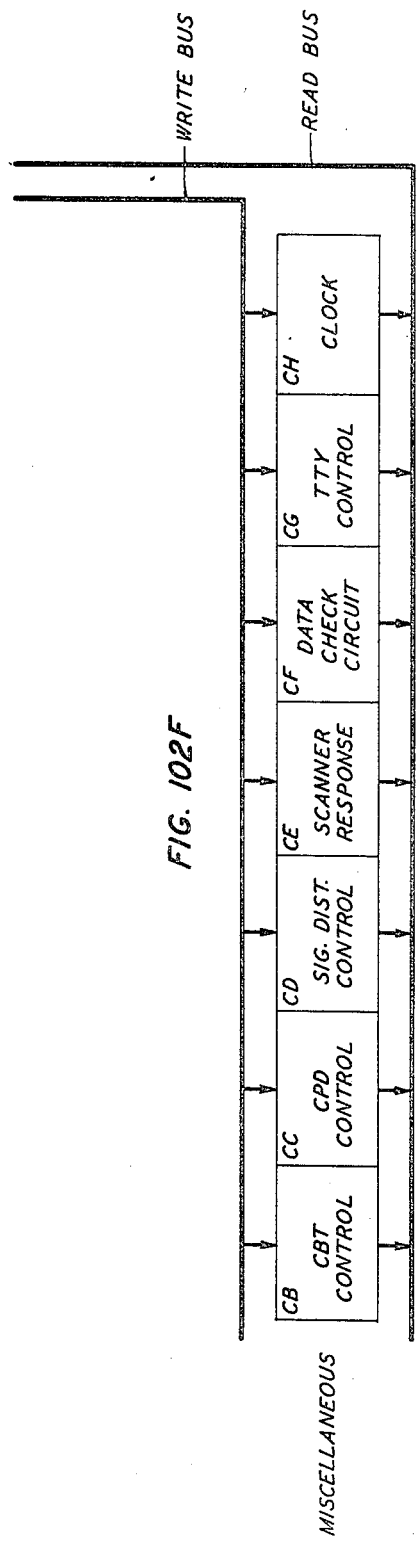

United States Patent Office 3,484,560
Patented Dec. 16, 1969

3,484,560
EQUIPMENT FOR SERVING CUSTOMER-DIALED CALLS INCLUDING THOSE REQUIRING OPERATOR ASSISTANCE
Richard J. Jaeger, Jr., Colts Neck, and Amos E. Joel, Jr., South Orange, N.J., assignors to Bell Telephone Laboratories, Incorporated, New York, N.Y., a corporation of New York
Filed Jan. 10, 1966, Ser. No. 519,787
Int. Cl. H04m 3/60
U.S. Cl. 179—27
71 Claims

ABSTRACT OF THE DISCLOSURE

This invention relates to a system for providing person-to-person type service on customer-dialed calls by means of equipment, including traffic service positions, located intermediate a local and a tandem or toll office. The system is independent in its operation of either office and is controlled by a stored program machine. Upon the receipt of a call from the local office, the disclosed equipment registers the digits outpulsed from the local office, outpulses to tandem the digits it requires, and connects an operator position to the call in order that the assistance requested by the calling party may be provided. AMA facilities are also provided for recording pertinent call charge data under control of the stored program machine. The invention represents an improvement over existing person-to-person systems in that its incorporation into a switching network requires no modification at either the local or tandem office.

INDEX

| | Column |
|---|---|
| Block Diagram—FIG. 1A | 10 |
| Block Diagram—FIG. 1B | 13 |
| Block Diagram—FIG. 2 | 15 |
| Block Diagram—FIG. 3 | 17 |
| Bus Systems—FIGS. 4A and 4B | 27 |
| Logic Circuits—FIGS. 5 and 6 | 29 |
| Cable Receiver—FIG. 7 | 31 |
| Duplicated Receiving Circuitry—FIG. 8 | 31 |
| Enable-Verify Unit—FIG. 9 | 33 |
| Drawing Symbols—FIGS. 10 and 11 | 34 |
| Central Pulse Distributor (CPD)—FIGS. 12-18 | 35 |
| Scanners—FIGS. 19-25 | 40 |
| Signal Distributors—FIGS. 26 and 27 | 43 |
| Communications Bus Translator (CBT)—FIGS. 28-35 | 45 |
| False Code Operation of CBT | 49 |
| Group Gate—FIGS. 36-39 | 53 |
| Position Signal Distributor—FIGS. 40-50 | 60 |
| Position Buffer and Position Circuits—FIGS. 51-75 | 72 |
| Table I—List of Keys | 75 |
| Table I—List of Lamps | 75 |
| Position Scanner—FIGS. 76-78 | 88 |
| Operator Cut-Through Circuit—FIG. 79 | 92 |
| Switching Network—FIG. 80 | 93 |
| MF Receiver—FIG. 81 | 94 |
| MF Outpulser—FIGS. 82-85 | 96 |
| CAMA Position Trunk Circuit—FIGS. 86-89 | 100 |
| TSPS Trunk Circuits—FIGS. 90-93 | 103 |
| MF Trunk Circuit—FIGS 90 and 91 | 103 |
| Dial Pulse Trunk Circuit—FIGS. 92 and 93 | 104 |
| Coin-Control Trunk Circuit—FIGS. 94-96 | 106 |
| Information Trunk Circuit—FIG. 98 | 110 |
| Delayed Call Trunk Circuit—FIG. 99 | 111 |
| Automatic Message Accounting Equipment (AMA)—FIG. 97 | 114 |
| Stored Program Controller (SPC)—FIGS. 100, 101 102A-102E, 103 | 116 |
| Detailed Operation of System During Serving of Calls | 121 |
| Noncoin Calls Served by MF Trunk Circuits | 122 |
| Noncoin-FM-ANI 0+ Calls | 122 |
| Noncoin MF-ANI-1+ Calls | 128 |
| Noncoin MF-NonANI-1+ and 0+ Calls | 128 |
| Noncoin Calls Served by Dial Pulse Trunk Circuits | 130 |
| Noncoin DP-ANI-0+ Calls | 130 |
| Noncoin-DP-ANI-1+ Calls | 132 |
| Noncoin-DP-NonANI-0+ Calls | 132 |
| Noncoin-DP-NonANI-1+ Calls | 133 |
| Noncoin Dial 0 Calls | 133 |
| Coin Calls—In General | 134 |
| Coin Calls Served by MF Trunk Circuits | 134 |
| Coin Calls Served by Dial Pulse Trunk Circuits | 137 |
| Miscellaneous Calls | 139 |

This invention relates to a switching system, and particularly to a switching system having improved facilities for recording call charge data and for serving customer-dialed calls requiring operator assistance for their completion. The invention further pertains to call-serving facilities positioned intermediate a toll (or tandem) office and the local offices connected thereto for providing operator assistance and/or a charge data recording operation on calls incoming to the toll office on an originating basis.

Recent improvements in telephone switching permit many types of calls requiring operator assistance to be completed on a customer-dialed basis. These calls are served in a manner similar to customer-dialed station-to-station calls, except that, subsequent to dialing by the calling party but prior to cut-through to the called station, an operator position is attached to the connection in order that an operator may converse with the calling party and provide any needed assistance. For example, if the calling customer requests person-to-person service, the operator determines that the specified individual is available at the called station. Similarly, if collect service is requested, the operator determines that the called station will accept the call charges. The operator can also provide assistance on other types of calls, such as for example, charge-to-third-party, credit card, time-and-charges, etc. After furnishing the required assistance, the operator depresses keys at her position to release from the call and to record charge data signifying the call type. The foregoing call surface is, for convenience of discussion, generally referred to hereinafter as "person-to-person" service.

It is known in the art to utilize charge data recording equipment and operators situated at a local office for providing person-to-person service on customer-dialed calls. The provision of person-to-person service in this manner has not attained widespread use since the additional equipment required is sufficiently expensive that few local offices generate enough person-to-person traffic to justify the expense of its installation and maintenance.

Equipment has recently become available which permits tandem offices to provide person-to-person type service on the customer-dialed calls originating in the local offices they serve on an originating basis. These customer-dialed calls are served by operators at the tandem office in a manner corresponding to that already described for local person-to-person service. The tandem office registers the digits outpulsed from the originating office, establishes a connection therethrough extending to the next office, and outpulses to that office the digits it requires. Concurrently, the tandem office connects an operator to the call who converses with the calling party, furnishes the assistance he requires, and then releases from the connection. Thereafter, the calling and called stations remain interconnected speechwise in the same manner as on a call not requiring operator assistance. The equipment provided at the tandem office includes facilities for recording pertinent charge data for each operator assisted call.

A tandem office equipped for serving noncoin customer-dialed person-to-person type calls and for recording charge data therefor is disclosed in the R. B. Curtis application, Ser. No. 318,275, filed Oct. 23, 1963, now Patent No. 3,341,661. A system of the type disclosed by Curtis, but additionally having facilities for the serving of customer-dialed coin calls, is disclosed in the L. J. Cerny et al. application, Ser. No. 325,842, filed Nov. 26, 1963, now Patent No. 3,341,662. The Cerny et al. system serves customer-dialed coin person-to-person calls in much the same manner as already described for the noncoin person-to-person calls. The only difference is that, on coin calls, the operator additionally informs the calling party of the call charges and supervises their deposit. On customer-dialed station-to-station coin calls, the person-to-person operator at the tandem office is briefly connected to the calling connection only to supervise the deposit of the required monetary charges. The Cerny et al. system includes facilities at tandem for automatically recording call charge data and for automatically computing and displaying to an operator the required deposits on each coin call, including the initial period deposit as well as the deposits required for overtime periods for those calls extending into overtime.

The expedient of providing person-to-person service at tandem (or toll) switching centers, as taught by Curtis as well as by Cerny et al., enables the cost of the equipment required to be shared by all local offices served by the tandem center. This, in turn, permits the subscribers served by these offices to be accorded the benefits of direct-dialed person-to-person service.

Although the Curtis and Cerny et al. systems represent significant improvements over prior arrangements, there are factors which limit the extent of their applicability. First of all, the equipment that is installed at the tandem office to provide this service is of such complexity that its addition to an existing office represents a major conversion rather than a minor modification. Also, the space requirements of this equipment are sufficiently great so that this factor by itself often precludes its installation in many offices which have already expanded to the limits of their capacity.

It is evident from the foregoing that a need exists for improved arrangements for serving customer-dialed calls requiring operator assistance.

Accordingly, an object of our invention is to provide improved facilities for connecting operator positions to calls requiring assistance for their completion.

It is another object to provide improved facilities for serving customer-dialed coin toll and person-to-person calls.

A further object is to provide improved charge data recording facilities for customer-dialed calls requiring operator assistance, as well as customer-dialed toll calls which do not require operator assistance.

It is a still further object to provide improved customer-dialed person-to-person call-serving and charge data recording equipment that is suitable for use in installations which cannot economically utilize the equipment heretofore available for providing this service.

It is yet another object to provide facilities that may be operatively associated with any tandem or toll switching center, regardless of its current space limitations, for providing operator assistance on customer-dialed coin toll and person-to-person calls incoming to the switching center and for providing a charge data recording operation on all calls requiring it.

Another object is to achieve the preceding objectives by expedients which require a minimum of modification of existing offices.

In accordance with a specific illustrativve embodiment of our invention, we provide equipment situated intermediate a toll switching center and its local offices for furnishing operator assistance as well as a charge data recording operation on both customer-dialed coin toll and person-to-person calls incoming to the toll switching center. Our equipment may also provide a charge data recording operation on customer-dialed station-to-station calls incoming to the toll office. Advantageously, our equipment is independent in its operation of both the toll and the local offices, and therefore no modification, other than a possible change in trunking patterns, is needed in an existing telephone system so that it may utilize our equipment to furnish improved call service of the aforementioned type.

The equipment provided in our illustrative embodiment includes operator positions, charge data recording apparatus, together with apparatus for automatically connecting operator positions to calls extended to the toll office and requiring assistance for their completion. Each call extended via our equipment from a local office to a toll office is monitored and timed and the pertinent charge data therefore recorded upon the call termination. If the call requires a connection to an operator, this is effected at the same time the forward connection to the terminating office and the called station is being established. When connected, the operator performs the duties required of her on the call and then depresses keys at her position to indicate the type of service provided and to release her position from the connection. The calling and called stations remain interconnected thereafter in the same manner as on a station-to-station call.

The specific equipment illustrative of our invention is hereinafter referred to, for convenience of discussion, as a "traffic service position system" (TSPS), inasmuch as it is independent, both geographically and equipmentwise, of any existing office and since its sole function is to furnish operator and/or data recording service on many types of calls incoming to the toll office which it serves. Our invention is designated in this manner, rather than as a switching system, since it performs no switching operations in connection with the selection of the route or trunk that is to be utilized in extending a call from a local to the toll office. This route selection is made solely by the originating office, and the sole function of our system is to furnish operator and data recording service for the calls incoming to the toll center over a route selected by the originating office.

Our system includes a plurality of TSPS trunk circuits each of which is connected on its incoming side to an outgoing trunk circuit at a local office, and each of which is connected on its outgoing side to an incoming trunk circuit at the toll office. Each TSPS trunk circuit also has means by which it may be connected to different circuits internal to our system, such as for example, operator positions, service and tone circuits, digit receivers, and outpulsers. Each call served by a TSPS trunk circuit requires a plurality of connections to be established sequentially between the trunk circuit and various circuits internal to our system. These connections permit a plurality of call functions to be performed, the specific nature of which varies in accordance with the type of call. Included among these functions are receiving call information outpulsed from the local office, connecting an operator position to the calling connection if operator assistance is required, and outpulsing information forward to the toll office. Once the outpulsing is completed and the operator assistance has been furnished (if it was required), the calling and called stations remain connected speechwise via the TSPS trunk circuit. The call is monitored and timed by our system and the charge data therefor automatically recorded upon its termination.

An incoming call arrives at our TSPS center when a local office outgoing trunk circuit, in response to its selection and seizure, transmits a loop closure signal forward to the TSPS trunk circuit to which it is permanently connected. This seizure signal activates control circuitry within the TSPS center which, in turn, effects the establishment of a connection between the calling TSPS trunk circuit and a DP or MF receiver, depending upon the mode of outpulsing utilized by the originating office. The call information outpulsed by the originating office is detected and translated by the receiver and, in turn, transmitted by it to a control circuit. Thereafter, the connection to the receiver is released and a connection is established between the calling TSPS trunk circuit and an MF outpulser. The call information required by the toll office is then outpulsed forward via the outgoing end of the TSPS trunk circuit. The outpulser is disconnected from the calling connection after it has completed its functions.

Prior to the outpulsing operation, the control circuit analyzes the information available to it regarding the call, including the information outpulsed from the originating office, and determines whether or not operator assistance is required for the call completion. If assistance is required, the control circuit causes an idle operator position to be conencted to the calling TSPS trunk circuit. The connection to the operator position and an outpulser is accomplished essentially at the same time. Neither a position nor an outpulser is connected unless the other is available.

Once the operator is attached to the calling connection, she converses with the calling party, determines the service he requires, furnishes this service, and then releases from the connection. The quantity and type of service she provides differs in accordance with the call type. Included in the services she may provide are a determination of the availability of the called party on a person-to-person call and a determination of whether the called station will accept the charges on a collect call. She may also perform the services required on charge-to-third-party, credit card, and other miscellaneous types of calls. She may also be required, on certain calls, to dial the calling and/or called station numbers. Also, on coin calls, she determines the required monetary deposit from information automatically displayed at her position. She then informs the calling party of this amount and supervises the deposit.

The operator position keys which she depresses to key charge data into the system signifying the call type for each call served by her, to signify the beginning of the chargeable time for a call and to transmit a signal to the control circuit requesting that her position be disconnected from the calling trunk circuit upon the completion of her call duties. The control circuit stores the call data it receives from the operator position, times and monitors the call by means of connections between it and the TSPS trunk circuit. Upon the call termination, the control circuit restores the TSPS trunk circuit to an idle condition and controls the recording for billing purposes of call data, including the calling and called stations, as well as information signifying the chargeable time.

Our TSPS center performs no call-switching or route-establishing operations. Each TSPS trunk circuit is permanently connected on its incoming side to a local office outgoing trunk circuit and on its outgoing side is permanently connected to a toll office incoming trunk. Thus, the toll office incoming trunk circuit that is to serve a particular call is effectively selected at the time the local office seizes one of its outgoing trunk circuits, since the seized local office outgoing trunk circuit is permanently connected via the TSPS trunk circuit to the toll office incoming trunk circuit. A switching network is provided in our TSPS center, not for call switching or routing purposes, but rather for connecting a calling TSPS trunk circuit to other TSPS circuits in order that the call service it requires within the TSPS center may be furnished.

The equipment provided in accordance with our invention is versatile in its operation and may be arranged to serve many types of calls in addition to those of the customer-dialed coin toll and person-to-person types. For example, our system can also serve customer-dialed toll station-to-station calls which do not require operator assistance. These calls are served essentially in the same manner as already described for person-to-person calls, except that the attachment of an operator position to the calling connection is not required. The sole function of our system in serving these calls is to receive information from the originating office, transmit information to the toll office, and then monitor and time the call and record the charge data therefor upon its termination. This arrangement permits an existing switching system not having automatic charge data recording facilities to serve noncoin customer-dialed station-to-station calls.

Our system may also serve dial 0 calls of both the coin and noncoin type. A dial 0 call is one for which the calling party dials only the digit 0 to obtain a connection to an operator. Once having obtained this connection, he gives the operator all the particulars of the call he wishes to place. The operator then keys into the system the called station digits, along with other possible information, including that required to effect the recording of the necessary charge data at the termination of the call.

The equipment provided in accordance with our invention enables the TSPS operator to serve other miscellaneous types of calls and to provide other miscellaneous types of call services. For example, an operator may set up a connection via the toll office between any two selected stations by keying both station numbers into the system. The toll office receives these numbers, by means of an outpulsing operation, and controls the establishment of a connection between the two stations. Calls of these types are commonly referred to as "delayed calls" since they are normally established in response to a calling customer's request when a priorly attempted call could not be completed.

The TSPS center may also initiate delayed calls on an automatic basis at a specified later time in response to information keyed into the system by an operator when an attempted call could not be completed. At this time, the operator asks the calling party whether he wishes the call to be tried at a later time and, if so, when. The specified later time is keyed into the system by the operator before she releases. Subsequently, when the specified time arrives, the calling and called numbers are outpulsed automatically to the toll office. At the same time, an operator is attached to the connection in order to provide any call service that may be required.

Our system also contains facilities which permit a calling station to be connected sequentially with a plurality of called stations, one at a time. An operator is required on these calls only for the keying in of the plurality of station numbers specified by the calling party. At this time, the operator receives from the calling party the list of stations with which he desires to be connected, keys this information into the system along with the required charge information, and then releases from the connection. The circuits of our system outpulse the first called number to the toll office, which controls the establishment of a connection thereto in the normal manner. This call, and each subsequent call, is monitored and, upon its termination, our system outpulses the next called number to the toll office. The process is repeated until the calling party has been connected to the last of the specified called stations. Upon the termination of this call, the entire connection, including the calling TSPS trunk circuit, is released.

Our system also contains facilities which permit a calling party to be notified that a specified number of chargeable minutes have transpired on a call. This service is provided automatically upon the expiration of the specified interval as a consequence of information initially keyed into the system by a TSPS operator. The TSPS operator to which the call is offered upon the expiration of the specified interval informs the calling party that the time he specified has elapsed and then releases from the connection.

Our system may also provide sequence call service of the delayed type. This service is requested when a calling party obtains a connection to a TSPS operator and requests that he be connected in sequence with a plurality of called stations at a specified later time. The operator keys into the system the specified later time and the list of called stations with which the calling customer desires to be connected. The control circuit times the period of delay and, upon its expiration, initiates the sequence calling operation in the same manner as already described for sequence calls which are not of the delayed type.

An increasing number of local offices are currently equipped with facilities for automatically identifying the calling station for charge data recording purposes. This equipment is commonly designated "ANI," which represents "automatic number identification." When serving calls from offices equipped for ANI operation, our system receives the ANI information (the calling number) by means of an outpulsing operation from the originating office. This information is stored until the termination of the call, at which time it is recorded with other relevant information for call charge data. Our system may also serve calls from offices not equipped for ANI operation (nonANI) and, on these, operator assistance is required to obtain the calling station number orally and key it into the system. If nonANI calls are of the type which require operator assistance for other reasons, i.e., person-to-person or coin, the duty of the operator additionally includes a determination of the calling number and the keying of it into the system. If a call served by our system is from a nonANI office and is of the customer-dialed station-to-station noncoin type, a TSPS operator is connected to the call solely for the purpose of obtaining the calling number and the keying of it into the system. This operation by the operator is performed in a manner similar to that already described for person-to-person calls.

Our system is sufficiently versatile in the type of call service that it may provide so that it may be interconnected with CAMA (centralized automatic message accounting) offices in order that our TSPS operators may function as CAMA operators. This service is provided by special TSPS CAMA trunk circuits each of which is connected on its incoming side to the CAMA office and on its other side to the TSPS network. The sole function of a CAMA operator is to orally obtain a calling station number and key it into her position for charge data recording purposes. When it is desired to permit our TSPS operators to function as or assist the local CAMA operators, each TSPS CAMA trunk circuit can extend a call via the TSPS switching network to one of our operator positions in essentially the same manner as a call is extended by the CAMA office to one of its CAMA operator positions. The TSPS operator then converses with the calling party to obtain his number in the conventional manner and keys it into the keyset at her position. This causes the calling station information to be transmitted back over the TSPS CAMA trunk circuit to the CAMA office, where it is recorded in the same manner as if the call were served by the regular CAMA operator. The CAMA office serves the remainder of the call in the same manner as if the CAMA operator function were performed locally. Specifically, the call is routed forward over circuitry external to our system. The TSPS CAMA trunk circuit is utilized for no other purpose than to enable a TSPS operator to converse with the calling party to obtain his number and to key it back to the CAMA office. The TSPS trunk circuit is not utilized to interconnect the calling and called stations on a CAMA call. The arrangement whereby our TSPS operators may serve as CAMA operators permits the elimination of inefficient CAMA switchboards.

The equipment provided in accordance with our invention is additionally versatile in that it may be situated geographically so that it can serve calls incoming to a plurality of toll offices from the local offices they serve on an originating basis. This permits all calls incoming to these toll offices to be provided with person-to-person service, without any modification being required at either the local offices or the toll offices. This arrangement enables the cost of our system to be shared by a greater number of offices and thereby permits person-to-person service to be provided in switching networks which might not otherwise have sufficient traffic of this type to economically justify person-to-person type service.

It may be seen from the foregoing that our invention represents a significant improvement in the art since it enables existing offices to serve many types of calls, including customer-dialed calls requiring operator assistance, without any modification being required at either the offices in which the calls originate or at the toll switching centers to which the calls are routed. This contrasts with the expensive and extensive central office modifications associated with the use of the equipment heretofore available that was capable of providing some of the call services provided by our system. The fact that the use of our system requires no modifications to any existing offices may well of itself permit many switching systems which could not otherwise afford it to now provide its customers with the advantages of person-to-person type service on customer-dialed calls.

The preceding has referred to our system as being situated intermediate one or more local offices and one or more toll offices in order to serve calls incoming to a toll office. This relationship is not limiting and the invention was discussed in this manner only to provide an appropriate setting illustrating the manner in which it might first find commercial use. However, if desired, the system of our invention could be situated between any two offices in order to provide service of the type discussed on calls extended from a first to the second office.

A feature of the invention is the provision of independent equipment which is situated intermediate a local and toll office for the serving of customer-dialed calls requiring call service that cannot be provided by the existing equipment at either the local or toll office.

A further feature is the provision of equipment situated intermediate to a first and second office for supplying operator assistance on calls extended from said first to said second office.

A further feature is that a call service center is located intermediate a first and second office and is operable upon the extension of a call from the first to the second office for providing call service of the type that cannot be provided by the facilities at either office.

A further feature is the provision at our service center of equipment for receiving call information outpulsed from a local office, for outpulsing call information to a second office, and for attaching an operator position to a calling connection solely for supplying call assistance required by a calling party.

Another feature is the provision of a service center intermediate a first and a second office for recording call charge data on calls extending via said service center from said first to said second office.

Yet another feature is the provision of an independent service center in which calls received over combined trunk groups are extended to the toll office without the attachment of an operator position if they do not require operator assistance, and for both extending calls to the next office and attaching an operator position thereto if the call is of the coin and/or person-to-person type or of any other type for which such assistance is required.

A further feature is the provision in the foregoing service center of equipment for recording call charge data for calls of both station-paid and person-to-person type.

A further feature is the provision in the foregoing service center of equipment for enabling the service center op-coin calls for computing the initial period deposit and duration, equipment for transmitting this information to the operator position serving the call in order that the operator thereat may monitor the collection of said deposit by the calling station, equipment for timing the chargeable portion of each coin call, equipment for connecting each coin call to any operator position upon the initial period termination, equipment for computing the overtime duration and charges of each coin call extending into overtime, and equipment for transmitting this overtime information to an operator position in order that the operator thereat may monitor the collection of these charges.

A further feature is the provision in the foregoing service center of equipment for enabling the service center operators to function as CAMA operators during periods when sufficient operators are not available at the CAMA office to serve its traffic.

A further feature is the provision in the foregoing service center of equipment for enabling a service center operator to key a plurality of called numbers into our system which, in response thereto, controls the connection of a calling station to a plurality of called stations sequentially, one at a time.

A further feature is the provision in the foregoing system of means whereby sequence call service may be initiated at a later time, in response to the operator keying into the system the required call information, including the time at which the service is to be initiated as well as the plurality of called stations with which the calling party desires to be connected.

A further feature is the provision in our service center of equipment whereby, upon the request of the calling party, a call may be automatically reconnected to an operator either upon its termination or upon the termination of a specified time.

These and other objects, advantages, and features of the invention may be more readily understood upon a reading of the following description of an exemplary illustrative embodiment of the invention taken in conjunction with the drawing, in which:

FIG. 1A discloses a first block diagram embodiment of our invention;

FIG. 1B diagrammatically discloses an alternative embodiment that differs slightly from that of FIG. 1A;

FIG. 2 illustrates one possible relationship between the TSPS center and a plurality of originating and toll offices;

FIGS. 3A through 3C, when arranged as shown on FIG. 3D, diagrammatically disclose additional details of our invention;

FIGS. 4A and 4B together, when arranged as shown in FIG. 4C, diagrammatically disclose additional details of the bus systems and other circuits utilized to transmit signals between the various circuits of our system;

Figure 8:
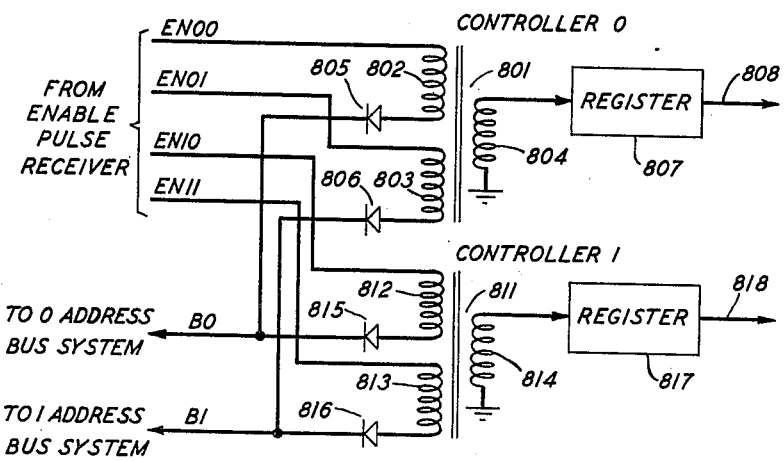
Figure 9:
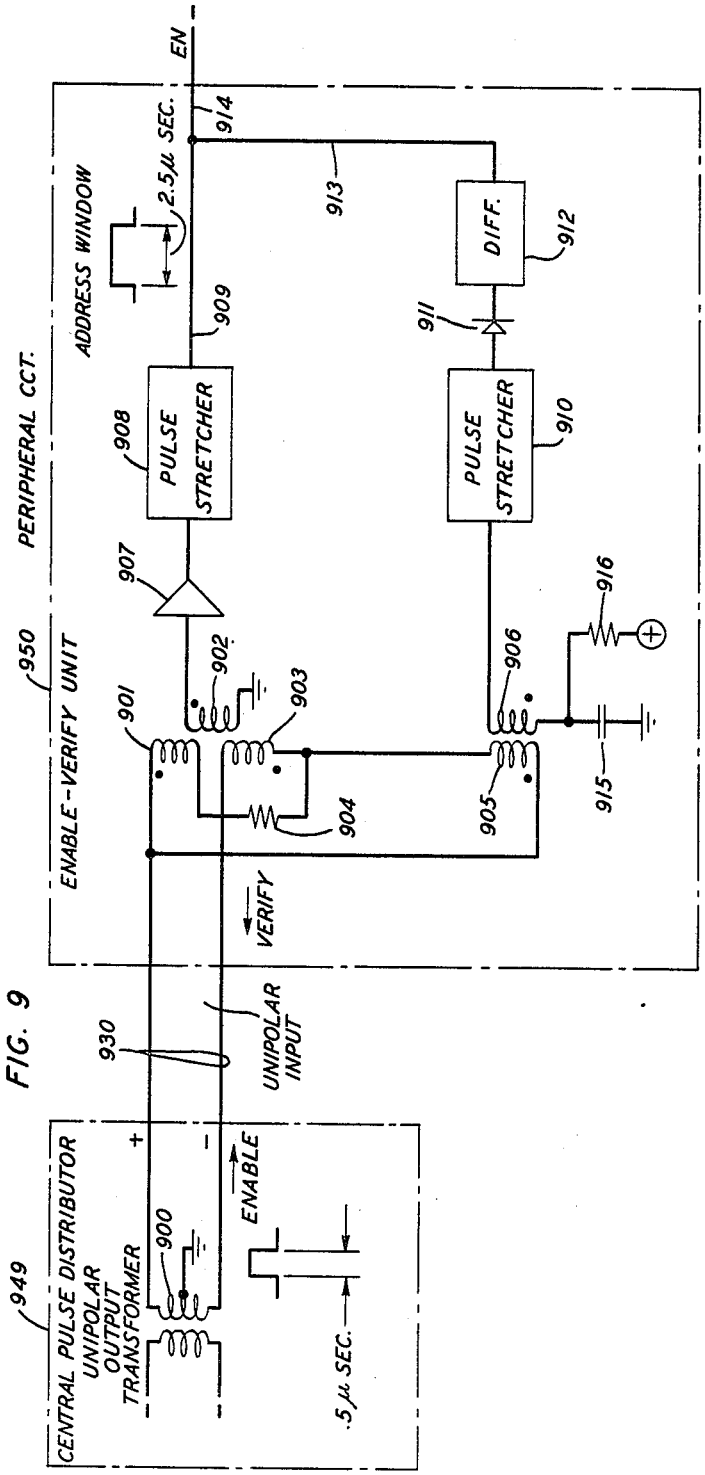
Figure 12:
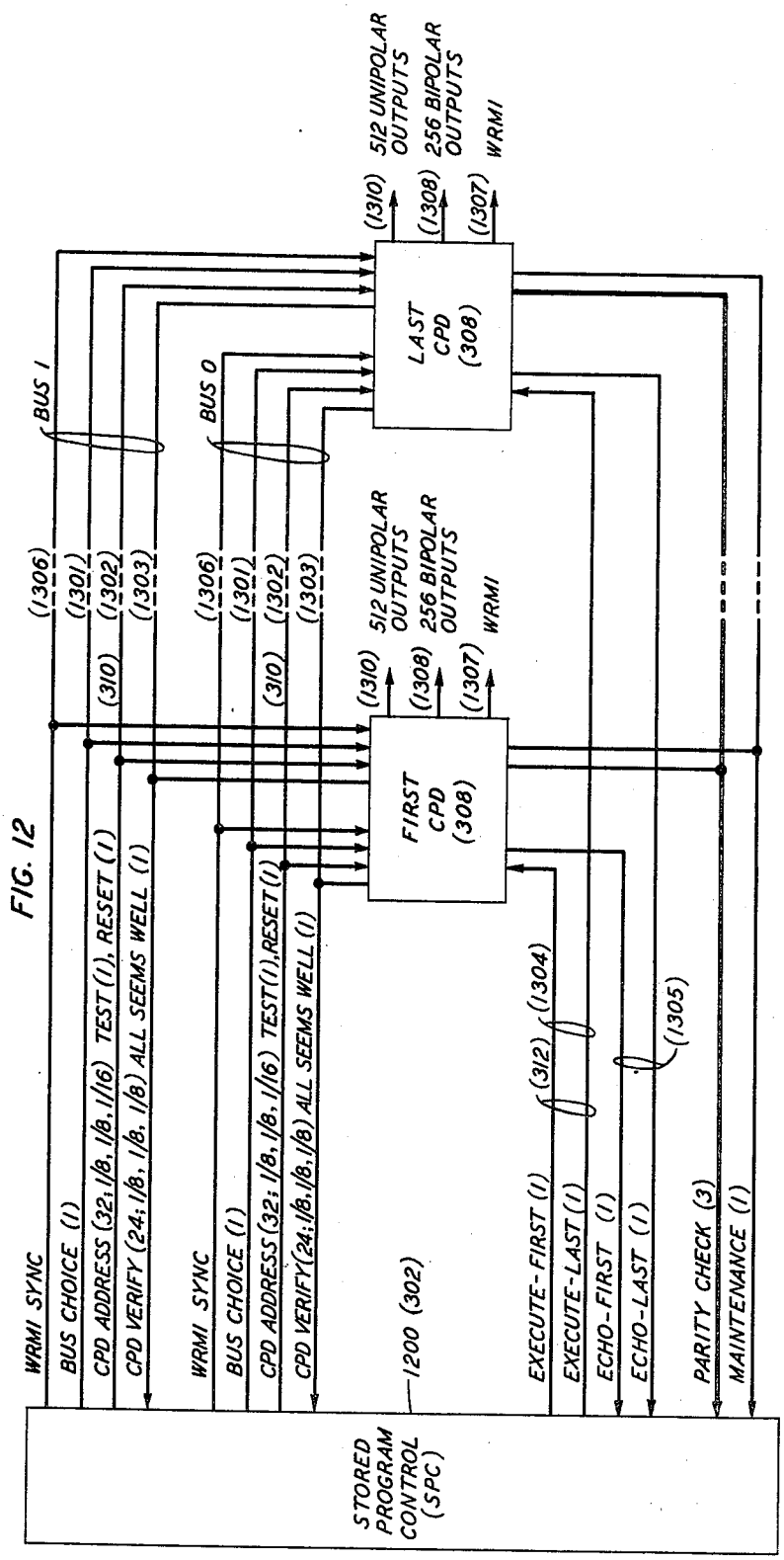
Figure 13A:
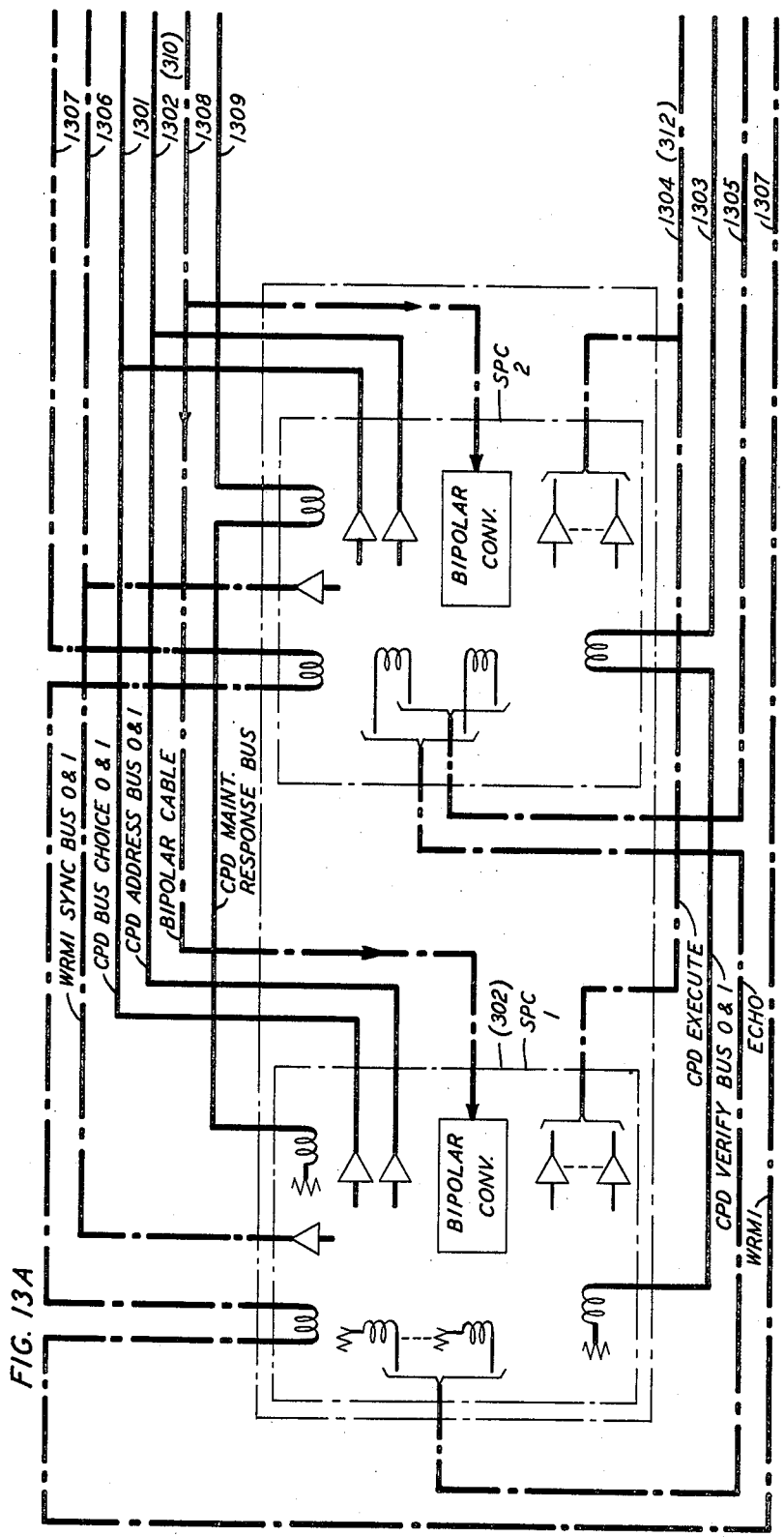
Figure 26:
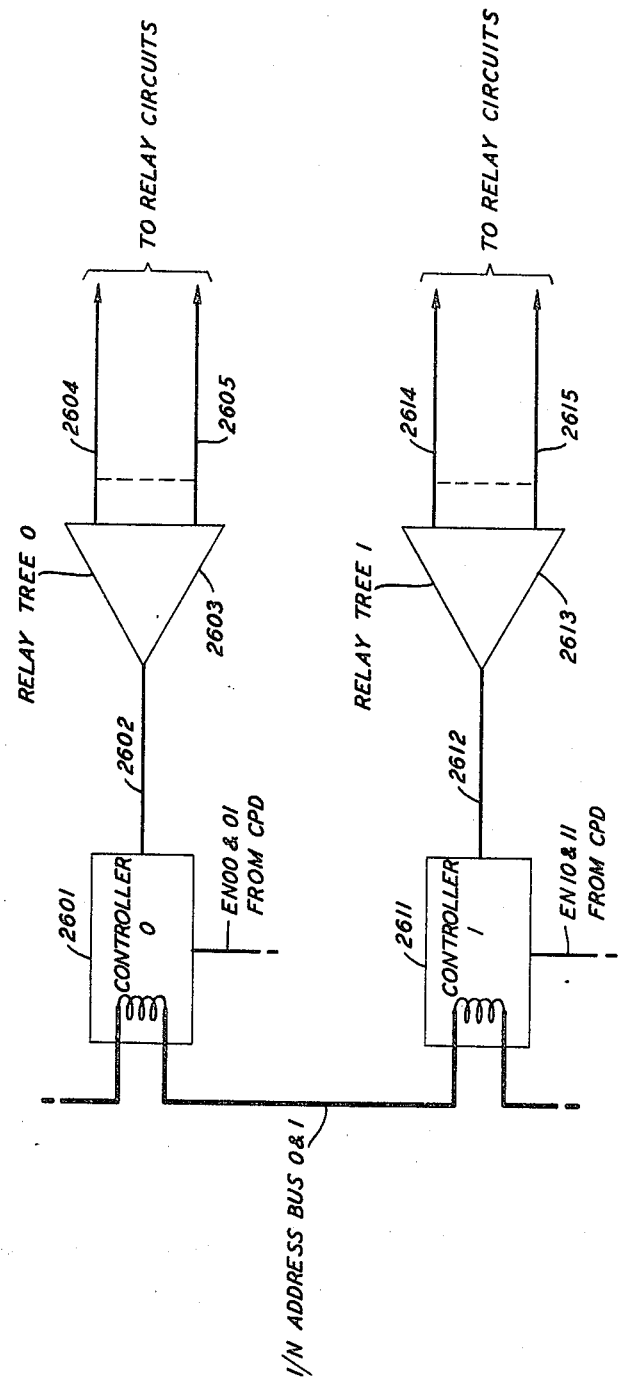
Figure 27:
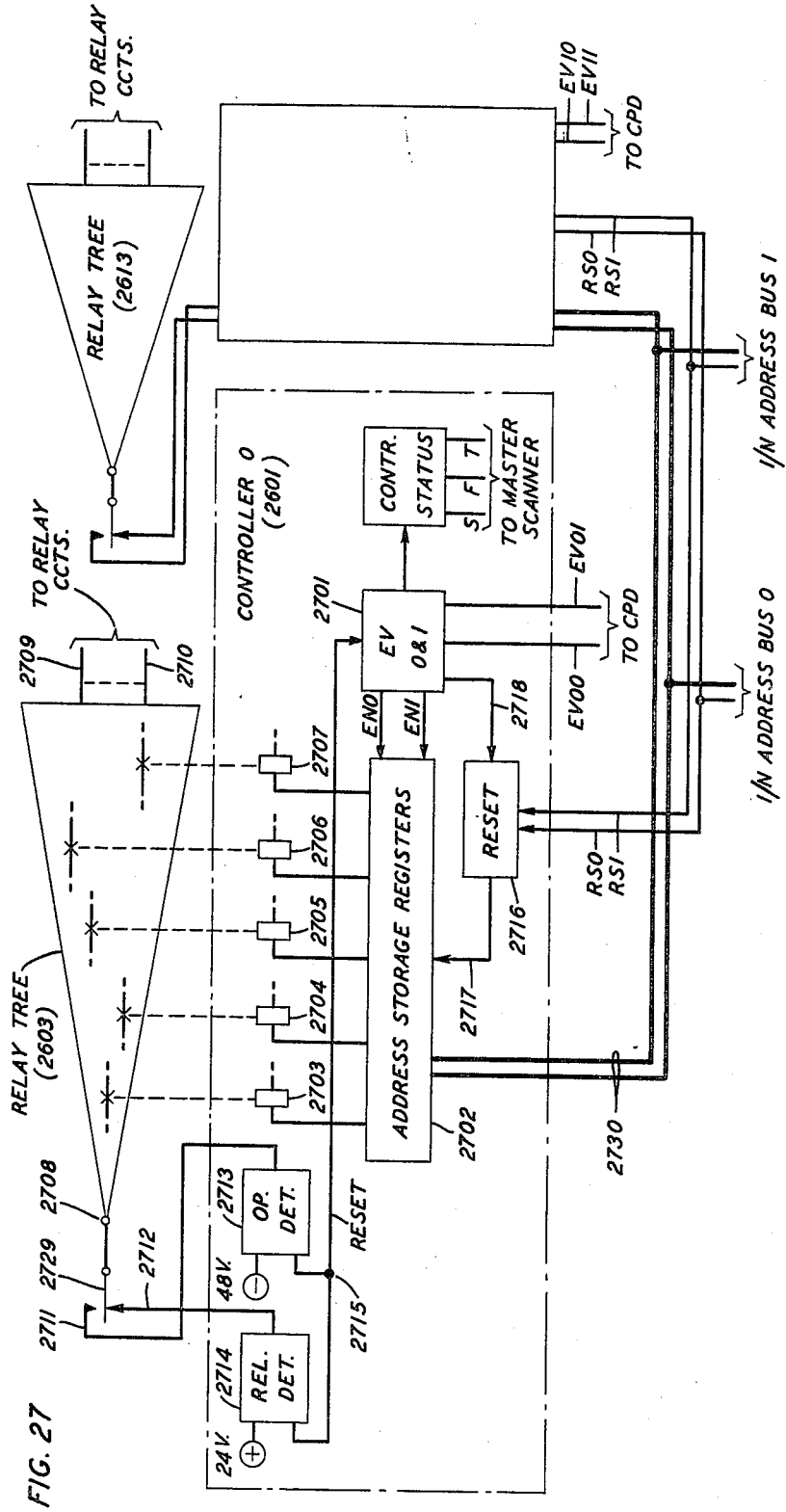
Figure 79:
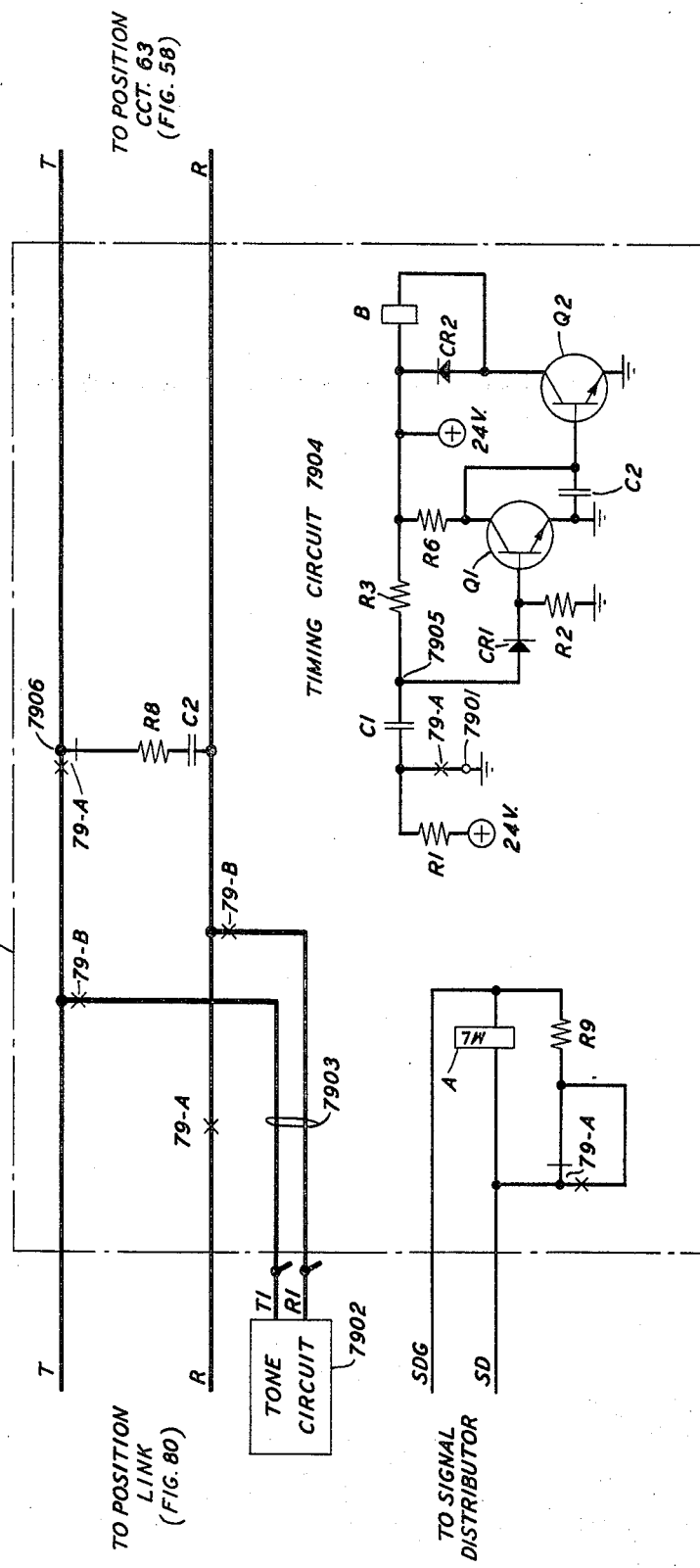
Figure 80:
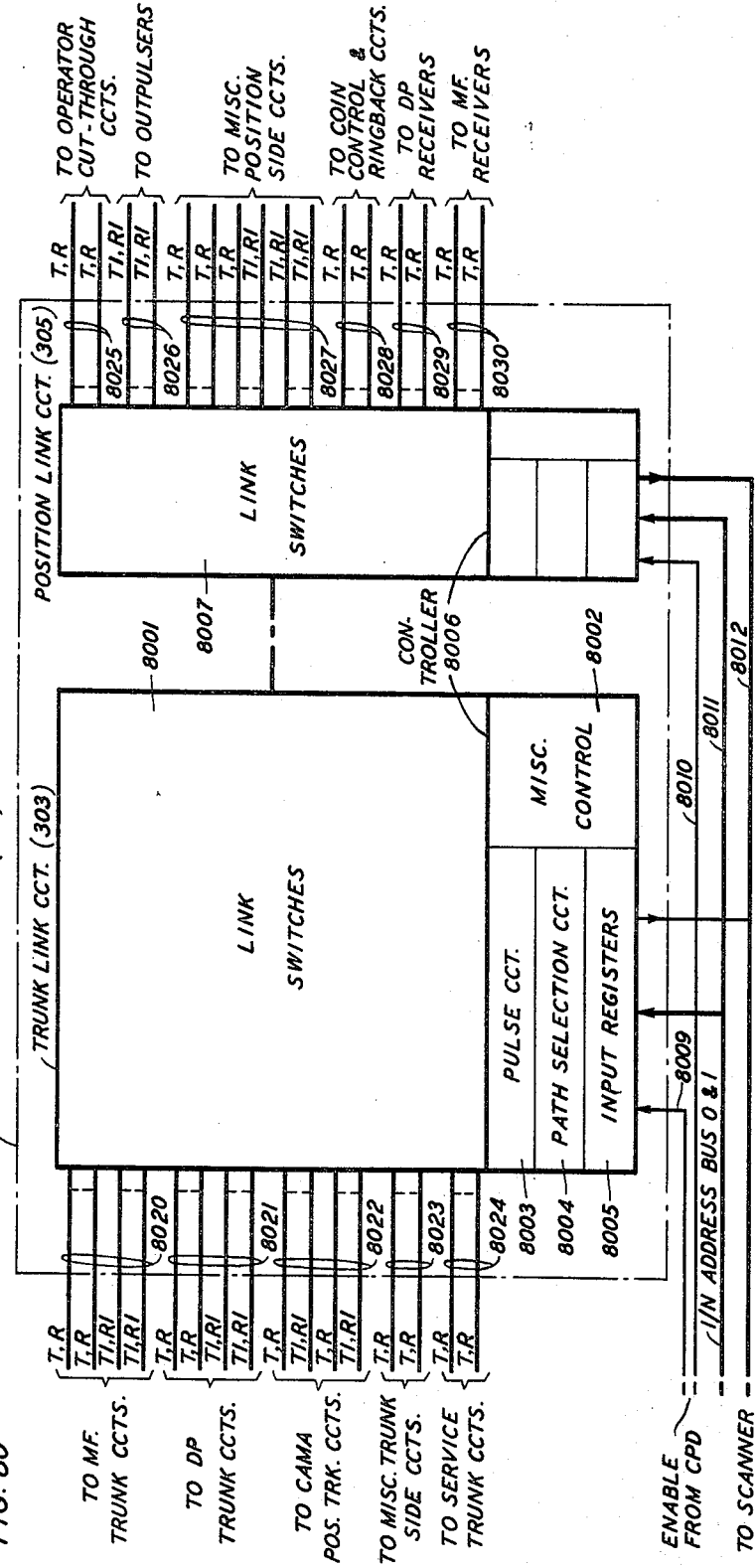
Figure 81:
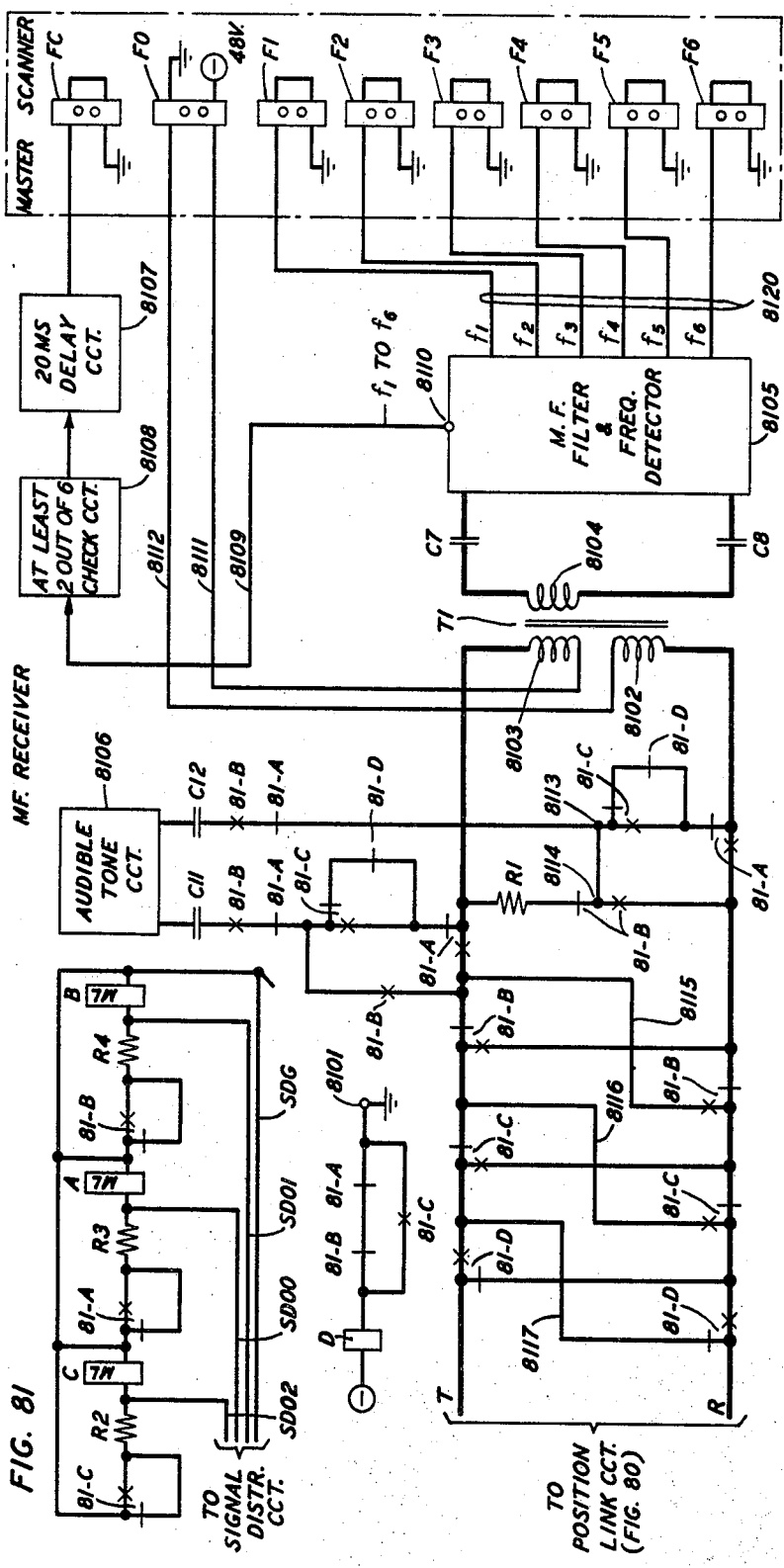
Figure 92:
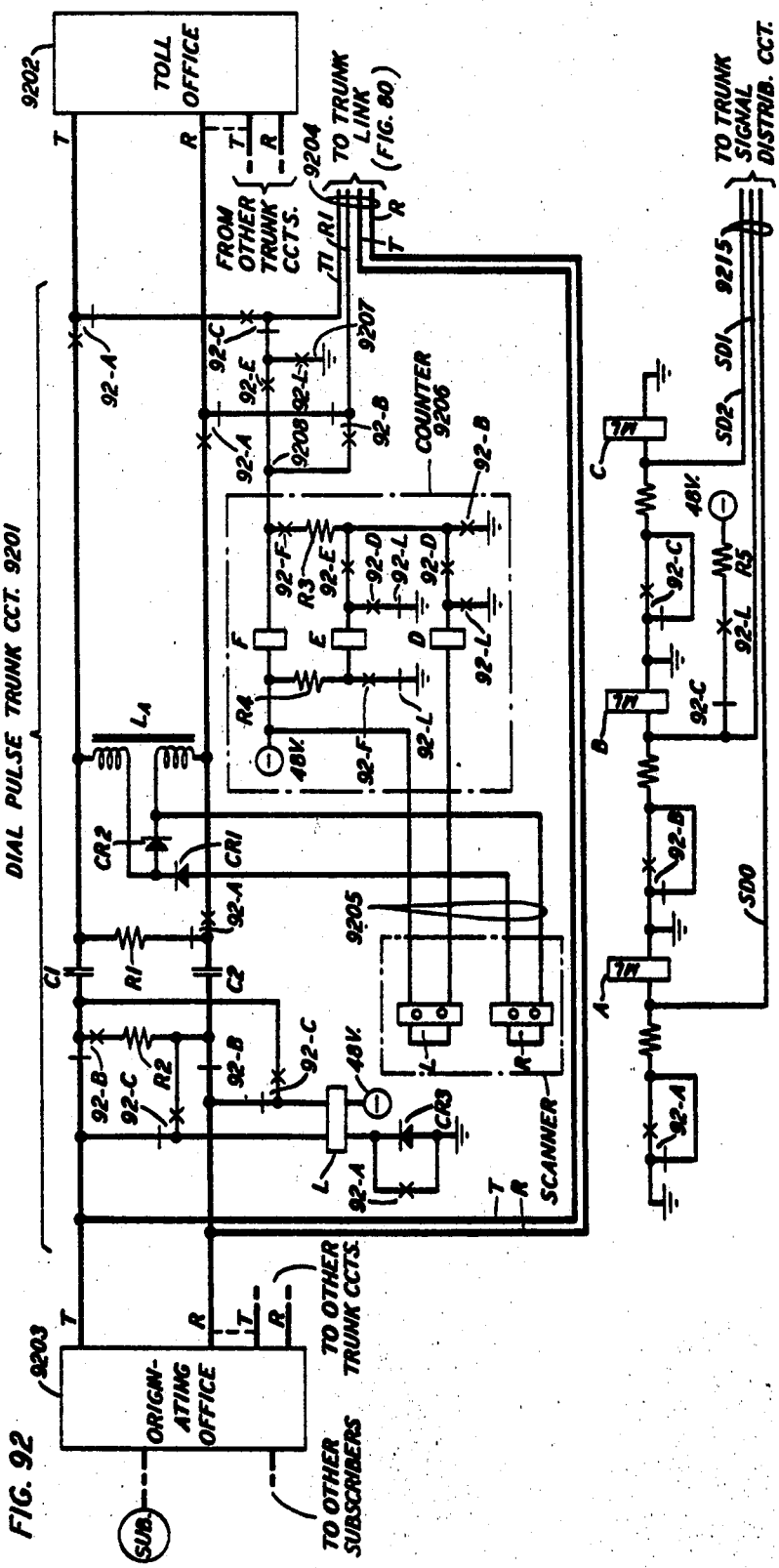
Figure 93:
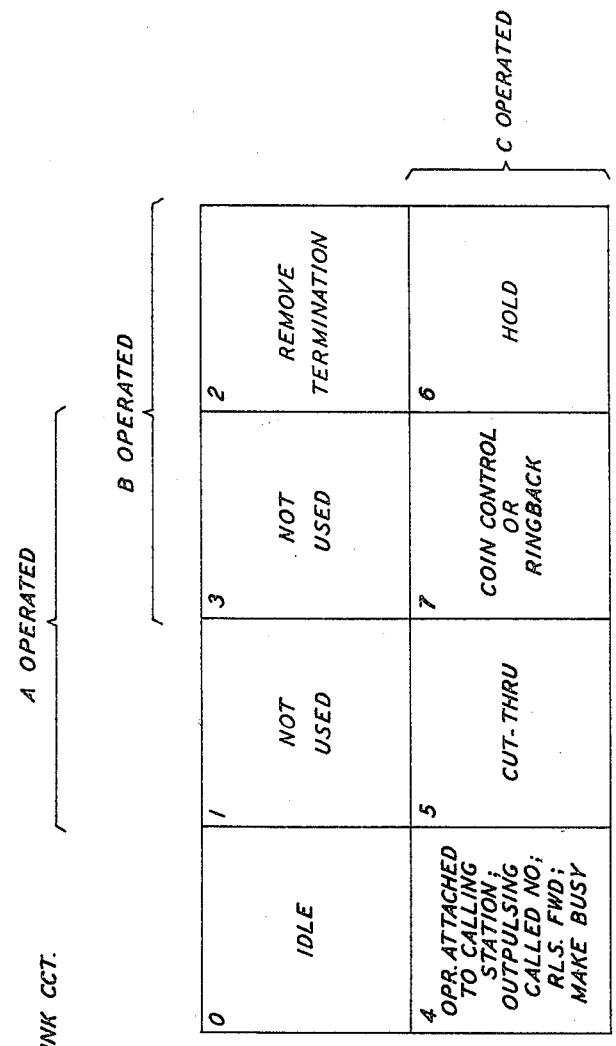
Figure 94:
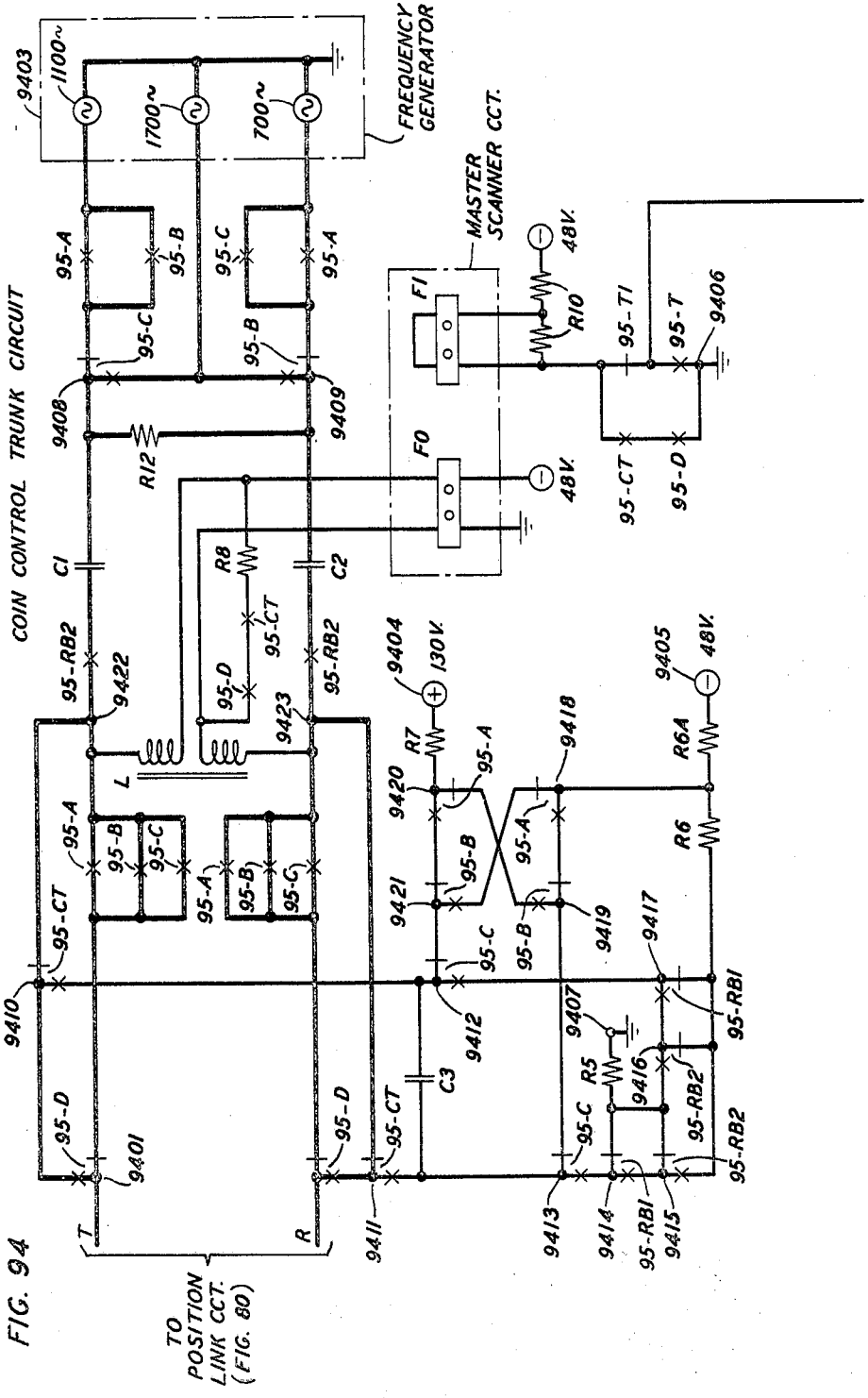
Figure 98:
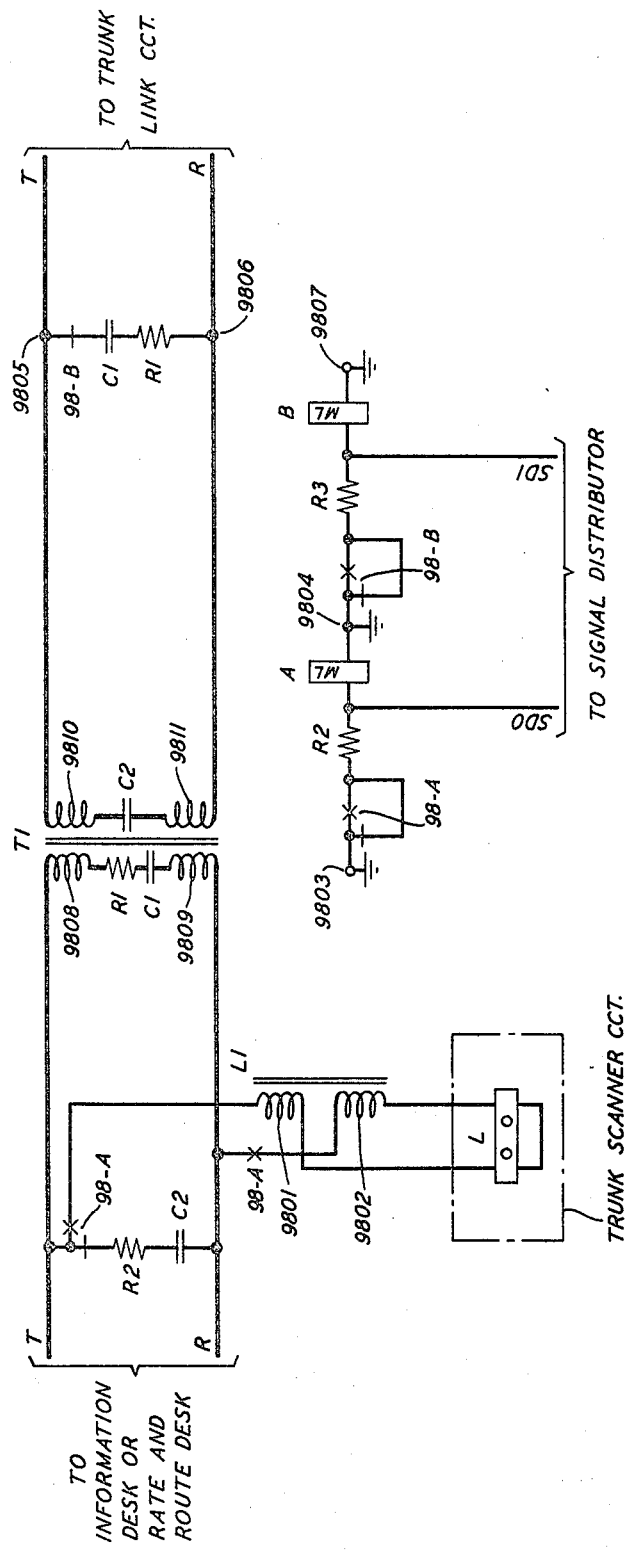
Figure 99:
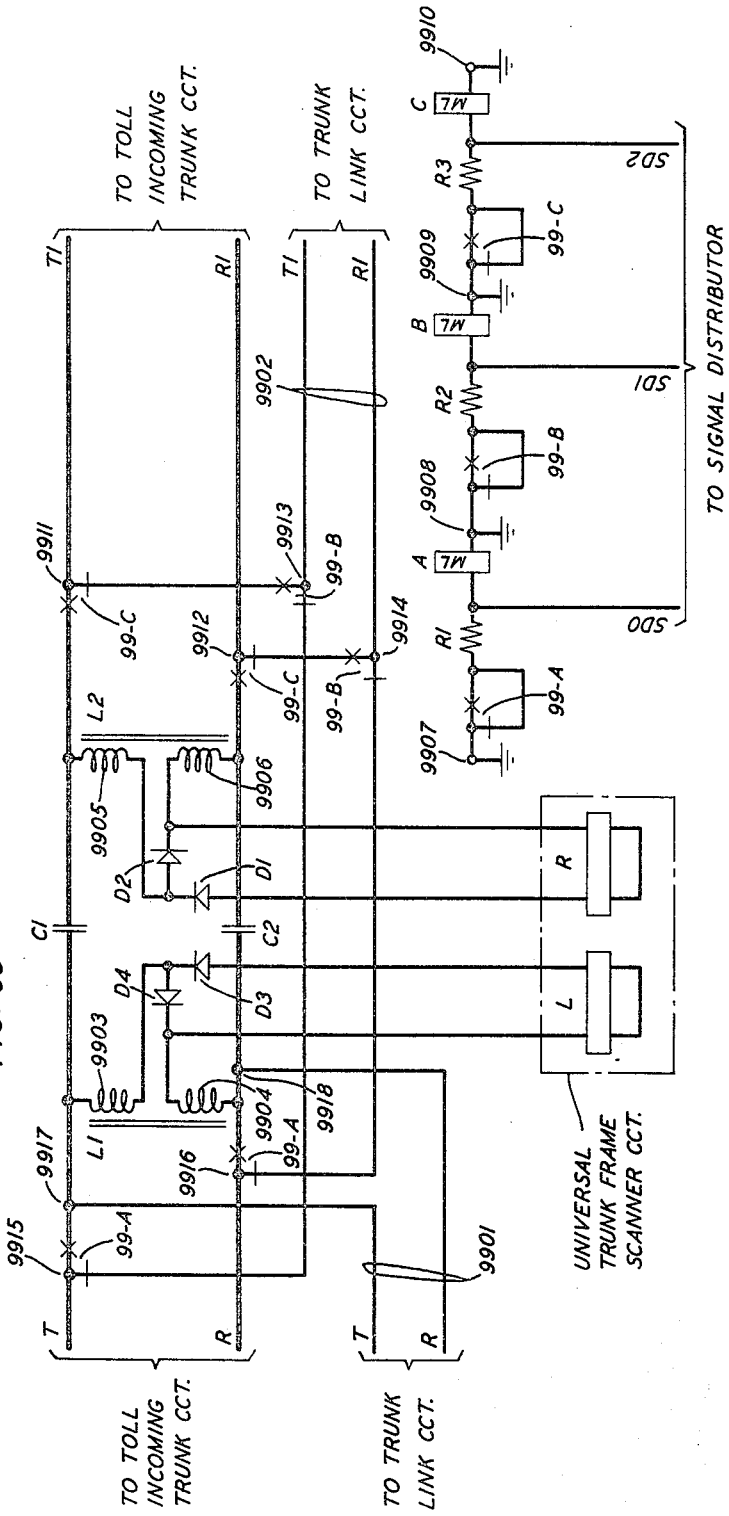

FIG. 8 discloses the details of a duplicated input circuit;

FIG. 9 discloses an enable verify unit utilized in our peripheral circuits;

FIGS. 10A, 10B, 11A and 11B illustrate additional drawing symbols utilized to minimize the drawing complexity;

FIG. 12 illustrates certain aspects of the interconnections between the stored program control circuit and the central pulse distributors;

FIG. 13A and 13B disclose additional details of the bus system utilized to interchange information between the circuits of our system;

FIGS. 14 through 18 disclose the details of a central pulse distributor;

FIGS. 19 through 25 disclose the circuit details of a typical scanner;

FIGS. 26 and 27 disclose a signal distributor;

FIGS. 28 through 35 disclose the circuit details of a communications bus translator;

FIGS. 36 through 39 disclose a position group gate circuit;

FIGS. 40 through 50 disclose details of a position signal distributor circuit;

FIGS. 51 through 57 disclose the circuit details of a position buffer;

FIGS. 58 through 75 disclose a position circuit;

FIGS. 76 through 78 disclose circuitry of a position scanner;

FIG. 79 discloses the details of an operator cut-through circuit;

FIG. 80 discloses a switching network;

FIG. 81 discloses an MF receiver;

FIGS. 82 through 85 disclose an MF outpulser;

FIGS. 86 through 89 disclose an AMA position trunk circuit;

FIGS. 90 through 91 disclose an MF trunk circuit;

FIGS. 92 through 93 disclose a dial pulse trunk circuit;

FIGS. 94 through 96 disclose a coin control trunk circuit;

FIG. 97 discloses the AMA circuitry and equipment which is utilized to record charge data;

FIG. 98 discloses an information trunk circuit;

FIG. 99 discloses a delayed call trunk circuit; and

FIGS. 100, 101, 102A through 102F, and 103 disclose further details of the SPC's (stored program controllers).

Block diagram—FIG. 1A

FIG. 1A diagrammatically discloses our invention in a manner which facilitates an understanding of its broader system aspects. Specifically, FIG. 1A shows our TSPS center 100 as being interconnected between a local office 101, a toll office 102, and a CAMA office 140 in order to furnish assistance of the type already described on calls incoming to the toll office and to permit TSPS operators to function as CAMA operators for calls served by the CAMA office The TSPS center contains a plurality of trunk circuits 103–1 through 103–N, each of which is connected on its incoming side to a corresponding one of local office outgoing trunk circuits 120–1 through 120–N and on its outgoing side to a corresponding one of toll office incoming trunk circuits 121–1 through 121–N. For example, TSPS trunk circuit 103–1 is connected via conductor pair IT, IR to local office outgoing trunk circuit 120–1 and to the toll office incoming trunk circuit 121–1 via conductor pair OT, OR. With this arrangement, each outgoing trunk circuit at the local office is individual to a different one of the TSPS trunk circuits 103 and, in turn, is individual to a different one of the toll office incoming trunk circuits 121. Each call from office 101 is extended via a selected outgoing trunk circuit to its associated TSPS trunk circuit and, in turn, to its associated incoming toll trunk circuit.

The TSPS center also has a plurality of CAMA trunk circuits 118–1 through 118–N, each of which is connected on its left-hand side to an individual one of outgoing CAMA office trunk circuits 119–1 through 119–N. Each trunk circuit 118– is connected on its right side to an individual appearance on the switching network 104. The TSPS center further includes AMA recorder 114 and a plurality of operator positions 109–1 through 109–N, with each position having an individual appearance on the right side of the switching network. The switching network, the AMA recorder, and the operator positions, together with the other circuits shown, permit the TSPS center to provide a charge data recording operation and/or operator assistance on those calls requiring it which are extended from local office 101 via the TSPS center to toll office 102. This arrangement also permits TSPS operators to function as CAMA operators on calls between the offices (not shown) with which the CAMA office 140 is associated.

Switching network 104 is connected on its left side to trunk circuits 103 and 118 and on its right side to a plurality of different circuits, including outpulsers 106, digit receivers 107, position buffers 108, and miscellaneous other type circuits which for the purpose of this figure are represented generally as Miscellaneous Tone and Service Circuits 117. Switching network 104 includes link 104A, which contains the circuit paths required to interconnect the circuits having appearances on its left side with those having appearances on its right side. Switching network 104 further includes link controller 104B, which controls the operation of the link in its path-establishing function.

TSPS center 100 further includes system control 105. System control is connected by cable 113 to trunk circuits 103 and 118, by cable 116 to link controller 104B, by cable 115 to recorder 114, by cable 111 to outpulsers 106, as well as by the same cable to digit receivers 107 and the miscellaneous tone and service circuits 117. System control 105 is further connected by cable 112 to position buffers 108 and by cable 116 to positions 109. These connections permit the system control to regulate, control, and coordinate the operation of each circuit in order that the TSPS center may furnish the service required of it on each call it receives. AMA recorder 114 records pertinent call charge data upon the termination of a call in response to information received from system control 105.

Each TSPS trunk circuit 103 is connected by means of two separate conductor pairs to two separate link appearances on the left side of link 104A. Conductor pair T and R connects the incoming side of the trunk circuit to the link. This permits the circuits on the right side of the link to communicate with the local office via the incoming side of the TSPS trunk circuit. The T1 and R1 conductor pair connects the outgoing end of the TSPS trunk circuit to the left side of the link. This permits the circuits on the right side of the link, such as for example, outpulsers, to communicate with the toll office.

Digit receivers 107 receive call information outpulsed from the local office 101. These receivers may be of different types, such as for example, DP or MF, depending upon the mode of outpulsing utilized by the local office. Outpulsers 106 transmit to the toll office the information it needs on each call. Outpulsers 106 advantageously may be of the MF type. However, if desired, they may be of any type well known in the art, such as for example, DP, et cetera, depending upon the toll office inpulsing requirements.

The TSPS center 100 functions to extend calls from any local office outgoing trunk circuit 120 to its related toll office incoming trunk circuit 121 via the TSPS trunk circuit 103 common to the local and toll office trunk circuits. Simultaneously with the extension of the call forward to the toll office, the TSPS center 100 furnishes the service required of it in connection with the completion of the call. This service may include, for example, the recording of call charge data by recorder 114. This service may further include the attachment of an operator position 109 to the calling TSPS trunk circuit if operator assistance is required for any reason in connection with the call completion. The operator position is disconnected by the switching network from the call when the operator assistance has been furnished. However, the calling and called stations remain connected via the TSPS trunk circuit for the call duration. The equipment at the TSPS center monitors and times the call and upon its termination causes recorder 614 to perform a charge data recording operation.

The function of the TSPS operators during the serving of calls from CAMA office 140 is identical to that of the CAMA operators; namely, they orally obtain the calling station number and key this information via the CAMA trunk circuit 118 back to the CAMA office, where it is recorded in the same manner as if the call were served by a local CAMA operator.

In order to illustrate the operation of our system as disclosed on FIG. 1A, let it be assumed that a customer-dialed call requiring operator assistance originates in local office 101. Let it further be assumed that this call requires a routing to toll office 102 via TSPS center 100. Finally, let it be assumed that, in serving this call, local office 101 selects outgoing trunk circuit 120-1. The seizure of this outgoing trunk circuit generates a signal which is received by TSPS trunk circuit 103-1 and transmitted to system control 105 over cable 113. System control responds to the signal and controls link controller 104B to establish a network link connection between the T and R conductors of trunk circuit 103-1 and digit receiver 107. The digit receiver subsequently receives call information outpulsed from the local office and, in turn, transmits it for storage to system control 105 over cable 111. System control signals link controller 104B to release the link connection to the digit receiver when the local office outpulsing operation has been completed.

System control next determines that the call requires operator assistance and signals the link controller to establish a connection between the T and R conductors of the calling trunk circuit and those of an idle operator position. Let it be assumed that position 109-1 is to serve this call. Therefore, the switching network now establishes a path between the T and R conductors of trunk circuit 103-1 and cable 110-1 extending to position 109-1. At the same time an operator positon is being selected and attached to the calling connection, the system control causes the link controller to establish a network connection between outpulser 106 and the T1 and R1 conductors of trunk circuit 103-1. Once this connection is established, circuit 105 controls the outpulser to transmit forward to the toll office the call information it requires for serving the call. The toll office utilizes this information to establish the forward connection in the conventional manner. The outpulser is disconnected by the link from the calling connection upon the termination of outpulsing.

The operator may converse with the calling party as soon as her position is attached to the TSPS trunk circuit. The relative time at which the outpulser and the operator position are attached to a call depends upon the type of call being served, as well as on the type and degree of operator assistance required. It is generally desirable that an operator have sufficient time to converse briefly with the calling party before the called station answers. The operator converses with the answering party at the called station in the event that the call is of the person-to-person or collect type. Once the operator has satisfied herself that the call has been established in the manner requested by the calling party, she depresses keys at her position to break down the link connection between trunk circuit 103-1 and the link appearance of her position via cable 110-1. At the same time, she depresses other keys which transmit to system control 105 the data it requires for a subsequent charge data recording operation by recorder 114.

Cable 112 permits system control 105 to transmit call data to each position circuit via its associated position buffer. This data may include the call type as well as the calling and/or called numbers together with any other information the operator may require. Cable 116 permits each position circuit to transmit information back to the system control for charge data recording purposes as well for instructing system control regarding the progress of each call served by the position. The information transmitted from the positions to system control may vary greatly depending upon the nature of the call.

The calling and called stations remain interconnected by the TSPS trunk circuit after the operator position has been released. System control monitors and times the call duration by means of its interconnections 113 with trunk circuit 103-1. Upon the call termination, system control detects the on-hook condition of the calling and/or called station and at this time transmits to recorder 114 the information it needs for recording pertinent call charge data. At the same time, the system control transmits signals over cable 113 to restore the trunk circuit 103-1 to its idle state.

All outgoing trunk circuits 120 in local office 101 are shown on FIG. 1A as extending to toll office 102 via the TSPS Center 100. If trunk circuits 120 actually comprise the sole means by means of which traffic may be routed by office 101 to the toll office, they would then be required to serve all type of traffic, including calls requiring operator assistance for their completion as well as calls that do not. Trunk circuits of this type are commonly referred to as being of the combined types since they serve more than one type of traffic.

It is possible that local office 101 could have additional outgoing trunk circuits, not shown on FIG. 1A, extending directly to the toll office without going through the TSPS center. In this case, the outgoing traffic could be segregated by the local office and routed to the toll office over the trunk group individual to the type of service required on each call. With this arrangement, noncoin station-paid and other calls not requiring operator assistance would be routed directly to the toll office, while calls requiring operator assistance would be routed via the TSPS center to the toll office. However, a direct trunk group could be utilized for this purpose and the TSPS center circumvented only if either the local or the toll office has facilities for obtaining and automatically recording all the charge data required for billing purposes. If such is not the case, a direct trunk group could not be utilized and all traffic would have to be routed via the TSPS center. In this event, an operator position would be attached only on calls requiring operator assistance. Those calls not requiring it would be served by the TSPS center in the same manner as already described, except that a connection to an operator position would not be made and all the call data required for billing purposes would be received by system control 105 from the digit receiver 107.

BLOCK DIAGRAM—FIG. 1B

The embodiment of our invention shown on FIG. 1B is similar to that of FIG. 1A, except that FIG. 1B discloses a plurality of local offices and a plurality of toll offices, with each local office being connected to a toll office by means of a different trunking arrangement. The elements on FIG. 1B corresponding to elements on FIG. 1A are designated so as to facilitate the correspondence. Local office 101 on FIG. 1B corresponds to the similarly designated office on FIG. 1A and is connected to toll office 102 solely by means of a combined trunk group extending via the TSPS center. Local office 130, on the other hand, is connected to toll office 132 by means of two different trunk groups, one of which extends directly to the toll office and is designated "NC1+" as an indication that it serves only noncoin station-paid calls. The other trunk group extending from local office 130 extends to toll office 132 via the TSPS center and is designated "0, 0+, C1+" as an indication that it serves calls requiring operator assistance.

It is contemplated that the dialing operation on customer-dialed station-to-station calls will include the prefix digit 1 plus the regular seven or ten digits while the dialing operation on customer-dialed calls requiring operator assistance will include either the digit 0 only or the digit 0 as a prefix, followed by the normal seven or ten digits. In view of the above and in order to facilitate a discussion of the different types of calls that may originate within the local offices, customer-dialed station-to-station calls, for which a prefix digit of "1" plus the regular seven or ten digits are dialed, are hereinafter referred to as being of the "1+" type. Customer-dialed calls involving the dialing of only the single digit 0 or the dialing of a prefix digit of "0" followed by the normal seven or ten digits are hereinafter referred to as "0" and "0+" calls, respectively. In some areas, customer-dialed station-to-station calls do not require the dialing of the prefix 1. However, for uniformity and convenience of discussion, these are nevertheless still referred to herein as "1+" type calls.

Also, since calls of the foregoing category may be originated from noncoin as well as coin stations, the letters "C" or "NC" are prefixed to the numerical designation where a distinction between the coin and noncoin types is significant. For example, the designation "C1+" is utilized to signify a coin customer-dialed station-to-station call while the designation "NC+" signifies a noncoin customer-dialed station-to-station call. Where a numerical designation is utilized by itself without the letters "C" or "NC," such as for example, 0+, the designation may be considered to signify both coin and noncoin traffic of the indicated type. For example, the trunk conductors connected to TSPS trunk circuit 103–1 are designated "0," "0+," "C1+." This is to be understood to signify that the 0 and 0+ traffic may be both of the coin and noncoin type while the C1+ traffic is of the coin station-to-station type.

Operator assistance is not required on noncoin station-to-station calls, NC1+, since these calls are of the customer-dialed station-to-station type for which the calling party is willing to converse with anyone answering the phone at the called station. Operator assistance is required on 0, 0+, and C1+ type calls. Operator assistance is required on 0 type calls since, on these, the calling party dials only the digit 0 in order to obtain a connection to the operator. It is then the operator's duty to orally obtain the desired called station number and key it into the system. Zero-plus calls, whether coin or noncoin, are of the person-to-person type, and operator assistance is required on these to ascertain that the individual specified by the calling party is available for conversation at the called station. Operator assistance is additionally required on calls of the coin 0 and coin 0+ type for the purpose of monitoring the collection of the required monetary deposits at the calling station. Operator assistance is required on C1+ type calls for the same reason.

The information that must be received by the TSPS center from the local office on each call differs, depending upon the type of traffic carried by the trunk group serving the call. For example, the TSPS center does not need to receive information indicating the call type on calls received over a trunk group carrying only a single type of traffic, i.e., noncoin station-to-station, since this information may be derived within the TSPS itself by noting the trunk group in which the calling TSPS trunk circuit is located. On the other hand, call type information must be received from the originating office on calls arriving over a combined trunk group since the TSPS center has no way of determining for itself the nature of the call.

In view of the foregoing, system control 105 on FIG. 1B is able to determine for itself that all of the traffic served by trunk circuit 103–1 requires operator assistance. This information is inserted into system control at the time the trunking pattern for the TSPS center are determined. However, even though the TSPS center may by itself determine that operator assistance is required on all calls served by this trunk circuit, it still must receive from the originating office on each call information signifying whether the call is of the 0, 0+, or C1+ type. This information must be received because the TSPS center has no way by itself of determining the call type on any call incoming on this trunk circuit.

TSPS trunk circuit 123 serves calls of the 1+, 0, and 0+ type. Therefore, on each call offered by this trunk circuit, the TSPS center must receive from the originating office information signifying the call type. Further, since 1+ calls do not require assistance, while 0 and 0+ calls do require operator assistance, the information furnished by the originating office must additionally specify whether or not the calls require operator assistance.

The call class information received by the TSPS center is transmitted to and stored within system control 105, where it is subsequently used for various purposes, including controlling the system operation in furnishing the class of service required on the call. For example, if a charge data recording operation is required at the TSPS center, the call class information is utilized to control the charge data recording operation in order that information signifying the call type may be recorded for subsequent billing purposes. Also, if operator assistance is required on the call, the call class data stored within system control is utlized to control the transmission operator position serving the call of sufficient data to inform her of the type of call she is serving in order that she may know the call functions required of her.

It is subsequently described in detail how the local office may supply the call class information by encoding into unique frequency combinations indicative of the call parameters certain control pulses utilized in connection with the normal outpulsing of the calling and/or called number information. This information is received by the rigit receivers 107 which receive the encoded frequency pulses and decode them into the calling and/or called number information as well as into the class charge information.

The disclosure of FIGS. 1A and 1B has been simplified in order to facilitate a basic understanding of the relationship between the local offices, the toll offices, and the TSPS center. Other more complex arrangements may be utilized in order to permit the full capabilities of our invention to be obtained and realized. For example, FIG. 1B discloses only one local office being connected to each toll office by way of the TSPS center. This showing is not a limitation and it is contemplated that in the commercial use of our invention, each toll office may be connected via the TSPS center with a plurality of local offices and, conversely, each local office may be connected via the TSPS center to a plurality of toll offices if the toll traffic from the originating office warrants it. Also, of the plurality of local offices to which each toll office may be connected, some of the connections may be made by way of the TSPS center while others may be of the direct type. Also, each local office may be connected by direct trunks to certain toll offices and, by means of TSPS trunk circuits, to other toll offices, depending upon the traffic requirements therebetween.

Figure 2:
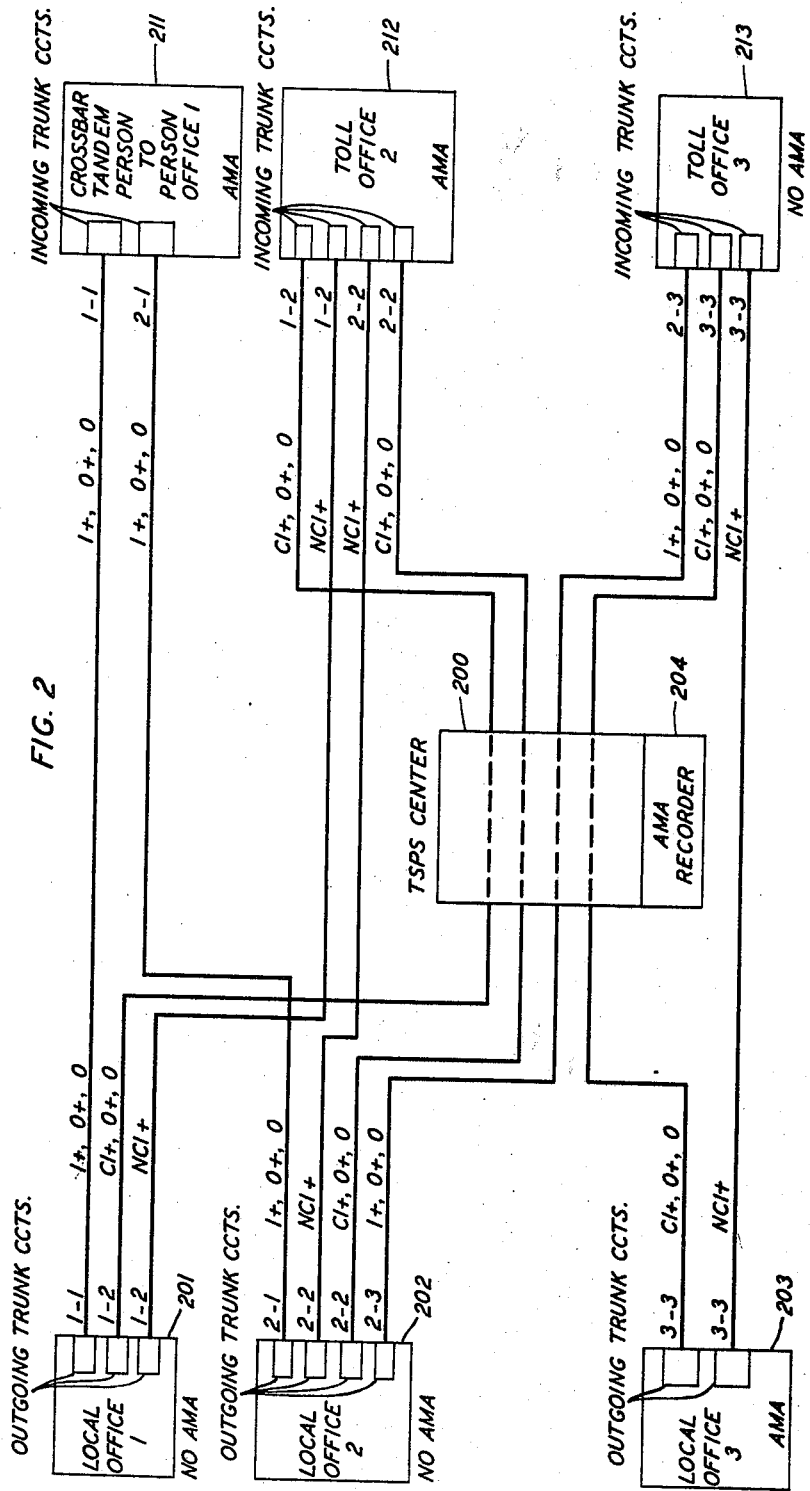

Block diagram—FIG. 2

FIG. 2 diagrammatically discloses a plurality of local offices, a plurality of toll offices, a TSPS center, together with interconnections illustrating the various manners in which the originating traffic incoming to the toll offices from the local offices may be served. Three local offices designated 201, 202, and 203 are shown on the left side of the figure. The right side of the figure shows three toll offices: 211, 212, and 213. TSPS center 200 is positioned intermediate the toll and local offices. Each local office has a plurality of cables representing trunks extending therefrom to a plurality of toll offices. Each cable is designated in a manner to signify the two offices that are interconnected by it as well as the type of traffic served thereover. Thus, the topmost cable extending from local office 1 is designated "1—1" to signify that it interconnects local office 1 and the toll office 1. Immeriately to the right of this designation is the designation "1+," "0," and "0+." These designations signify the type of traffic served by the trunk group and respectively represent station-to-station, person-to-person, and dial 0 traffic of both the coin and noncoin type. The other trunk groups on FIG. 2 are similarly designated in a manner indicating the offices interconnected thereby and the type of traffic served. Thus, referring to the right end of the lowermost trunk group on FIG. 2, it bears the designation "NC1+" to signify station-to-station traffic, and also bears the designation "3—3" to signify that the trunk group interconnects local office 3 and toll office 3.

The TSPS center 200 is shown only diagrammatically and the dashed horizontal lines within it represent the TSPS trunk circuits required to serve the various types of traffic extending from the originating offices to the toll offices via the TSPS center. Although the entirety of the equipment comprising the TSPS center is represented by the rectangle 200, the recorder 204 is separately shown in order to facilitate a subsequent discussion of the services provided by the TSPS center during the serving of different types of calls. Each local office as well as each tandem and toll office bears a designation indicating certain aspects of the type of service it may provide. Thus, local office 201 bears the designation "NO AMA." This signifies the office is not equipped with automatic call charge recording facilities. Local office 202 also does not have this equipment. Local office 203 bears the designation "AMA" and is equipped to record call charge data. Tandem office 211 is equipped to provide person-to-person type service as well as automatic charge data recording. Toll office 212 has charge data recording equipment while toll office 213 does not.

Calls from local office 201 may be extended either to crossbar tandem office 211 or to toll office 212.

Its calls to crossbar tandem are extended directly over the trunk group designated "1—1." This trunk group is of the combined type and serves customer-dialed station-to-station, person-to-person, and dial 0 calls. This is indicated by the designation "1+," "0+," and "0." The crossbar tandem office advantageously may be of the type disclosed in the aforementioned Curtis and Cerny et al. applications, and it accordingly includes the necessary facilities for providing operator assistance on calls requiring it as well as facilities for recording call charge data when serving calls from local offces which are not so equipped. This is the case for local office 201, which has no AMA facilities, and therefore tandem office 1 would be required to record call charge data when serving customer-dialed calls from local office 1.

Calls from local office 201 to toll office 212 are extended over one of two trunk groups depending upon the service required on each call. Noncoin station-to-station calls and other calls not requiring operator assistance are routed directly over the lowermost trunk group extending from local office 1 and designated "1–2," followed by a NC1+. The AMA facilities at toll office 212 record call charge data for calls received over this trunk group. Calls from local office 201 requiring operator assistance are extended to toll office 212 via trunk group 1–2, which serves C1+, 0+, 0, and any other type of call requiring operator assistance. These calls are routed via the TSPS center for the furnishing of the operator assistance required. Recorder 204 in the TSPS center records the call charge data on such calls and signals the toll office 212 to this effect so that its AMA facilities will not be utilized on calls received on this trunk group.

Local office 202 may extend calls to tandem office 211 as well as to both toll offices. The calls extended to the tandem office are served by the combined trunk group designated "2–1" followed by 1+, 0+, and 0. Any operator assistance required on calls served by this trunk group is furnished by the crossbar tandem office. The charge data recording is necessarily done at the tandem office on these calls since local office 202 has no AMA recording facilities. The traffic from local office 202 to toll office 212 which does not require operator assistance is served by the trunk group designated "2—2" followed by the designation "NCH." This trunk group extends directly between the two offices. A call charge recording operation is performed by the AMA equipment at the toll office. Calls requiring operator assistance and extending from local office 202 to toll office 212 are routed via the TSPS center and are served by the trunk group designated "2—2" followed by the designation "CH," "0+," "0." The TSPS center furnishes the required operator assistance and performs the charge data recording operation on these calls.

Calls from local office 202 to toll office 213 are served by the combined trunk group designated 2–3 followed by the designation "1+," "0+," and "0." These calls are routed via the TSPS center, which performs a charge data recording operation for all calls and supplies the required operator assistance on those calls requiring it.

Local office 203 extends its noncoin station-to-station and other traffic not requiring operator assistance to toll office 213 over a trunk group directly interconnecting the two offices, while its calls requiring operator assistance are routed via the TSPS center, which furnishes the required assistance. Local office 203 is equipped with AMA facilities, and it therefore records its own charge data for the 1+ traffic. However, the recorder 204 at the TSPS center records the charge data for operator assisted calls.

It may be seen from the preceding discussion of FIG. 2 that the incorporation of our TSPS center into a switching network enables the resulting network to improve and update the type of service it can provide with no modification being required at any office in the system. Thus, the addition of the TSPS center to the network of FIG. 2 enables customer-dialed calls extending from the local offices to toll offices 212 and 213 to be provided with operator assistance, when required, without any modifications being required at any office. The expense involved in the installation of our TSPS system is far less than that which would be otherwise required to modify a toll or a local office to the same service.

Block diagram—FIGS. 3

Figure 3A:
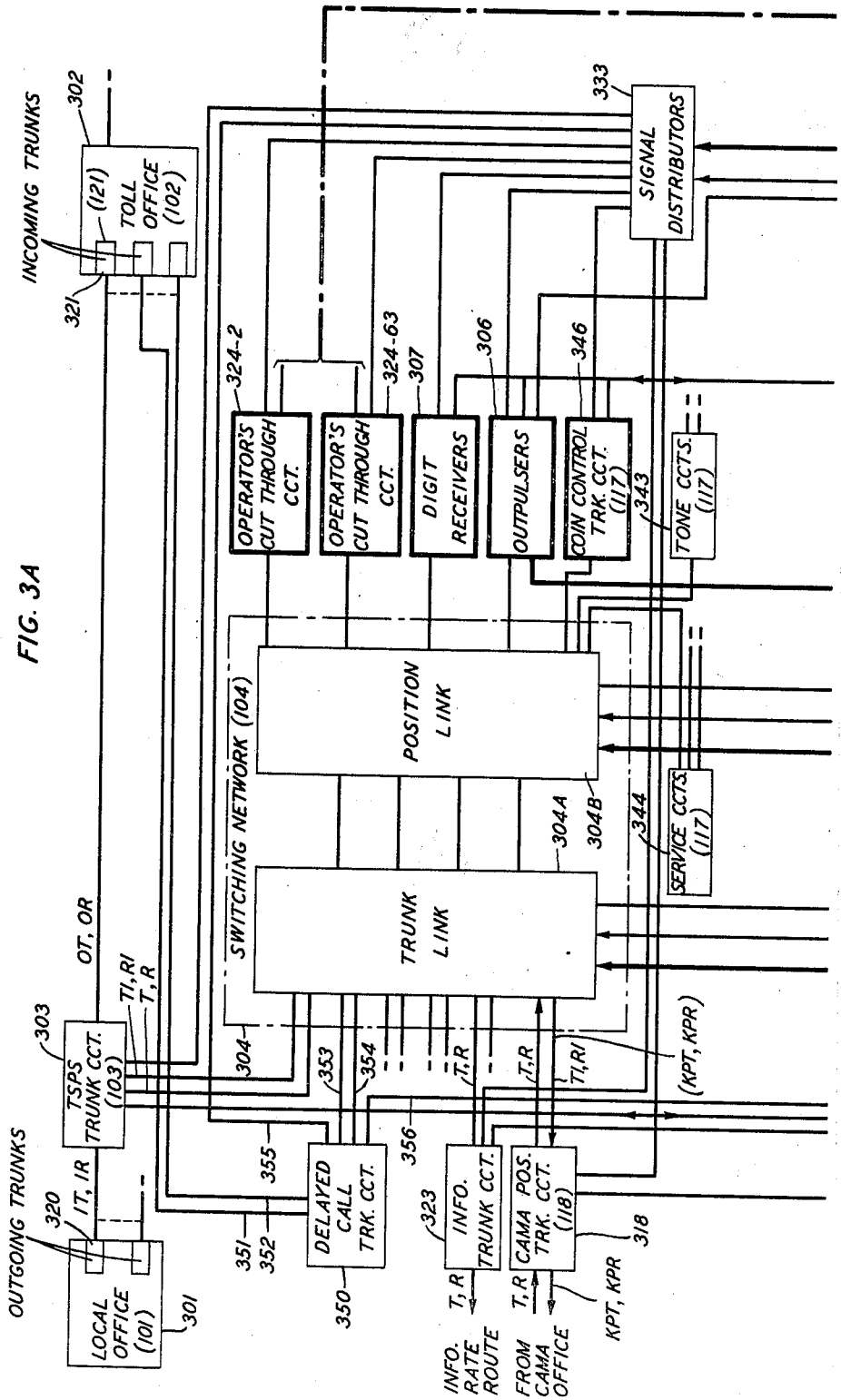

FIGS. 3A through 3C, when arranged as shown in FIG. 3D, diagrammatically disclose additional details of the embodiment of our invention shown on FIG. 1A. Each element of FIGS. 3 corresponding to an element on FIG. 1A is designated in a manner to indicate the correspondence. Thus, local office 301 on FIG. 3A corresponds to local office 101 on FIG. 1A, etc. Wherever a one-for-one correspondence is possible, each such element on FIGS. 3 also has, inside the rectangle representing the element, parentheses enclosing the numerical designation of the corresponding element on FIG. 1. However, a one-for-one correspondence between the elements on FIGS. 3 and FIG. 1A is not always possible since FIG. 3 is more detailed and contains many elements which are not separately shown on FIG. 1A.

The embodiments of FIGS. 3 is similar to that of FIG. 1A in that it discloses a local office 301 having an outgoing trunk circuit 320 extending via TSPS trnuk circuit 303 to an incoming trunk circuit 321 at toll office 302. Only one such interconnection between a local and a toll office is shown in order to minimize the complexity of the drawing and facilitates an understanding of our invention. It is to be understood, however, that the local and toll offices may be interconnected by many trunks, with the details of the trunk pattern being dependent upon the nature and volume of the traffic between the two offices.

FIG. 3A also includes a CAMA position trunk circuit 318 which, in a manner similar to its counterpart on FIG. 1, interconnects the TSPS switching network 304 with a CAMA office in order that TSPS operators may function when required as CAMA operators. FIG. 3A further includes an information trunk circuit 323 which, in order to minimize its complexity, was not shown on FIG. 1. This trunk circuit interconnects the TSPS switching network 304 with information desks, rate-and-route operators, and the like. This is required in order that a TSPS operator serving a call may have access to other operators so that she may obtain the information required to serve calls to infrequently called destinations.

The embodiment of FIG. 3A also includes a delayed call trunk circuit which is connected by paths 351 and 352 to two different toll office incoming trunk circuits and which is also connected to two appearances on network 304 by paths 353 and 354. This trunk circuit was not shown on FIG. 1 in order to minimize its complexity. This trunk circuit is used to permit an operator to initiate connections on her own between any two specified stations. Calls of this type are commonly referred to as "delayed calls" because they are normally attempted upon a customer's request at the time a priorly attempted call could not be completed.

Network 304 comprises a two-stage network having a trunk link 304A and a position link 304B. The two links together function to interconnect trunk circuits having trunk link appearances with the service circuits having appearances on the position link. The service circuits are shown in greater detail than on FIG. 1A and comprise digit receivers 307, outpulsers 306, coin control trunk circuits 346, tone circuits 343, and opeartor cut-through circuits 324. The digit receivers, the outpulsers, the service circuits, the tone circuits and the coin-control trunks perform the same functions already described in connection with FIG. 1A. The operator cut-through circuits are rudimentary trunk circuits whose function is to interconnect the talking circuitry of each opeartor position with an appearance on the position link. The operator positions are shown on the right side of FIG. 3 and the series of them are designated 309–2 through 309–63. These 62 different operator positions are designated in this manner since the functional equivalent of positions 0 and position 1 are utilized for other purposes, as subsequently described. Each position circuit is individually associated with one of the position buffer circuits in the series 308–2 through 308–63. Each operator position is also individually connected to one of the operator cut-through circuits in the series 324–2 through 324–63, each of which on its left side extends to an individual position link appearance.

The equipment at each operator position includes numeral display lamps, miscellaneous lamps, and manually operable keys. The function of the numerical display lamps is to provide the operator with numerical data, such as calling and called number information, monetary charges, etc. The function of the miscellaneous lamps is to provide the operator with the information she requires to serve calls extended to her position. This information may include the call type, the status of the call, the service required of the opeartor, etc. The function of the position keys is to enable the operator to transmit back to the controlling circuits of the system the informaion they require on each call. This information may include call charge data for billing purposes, as well as information signifying the current status of each call. The key information from each position is transmitted to the remainder of the system by the position scanner 342, which interconnects all operator positions with master scanner 336.

System control 105 on FIG. 1A is not shown as such on FIGS. 3 since it represents many circuits which are individually shown on FIGS. 3 and which together cooperate to control the operation of our system. These circuits on FIGS. 3 include stored program controls 330, hereinafter referred to as "SPC," communications bus translators (CBT) 331, central pulse distributors (CPD) 332, signal distributors 333, trunk scanners 334, master scanners 336, group gate 335, and position signal distributor 340.

The embodiment of our invention shown diagrammatically on FIGS. 3, as well as in detail on other drawings figures, comprises an electronic stored program controlled telephone switching system of the general type disclosed in the copending application to A. H. Doblmaier et al., Ser. No. 334,875, filed Dec. 31, 1963. Doblmaier et al. discloses an electronic type local office which is controlled in its operation by a real time stored program processor. The Doblmaier et al. system is also disclosed in detail the entirety of the September 1964 issue of the Bell System Technical Journal. Although our invention does not comprise a switching center in the sense that a call routing operation is performed, it makes extensive use of circuits of the type shown in Doblmaier.

The SPC may be considered to be the "brain," or the basic controlling mechanism, for the entire system. It comprises a stored program real time machine having a processor portion 330A and a memory portion 330B. The processor performs arithmetical and logical operations on the data it receives from the memory portion as well as on the data it receives from circuits external to the SPC, such as for example, from the scanners. The memory portion of the SPC comprises bulk memory which is supplied in sufficient quantity to store all the temporary and semipermanent information and data required for the operation of our system. As described in Doblmaier et al., the SPC, in performing its functions, receives signals from the memory and from the scanners, performs the necessary arithmetical and logical operations in response to the received signals, and generates output commands which are transmitted to other circuits of our system to control them in the performance of their required call functions. The circuits which responds to the SPC output commands are referred to as "peripheral circuits" since they are peripheral, or external to the SPC.

The SPC communicates with the peripheral circuits by means of communication paths referred to in this specification as "buses." On FIGS. 3, the buses which transmit the SPC commands to the various peripheral circuits are the 1-out-of-N address buses 339 and the binary address buses 338. The SPC transmits its output commands in binary form directly to the CBT. The CBT applies the SPC binary information to the binary address bus system. The CBT also translates the SPC binary output into a plurality of 1-out-of-N information bits and applies these to the 1-out-of-N bus system. Thus, for each binary command received by the CBT, a corresponding binary command is applied to the binary address bus and, in turn, to the peripheral circuits served by this bus. Simultaneously, a 1-out-of-N type command is applied to the 1-out-of-N address bus system and, in turn, to the peripheral circuits it serves.

Each command transmitted from the SPC via the CBT to the address bus systems functionally represents or indicates a task that is to be performed by a peripheral circuit. Each address bus system comprises a plurality of wires, most of which are connected to a plurality of peripheral circuits in common. Thus a command applied by the CBT to a combination of address bus conductors is transmitted to all peripheral circuits to which the combination of conductors are connected. In the normal course of events, only one peripheral circuit responds to a command, even though many peripheral circuits receive it.

The input circuitry of each peripheral circuit is arranged so that it does not respond to an address bus command unless it has first been primed or unlocked by the reception of a special signal hereafter termed an "enable pulse. The central pulse distributor operating under control of the SPC is the circuit which transmits the enable pulses to the various peripheral circuits. These enable pulses are transmitted over dedicated conductor pairs unique to each peripheral circuit. The transmission of an enable pulse from the CPD to a peripheral circuit unlocks the receiving portion of the peripheral circuit and enables it to respond to the command currently on the address bus to which the peripheral circuit is connected. In this manner, the SPC effects the operation of a selected peripheral circuit by causing the CBT to gate onto the address bus system the command specifying the desired operation of the selected peripheral circuit and, at the same time, by causing the CBT to transmit an enable pulse over a dedicated conductor pair to the selected peripheral circuit. The peripheral circuits that operate in this manner are the switching network 304, signal distributors 333, trunk scanners 334, master scanners 336, group gates 335, the AMA recording facilities 337, and the teletypewriter facilities 338. The CPD and the CBT also operate in this manner. However, both their input commands and enable pulses are transmitted to them directly from the SPC.

Our system utilizes duplicated circuitry and equipment, in many instances, to provide reliable service upon the occurrence of normally expected trouble conditions. Accordingly, many circuits are furnished on a paired basis, with one circuit of the pair being designated as the "0" circuit and with the other being designated as the "1" circuit. The SPC's, the CPD's, the CBT's, and the bus systems are furnished in pairs and are designated in this manner. Accordingly, the SPC shown as element 330 on FIG. 3B actually comprises a pair of SPC's, the first of which is SPC0 and the second of which is SPC1. The same is true of the CPD's, the CBT's, and the bus systems. Many peripheral circuits are arranged with duplicated equipment by means of various expedients to provide operational reliability. Some of these circuit, although shown as a single circuit on the drawing, actually comprise a "0" and a "1" half, each of which is independent and each of which may function to continue the operation of our system in the event of the failure of the other half. One such circuit of this type is the group gate. It comprises a "0" half and "1" half, and either half alone may, by itself, enable our system to operate in a reliable manner. Others of the peripheral circuits, although not provided on the duplicated basis in their entirety, have the critical portion thereof, such as for example, the input and output circuitry, arranged on a duplicated basis to provide for maximum operation reliability.

The complexity of the present drawing has been minimized, in many instances, by showing only a single circuit of a duplicated pair rather than both. In general, all "0" circuits of a duplicated pair normally operate with one another, as do all the "1" circuits. However, in the event of trouble, the "0" circuit of one pair may cooperate with the "1" circuit of another pair, etc. For example the "0" SPC normally transmits commands to the "0" CBT and the "0" CPD. However, in the event that the "1" SPC is inoperative, the "0" SPC could transmit output commands via the "1" CBT to the "1" bus system.

The function of the trunk scanner is to monitor the current state of each trunk circuit and, upon command, report its findings to the SPC. The trunk scanner is connected by a plurality of the circuit points within each trunk circuit and each such circuit point is, in turn, individually connected to a different sensing device, termed a "ferrod," in the scanner. Each ferrod includes a plurality of windings, one of which is connected across its associated trunk circuit point so that the magnetic state of the ferrod is controlled by the current applied to its winding by the trunk circuit point to which it is connected. The other windings of each ferrod are wired so that the scanner may be selectively controlled by the SPC to provide an indication of the existing circuit state of any monitored trunk circuit point. The master scanners are similar to the trunk scanners except that they monitor the operational state of circuits other than trunk circuits. These include the service circuits connected to the right side of the position link.

Ferrods are further described, inter alia, in Baldwin-May Patent 3,175,042, Mar. 23, 1965 and in an article "No. 1 ESS Scanner, Signal Distributor, and Central Pulse Distriubtor," by Freimanis, Guercio, and May, in the Bell System Technical Journal, vol. 43, page 2255 (September 1964, part 2).

Both scanners operate in response to the reception of coincidental signals in the same manner as do the other peripheral circuits, namely, an enable pulse is applied by the CPD to a scanner to unlock its receiving circuitry, and at the same time, a command is transmitted from the SPC via the CBT to the scanner over the 1/N address bus. This unlocks the input registers of the scanner and permits them to register the command currently on the bus. The ferrods of the scanner are arranged into rows of 17 ferrods each. Each command received by a scanner contains information signifying the ferrod row that is to be interrogated. The information resulting from the interrogation is transmitted to the SPC over the bus system 340, designated "scanner answer bus 0 and 1."

With this arrangement, the transmission of a command to a scanner instructing it to interrogate a particular row of ferrods causes information to be transmitted back to the SPC signifying the current state of all circuit points of the system to which the plurality of ferrods in the interrogated row are connected.

The signal distributor 333 basically comprises a matrix or relay tree type translator whose function is to receive the microsecond type signals from the CPD and the 1/N address bus and, in turn, transform them into signals having the presistence required to operate and release magnetic latching relays in the circuits of our system which utilize relays. These relays are primarily contained in the trunk circuits and the service circuits. The signal distributor operates to register SPC commands in the same manner as do the other peripheral circuits, namely, when its receiving circuitry is unlocked in response to the reception of an enable pulse from the CPD, it registers a 1/N address bus command specifying the operation or release of one of the magnetic latching relays under its control.

The trunk link and position link circuits of the switching network 304 also operate in response to the reception of the coincidently received signals from the CPD and the 1/N address bus system. The 1/N address bus commands to which they respond cause them to establish link connections between their left side and right side appearances. The paths by which these connections are to be established are not determined by the links, but instead, are determined solely by the SPC in response to the information it receives from its stored program memory.

The AMA circuit 337, connected to the binary address bus, includes tape recorders, together with buffer registers and recorder control circuits. Its function is to record call charge data in response to SPC commands on the binary address bus after it has been unlocked from the CPD. The function of the teletypewriter equipment designated "TTY" and numbered 338 is to transmit printed instructions to maintenance men and the like, under control of the commands on the binary address bus.

The function of the group gate 335 is to control the operation of the position signal distributor 340 in response to the commands applied by the SPC to the binary address bus. These commands represent lamp information that is to be transmitted to a particular operator position to assist the operator in serving a call currently connected to her position. The group gate responds to coincidently received binary address commands and enable pulses, translates the received binary command into 1-out-of-N form, and applies it to the input of the position signal distributor 340. The position signal distributor is basically similar to the signal distributor 333, in that it comprises a relay tree translator which responds to the 1-out-of-N input signals and translates them into signals having the persistence required to operate or release magnetic type latching relays in the position buffer circuits 308. Each position buffer circuit contains the relays required to control the lamp displays and its associated operator position. With this arrangement, the group gate translates each binary command it receives into a plurality of 1-out-of-N type information bits, which are transmitted to the position signal distributor in order that they may be stretched timewise to signals appropriate for operating or releasing magnetic latching relays. Each command received by the group gate specifies the operator position that is to be affected as well as the lamp display that is to be either initiated or terminated thereat. Thus, the group gate information transmitted to the position signal distributor specifies the operator position to which the command is directed and also specifies the operation or release of a relay in the position buffer associated with the specified operator position. In response to this information from the group gate circuit, the position signal distributor causes the specified relay in the specified position buffer circuit to be operated or released and thereby effects either the initiation or termination of the lamp display specified in the command transmitted by the SPC to the group gate.

Position scanner 342 transmits key information from the positions via the master scanner to the SPC regarding the state of each call currently connected to an operator position. Each position circuit contains a plurality of keys which may be depressed by an operator to generate call information. This information may comprise numerical type data, such as calling and called numbers; it may comprise call charge data signifying the type of service requested by the calling party; and it may also comprise call status information, such as for example, signals requesting the disconnection of the operator position from the call. Position scanner 342 is connected to each key in every position and, by virtue of these interconnections, it continually monitors the state of each key. Once it recognizes that a keys is depressed, it transmits appropriate signals back to the master scanner to energize ferrods therewithin signifying the key that is depressed as well as the position in which the key is located. This ferrod information is ultimately received by the SPC from the scanner which, in response thereto, initiates any circuit actions that may be required as a consequence of the receipt of the information.

The following paragraphs describe the manner in which the embodiment of FIG. 3 serves a typical call. A call is extended to the TSPS system when an outgoing trunk at the local office is seized and, in turn, transmits a signal to the TSPS trunk circuit to which it is permanently connected. The receipt of the signal by the TSPS trunk circuit changes the state of trunk scanner ferrod. The SPC is programmed so that both the trunk scanner and the master scanner scan all of the circuits to which they are connected at a sufficiently high rate so that no newly received information will be lost during the interval between scans. Thus, a short time after the trunk scanner ferrod changes state, the ferrod row in which which it is locted is scanned and the resulting information transmitted back over the scanner answer bus 340 to the SPC. The SPC, by means of its memory, identifies the trunk circuit with which the ferrod that has just changed state is associated, and analyzes the previous condition of this ferrod on the preceding scans in order to determine whether this is a new or a recent change of state, so that it may, in turn, determine whether the change of state signifies a newly arrived seizure signal. Once the SPC determines that this is a newly arrived seizure signal, it utilizes its memory to determine certain call parameters, such as for example, the calling and toll offices to which the trunk is connected, the nature of the outpulsing that may be received from the local office, the nature of the signals that must be transmitted forward to the toll office, etc.

The SPC utilizes this information to determine the service required on the call and, assuming the call to be of the 1+ or 0+ type, it then transmits the necessary commands, via the CBT and the CPD, to the switching network, instructing it to interconnect the T and R conductor appearances of the calling trunk circuit on network 304 with those of a suitable digit receiver. For example, if the information from the local office is to be received in MF form, the SPC causes an MF digit receiver to be connected by the network to the trunk circuit. When the digit receiver is attached, the SPC transmits coincident signals via the CBT and the CPD to the signal distributor, instructing it to operate relays within the trunk circuit 303 and the digit receiver 307 so that an acknowledgment of the service request is sent back to the local office in the form of a polarity reversal on the T and R conductors. By means of subsequent polarity reversals, the SPC causes the digit receiver to transmit signals back to the local office, signaling it to outpulse the called information and then, if the originating office is so equipped, the calling information.

The call information outpulsed from the originating office is received by the TSPS trunk circuit 303 and extended over its T and R leads via the switching network to the digit receiver 307. This circuit receives the information, one digit at a time, and, in response thereto, changes the magnetic state of a unique combination of master scanner ferrods to identify each digit. The master scanner scans all of its ferrod rows, under SPC control, and, in so doing, transmits serially back to the SPC, over the scanner answer bus, information signifying each digit outpulsed from the local office. The SPC operates in response to the receipt of this information and, once outpulsing is terminated, it transmits commands to the switching network instructing it to disconnect the digit receiver and the TSPS trunk circuit. The SPC, at the same time, transmits commands to the switching network instructing it to establish a connection between an idle outpulser 306 and the T1 and R1 conductor appearance of the calling TSPS trunk circuit on the left side of the link. These conductors are connected internally within the trunk circuit to its outgoing end extending via the OT and OR conductors to the toll office. Simultaneously, while this connection to the outpulser is being established, and assuming the call requires operator service, the SPC utilizes its memory to find an idle operator position available for serving the call and then transmits commands instructing the switching network to interconnect the T and R conductor appearance of the calling trunk with the appearance of the operator cut-through circuit 324 connected to the operator position selected for serving the call.

The SPC determines from its memory the nature and quantity of the data that is to be outpulsed to the toll office on this particular call. The SPC currently has within its memory the call information received from the local office and, since an outpulser is currently connected to the calling trunk circuit, the SPC now transmits commands, via the CPD and the signal distributor, to control the outpulser so that the data is transmitted forward digit-by-digit via the switching network, the T1 and R1 conductors of the trunk circuit, the outgoing end of the trunk circuit, and the OT and OR conductors, to the incoming trunk circuit 321 at the toll office. The toll office responds to this information in the conventional manner and establishes the forward connection to the terminating office and the called station. The SPC commands the switching network to break down the connection between the outpulser and the TSPS trunk circuit following the termination of the outpulsing operation.

Simultaneously with the outpulsing operation, the SPC transmits lamp information to the operator position that is to serve the call. This information is transmitted via the binary address bus 338, the group gate 335, and the position signal distributor 340, to the position buffer circuit 308 individual to the operator position selected for serving the call. The lamp information transmitted to the operator position by the SPC includes the call type. The operator at the selected position converses with the calling party, determine the assistance required, and then furnishes this assistance. For example, on a person-to-person call, the operator converse with the called station to determine that the individual specified by the calling station is available for conversation. Once the operator has furnished the requested assistance and satisfied herself that the call has been completed in the manner specified by the calling party, she depresses keys at her position to transmit information, via the position scanner and the master scanner, to the SPC, signifying the nature of the assistance provided, the time at which the charging of the call is to begin, as well as signals requesting the SPC to disconnect the TSPS trunk circuit and the operator position. The SPC, in response to the receipt of this information, commands the switching network to break down the link connection between the operator position and the TSPS trunk circuit.

The SPC times the call and retains within its temporary memory the information it has received from the originating office, as well as the information it has received from the operator position. The trunk scanner assists the SPC in timing the call by transmitting information to the SPC on every scanning cycle pertaining to the on-hook or off-hook condition of both the calling and called stations. The subsequent hank-up of either station changes the magnetic state of one of the scanner ferrods to which the TSPS trunk circuit serving the call is connected. A signal indicating this change of state is transmitted to the SPC, which then utilizes it to determine that the call is terminated. The SPC, in turn, transmits signals to the signal distributor instructing it to release all trunk relays and restore the trunk circuit to an idle condition. The SPC also transmits call information it has accumulated to the AMA recording facilities, which then record the necessary charge data for the call. This charge data includes the call type and the chargeable time, together with the calling and called station numbers.

It was assumed, in connection with the call just described, that operator assistance was required for furnishing person-to-person type service. Since our TSPS system can serve many types of calls, including those that require operator service as well as those that do not, it is necesary that the SPC determine on each and every call whether or not such service is required. This determination may be made solely in connection with an identification of the TSPS trunk circuit seized if separate truck groups from the originating office are used for each different type of call. In such instances, calls of a certain type requiring operator assistance are received over one trunk group while calls of the same type but not requiring such assistance are received over a different trunk group. The SPC then need only determine in which trunk group a calling trunk circuit is located in order to ascertain the call type as well as whether or not operator assistance is required. Trunk groups of the combined type serving calls requiring assistance, as well as those that do not require it, may also be served by the TSPS center. In this case, the local office transmits a signal specifying the call type to the TSPS center simultaneously with the outpulsing of the calling and/or called station information.

The preceding has described the manner in which the TSPS system functions to serve calls requiring operator assistance. If the SPC determines that operator assistance is not required, an operator position is not connected to the calling trunk circuit and, following the outpulsing of information forward to the toll office, the outpulser is disconnected by the switching network from the calling trunk circuit and the call is then timed by the SPC and the scanner in the manner already described. Then, following the termination of the call, the call charge data accumulated within the SPC is transmitted to the AMA recording equipment in the same manner as already described.

The preceding has assumed that the call was successfully completed and that all the required circuits within the TSPS center for serving the call were available. The tone circuits 343 are connected to the right side of the switching network and, during overload conditions of the office, a calling trunk circuit may be connected by the switching network to the tone circuit to signify a temporary delay in the call completion. This connection returns a tone signal to the calling party signifying that the call may be temporarily delayed.

Our system may also serve calls of the dial 0 type for which the calling party dials only the digit 0 to obtain a connection to an operator, who orally obtains the called number and keys it into the system. The manner in which our system serves these calls differs somewhat from the call types just described and varies in accordance with whether or not the originating office is arranged to outpulse information identifying the calling station. If the originating office is equipped for this mode of operation, the digit receiver is connected in the manner described solely for the purpose of receiving the calling station information and transmitting it to the SPC. The SPC commands the release of the digit receiver from the call, once the calling number is received, and the SPC then receives the called number information from the operator position serving the call as already described. The remainder of the call is served in the same manner as already described for other calls, namely, the SPC controls the outpulsing of the called station information to the toll office and then monitors and times the call for its duration.

Dial 0 calls from offices not equipped to identify the calling station are served in a manner analogous to that described for the preceding type of dial 0 call, except that the digit receiver is not connected to the TSPS trunk circuit at any time, and instead, the operator must converse with the calling party to determine both the calling and called station informataion and then key it into the system.

The TSPS center may serve both coin and noncoin calls. The SPC may determine the call type with respcet to its coin and noncoin parameters either by the utilization of separate trunk groups or by combined trunk groups together with signals outpulsed from the local office, in the same maner as already described in connection with a determination of whether or not operator assistance is required. Coin control trunk circuit 346 transmits the signals back to the local office on coin calls to control coin collection, coin refund, and ringback operations. The coin control trunk circuit is also used on noncoin calls to effect a ringback operation at the originating office. The connection of the coin trunk circuit to a call is accomplished via the switching network and the T and R conductor appearances of the calling trunk circuit on the left side of the switching network. The coin control trunk is operated under control of signals generated within the SPC, either in response to the termination of the call, or alternatively in response to signals received from the operator position.

The manner in which our system serves coin calls varies considerably in accordance with the call type and call duration. First of all, in servicing any coin call, it is necessary that informtaion be derived and made immediately available, signifying the initial period deposit and duration, as well as the overtime period charge and duration. Subsequently, if the call extends into overtime, information must be immediately available at the termination of the call regarding the deposits required for the overtime charge. The facilities within the SPC include a rater which derives the applicable charge rate in response to the receipt of calling and called office information. The SPC facilities also include a computer which utilizes the derived charge rate to compute additional call information, such as the initial period deposit and duration, the overtime period duration and charge, together with the charge for the total overtime upon the termination of the call in the event that it extended into overtime. Also included within the SPC are facilities for timing the duration of each call.

Upon the initiation of each coin call, the SPC derives and transmits to the operator position serving the call the initial period and overtime period charge and duration information. In addition to furnishing any other assistance that may be required, if any, the operator at this time communicates this information to the calling customer and monitors his deposit of the required initial period charge. The operator is disconnected from the call when she has furnished all the assistance required of her in the customary manner. The SPC times the call and, if the call is terminated before the initial period has elapsed, no further action is required except the release the calling TSPS truck circuit and to transmit the necessary charge data to the AMA recording facilities. However, assuming that the call extends beyond the expiration of the initial period, the SPC causes the switching network to interconnect the calling TSPS trunk circuit with any idle operator position and, at the same time, transmits to this position information signifying the call type and call state to the operator, who informs the calling party that the initial period has elapsed and that the call is entering overtime. If requested, the operator also informs the calling party of the charge for each overtime period, such as for example, one dollar for three minutes. The operator releases from the connection, once she has communicated this information to the calling party. The SPC monitors and times the call and, in most instances, no further circuit action occur in connection with the call until its termination. At this time, the SPC recognizes an on-hook condition and connects the calling TSPS trunk circuit to an operator position. Simultaneously, the SPC computes the duration of the overtime period together with the charge for the overtime. This information is transmitted to the operator, who informs the calling party of the amount due and monitors the deposit of this amount at the calling station before releasing from the connection.

Our system provides miscellaneous services on calls of both the coin and noncoin type. For example, a calling customer may require that he be notified upon the expiration of a specified time in the event that the call lasts that long. In this case, the operator keys the specified time information into the system and releases from the connection. The SPC, in monitoring this call, measures this time and, upon the expiration of the interval, reconnects the call to an operator position, who then informs the calling party that, for example, three minutes have elapsed.

An example of another miscellaneous service that may be provided occurs when a party requests the operator initially connected to the call that he desires to be informed of the call charges upon the call termination. The operator keys information signifying this service request into the system and then releases in the same manner as on other calls. The SPC stores this request and, upon the termination of the call, connects tn operator position to the call and simultaneously transmits the call charges and time to this position. The operator informs the calling customer of the call time and charges and then releases from the connection.

The preceding description of the manner in which our system serves various types of calls has assumed, for the most part, that the call requested by the calling customer is successfully completed to the called station. However, this is not always the case, and there are many instances in which a call cannot be completed, such as for example, the called station is busy, the specified individual on a person-to-person call is not available, etc. In many of these instances, the calling customer requests the operator to retry the call at a later time. In our system, the delayed call trunk circuits 350 are provided in order to permit the TSPS operators to provide service of this type. Delayed call trunk circuit 350 is connected over two separate circuits paths (351 and 352) to two separate incoming trunk circuits at the toll office. Also, the delayed call trunk circuit is connected by paths 353 and 354 to two separate appearances on the trunk link in the same manner as are the other TSPS trunk circuits.

The TSPS operator initiates a call connection of this type by first depressing a key at her position to inform the SPC that she is about to initiate a delayed call and by then keying both the calling and called station numbers into the system. The SPC commands the network to interconnect an outpulser with one network appearance of the delayed call trunk circuit. Once the outpulser is connected, the calling station information is outpulsed to a first one of the incoming toll trunk circuits associated with the delayed call trunk circuit. Subsequently, the called station information is outpulsed over the other path to the second associated toll incoming trunk circuit. The toll office registers the information received over its two separate incoming trunk circuits and controls the establishment of a connection to both the calling and the called offices. The outpulser is disconnected from the call after it has completed its outpulsing operations. At the same time, the SPC causes the switching network to connect the other network appearance of the delayed call trunk circuit with the operator position that initiated the delayed call. Once connected, she ascertains that the call is successfully completed and then furnishes any other call service that may be requested before releasing from the connection.

Delayed calls may be initiated either manually by an operator or automatically by the SPC as a consequence of information priorly keyed into it by the operator at the time the call was initially attempted and could not be completed. For example, the calling customer might have requested the operator to retry the call after 15 minutes. In this case, the operator keys information representing 15 minutes into the system. She then releases from the connection and the SPC times the 15-minute interval. Once it expires, the SPC initiates the call automatically by seizing a delayed call trunk circuit, by causing the calling and called number information to be outpulsed to the toll office, and by connecting an operator position to the call in order that she may ascertain that it can be successfully completed at this time.

Our system also contains facilities whereby a calling party may inform the TSPS operator that he desires to make a plurality of calls in sequence, with each succeeding call being initiated immediately upon the expiration of the preceding call. In this case, the calling party gives the operator the numbers of the called stations with which he desires to be connected. The operator keys these numbers into the system along with a signal indicating to the SPC that sequence calling service is then required. The operator releases from the connection and the SPC then proceeds to establish the first call in the conventional manner. This call, and each subsequent call, is monitored and, upon its expiration, the SPC reconnects an outpulser to a connection and causes the number of the next called station to be transmitted to the toll office, which then controls the establishment of the required connection. This operation proceeds until the last of the called stations has been reached and, upon the termination of this call, the calling TSPS trunk circuit is released.

Figure 4A:
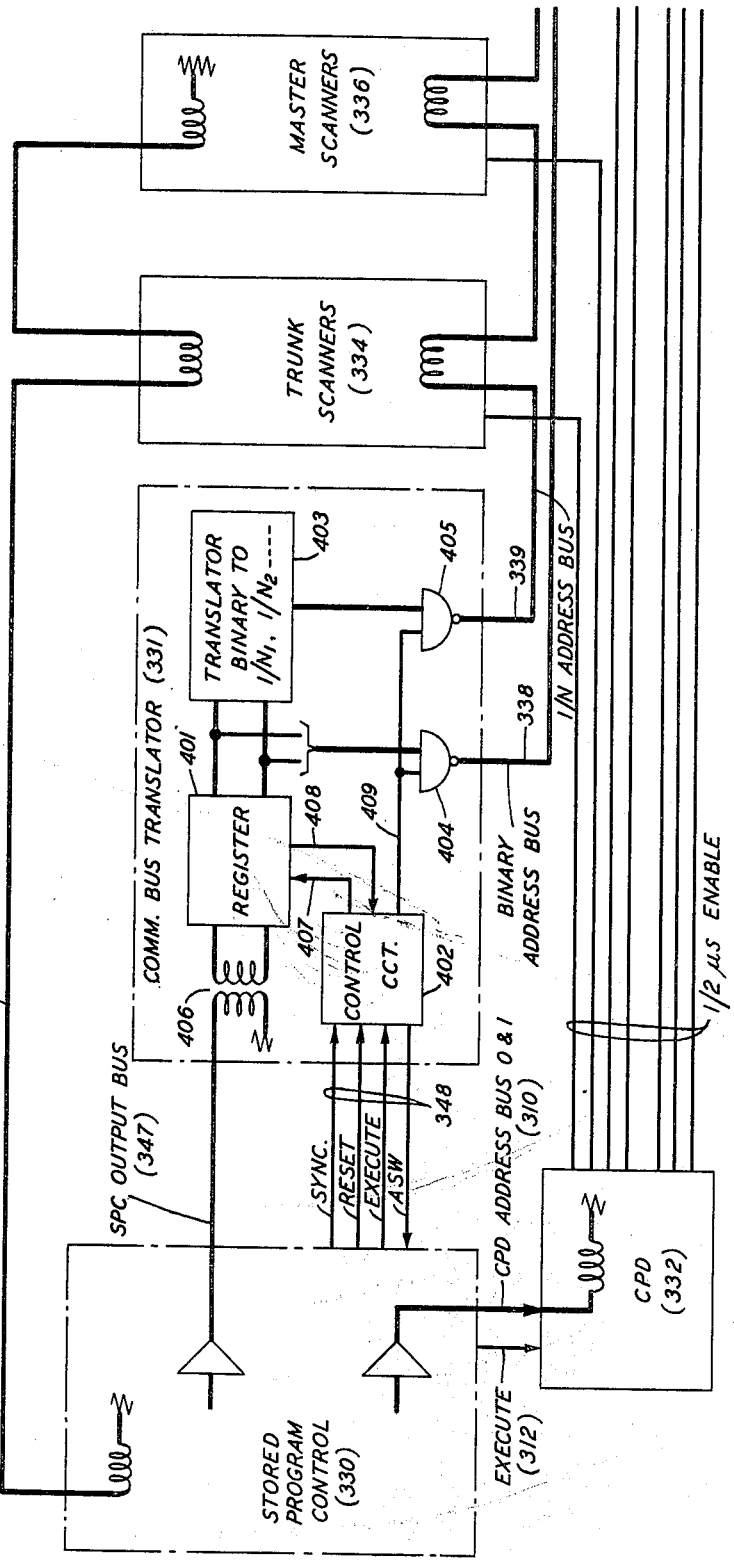

Bus systems—FIGS. 4A and 4B

FIGS. 4 disclose in greater detail certain circuits of our system and also disclose additional details of the bus systems we utilize to interchange signals at microsecond rates between circuits. The elements on FIGS. 4 which correspond to elements on FIGS. 3 are designated in an identical manner numerically except that the numerical designation on FIG. 4 is enclosed within parentheses. The elements on FIG. 4 which are not otherwise shown or separately designated on FIG. 3 are designated with a 400 series number.

Signals are interchanged or transmitted to many of the circuits of our system over specially designed high frequency type circuits which have become commonly known in the art as "buses." Each bus comprises a plurality of conductor pairs, with each conductor pair providing a path that is balanced with respect to ground in order to minimize the effect of longitudinal disturbances. Bus systems comprising circuits of this type are utilized in the system of our invention since the SPC output commands and other signals transmitted by the buses are in the microsecond range, and therefore only circuits capable of faithfully transmitting high frequency type signals can be utilized. This renders unacceptable the utilization of randomly strong interconnecting cables common to electromechanical type switching systems. The expedient utilized in the system of our invention is similar to that shown in detail in Doblmaier et al., as well as in the aforementioned issue of the Bell System Technical Journal.

FIGS. 4A and 4B disclose four different buses, namely, the binary address bus 338, the 1-out-of-N address bus 339, the scanner answer bus 340, the SPC output bus 347, and the CPD address bus 310.

The CPD address bus transmits to the CPD the SPC commands specifying a peripheral circuit that is to be enabled. The SPC output bus transmits the peripheral circuit address commands from the SPC to the CBT. The scanner answer buses transmit these scanner output signals back to the SPC. The binary address bus and the 1-out-of-N address bus transmit the SPC output commands from the output of the CBT to the peripheral circuits associated with each bus.

The binary address bus 338 is connected at one end to an output of the CBT and is then connected serially through the input circuits of the peripheral circuits served by it. Simlairly, the 1/N address bus is connected at its one end to another CBT output and is connected serially to the input circuits of the peripheral circuits served by it. Each bus system utilizes an individual conductor pair for the transmission of each information bit, whether it be of the binary type or 1-out-of-N type. The conductor pair for each bit is threaded serially through the input circuitry of the peripheral circuits receiving this information bit. The receiving circuitry of the last peripheral circuit in the series connection of each bus includes a suitable terminating resistor for each conductor pair in order to terminate the transmission line with its characteristic impedance. In the arrangement shown on FIGS. 4A and 4B, the input circuitry of the switching network 304 contains the terminating resistors for the plurality of conductor pairs comprising the 1/N address bus, while the group gate circuitry 335 contains the terminating resistors for the binary address bus.

The SPC 330 is shown on the left side of FIG. 4A and is connected to the CBT by conductor groups 347 and 348, to the CPD by conductor groups 312 and 310, and to the trunk and master scanners by means of scanner answer bus 340. The SPC controls the operation of the CPD by first transmitting an unlocking pulse to the CPD over the execute conductor 312. This pulse unlocks the receiving circuitry of the CPD in the same manner that enable pulses unlock the receiving circuitry of peripheral circuits. The SPC transmits commands to the CPD over CPD address bus 310 signifying the peripheral circuits to which enabled pulses are to be transmitted by the CPD. The CPD responds to the signals received over conductors 312 and 310, in response thereto, generates .5 microsecond enabled pulses which are transmitted to the peripheral circuits specified by the SPC commands. The interconnection between the CPD and the various peripheral circuits are by means of dedicated conductor pairs individual to each peripheral circuit.

The interconnection between the SPC and the CBT permits SPC to control the operation of the CBT so that address commands may be transmitted over the address buses to the peripheral circuits. The four individual conductor paths within the conductor group 348 permit the SPC and the CBT to interchange control and data check signals. The conductors within this group, designated "execute," transmit an unlocking pulse to the control circuit 402 of the CBT to unlock the receiving circuitry of the CBT in a manner analogous to that for the CPD and the peripheral circuits. The SPC transmits the commands containing peripheral circuit address information to the CBT over the conductor group 347. This information is transmitted through transformers 406 to the input of register 401 which, by this time, has been unlocked by the control circuit 402 over conductor 407. Conductor 408 permits the control circuit to check the parity of the registered information and, in turn, transmit an all-seems-well signal back to the SPC over conductors ASW.

When the registered information is to be gated out onto the bus systems, an unlocking pulse is applied to gates 404 and 405 by the control circuit 402 and conductor 409. The output of register 401 is applied in binary form via gates 404 to the binary address bus system 338. The output of the register is also applied to the input of translator 403, which translates the information from binary to a plurality of 1-out-of-N type information bits. These bits, in turn, are applied via AND gates 405 to the 1/N address bus system 339.

The 1-out-of-N type address commands comprise information encoded by the CBT into a plurality of 1-out-of-N type bits, such as for example, 1-out-of-8, 1-out-of-4, 1-out-of-2, etc. Different ones of the peripheral circuits require different quantities of information bits in the commands to which they respond. This is true for the peripheral circuits connected to the binary bus as well as those connected to the 1-out-of-N address bus. Therefore, each peripheral circuit is not necessarily connected to all conductors of the address bus with which it is associated, but rather, is connected only to the number of bus conductor pairs as required to transmit to it the number of information bits it needs to perform its assigned function.

Logic circuits—FIGS. 5 and 6

The circuit embodying our invention makes extensive use of logic elements such as AND gates, OR gates, inverting AND and inverting OR gates, flip-flops, shift registers, translators, counters, etc. The complexity of the drawing has been reduced by representing such elements with symbols indicating their logical functions, rather than by disclosing circuit details everywhere such an element appears on the drawing. Pages 2055 through 2096 of the September 1964 Bell System Technical Journal contain a detailed description of the design and operation of the logic circuits required in an electronic switching system. The aforementioned Doblmaier et al. specification also describes the logic circuits utilized in the system disclosed therein. Therefore, reference is made to both the aforementioned Bell System Technical Journal and the Doblmaier et al. specification for the details of the logic circuits which are represented only functionally, rather than in detail, on the present drawing.

Even though all the logic symbols utilized on the present drawing are well known to those skilled in the art of logical circuit design, FIGS. 5 and 6 disclose the details of the more commonly used logic circuits in our system. FIG 5A discloses the details of the circuit which comprises the basic element of many of the logic circuits used in our invention. This circuit comprises an AND NOT gate, commonly referred to as an AND or inverting AND gate. If desired, the circuit may also be operated as an inverting OR gate in the manner subsequently described. The circuit of FIG. 5A may be functionally divided into an AND gate and an inverting amplifier. The AND gate comprises diodes 501–1 through 501–N, together with resistor 502 and positive potential source 508. The inverting amplifier comprises diode 504, registers 505 and 507, and transistor 506. The operation of the AND gate is such that terminal 503 may go positive only when all of inputs 1 through N are raised above ground potential. The holding of one or more inputs at ground or negative potential will prevent terminal 503 from going positive. The inverting transistor amplifier 506 is turned off except when it receives a base current from source 508 via resistor 502 and diode 504. Source 508 is effective to supply base current to the transistor only when terminal 503 goes positive as all of the inputs 1 through N are driven positive. The turn-on of the transistor at this time lowers the potential on output conductor 510 from that of the positive source 509 to a lesser potential as determined by the IR drop across resistor 507.

Figure 5A:
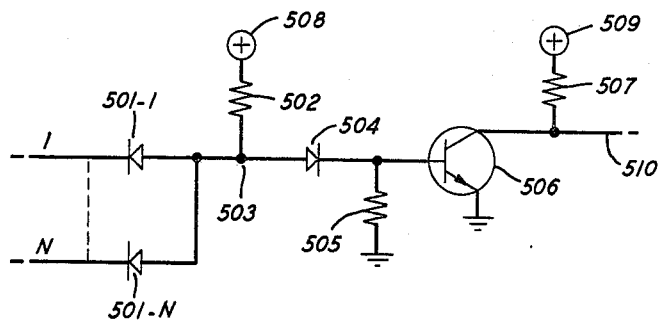
FIGS. 5A through 5F illustrate the symbols utilized on the drawing to diagrammatically represent detailed circuits.
Figure 5B:
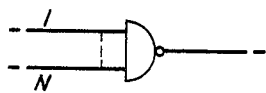

It may be seen from the foregoing that the circuit of FIG. 5A operates in such a manner that positive-going signals on all inputs turn the transistor on and produce a negative-going signal at its output. Conversely, the grounding of at least one of its inputs prevents the transistor from turning on even though the remainder of its inputs are driven positive. This circuit may be operated as an AND NOT circuit by maintaining one or more of its inputs low, i.e., ground, and by driving all of its inputs high for the AND condition of the circuit. When the circuit of FIG. 5A is operated as an inverting AND gate in our system, it is represented on the drawing by the symbol shown in FIG. 5B, with the plurality of input terminals 1 through N being shown on the left and with the output terminal being shown on the right.

Figure 5C:
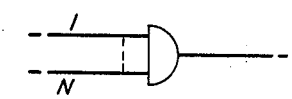

Noninverting AND gates are represented on the drawing by the symbol shown on FIG. 5C. This symbol differs from that of 5B in that the output conductor is directly connected to the semicircle representing the gate, rather than being connected to it by the small circle of FIG. 5B. The noninverting AND gate of FIG. 5C may be of any type well known in the art. For example, it could, if desired, comprise the AND gate portion of FIG. 5A if it is desired that the AND condition of the gate occur when all of inputs are positive. If it is desired that the AND condition of the circuit occur when all inputs are negative, the gate could then be similar to that of FIG. 5A, except that the polarity of the diodes and the potential source 508 would be reversed.

Figure 5D:
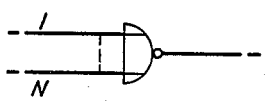
Figure 5E:
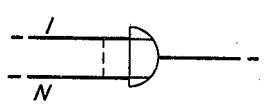
Figure 5F:
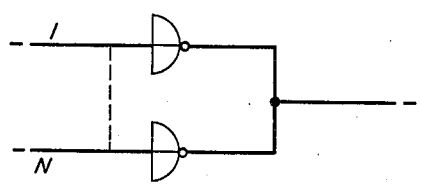

The circuit of FIG. 5A may be operated as an inverting OR gate by normally maintaining all inputs above ground and by subsequently driving at least one input to either ground or to a negative potential to represent the OR condition. The symbol shown on FIG. 5D is utilized on the drawing whenever the circuit of FIG. 5A is operated as an inverting OR gate. The symbol shown on FIG. 5E is utilized to represent the noninverting OR gates on the drawing of our invention. These OR gates may be of any type well known in the art, such as for example, elements 508, 502, and diodes 501– of FIG. 5A.

The circuit of FIG. 5A, when operated as an OR gate, produces a positive-going output signal pulse as one or more of its inputs is driven low to turn the transistor off. The circuit of FIG. 5F may be utilized as an inverting OR gate whenever a negative-going output signal is desired for the OR condition. The OR gate of FIG. 5F basically comprises two one-input inverting AND gates per FIG. 5B, with the outputs of the two gates being joined. The normal condition of this circuit is that all of its inputs are held low to maintain all transistors in an off condition and thereby maintain the output conductor at the potential of the positive source 509. The OR condition of the circuit occurs when at least one of the inputs is driven high to turn on its transistor and drive the output conductor low. Thus, the symbol for the inverting OR gate shown on FIG. 5D may represent either the OR gate of FIG. 5A or the OR gate of FIG. 5F, depending upon the desired polarity of the input signals for the OR condition of the circuit.

Figure 6A:
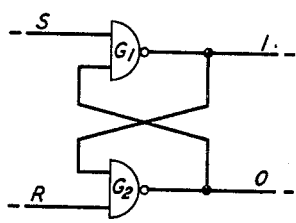
FIGS. 6A, 6B, illustrate additional drawing symbols utilized.
Figure 6B:
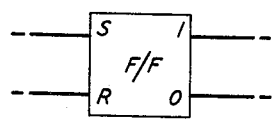

Flip-flops are utilized extensively in our system as memory facilities for the temporary storage of data. The flip-flops we use are readily constructed by cross-connecting two inverting AND gates as shown in FIG. 6A. These flip-flops are represented on our drawing by the symbol shown in FIG. 6B. The circuit of FIG. 6A operates as follows: The drive circuitry (not shown) for the gate ensures that inputs S and R are both held high when the flip-flop is quiescent. Assume at this time that the transistor in gate G1 is off while that in gate G2 is on. In this case, the output 1 is high since its transistor is cut off, while output 0 is low since its transistor is in saturation. Input signals applied to the S conductor at this time are ineffective to change the state of its transistor since the low on the cross-connected input from the output of gate G2 keeps the G1 gate turned off. However, a negative-going pulse applied to the R input at this time removes the base drive for the transistor in gate G2. This turns the gate off and drives its 0 output high, which is cross-connected to the input of gate G1 to turn it on and drive its output low.

Figure 7:
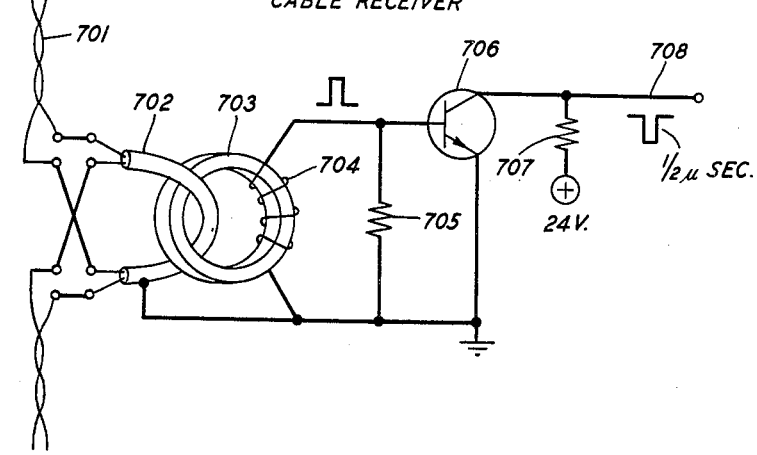
FIG. 7 illustrates the circuit details of a cable receiver utilized in our bus system.

Cable receiver—FIG. 7

The successful operation of our system requires that vast quantities of information be interchanged between the various circuits at high speed, usually in the form of .5 microsecond pulses. This data interchange is accomplished primarily by means of a plurality of bus systems, as already discussed. The bus systems used in our invention are similar to those disclosed in Doblmaier et al. and are further disclosed in pages 2021 through 2054 of the aforementioned Bell System Technical Journal. Each bus comprises a large number of conductor pairs which are balanced with respect to ground. Each such conductor pair is utilized for the transmission of 1 bit of a multibit data word, which may be either in binary or in 1-out-of-N type code form. Data is impressed on the plurality of conductor pairs within a bus by means of a drive circuit for each pair comprising an output transistor which drives the primary of a transformer whose secondary is shunted across the conductor pair. The circuit details of a typical bus driver are shown on FIG. 16, page 2046, of the aforementioned Bell System Technical Journal. Each bus is connected to those peripheral circuits which are required to receive and register data transmitted over the bus.

FIG. 7 discloses the details of the circuitry required to pick off information from one conductor pair of a bus. Accordingly, FIG. 7 discloses one conductor pair 701 of a bus which extends from a preceding circuit through a transformer 703 to a succeeding circuit. The disclosure of FIG. 7 is intended to be general in its applicability, and therefore the preceding circuit may either comprise the drive circuit for the bus or may comprise a preceding peripheral circuit which also picks off information from the bus. Similarly, the succeeding circuit may comprise either a succeeding peripheral circuit or the terminating circuit for the bus.

The conductor pair 701 is threaded through the core of transformer 703 so as to form its primary winding 702. Secondary winding 704 is connected to the base of transistor 706 in such a manner that the data bits representing a 1 binary impress positive .5 microsecond pulses on the base of the transistor, while data bits representing 0's apply no signals to the transistor base. Each positive input pulse turns the transistor on and drives its output low on conductor 703 for the pulse duration. Data is commonly transmitted over the bus in the form of .5 microsecond pulses, and therefore the output signal of the cable receiver on conductor 708 comprises .5 microsecond negative pulses.

The specific circuitry and apparatus shown on FIG. 7 represents that required within a peripheral circuit to pick off 1 bit's worth of the data transmitted over a bus. Each circuit which receives information from a bus will require as many of the circuits per FIG. 7 for each bus as there are bits in the data words it receives from the bus. In other words, if a circuit receives 21-bit binary words from a bus, it will then require 21 of the circuits per FIG. 7 to pick off the 21 data bits from the bus. Since each bus system includes both a 0 and 1 bus, two times 21″ or 42″ circuits per FIG. 7 would be required.

Duplicated receiving circuitry—FIG. 8

Ae does the Doblmaier et al. system, our system utilizes, in many instances, duplicated equipment in order to guarantee the continued operation of the system for many types of trouble conditions. Included in this equipment duplication are the bus systems together with the receiving circuitry in the equipment units which receive data from the buses. The duplicated buses are commonly designated "0" and "1" and the duplicated receiving circuitry in the receiving circuits is designated, typically, as controller 0 and controller 1.

A peripheral circuit is connected both to a bus system and to dedicated conductor pairs extending to the central pulse distributor so that either of its controllers may receive information from either bus system. A typical arrangement by means of which this is accomplished within a peripheral circuit is shown in FIG. 8 in some detail, since an understanding of this concept facilitates an understanding of the operation of the circuits of our invention.

FIG. 8 represents the apparatus required in the two controllers of a peripheral circuit for the reception of 1 bit's worth of data from either bus system. Transformer 801 and register 807 comprise a portion of controller 0, while transformer 811 and register 817 comprise a portion of controller 1. Conductor B0 extends to the output of a cable receiver for the 0 bus system, while conductor B1 extends to the output of a cable receiver for the 1 bus system. Leads EN00, EN01, EN10 and EN11 are dedicated conductors which are extended by suitable circuitry to the central pulse distributor. This circuitry may include, if desired, suitable transformers in order that the pulses may be transmitted between the peripheral circuit and the central pulse distributor by means of balanced pairs, rather than by a single unbalanced conductor with respect to ground.

Primary windings 802 and 803 are connected between conductors B0 and B1, as well as conductors EN00 and EN01, in such that transformer 901 may receive information over either bus system. For example, a positive enable pulse on conductor EN00 together with a coincident negative pulse on conductor B0, causes transformer 801 to respond to signals on the 0 address bus. Similarly, a positive pulse on conductor EN01 and a coincident negative pulse on conductor B1 causes transformer 801 to respond to signals on the 1 address bus system. In a similar manner, the primary windings 812 and 813 of transformer 811 for controller 1 are connected to both bus systems as well as to conductors EN10 and EN11 in such a manner the controller 1 may receive data from either address bus.

The signals induced in the primary winding of either transformer are applied by its secondary winding to the input of a register, such as register 807 for controller 0, or register 817 for controller 1. The representation of this register is symbolic only, since it may comprise a plurality of forms, depending upon the time duration for which the data is to be stored. For example, in some peripheral circuits the register may comprise a flip-flop in order that the data may be stored until some form of a reset signal is received either from circuitry internal to the peripheral unit or from another circuit, such as the SPC. Alternatively, the register may be of the dynamic type, such as for example, a pulse stretcher for the storage of data on a relatively short-term basis.

As already mentioned, the circuit shown on FIG. 8 represents the apparatus required to receive 1 bit of data from either the 0 or 1 bus system. Accordingly, each peripheral circuit would require as many circuits per FIG. 8 as there are bits in the data words it is required to receive from the address bus. The conductors B0 and B1 are shown as extending to either the 0 or 1 address bus system, respectively. The bus system is understood to include the necessary cable receivers of the type shown in FIG. 7 in order that the data bits may be extracted from the bus. Each of conductors B0 and B1 on FIG. 8 are connected to cable receivers within their respective bus systems. Accordingly, conductor B0 is connected to a cable receiver per FIG. 7 for the 0 address bus system, while conductor B1 is connected to a similar cable receiver for the 1 address bus.

Each peripheral circuit has a plurality of input conductors by means of which it receives input data from a bus system. The complexity of the drawing is reduced considerably by representing each such input conductor in a manner similar to that for conductor B0 or B1 on FIG. 8, together with an indication of the data bit the conductor receives from each bus system. The plurality of cable receivers per FIG. 7 that would be required by each peripheral circuit to pick its required quantity of information off a bus are not shown in connection with the drawing figures for each peripheral circuit. It is to be understood, however, that each input conductor that receives information from a bus, such as B0 or B1 on FIG. 8, is not connected physically to the bus, but instead, is connected thereto via the intermediary of a cable receiver of the type shown on FIG. 7.

Enable-verify unit—FIG. 9

It has already been described how an enable pulse is applied to a peripheral circuit to unlock its input circuitry for the reception and registration of the information currently applied to the address bus by the CBT. Signals on the address bus comprise .5 microsecond pulses. The enable pulses are also .5 microsecond in duration. However, the input circuitry of a peripheral circuit stretches the received enable pulse to approximately 2.5 microseconds to unlock its receiving registers for the 2.5 microsecond period so that the address information may be obtained from the address bus any time during this interval.

It is also described in connection with the central pulse distributor how the same circuitry which transmits an enable pulse to a peripheral unit is used to receive a verify pulse back from the peripheral circuit. The verify pulse is received by the CPD and applied to the SPC, which uses it to determine that the proper peripheral circuit is currently responding to the information on the address bus. FIG. 9 discloses the elements within the central pulse distributor 949 and the peripheral circuit 950 which utilized in connection with the transmission and generation of the enable and verify pulses. The central pulse distributor 949 contains a unipolar output transformer 900 individual to unipolar cable 903 interconnecting the CPD and the peripheral circuit 950. Under control of the SPC, the CPD generates a .5 microsecond positive-going pulse which is transmitted over cable pair 930 to peripheral unit 950. The enable signal is received in the transformer having windings 901, 902, and 903. In response to the reception of this enable pulse, a pulse is induced in the transformer secondary winding 902, amplified by amplifier 907 and stretched by pulse stretcher 908. The output of this pulse stretch provides an address window having a duration of approximately 2.5 microseconds. This stretched pulse is then applied to the registers of the peripheral unit to unlock them for 2.5 microseconds so that they may register the address information received over the address bus.

The leading edge of the window from pulse stretcher 908 is essentially coincident with the leading edge of the pulse generated in the secondary winding 902. Output conductor 909 is also connected to differentiating circuit 912. Diode 911 suppresses the positive-going spike comprising the differentiation of the leading edge of the pulse from stretcher 908. However, the differentiated trailing edge of the window, following the registration of the address information is applied as a negative-going spike through diode 911 to pulse stretcher 910. The negative-going spike coincides with the trailing edge of the address pulse window, and it is amplified by the stretcher 910 and applied to transformer winding 906. An output pulse is generated in winding 905, which splits approximately equally between the cable pair 930 and the resistor 904. The portion of the signal which reaches the cable pair 930 is returned to the central pulse distributor as a verify signal to indicate that the peripheral unit has responded to the reception of the enable signal at least to the point where an address window has been generated for unlocking the receiving registers in the peripheral unit. The portion of the signal which is applied to resistor 904 serves no useful purpose. However, the presence of the resistor prevents transmission of the verify signal to the transformer secondary winding 902, and thus to amplifier 907.

Drawing symbols—FIGS. 10 and 11

The transmission of data bits over buses results in the use of circuitry individual to each bit which is identical to that for each other bit. The disclosure of the details of the circuitry required for each and every bit would greatly increase the complexity of the drawing, and therefore the expedients disclosed on FIGS. 10 and 11 have been utilized in order to minimize the quantity of drawing figures required.

Figure 10B:
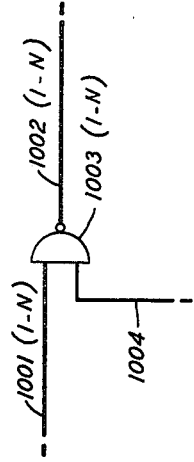
Figure 10A:
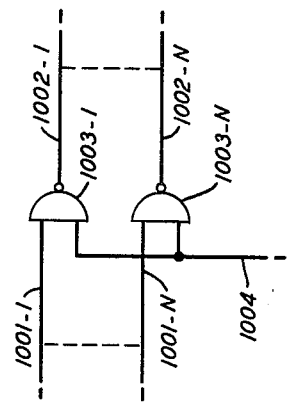

FIG. 10A discloses a plurality of inverting AND gates 1003-1 through 1003-N, each of which has two input conductors. One input conductor, common to all gates, is designated 1004, while the other input conductors, each individual to a gate, are designated 1001-1 through 1001-N. The output conductors for this series of gates are designated 1002-1 through 1002-N. A plurality of gates of the type shown in FIG. 10A, each of which is connected in a manner similar to each other gate, would be disclosed on the present drawing in the manner shown in FIG. 10B. The single gate designated 1003(1-N) represents the entire series of FIG. 10A. The darkened upper input conductor for this gate represents the upper input conductor for the entire series of gates, and the darkened output conductor represents the output conductor for these series of gates.

Figure 11B:
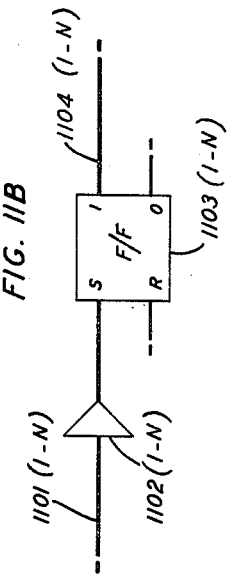
Figure 11A:
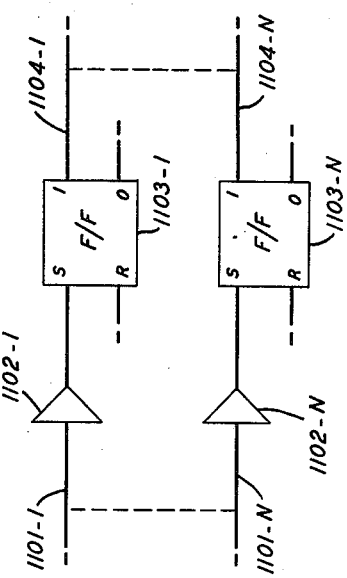

FIG. 11A discloses a plurality of similarly arranged circuits. Each circuit is connected in a manner identical to each other circuit, and the upper circuit includes input conductor 1101-1, connected to the input of amplifier 1102-1, whose output is connected to the set terminal of a flip-flop 1103-1. The output terminal of the flip-flop is designated 1104-1. The plurality of identically arranged circuits shown in FIG. 11A would be repersented on the present drawing in the manner shown in FIG. 11B, wherein only a single amplifier and flip-flop are shown and wherein heavy conductors are used to represent the plurality of individual conductors 1 of FIG. 11A. Also, the circuit elements to which the heavy conductors are connected represent not a single circuit element, but instead, represent a plurality of circuit elements, the number of which matches the number of conductors represented by the heavy conductor.

The expedients illustrated in FIGS. 10B and 11B are widely used in a number of instances on the present drawing in order to reduce the complexity and number of drawing figures required.

Relay contacts are shown detached from their associated windings on the drawing. Contacts which are closed when a relay is operated (make contacts) are represented by an "X" crossing the lines representing the connecting conductors, while contacts which are opened when a relay is operated (break contacts) are represented by a short line intersecting the connecting conductors. The winding of each relay is designated either alphabetically or alphanumerically, such as for example, relay RB1 on FIG. 95. The contacts associated with a relay are designated with a numerical prefix signifying the drawing figure on which the controlling winding appears, followed by the designation of the relay winding. Thus, the make contacts of relay RB1 on FIG. 95 are designated 95-RB1. This method of designation facilitates an identification of the controlling winding for each set of contacts in instances where the winding may or may not be on the same drawing figure. Also, in describing the operation of relay circuits, a discussion of a particular relay winding is often preceded by a prefix indicating the drawing figure on which the winding is located. This expedient eliminates the necessity of separately specifying a figure number each time a relay winding is discussed.

Central pulse distributor (CPD)—FIGS. 12-18

The purpose of the central pulse distributor 332 on FIG. 3B is to transmit an enable pulse to a peripheral circuit at the same time a command is gated onto an address bus by the CBT in order to that the peripheral circuit receiving the enable pulse, and no other circuit, may register the address bus command. The manner in which a peripheral circuit receives this enable pulse and unlocks its address bus receiving circuit to register the address bus command has already been described in connection with FIG. 8. Further details regarding the operation of a central pulse distributor, as well as its interconnections with other circuits of our system, are shown on FIGS. 12 through 17.

A central pulse distributor (CPD) is a high-speed electronic translator which operates in response to commands from the SPC330 to provide one of two classes of output signals. The two classes are termed "unipolar" and "bipolar." Both types are transmitted from a CPD, via individual transformer coupled transmission pairs, to utilization circuits. A CPD is capable of transmitting pulses both to the peripheral circuits connected to the address buses and to the SPC's themselves. However, since this disclosure relates primarily to the manner in which the CPD pulses are utilized by the peripheral circuits, the utilization circuits which receive the enable pulses will be hereinafter referred to, for convenience of discussion, as "peripheral circuits."

Central pulse distributors are employed in pairs for purposes of reliability, and the corresponding outputs of the paired distributors are employed to address a utilization circuit simultaneously. CPD's may be provided in various sizes, depending upon system requirements. The present disclosure assumes a CPD to comprise 1024 points. The term "points," as used herein, refers to the number of different input address words required for its operation in order that its full output capacity might be utilized. Of these, 512 points are assigned to 512 unipolar outputs, while the other 512 points can be assigned to 266 bipolar outputs, each of which can provide either a negative or a positive enable pulse. It is for this reason that each bipolar output requires two CPD points. The most common use of the unipolar signals is to momentarily enable a peripheral circuit, such as a network controller, a scanner, etc., in order that it may register the command currently on the address bus to which it is connected. Each peripheral circuit receiving an enable pulse reshapes the pulse and, after a predetermined time delay, transmits a verify pulse back over the same path to the CPD as an indication that the enable pulse has been successfully received. This operation within the peripheral circuit is described in detail in connection with FIG. 9. The CPD encodes the received verify pulse into the address of the peripheral unit which transmitted it and, in turn, sends this address information to the SPC. The SPC receives the verified address information and compares it with the address which was originally transmitted to the CPD. A match between the two addresses indicates that the correct circuit responded to the enable pulse. Only the unipolar output circuits of the CPD receive verify pulses.

Unipolar output pulses, since they are of a fixed polarity, are generally employed for only a single purpose, namely, to unlock the input of a peripheral circuit in order that its registers may respond to the information currently on its address bus. Bipolar output signals are employed in a selective manner to unlock a peripheral circuit so that its registers may be selectively set or reset from the address bus, depending upon the polarity of the bipolar enable pulse.

In certain instances, the bipolar pulse controls certain circuits which are relatively more critical in their operation than are other circuits. In such instances, the transmission of a bipolar enable pulse is accompanied by the transmission of an accompanying WRMI signal from the CPD. The WRMI signal serves as an unlocking medium for the receiving circuit, and thereby prevents the circuit from responding to extraneous noise signals on an address bus in the absence of the WRMI pulse. The system generally has means for verifying the setting or resetting of the flip-flops associated with the CPD bipolar signals, and therefore the bipolar output circuits of the CPD are not associated with a verify operation, as are the unipolar outputs.

FIG. 12 comprises a first showing, while FIGS. 13A and 13B together comprise a second showing of a plurality of CPD's, together with their interconnections between each other, as well as between other circuits of our system. FIG. 12 discloses the interconnections between a single SPC1200 and a plurality of CPD's designated "first" through "last." FIGS. 13A and B together disclose a pair of SPC's, a plurality of CPD's and a plurality of master scanners, together with the interconnections therebetween. FIGS. 13 emphasize the manner in which the CPD's, the SPC's, and the scanners are interconnected with each other, while FIG. 12 emphasizes in greater detail than do FIGS. 13 the connections between the CPD's and an SPC. Also, FIG. 12 discloses more detail than do FIGS. 13 regarding the specific data bits received by the CPD's, as well as the specific data bits transmitted from the CPD's to an SPC.

FIG. 12 discloses only a single SPC in order to minimize its complexity. It has already been mentioned that a pair of SPC's are normally operated synchronously for reliability purposes. Therefore, in the following description it is to be understood that when a statement is made indicating that an SPC controls or effects a certain circuit operation, two SPC's operating in synchronism both perform this function (one is a check on the other).

Our central pulse distributor is disclosed on pages 2270 through 2282 of the aforementioned Bell System Technical Journal, as well as in the Doblmaier et al. specification, in connection with that portion of the description pertaining, in particular, to FIGS. 95 through 98. FIGS. 12 through 17 of the present drawing disclose the CPD, together with its relationship with the rest of our system, in simplified form, for the benefit of those not requiring an understanding of the entirety of its details as shown in the Bell System Technical Journal and in Doblmaier et al.

An SPC is connected to a plurality of CPD's by means of the 0 and 1 bus system shown on FIGS. 13 and, in further detail, on FIG. 12. The two bus systems shown in the upper portion of FIG. 12 represent the conductors which are connected from an SPC to a plurality of CPD's in common. In addition, an SPC is connected on an individual basis over separate conductor pairs to a plurality of CPD's. These are shown on the bottom portion of FIG. 12 as well as on FIGS. 13.

An SPC transmits information to a CPD in the same manner in which information is transmitted to a selected peripheral circuit. In other words, the SPC transmits over a first path a pulse which unlocks the input circuit of the CPD and then, over another path, transmits to the CPD a command identifying the peripheral circuit to which a pulse must be sent. If the pulse is to be of the bipolar type, the address information also specifies the pulse polarity.

In controlling the circuit operations required to transmit an enable pulse to a selected peripheral circuit, the SPC first determines which of the two bus systems extending to the CPD's is to be utilized. Once this determination is made, it transmits a signal to all CPD's over the bus choice lead of the selected bus system. The CPD bus choice bus system 0 and 1 is shown as cable 1301 on FIGS. 13, and is further shown on FIG. 12 as one of the conductor pairs in each of the 0 and 1 bus systems. The parentheses enclosing the digit 1 next to the bus choice conductor on FIG. 12 specify the number of data bits required for the transmission of the bus choice signal. Parentheses immediately to the right of the designation for other conductors also indicate the number of data bits carried by such conductors, as well as, in some cases, the type of code utilized for the transmission of the data bits. The digits 1301 enclosed by parentheses on the right end of each bus choice bus of FIG. 12 signify that it is a portion of bus 1301 on FIGS. 13A and B. The same expedient is used on other circuit elements on other figures to indicate correspondence with the same element on a differently numbered figure.

The SPC applies a signal to the bus choice pair for bus system 0, if it desires to utilize the 0 bus system. This bus choice signal is received by all CPD's. Then, via the chosen bus system, such as for example, bus system 0, the SPC transmits address information, via the CPD address bus, to all CPD's. The CPD address bus is shown as element 1302 on FIGS. 13 and is further shown as one bus in each of the 0 and 1 bus systems of FIG. 12. The address transmitted to the CPD's identifies the circuit to which the enable pulse is to be sent. This address is divided into three parts, designated "X," "Y," and "Z," which are in 1-out-of-8, 1-out-of-8, and 1-out-of-16 code form, respectively, for CPD's of the size assumed in the present discussion. The parentheses immediately to the right of the designation "CPD address" for each of buses 1 and 0 on FIG. 12 enclose the digits 32; 1/8, 1/8, 1/16, to signify that the address comprises 32 bits in the indicated 1-out-of-N code form. The address information transmitted over this bus specifies one of the 512 unipolar CPD outputs, or alternatively, one of its 256 bipolar outputs, together with the polarity of the pulse to be supplied by the bipolar output. The address information supplied to the CPD address bus is received and registered by both CPD's.

Next, the SPC determines which CPD should transmit the enable pulse to the selected peripheral circuit. Once this determination is made, the SPC transmits a signal to the selected CPD over an individual execute conductor. The execute conductors comprise the cable 1304 on FIGS. 13. FIG. 12 illustrates on its lower half, in greater detail than do FIGS. 13, how execute signals are transmitted from an SPC over dedicated conductors to the selected CPD's. The CPD that receives the execute pulse returns an acknowledgement of it to the SPC over a dedicated conductor pair within the cable 1305 on FIGS. 13. This dedicated conductor pair is also shown in greater detail on FIG. 12. The pulse returned by the CPD at this time is termed an "echo" pulse since it signifies nothing more than the fact that the CPD received the execute pulse.

A WRMI output pulse, together with an enable pulse, is transmitted by the CPD to certain circuits whose operations are considered to be relatively more critical than others. The WRMI pulse is transmitted over cable 1307 on FIGS. 13, and it extends from the output of the CPD's, through the SPC's in series, to the master scanners, for example. The WRMI output is shown on the right-hand side of each of the rectangles representing a CPD on FIG. 12.

The SPC decides whether the CPD should transmit a WRMI output along with an enable pulse. In the event the WRMI operation is desired, the SPC transmits a WRMI SYNC pulse to the CPD at the same time it transmits the execute pulse. As disclosed in Doblmaier et al., the internal circuitry of a CPD ANDs the WRMI SYNC pulse with certain data check signals and provides the WRMI output in the event the ANDing operation occurs successfully. The WRMI SYNC pulse is transmitted to the CPD over the bus 1306 on FIGS. 13. This path is shown in greater detail on FIG. 12. The WRMI output pulse is transmitted to all circuits on the WRMI bus 1307. However, it is utilized only by the circuit to which the enable pulse is coincidently transmitted.

Figure 14:
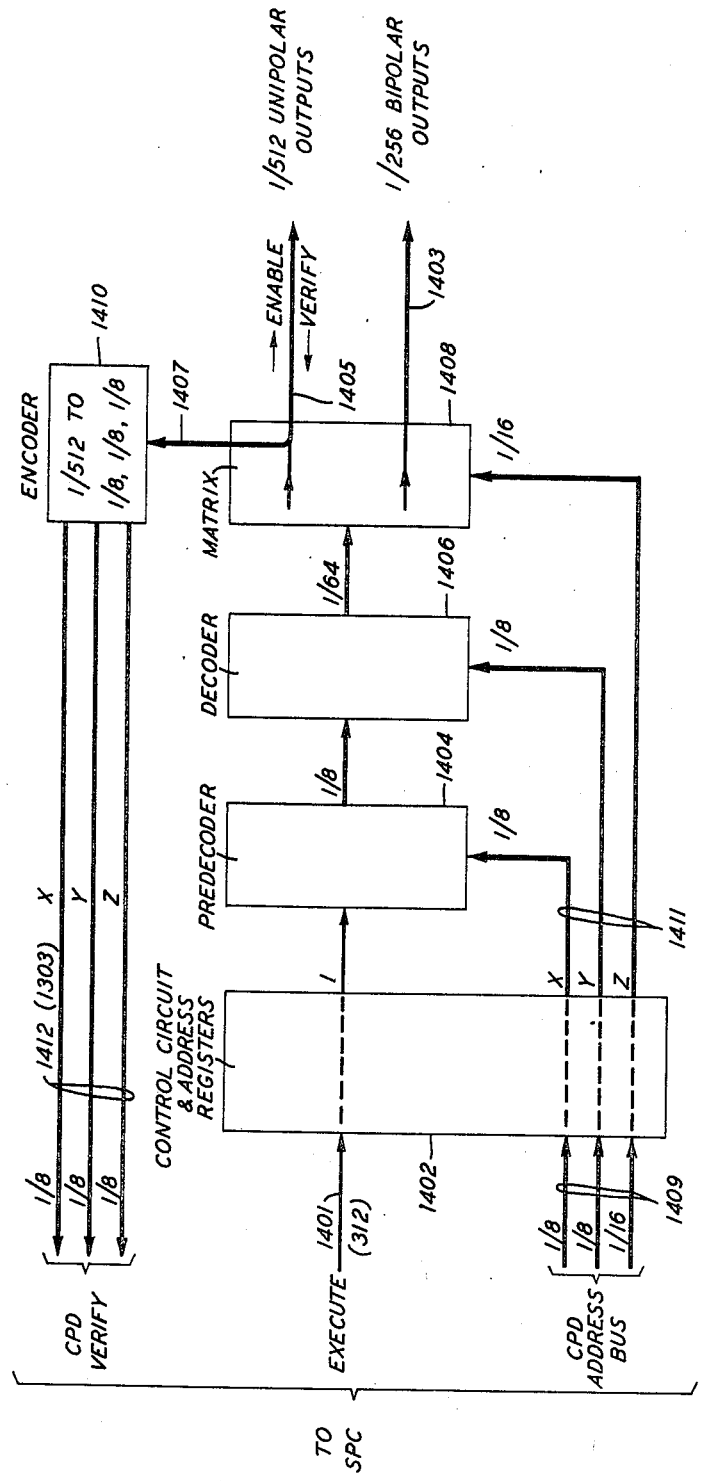

FIG. 14 shows the elements of a CPD which are essential to an understanding of its operation. The CPD basically comprises a combined control and address register circuit 1402 together with a 3-stage selection circuit comprising predecoder 1404, decoder 1406, and matrix 1408. The control circuit receives the bus choice pulse and unlocks the register, which enables it to receive the information on the CPD address bus 1409. The control circuit also effectively applies the execute pulse to the input of the 3-stage selection circuit, which steers the received pulse through its three stages to one of the 512 unipolar outputs 1405, or to one of the 256 bipolar outputs 1403, under control of the address data currently stored in the registers.

The address information now stored in register 1402 identifies the address of the peripheral unit to which an enable pulse should be transmitted. This address information is divided into three bits designated "X," "Y," and "Z," each of which is in a 1-out-of-N type code form, in the manner shown adjacent to each of the three cables within the group 1409. The X portion of the address data is in 1-out-of-8 code form, and it is applied to the bottom input of the predecoder 1404 to steer the execute pulse on the input of the predecoder to one out of its eight outputs. The output of the predecoder thus represents a 1-out-of-8 translation for the execute pulse received by it.

The Y portion of the address data currently stored in the registers in 1-out-of-8 code form is applied to the bottom input of the decoder 1406. This circuit also comprises a 1 out-of-8 translator, and it now receives the output of the predecoder, translates the received information, under control of the Y portion of the address information, and applies an output signal to one of its 64 outputs. The signal on this output at this time represents a 1 out-of-64 translation of the execute pulse received by the predecoder.

The output of the decoder is applied to the input of matrix 1408, which simultaneously receives, by its lower input, the Z portion of the address information in a 1-out-of-16 code. The matrix 1408 is basically a 1-out-of-64 translator, and it now applies a fixed polarity enable pulse to one of its 512 unipolar outputs, or alternatively, applies an enable pulse of one of two polarities to one of its 256 bipolar outputs. The unipolar output 1405 and the bipolar outputs 1403 are connected to other circuits in the manner shown on FIGS. 13.

When a peripheral circuit receives an enable pulse from a unipolar CPD output, it returns a verify signal over the same path in the manner already described. The matrix 1408 steers this verify signal to encoder 1407, which translates it into a "verify answer" signal for the SPC. This answer signal is encoded into a 1-out-of-8, 1-out-of-8, and 1-out-of-8 code for transmission back to the SPC. The SPC, upon the receipt of this signal, compares it with the address originally transmitted to the CPD in order to determine that the proper peripheral circuit responded to the information gated onto the address bus. The encoded verify answer information is transmitted from the encoder 10 back to the SPC over the three cables 1412 on FIG. 14. These cables are shown as the CPD verify bus system 1303 on FIG. 13.

Figure 15:
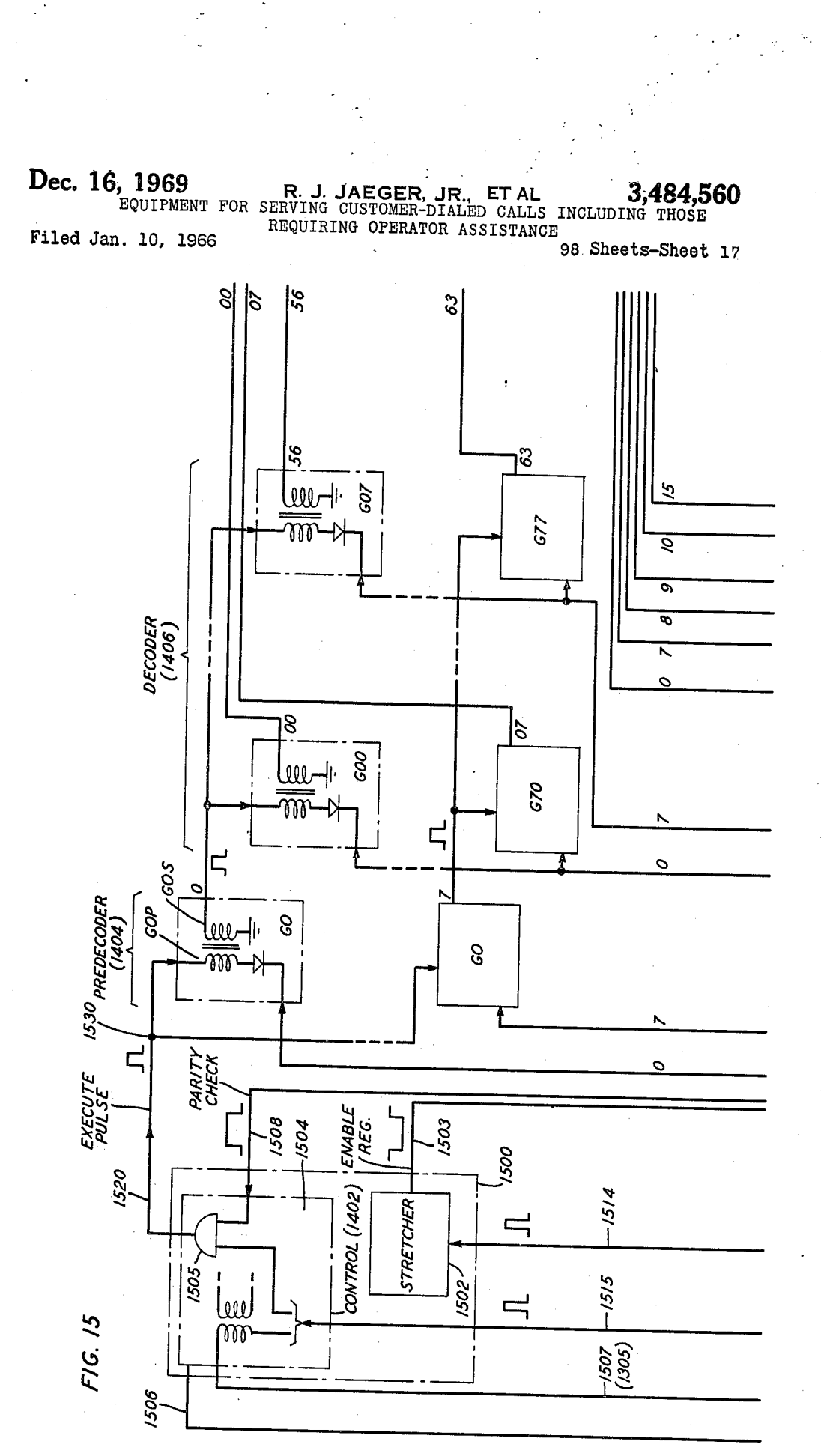
Figure 16:
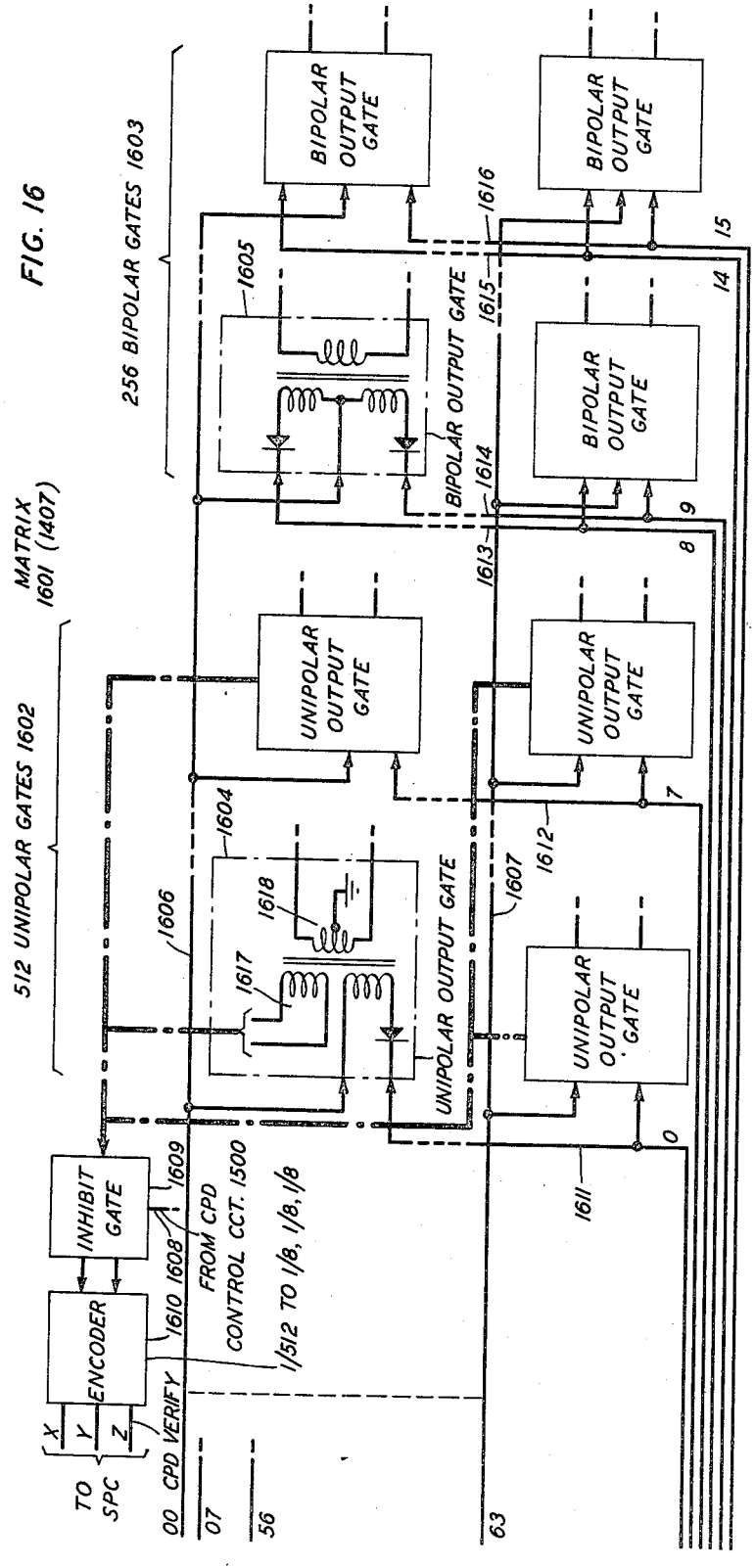

FIGS. 15, 16, and 17, when arranged as shown in FIG. 18, discloses additional details of the CPD beyond those shown and discussed in FIG. 14. The input signals are shown on a nonduplicated basis in order to simplify the discussion. The CPD requires three communications in rapid succession from the SPC to transmit an enable pulse to a selected peripheral circuit. These signals are the bus choice signal, the address information, and the execute signal. When the bus choice signal is received over conductor 1514, it is stretched to a 2.5 microsecond pulse and applied over conductor 1503 to unlock the address registers 1402 so that they may registed the information transmitted to the CPD via the CPD address bus system 1302, which is shown as the three separate buses 1409 on FIG. 14. The X, Y, and Z portions of the address are stored in registers 1711X, 1711Y, and 1711Z, respectively.

Next, the SPC transmits an execute pulse over conductor 1515 to the CPD control circuit 1500. This pulse is received by the elements within the rectangle 1504. The execute pulse is transmitted back to the SPC over echo conductor 1507, which is a part of the echo bus system 1305 on FIGS. 13. The return of this pulse merely informs the SPC that the execute pulse was received by the CPD. It indicates nothing regarding the operable condition of the CPD itself. The execute pulse is also applied from conductor 1515 to one input of AND gate 1505. The other input of this AND gate comprises the parity check lead 1508 from register 1702. In the event that the address in the register has good parity, the AND gate 1405 is unlocked and transmits a positive pulse out over conductor 1520 to the input of predecoder 1404 on terminal 1530.

The predecoder comprises the eight elements G0 through G7, each of which is identical to that shown in detail for the element G0. The execute pulse is applied to the top left-hand winding terminal in each of these elements, while the other end of the winding for each element is connected through a diode to an individual output of the X register 1711X. The X portion of the address information now in register 17X produces a negative pulse on one of the eight outputs of the register at the same time the execute pulse is applied to terminal 1530. Only the decoder element which receives the negative pulse from the register output at this time generates a pulse in its secondary winding, such as for example, G0S, for the secondary winding of predecoder element G0.

The decoder 1406 is comprised of 64 individual elements, each of which is identical to elements G0 through G7 of the predecoder. The 64 elements of the decoder are numbered G00 through G77 (octal), and these 64 elements are arranged into eight rows and eight columns, in the manner shown. Each decoder row is individual to one of the elements of the predecoder, and each decoder column is individual to one of the outputs of the register 1711Y. The input circuit of each decoder element is connected between the output of the predecoder element common to its row and the output of the Y register common to its column. The generation of a positive pulse in the secondary of one of the predecoder elements and the simultaneous application of a negative pulse to one of the outputs of the Y register completes the primary circuit for only one of the decoder elements, and the current through it at this time generates a pulse in its secondary winding. For example, let it be assumed that a positive pulse is produced within the secondary winding G0S of predecoder element G0 and that, simultaneously, a negative pulse is applied to the 0 output of the Y register. This completes the circuit for the left-hand winding of only decoder element G00 and, in response thereto, a positive pulse is generated in its right-hand winding and applied to conductor 00 extending to the matrix translator on FIG. 16. The outputs of the 64 decoder elements are designated 00 through 63 on the right side of FIG. 15.

The matrix translator 1601 comprises 512 unipolar gates 1602 and 256 bipolar gates 1603, all of which are arranged into rows and columns in the manner shown. The 512 unipolar gates are arranged into 8 columns of 64 gates each, while the 256 bipolar gates are arranged into 4 columns of 64 gates each. The unipolar gates are all identical to gate 1604, whose details are shown, and the bipolar gates are identical to gate 1605, whose details are shown. Each matrix row is individual to one of the output conductors from the decoder stage. Each column of unipolar gates within the matrix is individual to a different Z register output, while each column of bipolar gates within the matrix is individual to a pair of Z register outputs. Each unipolar gate has two input terminals, one of which is connected to a conductor common to its row and, in turn, to its associated decoder output. The other input terminal of each unipolar gate is connected to a conductor common to its column and, in turn, to its associated Z register output. In the same manner as already described, the application of a negative pulse to one of Z register outputs 0 through 7 and the simultaneous application of a positive pulse to one of outputs 00 through 63 of the decoder produces an enable pulse in the right-hand winding of the unipolar gate common to the row and column conductors to which the pulses are applied.

Each bipolar gate has three input terminals. The middle input terminal, extending to the center tap of the left-hand winding, is connected to the conductor common to its row and, in turn, to its associated decoder output. The upper input terminal of each bipolar gate is connected to its associated even numbered Z register output, while the lower input terminal is connected to its odd numbered associated Z register output. This arrangement permits the data in the Z register to determine the polarity of the enable pulse developed in the secondary of a bipolar gate by selectively applying a negative pulse to either an even or an odd Z register output at the time a bipolar gate receives a positive pulse at its center tap from the output of the decoder.

The details of the circuitry which transmits verified address information back to the SPC is also shown in connection with the unipolar output gates on FIG. 16. In order to illustrate this operation, let it be assumed that unipolar output gate 1604 transmits an enable signal to a peripheral circuit. This peripheral circuit generates a verify signal and applies it back over the same path utilized for the transmission of the enable pulse. The verify pulse is received by winding 1618, which develops a corresponding pulse in winding 1617, which, in turn, is connected to the inhibit gate 1609. The gate is enabled at this time by conductor 1608 extending to control circuit 1500 and therefore the pulse is applied to the input of encoder 1610. The encoder basically comprises a translator operable under control of the X, Y, and Z address bits for breaking down the received verify pulse back into its original X, Y, and Z address bits. The Z address at this time comprises only a 1-out-of-8 code, rather than 1-out-of-16, since there are only eight columns of unipolar output gates connected to the Z register outputs. The verified address information is transmitted back to the SPC over the CPD verify bus system 1303. The inhibit gate 1609 is inhibited by control circuit 1500 during the original transmission of an enable pulse to a peripheral circuit. Thus, the pulse developed in winding 1617 at this time is not applied to the input of the encoder 1610 and, in turn, to the SPC.

The control circuit 1500 also includes provision for monitoring the current resulting from the transmission of an enable pulse to a peripheral circuit. In the event that this current is of the proper magnitude, control circuit 1500 generates an all-seems-well signal which is applied over conductod 1506 to the SPC. The ASW signal is transmitted over one of the conductor pairs in the CPD verify bus system 1303. This bus, together with the CPD maintenance response bus 1309, transmits a plurality of miscellaneous type signals from the CPD to the SPC. The nature of these signals, together with the details of the circuits generating them, are disclosed in detail in the Doblmaier et al. specification.

Scanners—FIGS. 19–25

It has been described how the SPC controls the operation of our entire system. It is necessary, in fulfillment of its function, that the SPC have readily available to it information signifying the current busy or idle state of many different circuits. In order to provide the SPC with this information at microsecond speeds, we utilize electronic scanners, rather than relays, for circuit monitoring purposes. This monitoring function includes the detection of call originations and terminations, supervising on- and off-hook trunk conditions, monitoring the reception of information outpulsed from a preceding office, monitoring the current state of miscellaneous circuits within our system, as well as for administrative, diagnostic, and other purposes. Each scanner contains a plurality of current sensing devices called "ferrods," and each circuit that is to be monitored is connected to an individual ferrod. The ferrods are arranged into rows of sixteen ferrods each, and the ferrod rows are further arranged into groups of sixteen rows to form scanner matrices of various sizes in multiples of sixteen rows, i.e., 256, 512, or 1024 ferrods per matrix.

The SPC receives information signifying the current state of a selected circuit point by transmitting a command to the scanner instructing it to interrogate the ferrod row containing the ferrod individual to the selected circuit. The interrogation of this row transmits a 16-bit binary word back to the SPC signifying the state, not only of the selected circuit, but of all sixteen circuits monitored by the sixteen ferrods comprising the interrogated scanner row.

The scanners employed herein are described in greater detail in copending United States patent application A. M. Guercio-H. F. May, Ser. No. 250,416, filed Jan. 9, 1963. The scanning element or ferrod is disclosed in J. A. Baldwin, Jr.-H. F. May, Patent No. 3,175,042, Mar. 23, 1965. In addition, the scanners are disclosed in detail in the aforementioned Doblmaier et al. application, as well as in the Bell System Technical Journal, pages 2255 through 2269.

Figure 19:
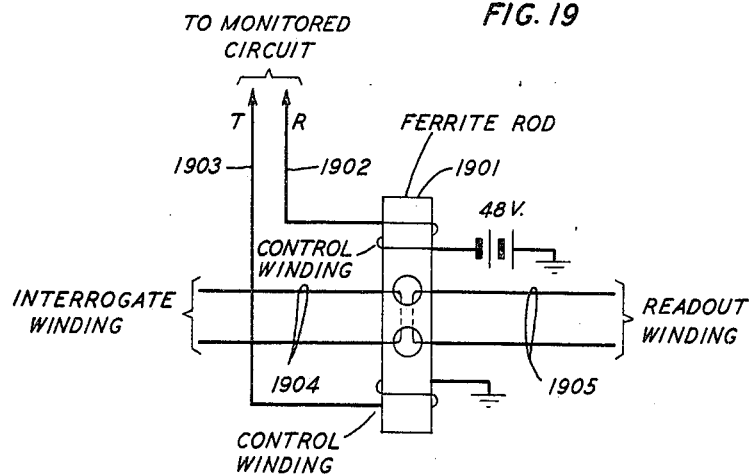

FIG. 19 discloses the details of a typical scanner ferrod. It comprises a ferrod rod 1901, two control windings 1902 and 1903, interrogate winding 1904, and a readout winding 1905. The control windings are connected in series with the circuit that is to be monitored, such as for example, across a trunk incoming from a local office. In this case, battery and ground are supplied by windings 1902 and 1903 to the trunk. If desired, the ferrod may have its control windings connected in a loop so that it merely monitors the current over a conductor pair and yet supplies no potential to it.

The ferrod is essentially a transformer in which the magnetic coupling between the interrogate and readout winding is determined by current in the control windings. This current, in turn, reflects the state of the monitored circuit. The current through the control windings resulting from an off-hook condition of a trunk, for example, saturates the ferrod rod so that the subsequent application of a pulse to the interrogate winding induces practically no signal in the readout winding. On the other hand, the application of an interrogate pulse produces a pulse in the readout winding whenever the monitored circuit is idle and does not produce saturation current in the control windings. A pulse induced in a readout winding during the interrogate time indicates a low current condition of the monitored circuit, and the readout pulse is said to represent a "1." Conversely, the absence of an output pulse during interrogate time represents a low current condition of its monitored circuit and is said to represent a "0."

Figure 20:
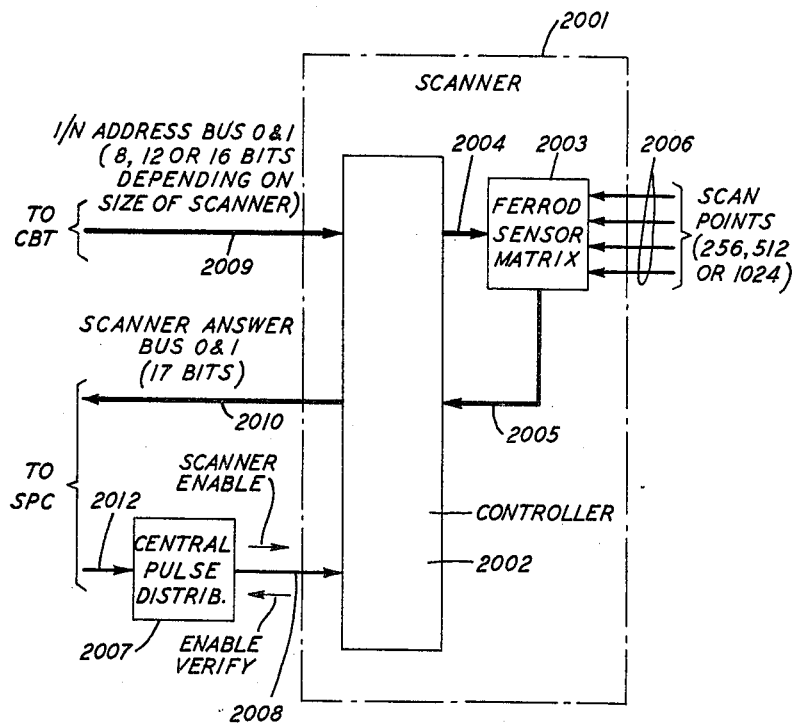

FIG. 20 diagrammatically discloses a scanner together with the main input and output paths. The SPC initiates a scanner operation by first sending a command to the CPD, instructing it to transmit an enable pulse to the scanner in order to unlock its address registers. The CPD 2007 receives this command from the SPC over path 2012 and transmits the required enable signal to the scanner over circuit path 2008. The scanner controller 2002 receives this enable signal and transmits back to the CPD a verify signal in the conventional manner elsewhere described. Simultaneously, address information specifying the scanner ferrod row that is to be interrogated is applied to the 1-out-of-N address bus by the CBT under control of the SPC. The scanner 2001 receives this information from the 1-out-of-N address bus system over path 2009 and stores it in its address registers within controller 2002. The controller then transmits signals over path 2004 to the ferrod senser matrix 2003 which interrogates the ferrod row specified by the received address information. The 16-bit answer provided by the interrogated row is sent back to the controller over path 2005. The controller circuit adds a 1-bit all-seems-well signal, in the event that all circuits operated properly, and transmits, over path 2010, a 17-bit answer back to the SPC indicating the all-seems-well condition of the scanner together with the 16-bit word representing the current state of the 16 circuits associated with the interrogated scanner row.

The controller, represented generally as element 2002, may actually comprise a pair of controllers for duplicated operation from either of the 1-out-of-N address buses. The particular number of pairs of the 1-out-of-N address bus cable to which a scanner is connected is dependent upon the size of the scanner, i.e., the size of its ferrod matrix. The bit magnitude of the 1-out-of-N address word required by a scanner varies with its size since, the greater the quantity of ferrod rows in a scanner matrix, the greater the quantity of 1-out-of-N address bits required to identify a selected row.

Figure 21:
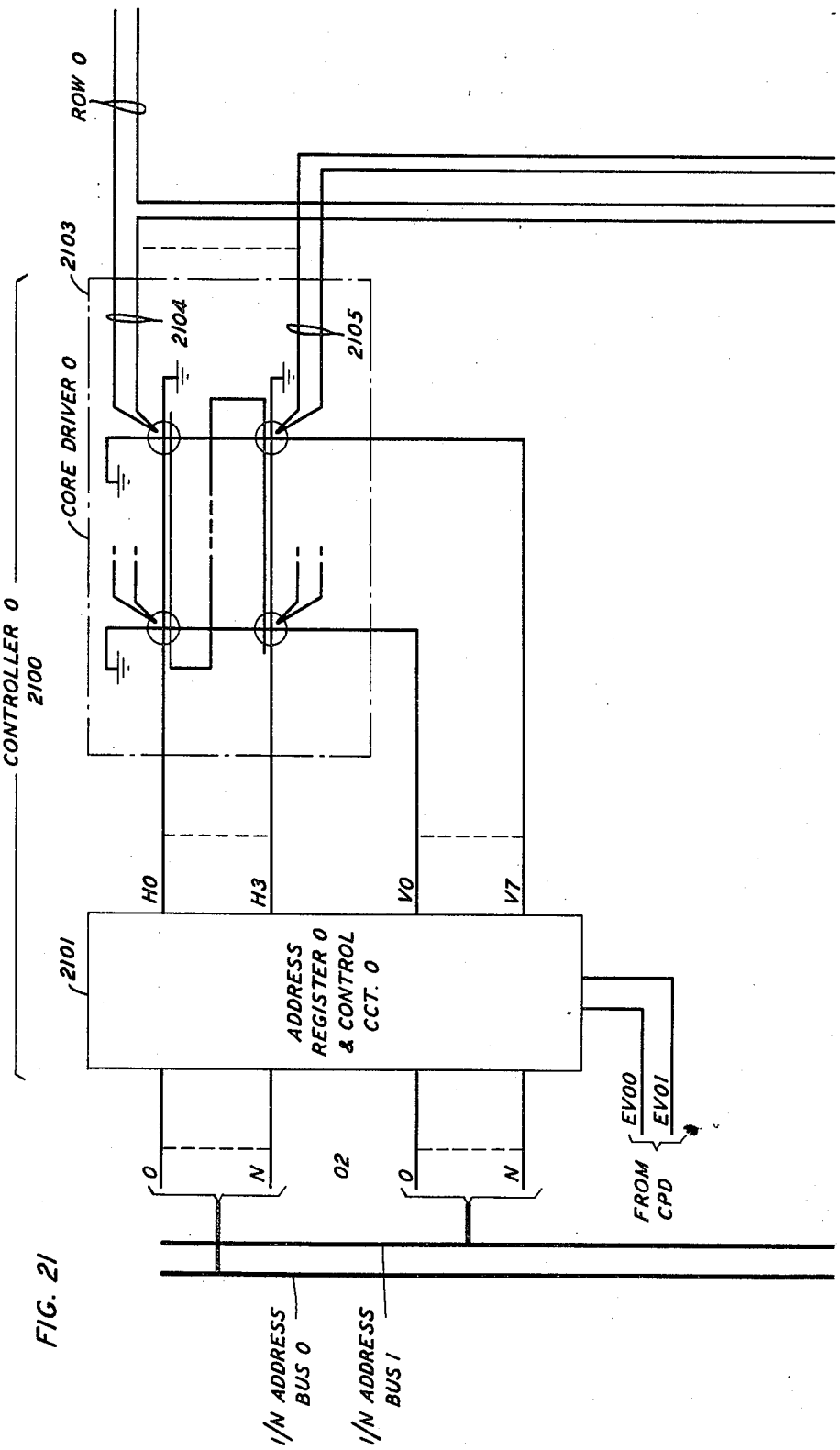
Figure 22:
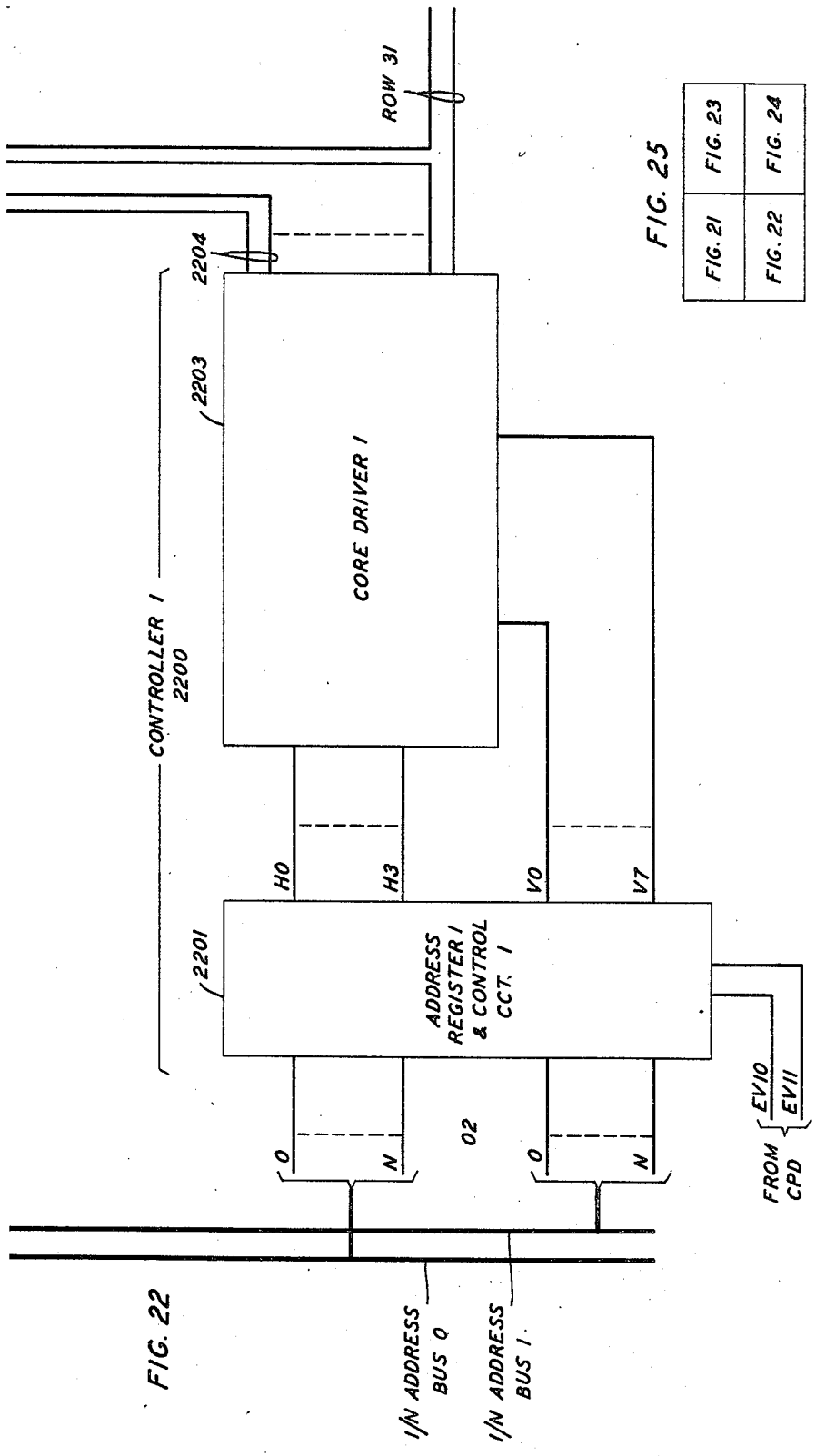

Additional details of a typical scanner are shown on FIGS. 21 through 24, when arranged with respect to each other in the manner shown on FIG. 25. FIGS. 21 and 22 together disclose duplicated controllers 0 and 1 which receive input signals from the 1-out-of-N address bus system and from the CPD, and which, in turn, transmit control signals to the ferrod matrix shown on FIGS. 23 and 24. The two controllers are identical. Controller 0 is shown in detail and comprises an address register and control circuit 2101, together with a core driver 2103 having 32 cores arranged into a 4 x 8 pattern, as shown. The address register and control circuit receives an enable pulse from the CPD on either the EV00 or EV01 conductor, stretches the pulse, and then, during the persistence of the stretched pulse, receives from the 1-out-of-N address bus information signifying the ferrod row to be interrogated. The address register and control circuit registers this data and, in turn, transmits control signals to core driver 2103 by simultaneously pulsing one of its four output conductors H0 through H3 and one of its eight output conductors V0 through V7.

The core driver 2103 comprises a 4 x 8 core matrix in which each H- input conductor is connected in series through one winding of each core common to a row, while each V- input conductor is connected in series through one winding of each core common to a column. The core driver also includes a bias winding threaded serially through all cores in order to bias them magnetically in the required manner. The circuit for the bias winding is shown only diagrammatically.

Each individual core also includes an output winding in addition to a horizontal winding, a vertical winding, and a bias winding. The output winding of each core is connected in series with the output winding of the corresponding core in the other core driver, and the windings of these two cores are, in turn, connected to a series connection of all the interrogate windings of the ferrods common to a particular scanner row. For example, the output winding for the upper right-hand core in core driver 2103 is connected by means of conductors 2104 in series with the winding of the corresponding core in core driver 2203. The output windings of these two cores, in series, are, in turn, connected by means of the conductor pairs designated "row 0" to a series circuit on FIG. 23, comprising the interrogate windings of all ferrods in the top row.

Figure 23:
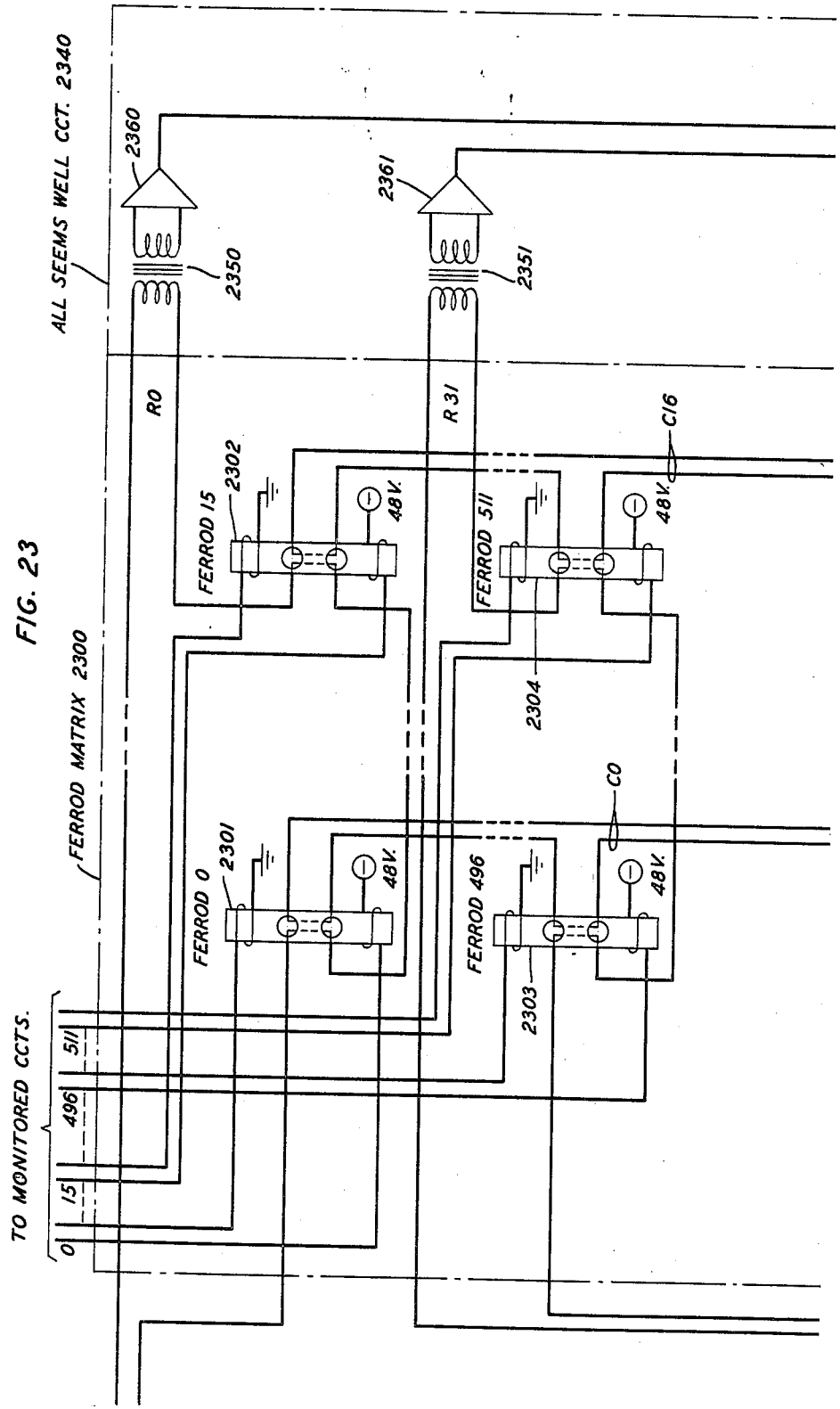
Figure 24:
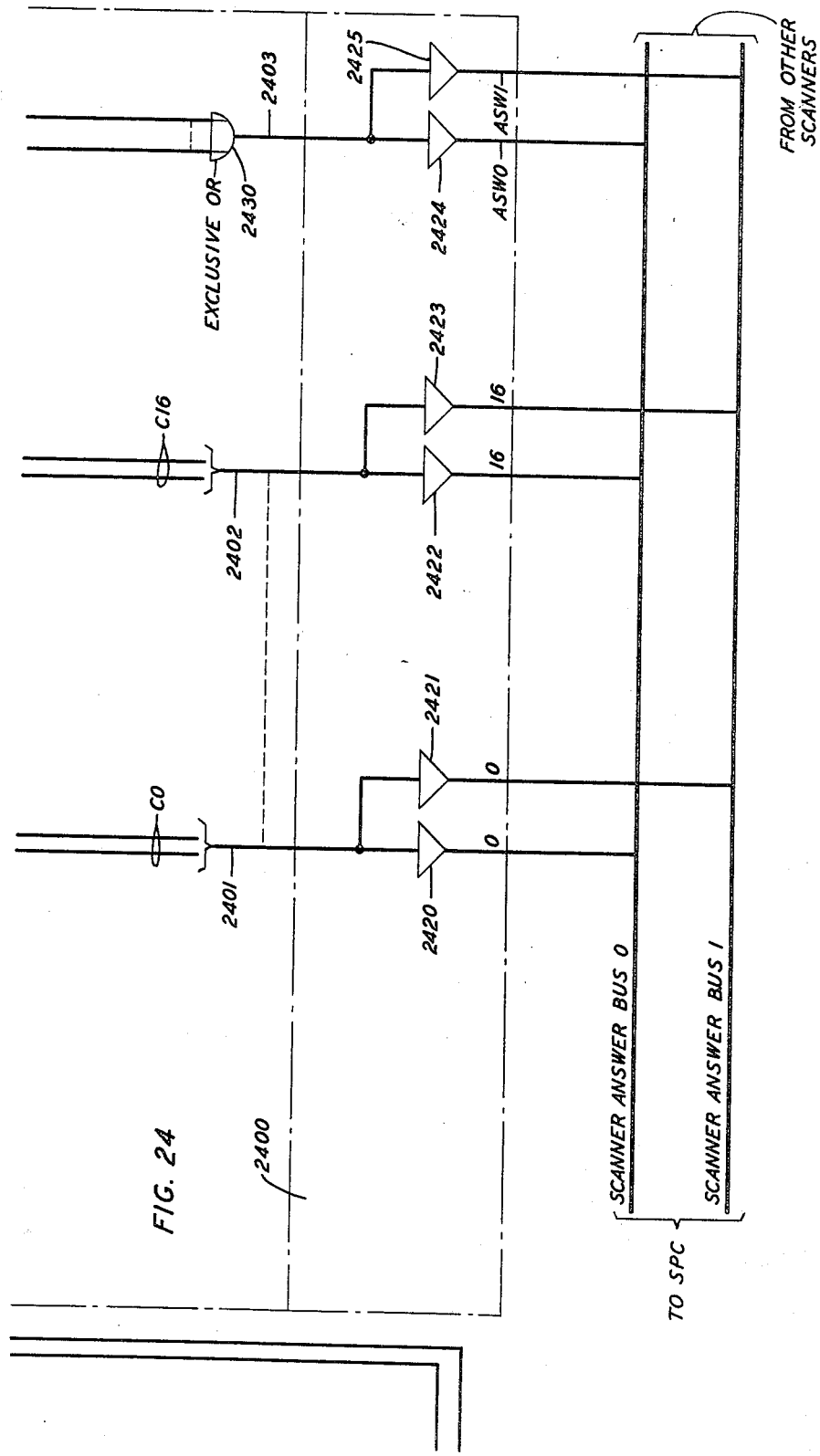

The scanner matrix shown on FIGS. 23 and 24 is of the 512 point size and has 32 ferrod rows, each of which has 16 ferrods. The interrogate windings of the ferrods common to a row are connected in series and, in turn, are connected to a series circuit comprising the output winding of an individual core in each of the core drivers 2103 and 2203. Thus for example, the interrogate windings of the upper row of ferrods on FIG. 23 are connected to the output winding of the upper right-hand core in each of core drivers 2103 and 2203. The circuit for the interrogate windings of each ferrod row also includes a winding of a transformer such as 2354 for row 0. The purpose of this transformer is subsequently described.

The control windings for all ferrods extend to the monitored circuits in the manner shown in the upper left-hand corner of FIG. 23. The readout windings of the ferrods common to a column are connected in series with each other and, in turn, to the input of two cable driver amplifiers whose outputs are connected to individual conductor pairs in each of the scanner answer buses. For example, the readout windings of ferrod column 0 are connected by means of amplifiers 2420 and 2421 to the 0 conductor pair in each scanner answer bus. Similarly, the readout windings of column 16 are connected by means of amplifiers 2422 and 2423 to the sixteenth pair of conductors in each scanner answer bus.

The reception of address data by each of controllers 0 and 1 from the 1-out-of-N address bus system causes each of registers 2101 and 2201 to apply simultaneous pulses to one of their horizontal conductors, H0 through H3, and one of their vertical conductors, V0 through V7, under control of the registered address information. These output pulses from the register are applied over the indicated conductors to the core driver in each controller where they switch the one core in each driver common to the two pulse conductors. The reception of these pulses by each of the two cores switches its magnetic state and generates a pulse in its output winding which is connected in series with the output winding of the corresponding core in the other core driver to the interrogate windings of one row of ferrods in the matrix of FIG. 23. Thus, the application of a pulse simultaneously to conductors H0 and V7 in both controllers 0 and 1 switches the upper right-hand core in each core driver and applies an interrogate pulse to the ferrods of row 0 on FIG. 23. At this time, either a "0" or a "1" is induced in the output winding of each interrogated ferrod, depending upon the state of the circuit monitored by it. The output signals from the 16 ferrods are applied in series with the corresponding windings for the other ferrods of their columns to the scanner answer buses by means of the indicated amplifiers. This returns a 16-bit binary word to the scanner answer bus to inform the SPC of the current state of the circuits monitored by the interrogated ferrods.

As already mentioned, the interrogate windings of the ferrods common to a row are also connected in series with the left-hand winding of a transformer common to each ferrod row, such as for example, transormer 2350 or the top row. The output of each transformer is connected by means of an amplifier, such as 2360 for transformer 2350, to an input of an exclusive OR circuit 2430, whose output is connected via amplifiers 2424 and 2425, to one conductor pair in each of the two scanner answer buses. The interrogation of a ferrod row induces an output signal in its associated transformer winding which, in turn, is amplified and applied to an input of the exclusive OR gate. The OR gate generates an output signal in the event that one, and only one, of its inputs is energized. Since the intended manner of operation of the scanner is such that only one ferrod row will be interrogated at a time, the OR gate 2430 should generate an all-seems-well signal when ever the scanner is operating in its intended manner.

Signal distributors—FIGS. 26 and 27

Signal distributors are provided in our system in order that relays in certain circuits may be operated and released by the SPC it runs at electronic microsecond speeds. Broadly speaking, the signal distributors act as intermediaries, or buffers, between the SPC and the circuits having relays whose operation and release is controlled by the SPC. The signal distributors receive signals from the SPC, via the CBT and CPD, at microsecond speeds and transform them into signals having the persistence required to operate and release relays.

As shown on FIG. 26, a signal distributor basically comprises a pair of controllers 2601 and 2611 and a pair of relay contact trees 2603 and 2613. Address information identifying a relay, as well as signifying whether the relay is to be operated or released, is transmitted from the SPC, via the 1-out-of-N address bus, to the signal distributor following the unlocking of its input circuit by an enable pulse from the CPD. The address information is registered in the controller and transmitted to the relay tree to operate relays therein to close a unique metallic path extending to the winding of the relay specified by the address information. The controller then applies an appropriate signal to operate or release the relay. The controller senses the operation or release of the relay and restores itself and the relay tree to normal.

FIG. 27 discloses a typical signal distributor in additional detail. Once again, the signal distributor comprises two controllers and two relay trees. The circuit operation is initiated when a controller, such as for example, controller 0 (2601) receives an enable pulse over either of its leads EV00 or EV01 from the CPD. This pulse is received by the enable verify unit 2701 and applied either over conductor EN0 or EN1 to unlock the storage registers 2702. Simultaneously, in the manner already described for other circuits, the EV unit 2701 returns a vertify pulse to the CPD. The unlocking of the registers 2702 permits them to register the address information currently gated onto the 1-out-of-N address bus system 2730 by the CBT. The output conductors of the register at this time selectively operate relay 2703 through 2707 in accordance with the registered information. The relay tree is comprised of the contacts of these relays, and their selective operation at this time closes through metallic path from their input terminal 2708 to a selected one of their output terminals 2709 through 2710. Each output terminal is individually connected to a different relay (not shown), and the output terminal that is now connected to the input terminal is the one that is connected to the relay specified by the registered address information.

The registered address information also specifies whether the relay is to be operated or released at this time. The registration of this information controls a relay whose contacts 2729 are connected to input terminal 2708. The contacts of this relay either connect terminal 2708 via contacts 2711 to the operated detector circuit 2713, or alternatively, via contacts 2712 to the released detector circuit 2714. Contact 2729 is connected to contact 2711 when a relay is to be operated. At that time, circuit 2713 applies the 48-volt negative potential to the input terminal 2708 and, from there, to one of the output conductors, as determined by the metallic path now existing in the relay tree, and finally, to the winding of the relay to which this output conductor is connected. The energized relay now operates and, in so doing, generates an inductive kick which is transmitted back over its operate path to circuit 2713. This circuit detects the inductive kick, which indicates that the relay has operated and, in turn, releases its controller and the relay tree. The operated relay remains operated by virtue of the fact that it is of the magnetic latching type.

The release operation is accomplished in a manner similar to that described for the operate cycle, except that, for a release operation, the release detector 2714 is connected to the input 2708 of the relay tree and, at that time, applies a positive 24-volt potential via the relay tree to the winding of the selected relay to release it. The inductive kick resulting from the relay release is detected by circuit 2714, which then restores its controller and its relay tree to normal.

The output of both circuits 2713 and 2714, signifying that a relay has operated or released, respectively, is applied via conductor 2715 to the enable verify circuit 2701. This signal is, in turn, applied via conductor 2718 to reset circuit 2716 and, from there, via conductor 2717, to registers 2702 to reset them. These registers may be also reset under control of the SPC by means of reset signals applied via conductors RS0 or RS1 to reset circuit 2716.

The signal distributor has been shown only diagrammatically on FIGS. 26 and 27 since they are similar to those disclosed in Doblmaier et al., as well as on pages 2270 through 2282 of the aforementioned Bell System Technical Journal. Also, our signal distributors are similar to our position signal distributor, which is described elsewhere in complete detail in this specification.

Communications bus translator—FIGS. 28–35

Figures 34, 35:
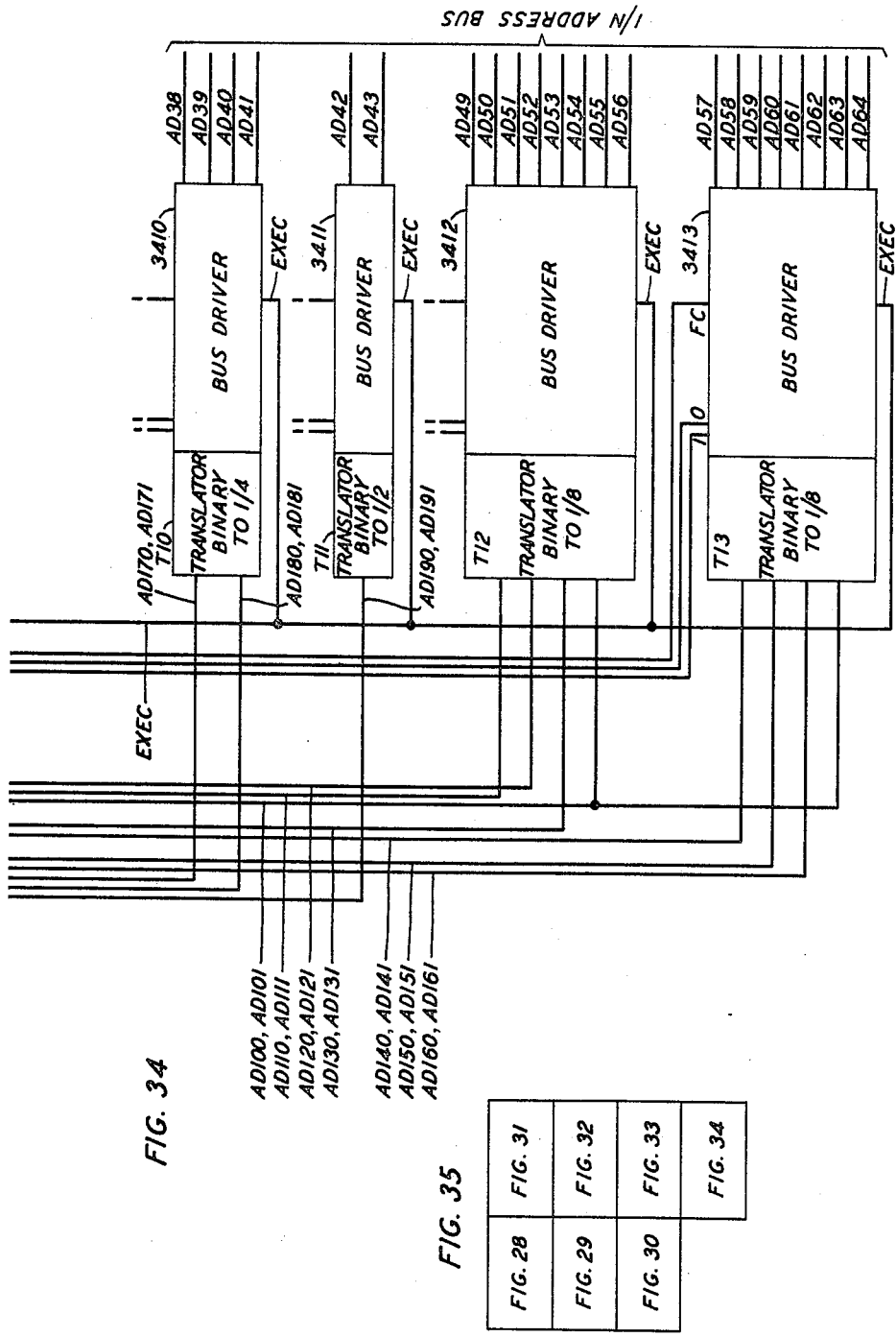

The communications bus translator (CBT) is shown diagrammatically as element 331 on FIG. 3A and in detail in FIGS. 28 through 34, when arranged with respect to each other as shown on FIG. 35. The function of this circuit is to receive peripheral circuit address information from the SPC in binary form, register this information, apply the registered binary information to the binary address buses, and also translate the registered information into a plurality of 1-out-of-N type information bits and apply the 1-out-of-N type information to the 1-out-of-N address buses. The information applied to the binary address bus is transmitted to the AMA, the teletype, and the group gate circuits, all of which are adapted to receive binary address information. The 1-out-of-N address information is applied to the remainder of the peripheral circuits of our system, such as for example, the scanners, the signal distributors, and the switching network.

As already discussed, our system provides for a duplication of many of the major circuits in order to ensure reliable call service under all condtions. This duplication includes the SPC's, the CBT's, and the bus systems, as well as other circuits. The two circuits comprising a pair are functionally designated "0" and "1." Normally, the "0" SPC operates with the "0" CBT which, in turn, operates with the "0" bus system. The same arrangements exist with respect to the "1" circuit of each pair. However, transfer facilities are provided so that, in the event of trouble, either SPC can operate with either CBT.

FIGS. 28 through 35 disclose the details of only one of the pairs of CBT's that are provided in our system. The designation of certain of its conductors assumes, for the purpose of discussion, that this is the "0" CBT and, accordingly, that it operates with the "0" SPC and the "0" bus system.

Figure 30:
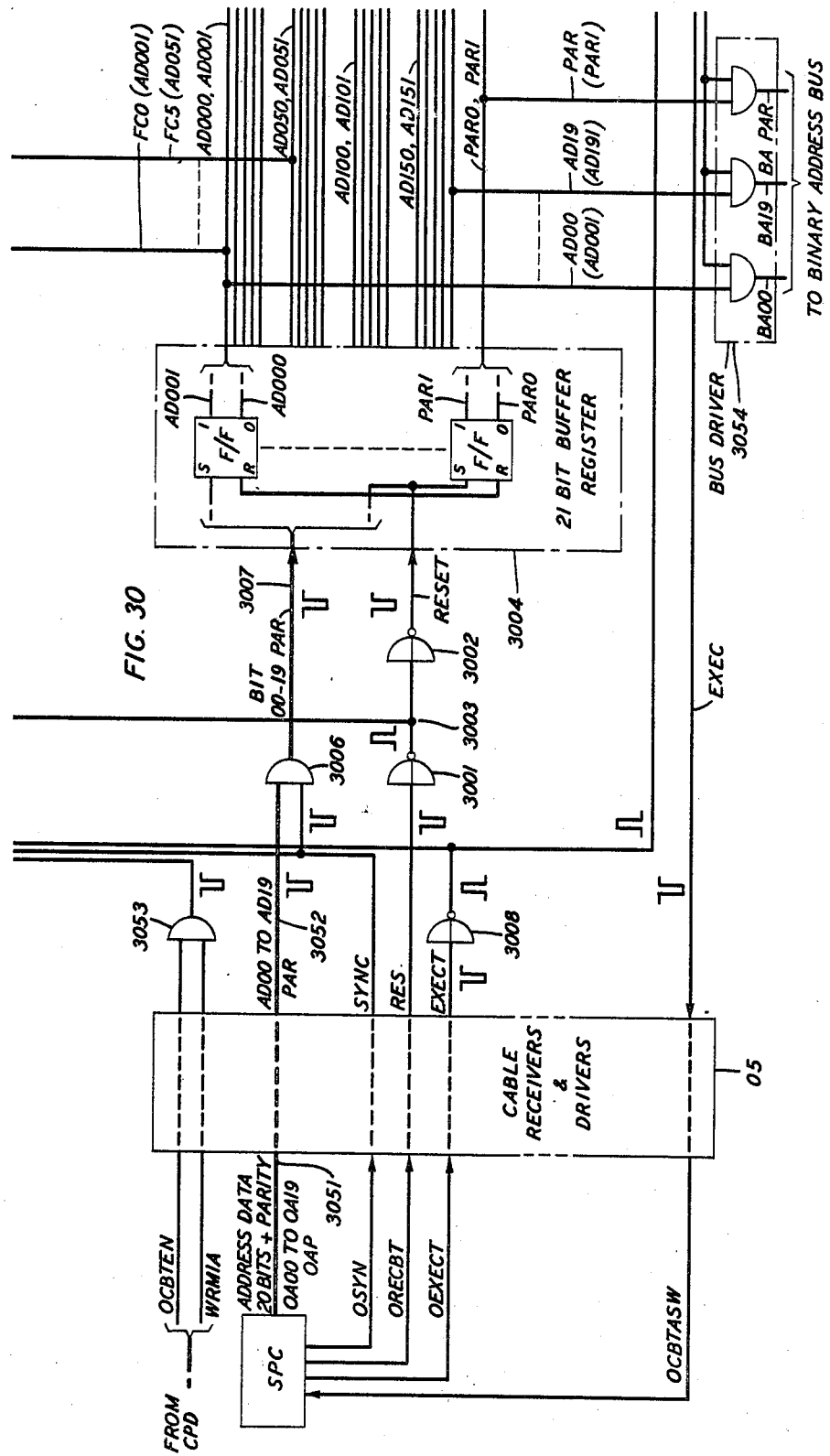
Figure 31:
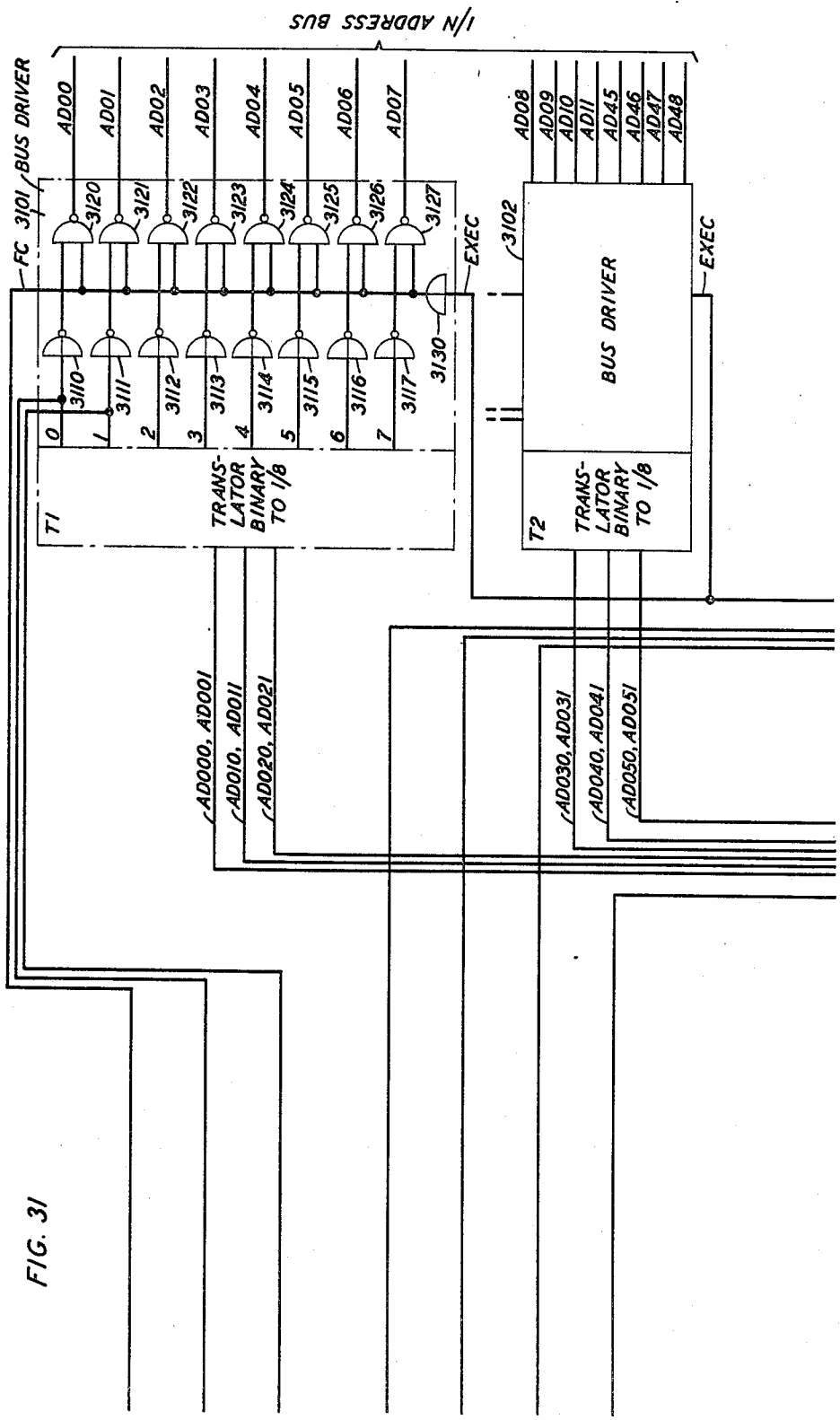
Figure 32:
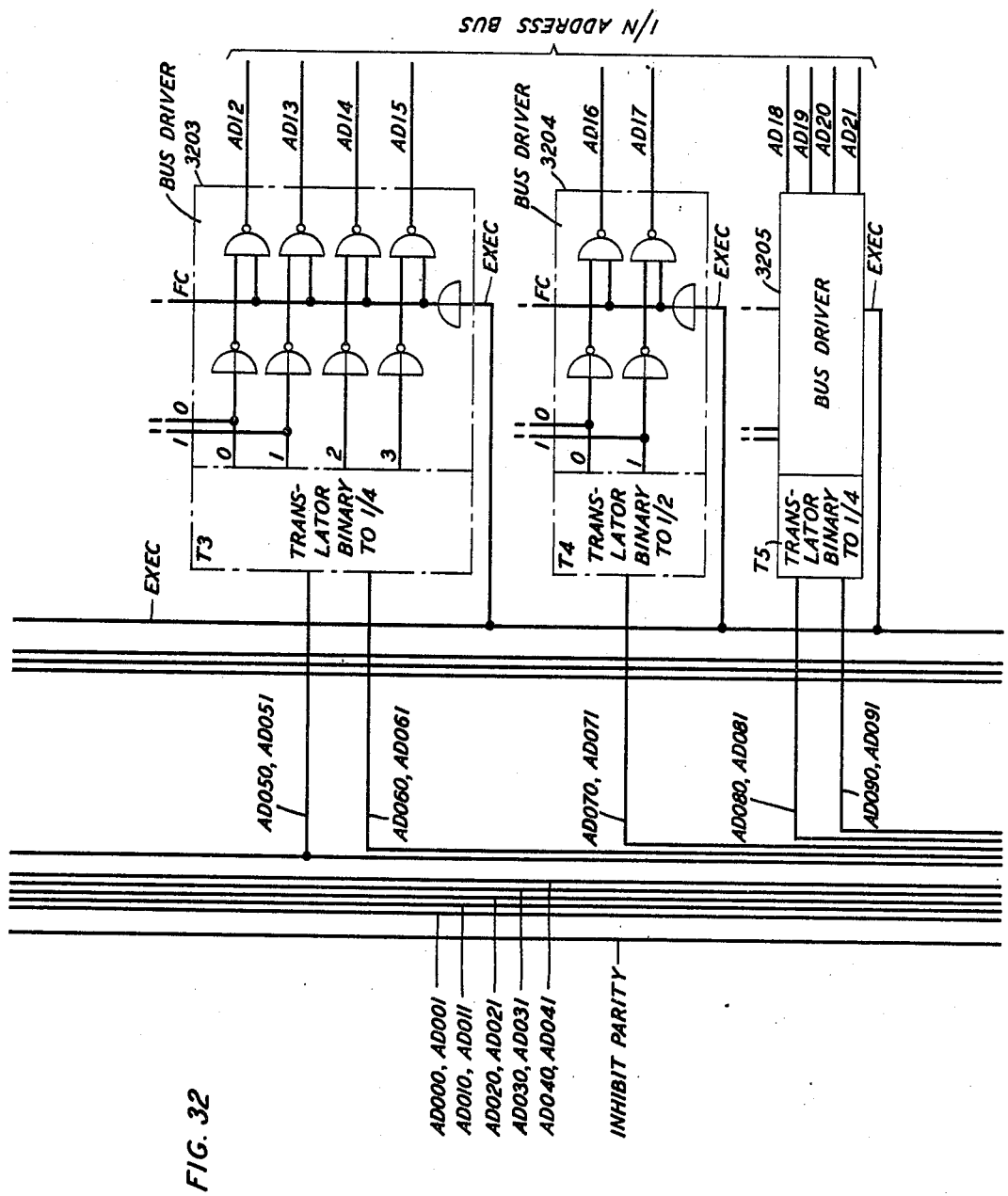
Figure 33:
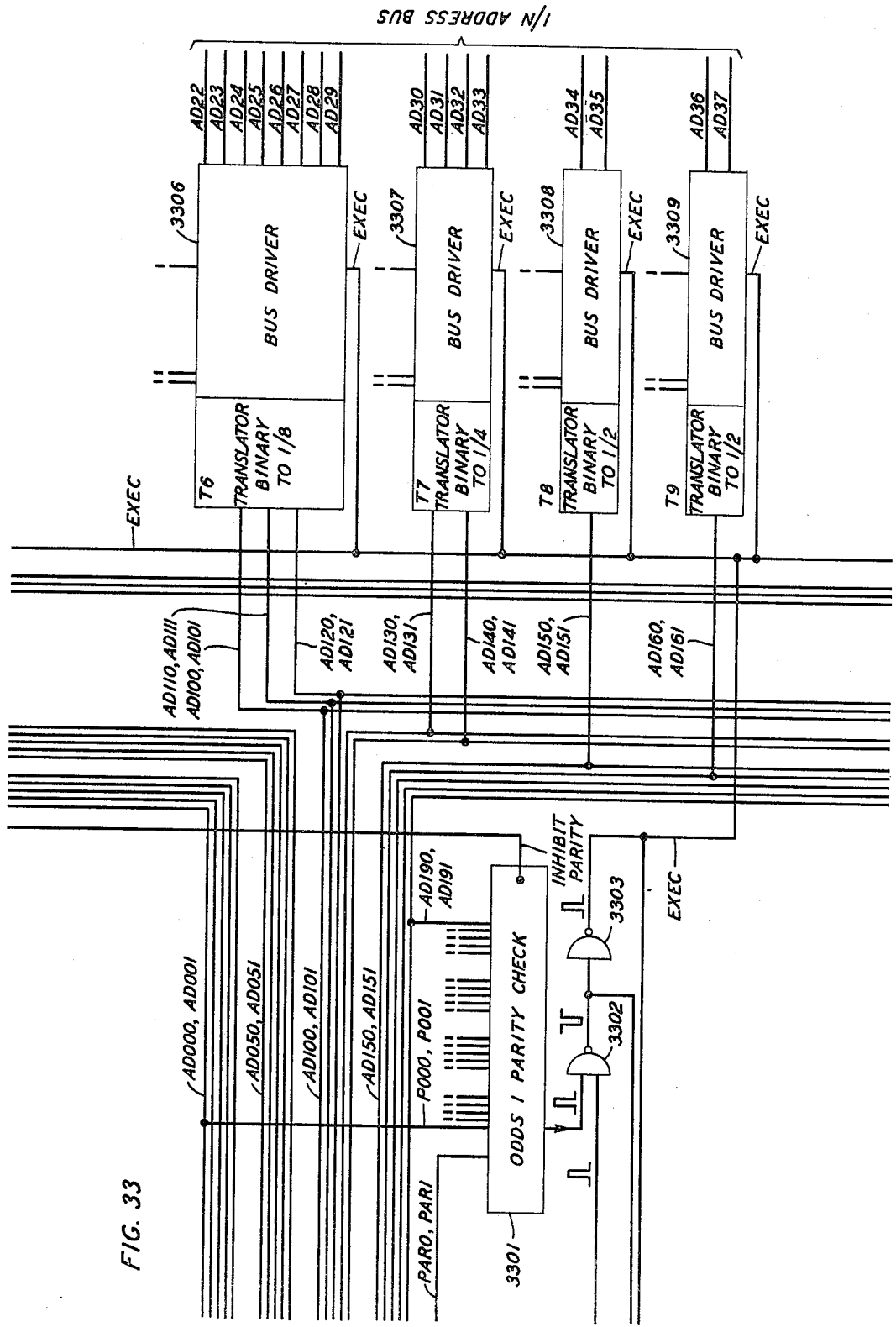

The SPC performs its function of transmitting address information to the CBT by means of the interconnections shown on FIG. 30. The SPC shown on FIG. 3B is also shown diagrammatically on FIG. 30 in order to facilitate an understanding of the nature of the signals interchanged between the SPC and the CBT. The peripheral circuit address information is transmitted from the SPC to the CBT in a 20-bit binary word, plus an odds-1 parity bit, for a total of 21 bits. This cable is designated "3051" and is further designated in a manner indicative of the information bits carried by it. The SPC also transmits control pulses to the CBT over the leads designated "OSYN," "ORECBT," and "OEXECT." It receives information from the CBT over the lead designated "OCBTASW." The nature and purpose of the signals on these miscellaneous control leads are subsequently described in detail in the following paragraphs.

The input information received by the CBT is received by its cable receivers and drivers 3005, which are of the type generally shown in FIG. 7, and in turn applied to the various portions of the circuitry of the CBT. The normal operation of the SPC and the CBT is such that each transmission of a binary peripheral circuit address to the CBT is preceded by the transmission of a RESET signal from the SPC over the lead ORECBT. This RESET signal, which is manifested as a negative pulse, is transmitted through inverting OR gates 3001 and 3002 to apply a negative RESET pulse to the RESET lead of a 21-bit buffer register 3004 to reset it and prepare it for the reception of peripheral circuit address information.

The SPC transmits a SYNC pulse to the CBT over the lead OSYN to unlock the address receiving circuitry within the CBT and prepare it for the reception of peripheral circuit address information. The SYNC pulse is detected by the cable receivers and applied as a negative-going pulse to lead SYNC. This negative SYNC pulse is further applied to one input of the noninverting AND gates 3006, which operate in such a manner that they produce a negative potential on their output leads whenever both of their input leads are driven negative. The AND gate 3006 shown on FIG. 30 actually comprises a plurality of AND gates as described in connection with FIG. 10. Therefore, the SYNC pulse which is applied to one input of each of AND gates 3006 partially unlocks them and puts the potential on their output leads under direct control of the other input of each AND gate. Next, the SPC transmits the 20-bit address information, together with a parity bit, to the CBT over the lead 3051. This data is received and detected by the cable receivers 3005 and applied to the second input of each of AND gates 3006 over the leads 3052. The potentials on these leads at this time are such that a negative pulse is applied to each lead associated with a binary 1, while the leads associated with binary 0 remain at a positive potential and undergo no change of state. The negative-going pulses on the input leads associated with binary 1 turn on their associated AND gates 3006 and, in turn, produce a negative pulse at the output of each AND gate, both of whose inputs are low at this time. The outputs of the 21 AND gates 3006 are applied over cable 3007 to the inputs of the 21-bit buffer register 3004 to register the 21 bits of address and parity information. Each register order comprises an individual flip-flop, and the operation of the register at this time is such that the flip-flops associated with binary 1's are set while the flip-flops associated with binary 0's remain in a RESET condition.

The output of each register order is provided on a 2-conductor double-rail basis, with one conductor being connected to the "0" output terminal of its flip-flop, as shown in FIG. 30, and with the other output conductor for the same order being connected to the "1" output terminal of its flip-flop. This double railing of the output information enables both high and low output potentials to be available simultaneously for each register order. The output conductors for the "0" order are designated "AD000" and "AD001," with the first two digits representing the bit address and with the last digit representing the output terminal of its flip-flop to which the conductor is connected. Each output conductor having a final digit of "1" is high when its associated register order is storing a binary 1. Each output conductor having a final digit of "0" is high when its register order stores a binary 0. Thus, output conductor AD001 represents bit 00, is connected to the "1" side of its flip-flop, and is driven high whenever its flip-flop is set to store a binary 1. On the other hand, output conductor AD000, which also represents bit 00, is connected to the "0" side of the flip-flop for the "0" order of the register and is driven high whenever a binary 0 is entered into the "0" order. Conversely, conductor AD001 is low for a binary 0 and conductor AD000 is low for a binary 1 indication for the 0 bit. The designation of the two output conductors for the parity order is different in that they are designated "P0" and "P1" to indicate directly whether they are associated with the "0" or "1" portion of their associated flip-flop. In the subsequent paragraphs, the output conductor for each register order which is connected to the "1's" output terminal of its flip-flop is referred to as the "1's" conductor while the other conductor is referred to as the "0" conductor.

The 21 output bits of the buffer register are applied via the "1's" output leads to the parity check circuit 3301, which checks for an odds-1 parity and supplies a parity OK check signal 3302 to AND gate 3302 in the event the parity checks OK. This signal manifests itself as a positive signal on the upper input of the AND gate.

Output bits 0 through 19 of the buffer register are applied, in the manner shown, to the 13 translators, T1 through T13, shown on the right side of FIGS. 31 through 34. Each of these 13 translators operates on a binary to 1-out-of-N mode in response to input information supplied to it by register 3004. The number of binary input bits each translator receives, as well as the particular 1-out-of-N code by which it opeartes, may be readily obtained from an inspection of the circuit for and designation of each translator. For example, the first three binary bits from register 3004 are applied to translator T1, which operates on a binary to 1-out-of-8 basis. In so doing, it translates the 3-bit binary word it receives and converts it to a 1-out-of-8 indication for each operation of the register. Each of the remaining 1-out-of-N type translators, T–2 through T13, is entitled in a manner indicating the particular 1-out-of-N code in accordance with which its operates. The input conductors on the left side of each translator are numbered in a manner which signifies the register order to which it is connected. Thus, translator T2 is of the 1-out-of-8 type and receives binary information from bits 03, 04, and 05 of the register. The circuit details of this translator are not shown, since they are identical to that of translator T1. Translator T3 is of the binary to 1-out-of-4 type and receives binary information from bits 05 and 06 of the register. Translator T4 is of the binary to 1-out-of-2 type and receives input information from bit 07 of the register. Translator T5 is of the binary to 1-out-of-4 type and receives as input information register bits 08 and 09. Each of the remaining translators is also of either the 1-out-of-8, 1-out-of-4, or 1-out-of-2 type, as indicated by their designation.

Each translator operates in response to the binary input information it receives and energizes one of its output leads in accordance with the code by means of which it operates. Thus, for example, translator T1 energizes one of the output leads 0 through 7 for each 3-bit binary word received from the buffer register. The selected "1" output lead is driven low, while the remaining leads (the nonselected ones) remain high. Each output lead is connected to an individual inverting OR gate, each of whose output terminal is connected to one input terminal of an AND gate individual to the OR gate. For example, output lead 0 is connected to inverting OR gate 3110, whose output, in turn, is connected to the upper input of inverting AND gate 3120. With this arrangement, the AND gate associated with the selected output conductor of the translator has its upper input driven high, while the upper input of each of the remaining AND gates remains low. The eight OR gates for translator T1 are designated 3110 through 3117, while the AND gate to which each of these OR gates is connected is designated 3120 through 3127.

The inverting OR gates connected to each translator output, together with the succeeding series of AND gates for the same translator, comprise what is hereinafter termed the "bus driver" for the translator. Thus, for example, the series of OR gates 3110 through 3117 for translator T1, together with the series of AND gates 3120 through 3127 for the same translator, all comprise the bus driver 3101 for translator T1. The output conductors for the bus driver are connected to the outputs of its series of AND gates, and these conductors for bus driver 3101 are designated "AD00" through "AD07." Each of the remaining translators, T2 through T13, also has a bus driver circuit associated therewith which operates in the same manner as described for bus driver 3101.

Each bus driver also includes a noninverting OR gate, such as OR gate 3130 for bus driver 3101, whose output is connected to the lower input of each of the AND gates within the bus driver. The input of this noninverting OR gate is connected to lead EXEC. This arrangement puts the conductive condition of each AND gate within a bus driver under the joint control of the lead EXEC and the output conductors of its associated translator.

It may be seen from the foregoing that the registration of each 21-bit word by buffer register 3004 applies binary information to the input of each of translators T1 through T13 to energize with a negative potential one, and only one, of their plurality of output leads, so that one output conductor of each of translators T1 through T13 is energized at this time.

The "1's" output conductors from the 21 orders of the buffer register 3004 are applied to one input of each of the AND gates whose output conductors are designated "BA00" through "BA19" and "BAPAR" on FIG. 30. These gates comprise bus driver 3054. The output conductors of these gates extend to the binary address bus circuit, to which is connected the teletype unit, the AMA circuits, and the group gate circuits. The other input of each of these AND gates is connected to the same EXEC conductor which is connected to the AND gates of bus drivers 3101 through 3413.

The data stored at the present time in the buffer register is neither applied in binary form to the binary address bus nor in 1-out-of-N type form to the 1-out-of-N address bus, since the output gates of the bus drivers are not currently enabled. OR gate 3303 is normally in a conductive state. This holds the EXEC lead low, and therefore holds one input on each of the bus driver AND gates low to maintain them in a disabled condition with their outputs high.

Subsequently, when the SPC desires that the CBT gate the information in the buffer register onto the bus systems, it transmits an execute pulse to the CBT over lead OEXECT. This pulse drives the input of inverting OR gate 3008 low and drives its output high extending to the lower input of AND gate 3302. The other input of this AND gate is the OK check parity signal. If the information in the buffer register has good parity, the parity check circuit now applies a positive output to the other input of the 3302 AND gate. This execute pulse turns the AND gate on and drives its output low. The negative pulse on the output of gate 3302 is, first of all, applied back through the cable receivers 3005 as an all-seems-well signal to the SPC over conductor OCBTASW. This signal signifies that the data has been registered with good parity, together with the fact that the execute pulse has been received by the CBT.

The negative output from AND gate 3302 is inverted by OR gate 3303 and applied as a positive pulse to one input of each of the AND gates in bus driver 3054. This unlocks these gates and gates the contents of the buffer register onto the binary address bus and, in turn, to the peripheral circuits to which this bus is attached. The AND gates associated with binary 1's turn on, while the AND gates associated with binary 0's remain off. This causes the output of these gates to apply negative pulse to the bus system for a binary 1 and to apply no pulse to the bus leads representing binary 0's.

The positive pulse on the output of OR gate 3303 is also extended over lead EXEC to each of bus drivers 3101 through 3413, and, in particular, to the noninverting OR gate in each of these bus drivers. The positive pulse on this lead unlocks the drivers and gates the outputs of each binary to 1-out-of-N translator onto the 1-out-of-N address bus system. The details of this operation may best be understood with reference to the positive execute pulse applied to bus driver 3101. This positive pulse is extended through the noninverting OR gate 3130 to one input on each of AND gates 3120 through 3127. The other input is now high for only the one AND gate associated with the energized output conductor which represents, in 1-out-of-N code form, the numerical value of the binary word supplied to the input of translator T1 from the buffer register. Thus, with reference to translator T1, AND gate 3127 would now have both of its inputs high and would turn on to indicate a "7" in the event that a binary 7 (111) was transmitted from the buffer register to the input leads of translator T1. The turn-on of gate 3127 for the duration of the execute pulse drives its output low and applies a negative pulse over conductor AD07 to the 1-out-of-N address bus. The remaining AND gates, 3120 through 3126, do not turn on at this time since the upper input conductor of each of these AND gates remains low. This causes no signal to be applied over their associated output conductors to the bus system. The operation of the bus drivers for translators T2 through T13 is similar to that already described during the reception of the execute pulse, in that one, and only one, output conductor in each driver is energized to apply a negative pulse to the 1-out-of-N address bus system.

All peripheral circuits connected to the binary and 1-out-of-N address bus systems receive each and every item of address information gated onto these systems by the CBT. However, as described elsewhere, in the course of normal call processing, only one peripheral circuit at a time is selected by the SPC to respond to an address command on either the binary or 1-out-of-N bus system. The selection of the peripheral circuit that is to respond to a command is accomplished by means of a central pulse distributor, operating under control of the SPC, which transmits an enable pulse over a discrete conductor pair extending to the peripheral circuit selected by the SPC for response. The selected peripheral circuit registers this address information and, in turn, in the normal course of events, transmits an enable verify signal back to the SPC via the CPD, indicating that it has received and registered the information transmitted to it. Once the SPC is assured that the information has been successfully registered within the selected peripheral circuit, it restores the CBT to a normal condition by transmitting a RESET pulse to it over the lead ORECBT. This RESET pulse is received and applied over the RES lead and through the inverting 3006 OR gates to the buffer register to reset it in preparation for the reception of the next binary word, in the manner priorly described.

False code operation of CBT

The preceding has described the manner in which the SPC transmits peripheral circuit address data to the SPC in connection with a normal call processing operation. The SPC and CBT together can operate in what is termed a "false code routine" in order to test the check circuitry in the various peripheral circuits. Each of the peripheral circuits to which the 1-out-of-N address bus is connected contains a 1-out-of-N check circuit which transmits a trouble indication back to the SPC in the event that bad information, such as for example, 0-out-of-N or 2-out-of-N, is transmitted to it from the CBT. This check circuitry in the peripheral circuits sends back no error signal in the event that it receives good data.

Since an inoperable condition of a 1-out-of-N check circuit in a peripheral unit would prevent it from transmitting back a bad data signal in the event that improperly coded data was received from the CBT, the SPC and the CBT together cooperate during idle times of the system to operate in a false code routine in which bad data is deliberately transmitted over the 1-out-of-N address bus to a peripheral circuit in order to ensure that the bad data will be detected and transmitted back to the SPC as an error condition. The following paragraphs describe the manner in which the SPC and the CBT together function during a false code routine.

It is assumed that the CBT has already been reset by the SPC in the manner priorly described. This RESET pulse causes a positive pulse to appear at the output of OR gate 3001. This positive pulse is applied via terminal 3003 to the lower input of AND gate 2903. The other input of this AND gate is already high at this time, as subsequently described, and therefore the AND gate turns on to drive its output low as a negative RESET pulse to the reset input of the 6-bit false code register 2906, to reset it and clear it of any data that might be now in it.

Subsequently, the SPC transmits a SYNC pulse together with a special 6-bit binary word to the CBT, which is registered in the first 6 bits of register 3004 in the normal manner. The remaining bits of the register store binary 0's at this time. The negative SYNC pulse is also applied to the C input terminal of flip-flops 2901 and 2902 to reset them in the event that they were not already reset.

Next, the SPC commands the CPD to transmit pulses to the CBT over the leads OCBTEN and WRMIA on FIG. 30. These pulses are applied as negative pulses to the input of noninverting AND gate 3053, which, by means of its output, applies a negative-going pulse to various portions of the CBT circuit. This negative pulse is, first of all, transmitted to the S input terminal of flip-flop 2902 to set it and drive its 1 output high. This negative pulse from gate 3053 is inverted by OR gate 2907 and applied as a positive pulse to one input on each of AND gates G0 through G5. This partially unlocks these AND gates and puts their conductive condition solely under control of their other input conductors, which are connected to the "1's" output conductors for the first 6 bits of register 3004, i.e., bits 0 through 5. The "1's" output conductors for the orders of the register storing binary 1's are now high, while the "1's" conductors for the register orders containing "0's" are low. Thus, the reception of the CBT enable pulse unlocks gates G0 through G5 and gates the 6-bit word now in the register, via gates G0 through G5, into the 6-bit false code register 2906. This sets the false code register so that it now stores the same word currently contained in the first 6 bits of register 3004. The termination of the CBT enable pulse drives the output of OR gate 2907 low and thereby locks AND gates G0 through G5 to isolate the input of the false code register from the output of the buffer register.

In summary of the false code routine description, so far, the false code register now contains the 6-bit false code register transferred to it from the buffer register. The buffer register still contains the false code word in its first 6 bits and in its remaining address bits contains binary 0's, except for the parity bit, which may be either a "0" or a "1", depending upon the number of 1 bits in the false code word.

The SPC subsequently transmits an execute pulse to the CBT which, in the manner priorly described, gates the output of the 21-bit buffer register 3004 onto both the binary and the 1-out-of-N address bus systems. No peripheral circuit responds at this time, since the SPC has not commanded the CPD to enable any peripheral circuit. However, within the CBT the execute pulse is applied as a positive pulse from the output of OR gate 3008 to the lower input of AND gate 2905. The other input of this AND gate is already high, since the "1's" output of flip-flop 2902 is high by virtue of the flip-flop being in its SET state. Therefore, AND gate 2905 turns on and applies a negative pulse from its output to the S input of flip-flop 2901 to set it and drive its "1's" output high into the lower inpu of AND gate 2904. The other input of the 2904 AND gate is connected to the "1's" output of flip-flop 2902, which is already high. Therefore, both inputs of the AND gate are high, which causes it to turn on and drive its output low into the upper input of AND gates 2903.

This low potential on the AND gate disables it and prevents it from responding to any positive RESET signals that might be applied at this time to its other input.

Subsequently, the SPC transmits a RESET pulse to the CBT. This pulse resets register 3004 in the normal manner. The RESET pulse also applies a positive pulse to the lower input of AND gate 2903. However, the AND gate is disabled at this time, as just described, and therefore a RESET pulse is not transmitted to the false code register. The false code register, therefore, at this time remains SET and stores the 6-bit false code word.

Subsequently, the SPC transmits a SYNC pulse together with a normal 20-bit data word, plus parity, to the CBT. The information is entered into register 3004 in the normal manner. The SYNC pulse is also extended as a negative pulse to the C terminals of flip-flops 2901 and 2902 to reset them. The resetting of the two flip-flops drives their "1's" output low to turn off AND gate 2904. This drives its output high into the upper input of AND gate 2903 to unlock it and put its conductive state solely under the control of its other input conductor.

At this time, the normal 21-bit word has been registered in register 3004, whose outputs are connected to the inputs of the plurality of 1-out-of-N translators to energize them in the normal manner so that one, and only one, of the output conductors of each translator is energized at this time with a negative potential. However, at this time, the data in the false code register causes the circuits on FIG. 28 to supply a potential to the bus driver circuit of one of the 1-out-of-N translators to cause it to transmit defective 1-out-of-N type information to the 1-out-of-N address bus.

The first 4 bits of the 6-bit false code word are applied from the output of the false code register 2906 over conductors F0 through F3 to the input of translator 2801, which operates on a binary to 1-out-of-16 basis. The last 2 bits of the false code register are applied over conductors F4 and F5 to translator 2802, which operates on a binary to 1-out-of-4 basis. The first 4 bits of the false code word represent an identification of the 1-out-of-N bus driver selected by the SPC for false code transmission. The remaining 2 bits of the 6-bit false code word represent the manner in which the selected bus driver is to apply false data to the 1-out-of-N address bus. In other words, these last 2 bits signify whether the false data is to be transmitted in 0-out-of-N or 2-out-of-N form, together with the output lead that is to be utilized if 2-out-of-N transmission is to be utilized.

Figure 28:
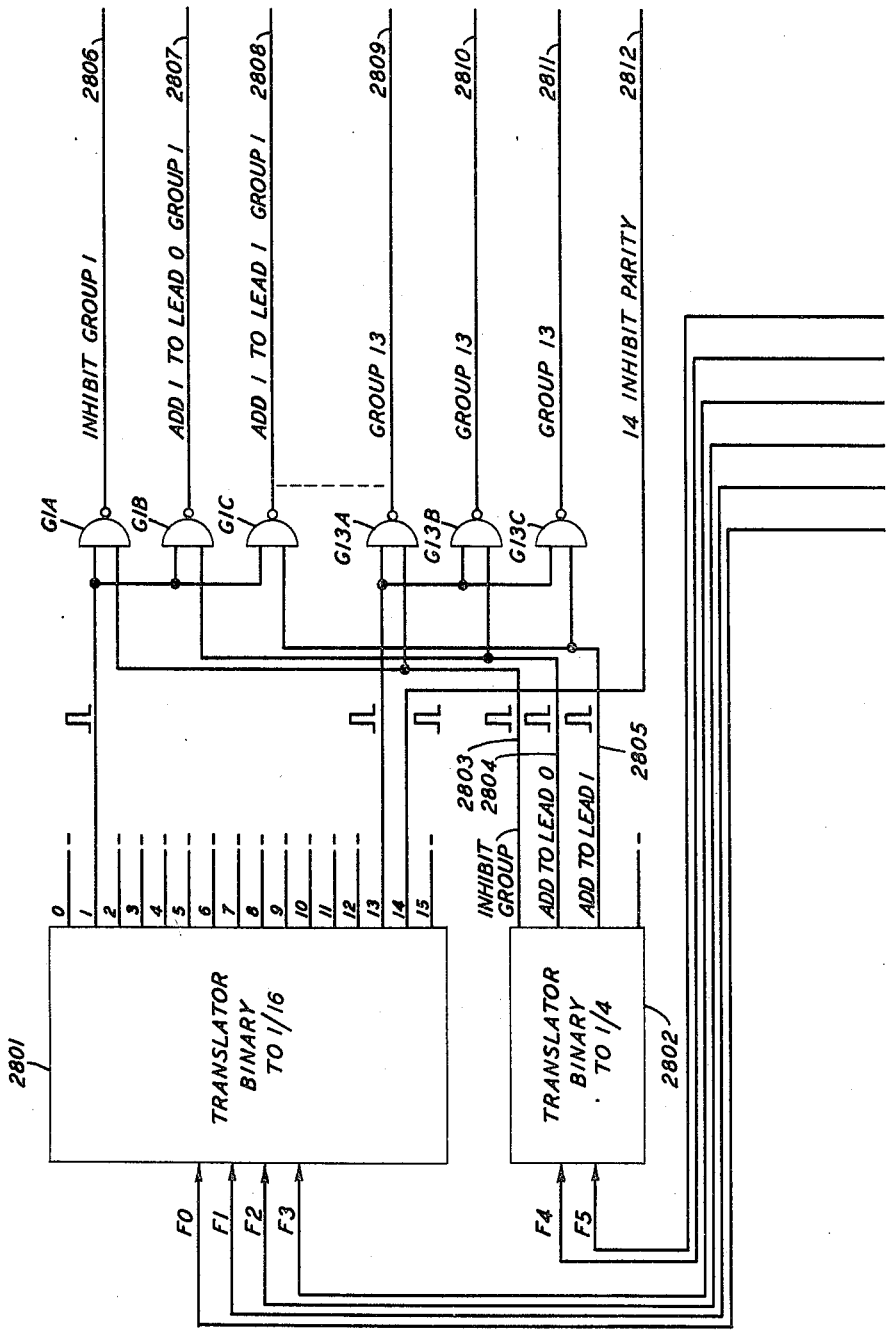
Figure 29:
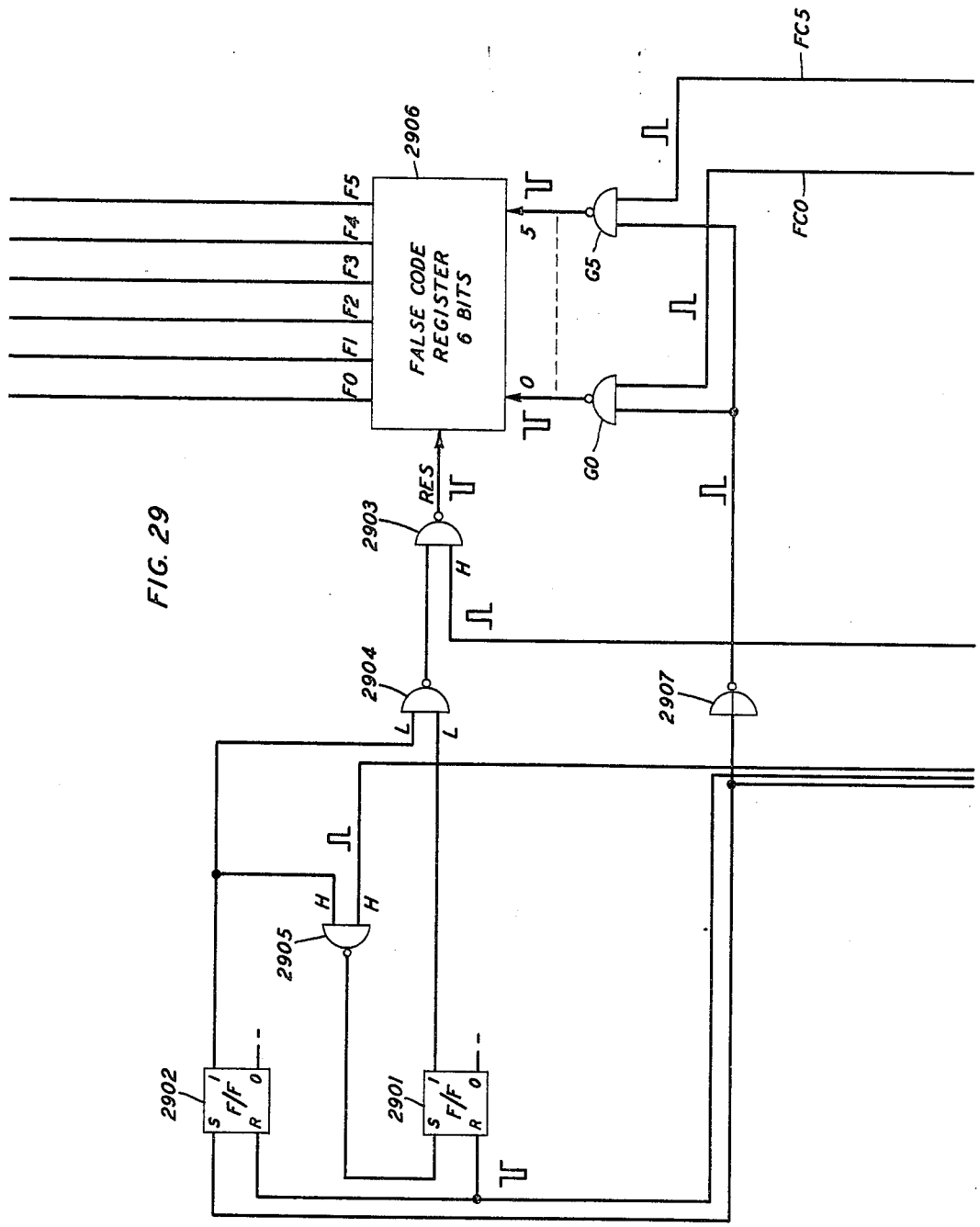

The translator 2801 on FIG. 28 operates on each false code operation to energize one of its sixteen output conductors. Only its output conductors 1 through 13 are utilized for the false code operation. Thus, the binary input to this translator on each false code operation energizes one, and only one of its output conductors 1 through 13. The last 2 bits of each false code word are supplied as binary information to translator 2802, which energizes one, and only one, of its top three leads. The fourth output lead of this translator is not used.

Each of the three output leads of the translator 2802 represents the manner in which the selected 1-out-of-N bus driver shall be utilized to transmit false data to a peripheral unit via the 1-out-of-N address bus. The lead 2803 from this translator is designated "inhibit group" and, in the manner subsequently described, causes the selected output circuit to transmit 0-out-of-N type data. The output lead 2804 of this translator is designated "add-to-lead-0" and energizes the 0 output lead of the selected bus driver circuit, one of whose other output leads is also energized at this time. This causes two of its output leads to be energized and transmit 2-out-of-N type data over the 1-out-of-N address bus. The output lead 2805 translator is designated "add-to-lead-1" and, in a manner analogous to the "add-to-lead-0" output, causes the energization of lead 1 of the selected output circuit to cause it to transmit defective 2-out-of-N type data over the 1-out-of-N address bus.

Output conductors 1 through 13 of translator 2801 are each connected to an individual group of three AND gates each. Thus, the No. 1 output conductor of the translator is connected to one input on each of the three AND gates in group 1, which AND gates are designated "G1A," "G1B," and "G1C." Similarly, the No. 13 output conductor of the translator is connected to one input conductor on each of AND gates G13A, G13B, and G13C. The other input lead for each of the three AND gates within a group is connected to one of the three output leads of translator 2802. With this arrangement, the single output of translator 2801 that is energized unlocks its associated group of three AND gates and causes the conductive state of its three AND gates to be placed solely under control of the output conductors from translator 2802. In other words, if output conductor 1 from translator 2801 is energized at this time, it drives the upper input high on each of AND gates G1A, G1B, and G1C. This partially unlocks these three AND gates and puts their conductive status solely under control of the three output conductors of translator 2802. Let it be assumed at this time that output conductor 2803 of this translator is energized at this time with a positive potential under control of the binary data transmitted to the translator over conductors F4 and F5. In this case, the AND gate G1A has both of its inputs high, which causes it to turn on and apply a low potential to the lower input terminal of each of AND gates 3120 through 3127 for bus driver 3101. This disables these AND gates and prevents one of them from turning on upon the subsequent reception of the positive execute pulse from the output of noninverting OR gate 3130. The disabling of these AND gates thereby prevents any information bits from being applied to output conductors AD00 through AD07, and therefore causes 0-out-of-N type information to be applied to this particular set of eight conductors.

In a similar manner to that just described, the selection of ouput conductor 2804, designated "add-to-lead-0," turns AND gate G1B on and applies a negative potential over lead 2807, designated "and-1-to-lead-0 group 1," which extends to the input of OR gate 3110 for the bus driver 3101. This turns off the OR gate, drives its output high, and drives the upper input of AND gate 3120 high so that it will turn on when the execute pulse is subsequently received. At this time, the T1 translator is also energized by the buffer register so that another of its output leads, other than lead 0, is now energized. This causes the AND gate associated with this other energized lead to turn on when the execute pulse is received. The two AND gates turning on energize two of the eight ouput leads for this bus driver and thereby cause 2-out-of-N type data to be transmitted to a peripheral circuit.

In a similar manner, the energization of the output lead 2805 of translator 2802, the lead designated "add-to-lead-1," causes gate G1C to turn on and consequently causes a second 1-out-of-N bit to be applied to output conductor AD01 of bus driver 3101 so that, once again, 2-out-of-N type data is applied to the bus.

The preceding paragraphs have described the manner in which bus driver 2101 may be caused to transmit defective 1-out-of-N data. The energization of one of the other output conductors of translator 2801, other than output lead 1, will unlock a different group of three AND gates so that the energization of one output conductor of translator 2802 will then cause the bus driver specified by the 2801 translator to be utilized for the transmission of false code data over the 1-out-of-N address bus. Thus, it may be seen that the false code circuitry on FIGS. 28 and 29 enable false code data to be transmitted out over any one of the thirteen 1-out-of-N bus drivers, as determined by translator 2801, while the precise nature of the defective data is determined by the energized output conductor of translator 2802. The SPC, during idle periods of the system, routinely exercises the false code circuit so that all of the 1-out-of-N output circuits and all the peripheral units are tested to ensure their proper operation. If a 1-out-of-N check circuit in a selected peripheral unit is not functioning properly, such as for example, by being blocked so that it never returns a bad error signal to the SPC, this condition will be detected during the false code routine when the 0-out-of-N or 2-out-of-N type data is transmitted to the defective check circuit. At this time, the SPC knows that it should receive an error signal and, if no such signal is received from the peripheral unit, the SPC will then initiate further maintenance operations to isolate and trouble-shoot the defective peripheral unit.

In summary, the preceding description of the CBT has described its operation for both a normal and a false code routine. The normal routine is typified by the sequential transmission of a RESET pulse, a SYNC pulse plus data which is entered into the buffer register, followed by an execute pulse which gates the registered information onto the binary address bus through bus driver 3054, as well as onto the 1-out-of-N address bus via translators T1 through T13 and bus drivers 3101 through 3413.

The false code routine is more involved and is initiated by the reception of a RESET pulse which resets both the buffer register and the false code register. A 6-bit false code word plus a SYNC pulse is then transmitted to the CBT. This 6-bit word is entered into the buffer register in the normal manner. Subsequently, a CBT enable and a WRMIA pulse is received to gate the false code word from the buffer register into the false code register. Following this, an execute pulse is received which disables the control circuitry for the false code register so that the subsequent reception of a RESET pulse resets only the 21-bit buffer register and not the false code register.

Next, a normal 21-bit binary word representing good data, together with a SYNC pulse, are simultaneously received by the CBT from the SPC. This enters the 21-bit word into the buffer register. The setting of the buffer register at this time energizes the input leads of the 1-out-of-N translators in the normal manner, thereby preparing them, supposedly, for the transmission of routine 1-out-of-N data over the output leads of their 1-out-of-N bus drivers. However, the information in the false code register is effective at this time to select one of the bus drivers for data modification, as well as to select the manner in which the data is to be modified. The selected driver is represented by the first 4 bits of the false code word, while the nature of the data modification is represented by the last 2 bits of the word. The driver selected for data modification is controlled by the "1" energized output conductor of translator 2801, while the nature of the data modification is determined by the "1" energized output conductor of the 2802 translator on the same figure. At this time, the thirteen groups of gates associated with the false code circuitry on FIG. 28 are energized in such a manner that the selected bus driver either has an additional one of its output leads energized, or alternatively, has a lead within it energized which blocks the energization of any of its output leads.

Next, the execute pulse is received from the SPC and the nonselected 1-out-of-N bus drivers apply their customary 1-out-of-N information to the 1-out-of-N address bus. However, the operation of the selected bus driver is modified at this time so that it transmits either 0-out-of-N or 2-out-of-N type data to the address bus in the manner determined by the last two bits of the false code word.

Group Gate—FIGS. 36–39

One of the many functions of the SPC is to generate the signals which effect the operation and release of relays in the position buffer circuit for each operator position. The operation and release of these relays supply the lamp signals which keep the operators advised of the current status of the calls served by them. The commands generated by the SPC which control the operation and release of these relays are applied by the SPC to the binary address bus via the CBT. From the binary address bus, the commands are transmitted via the group gate and position signal distributor to the position buffer circuits. The purpose of the group gate on FIG. 3C is to receive the microsecond type pulse signals on the binary address bus and translate them into output signals having the persistence required to operate relays in the position signal distributor. Each command received from the SPC via the CBT on the binary address bus represents information signifying a particular operator position, a particular relay at the position, as well as signifying whether the relay is to be operated or released.

Figure 36:
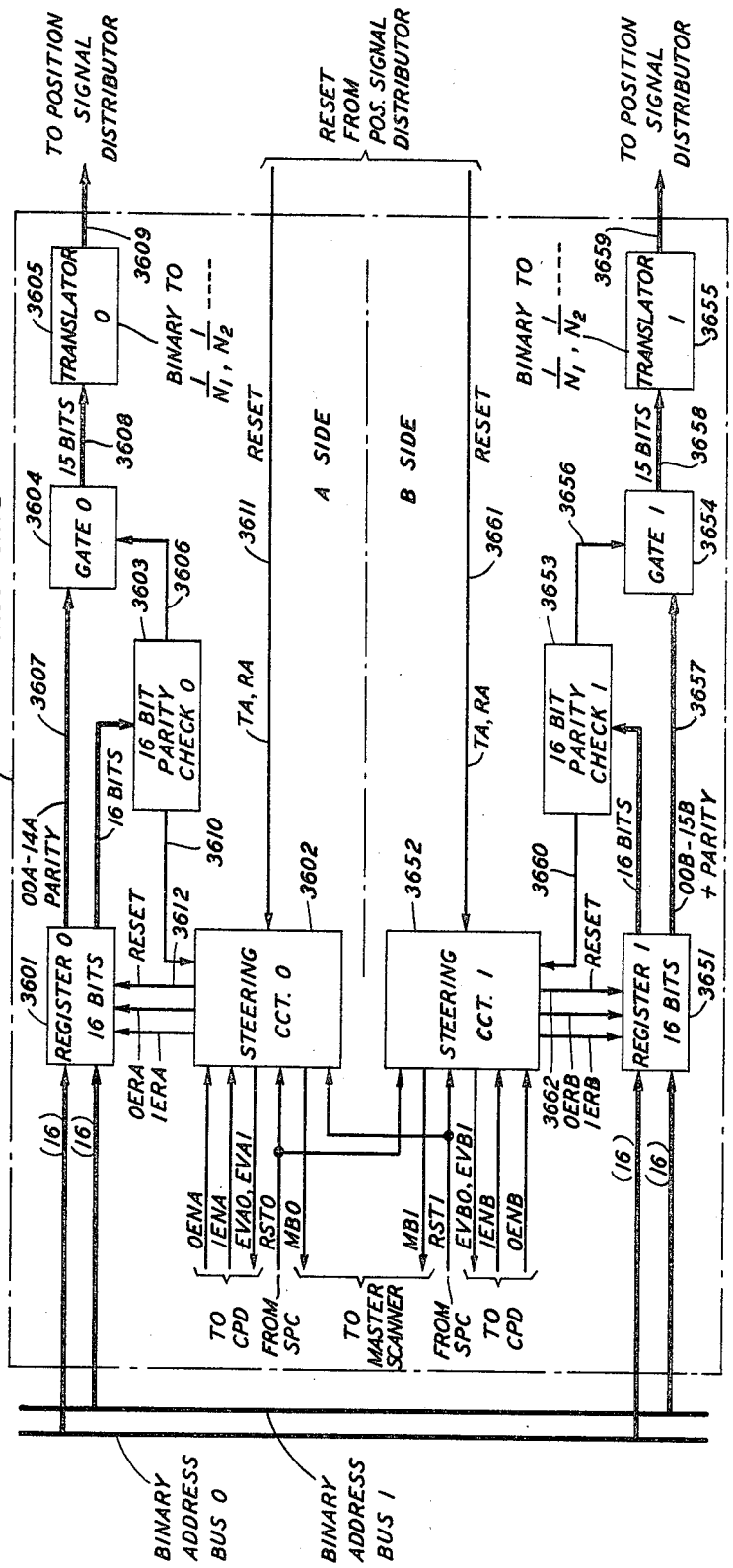

The basic functional elements of the group gate are shown diagrammatically on FIG. 36. These elements are furnished on a duplicated basis for reliability purposes in order that the group gate may respond to signals on either binary address bus. Accordingly, the group gate on FIG. 36 has been divided into two identical parts termed an "A" side and a "B" side, each of which can receive information from either binary address bus. The A side comprises the elements on the upper path of FIG. 36 while the B side comprises the elements on the lower half. Each side is identical to the other and each element on the B side bears a numerical designation 50 points higher than its corresponding elements on the A side. Since the relationship between the elements on each side is identical, the following description of the function of the group gate is with reference to the A side elements except where corresponding elements on both sides are mentioned in order to illustrate the relationship between the A and B side components.

The data bits comprising a binary address bus command are registered in a 16-bit binary form in register 3601. The registered information is applied to the input of gate 3604 and to the parity check circuit 3603. If the parity checks good, the gate is unlocked and the registered information is passed to the input of translator 3605, which converts it from a 15-bit binary form to a plurality of 1-out-of-N type signals which are applied to operate relays within the position signal distributor.

Each of registers 3601 and 3651 is connected to both binary address buses and can receive commands from either one. The control of which binary address bus a register responds to its under control of the CPD and its interconnections with the registers. On FIG. 36 the CPD applies an enable pulse to steering circuit 3602 for the A side via conductor 0ENA to cause the register 3601 to respond to commands on binary bus 0 and via conductor 1ENA, to cause the register to respond to commands on binary bus 1. In a similar manner, the CPD applies enable pulses to steering circuit 3652, either via conductors 0ENB or 1ENB, to cause register 3651 to respond to commands on either the 0 or 1 bus system, respectively.

Let it be assumed that the enable pulse is applied to steering circuit 3602 via conductor 0ENA to cause the register to respond to commands on the binary address bus 0. The steering circuit stretches the pulse approximately .5 microsecond to a 2.5 microsecond duration and feeds it to the register 3601 over conductor 0ERA. The reception of this pulse unlocks the register and permits it to receive the information gated onto the binary address bus at the same time. The parity check circuit 3603 analyzes the parity of the information now in the register and, if the information checks good, transmits an unlocking signal to gate 3604 via conductor 3606. The output of the register is transmitted via conductors 3607 to the other input of the gate. The gate is now unlocked by the parity circuit and the register output information is transmitted through the gate and over conductors 3608 to the input of translator 3605. The information transmitted to the gate includes 15 data bits plus one parity bit. The translator 3605 does not require parity information, and therefore the output of the gate to the translator includes only the 15 data bits.

The translator translates the 15-bit binary word received by it into a plurality of 1-out-of-N-type indications. Specifically, in the present embodiment, the 15-bit binary word is translated into four 1-out-of-8 indications, two 1-out-of-1 indications, and one 1-out-of-2 indications. The 1-out-of-N information is fed from the translator over conductors 3609 to the input of the position signal distributor to operate relays therein.

The steering circuit 3602 has a plurality of functions. First of all, as already mentioned, its primary function is to receive a .5 microsecond enable pulse on either of leads ENA0 or ENA1, stretch the pulse into a 2.5 microsecond pulse, and apply the stretched pulse as an unlocking signal to the register over lead 0ERA or 1ERA. The steering circuit also receives a parity okay check signal over conductor 3610 from the parity check circuit 3603. It utilizes this signal to generate an enable verify signal, which is sent back to the central pulse distributor (over either of leads EVA0 or EVA1 for the A side or EVB0 or EVB1 for the B side) as an indication that the data applied to the binary address bus has been registered with good parity by the group gate. The steering circuit also utilizes the enable signal from the CPD, to generate a make-busy signal which is transmitted to the scanner over lead MBO to inform the SPC, via the master scanner, that the group gate is now busy and should not be addressed for the reception of further commands, for the time being.

The normal operation of the group gate is such that its registers are reset by a reset signal received from the position signal distributor via conductors 3611, extending into steering circuit 3602, and from there extending over conductor 3612 to the register. In the event a RESET signal is not received from the position signal distributor, due to a trouble condition, for example, the steering circuit and its register can be reset under control of a RESET signal from the SPC over a conductor RST0 for the A side.

The preceding description of the group gate with reference to FIG. 36 has described its operation on the assumption that an enable pulse is received by steering circuit 0, 3602, for the A side. The B side of the group gate is essentially identical to the A side and the manner in which it would respond and register data from the address bus in response to an enable pulse is analogous in all respects to that for the A side.

Figure 38:
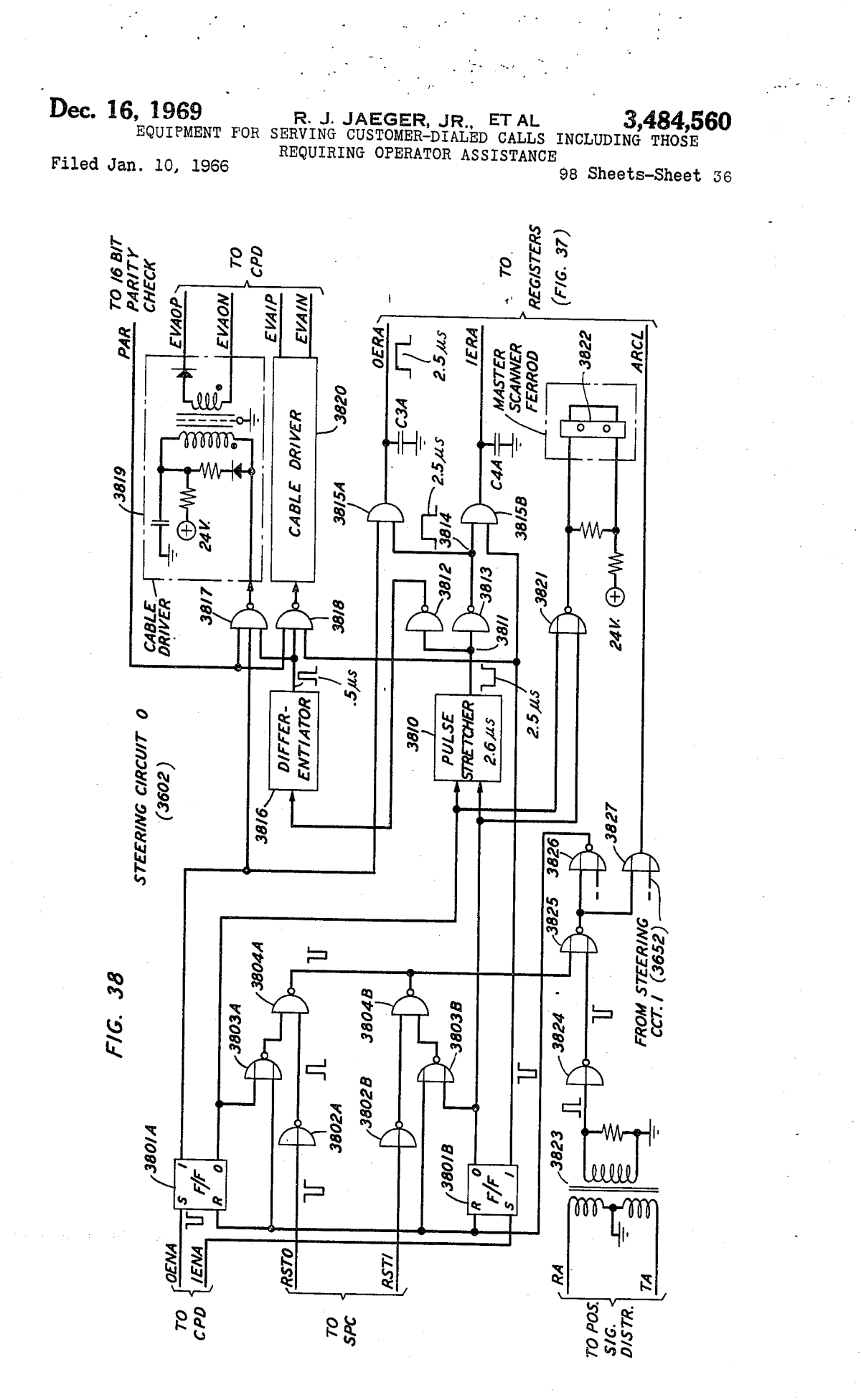

FIG. 38 discloses the details of one, and only one, of the steering circuits 3602 and 3651 on FIG. 36. The group gate on FIG. 36 is subdivided into an A and a B portion with respect to its upper and lower halves, and, as may be noted, certain of the corresponding conductors on each half differ from each other slightly in their designation in accordance with whether they are associated with the A or the B portion of the group gate. FIG. 38 represents only one of the two steering circuits of FIG. 36 and, therefore, in order to facilitate the discussion, certain of the conductors on FIG. 38 have been arbitrarily designated with the assumption that the circuit of FIG. 38 comprises steering circuit 3602 for the A half of the group gate. This assumption and the resulting lead designations permit a comparison of the leads of FIG. 38 with those of FIG. 36. If FIG. 38 were assumed to represent steering circuit 3652 for the B side, certain of the lead designations on FIG. 38 would require a slight change in their designation in a manner that may be readily deduced from comparing the designation of comparable leads on the A and B side on FIG. 36.

Steering circuit 3602, as already mentioned, contains sufficient circuitry so that it can control its register 3601 to respond to signal on either binary address bus. As part of this circuitry, the steering circuit includes two conductors, 0ENA and 1ENA, over which it can receive enable pulses from the CPD. The steering circuit of FIG. 38 contains certain elements which are operable to change their state only in the event an enable pulse is received on conductor 0ENA. It also contains other circuit elements which are operable to change their state in the event that the enable pulse is received on conductor 1ENA. Those elements which are primarily associated with the reception of a pulse on conductor 0ENA have a numerical designation followed by a suffix A, while their counterpart elements associated with conductor 1ENA bear the same numerical designation but have a suffix B. These A and B suffixes are not to be confused with the A and B side of the group gate on FIG. 36. It is to be emphasized that the steering circuit shown on FIG. 38 represents one, and not two, of the steering circuits of FIG. 36. The circuit elements on FIG. 38, which respond and change their state regardless of which input conductor receives the enable pulse, are designated solely by a numerical designation and do not have an A or a B suffix.

The following description asumes that an enable pulse is received on lead 0ENA. This is received as a negative .5 microsecond pulse applied to the S lead of flip-flop 3801A. This sets the flip-flop and drives its 1 output high in a positive direction and its 0 output low towards ground. The negative-going pulse on its 0 output is applied to the upper input of pulse stretcher 3910, which stretches it to a 2.5 microsecond negative pulse on its output terminal 3811. This negative pulse is inverted by inverter 3813 and applied to one input of each of the noninverting AND gates 3815A and 3815B. It is assumed the flip-flop 3801B is in its RESET condition in which its 1 output is low. This low is connected to the lower input of AND gate 3815B to hold it off during the application of the 2.5 microsecond positive pulse to its upper input. The upper input of AND gate 3815A is connected to the 1 output of flip-flop 3801A. This output is now high since the flip-flop is in a SET state. The high on the upper input of AND gate 3815A permits it to turn on for 2.5 microseconds when the positive pulse from the output of inverter 3813 is applied to its lower input. The gate thus turns on for 2.5 microseconds and generates a positive 2.5 microsecond pulse on its output conductor 0ERA. This pulse is utilized to unlock the register of FIG. 37 for response to data on the binary address bus 0 system in the manner subsequently described.

The negative 2.5 microsecond pulse at the output of pulse stretcher 3810 is also applied through inverter 3812 to the input of differentiator 3816 as a positive 2.5 microsecond pulse. The differentiator differentiates the trailing edge of the pulse and produces a .5 microsecond pulse at its output, which is connected to one input of each of AND gates 3817 and 3818. The middle input of AND gate 3817 is high at this time since it is connected to the 1 output of flip-flop 3801A. The lower input of AND gate 3818 is low at this time since it is connected to the 1 output of flip-flop 3801B, which is in a RESET state.

The parity of the registered information is now checked and, provided it represents a valid registration, a positive-going potential is applied by the parity check circuit 3603 to conductor PAR, extending to one input of each of AND gates 3817 and 3818. AND gate 3818 does not turn on at this time, since its lower input is held low by the 1 output of flip-flop 3801B. AND gate 3817 turns on for .5 microsecond since all of its inputs are held high for the duration of the output pulse from differentiator 3816. The turn-on of gate 3817 generates a negative going signal at its output. This signal is applied to cable driver 3819 and is transmitted over conductors EVAOP and EVAON back to the CPD as a verify pulse over the same circuit which transmitted the enable pulse to this steering circuit of FIG. 38. The details of the manner in which a verify pulse is transmitted back over the same path is disclosed in connection with FIG. 9 of the drawing. The return of a verify pulse, as described in connection with the circuit of FIG. 9, indicated to the CPD and, in turn, the SPC, that the enable pulse had been received, stretched, reshaped, and returned to the CPD. The return to the CPD and SPC of the verify pulse for the group gate additionally signifies that data having good parity has been entered into its registers.

The negative-going signal on the 0 output of flip-flop 3801A, as it was set by the enable pulse, is applied to the upper input of OR gate 3821, which now turns off, drives its output high, and reduces the current through the associated master scanner ferrod 3822. This magnetic change in the state of the ferrod informs the master scanner that this position group gate is currently busy and should not be currently addressed for the reception of further commands.

The primary function of the group gate is to operate, relays in the position signal distributor which, in turn, operate or release a specified relay in a specified operator position buffer circuit. The steering circuit of FIG. 38 is normally reset by a signal received from the position signal distributor after it has determined that the specified relay within the specified position buffer has released or operated as required. This signal is received from the position signal distributor on conductors TA and RA and, by means of transformer 3823, applied as a positive pulse to the input of OR gate 3824. This produces a negative pulse at its output, which is applied through OR gate 3825 and then through OR gate 3826, as a negative pulse to the R (reset) terminals of flip-flops 3801A and 3801B. The reception of this pulse has no effect on flip-flop 3801B since it is already reset. However, flip-flop 3801A resets at this time and restores the group gate to normal. The upper input of gate 3825 is high since a RESET signal is not currently on either of leads RST0 or RST1. The lack of a RESET signal on them holds them high which holds the output of the gates 3802A and 3802B low and, in turn, the output of gates 3804A and 3804B high into the upper input of gate 3825. The positive pulse on the output of gate 3825 is also applied through noninverting gate 3827 as a positive pulse on conductor ARCL extending to the registers. This pulse resets all registers in the manner subsequently described.

In the event of trouble conditions, or for maintenance purposes, the position group gate may be reset by a signal from the SPC itself. This signal may be received either by lead RST0 or RST1. The signal on lead RST0 is received as a negative pulse. It is inverted by gate gate 3802A and applied to the lower input of inverting AND gate 3804A. The low on the 0 output of flip-flop 3801A is inverted by gate 3803A and applied as a high to the upper input of gate 3804A. Both of its inputs are now high. This drives its output low extending to the upper input of gate 3825. This low is propagated through gates 3825 and 3826 and applied back to the RESET lead of each flip-flop to reset any flip-flop that may be in a SET condition as already described. The low on the input of gate 3825 is also propagated therethrough and through gate 3827 to reset the registers via conductor ARCL.

Figure 37:
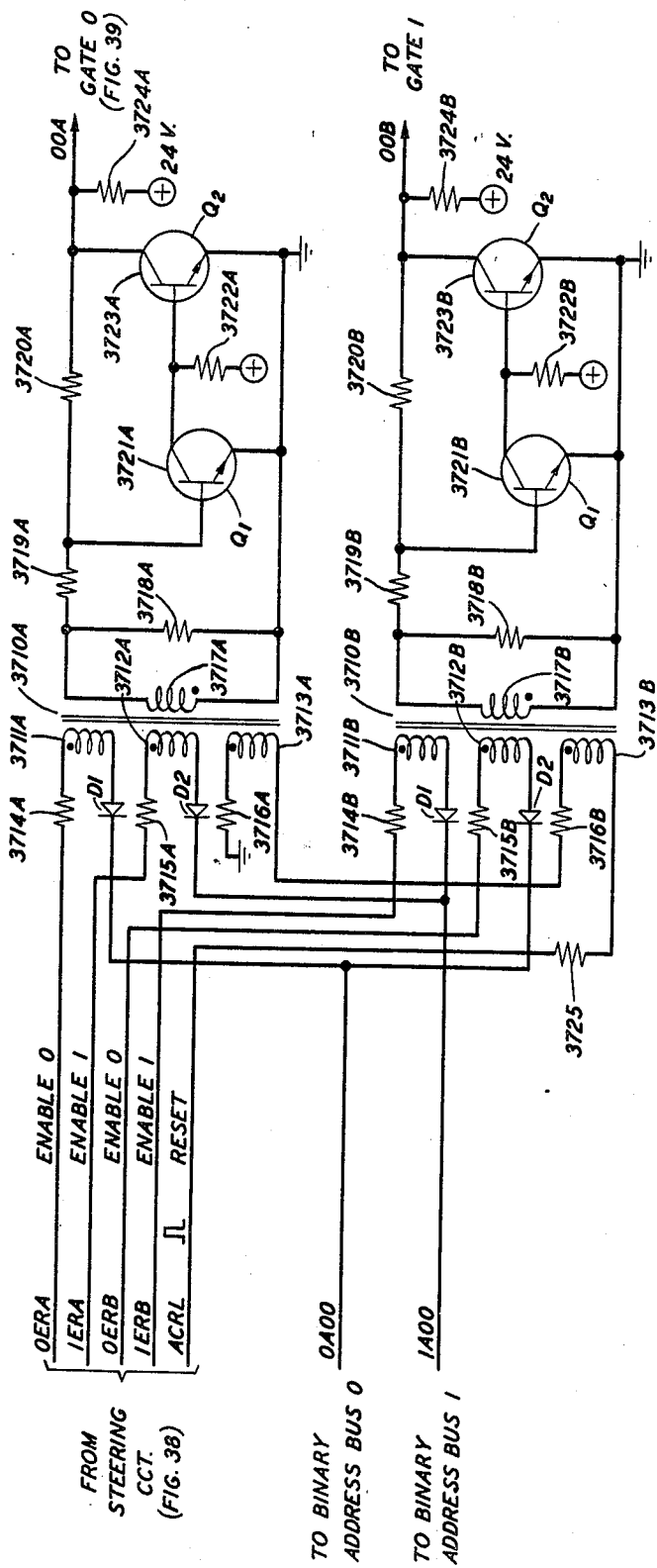

FIG. 37 discloses the circuit details of the equipment required to register one binary bit in either of the registers 3601 and 3651. In other words, the equipment on the upper half of FIG. 37 comprises a portion of register 3601, while the equipment on the lower half comprises a portion of register 3651. The equipment is shown on a duplicated basis so as to illustrate the manner in which the two registers within a group gate can communicate with either binary address bus 0 or binary address bus 1. The showing of FIG. 37 is similar to that already described for FIG. 8, in that it discloses two registers each of which has the capability of receiving information from either bus system. The enable leads on FIG. 8 are designated "EN00" and "EN01" for the upper portion of the circuit. The analogous leads on FIG. 37 are designated "0ERA" and "1ERA". Similarly, the enable leads for the lower portion of the circuit of FIG. 8 are designated "EN10" and "EN11". Their counterparts on FIG. 37 are designated "0ERB" and "1ERB". The leads extending to the bus systems are designated "B0" and "B1" on FIG. 8, while their counterparts on FIG. 37 are designated "0A00" and "1A00". The designation "0A" signifies that the conductor extends to the 0 bus system, while the designation "1A" signifies a connection to the bus system 1. The "00" following the designation "0A," for example, signifies the register bit position represented by the circuitry of FIG. 7. For example, the circuitry of FIG. 37 is associated with bit 00 of a 16-bit binary word.

The leads described in the preceding paragraph for FIG. 37 are extended to transformers 3710A and 3710B in the manner shown. In a manner analogous to that for FIG. 8, these connections enable either transformer to respond to data on either bus system upon the coincident application of a positive-going enable pulse from the steering circuit and a negative-going pulse on the lead extending to the bus system.

The conductor designated "ACRL" on FIG. 37 extends serially through windings 3713A and 3713B of both transformers. A positive-going pulse in this conductor resets any portion of the circuit of FIG. 37 which is not already in a reset condition.

The transistor circuitry on the upper and lower halves of FIG. 37 is identical, and each comprises a flip-flop. The operation of the circuit will be described with reference only to the upper half since the operation of both is identical. Normally, transistor Q1, 3721A, is biased on by means of the positive potential applied to its base from resistors 3724A and 3720A. The collector current in Q1 produces a sufficient voltage drop across resistor 3722A, to hold transistor Q2, 3723A, off. Subsequently, when the register receives an enable and a binary 1 signal simultaneously, the upper portion of the transformer secondary 3707A generates a negative-going signal which turns Q1 off. This removes the voltage drop across resistor 3722A and allows base current to flow into transistor Q2 to turn it on. The turn-on of transistor Q2 produces a voltage drop across the resistor 3724A sufficient so that transistor Q1 cannot turn back on upon the termination of the input pulse. The circuit remains in this condition until subsequently reset by the RESET pulse. The RESET pulse applies a positive-going signal to the top of the secondary winding 3717A, which produces a sufficient base drive at transistor Q1 to turn it on and thereby restore the register to its normal condition in which it is said to represent a "0" condition.

The equipment shown on FIG. 37 represents that required to register one binary bit's worth in either the "0" or "1" register of FIG. 36. Since each register must contain sufficient equipment to register a maximum of 16 binary bits, the two registers together on FIG. 36 would require 16 of the equipments shown on FIG. 37.

On FIG. 36, the output conductors of the 0 register 3601 are designated "00A" through "14A", plus parity, while the conductors for the other register are designated in a similar manner, except with the suffix "B." These conductors extend into the input of gate 0 for register 3601 and into the input of gate 1 for register 3651. The output conductor for the one bit of each register shown on FIG. 37 is indicated as "00A" for the upper half of the figure and "00B" for the lower half.

Figure 39:
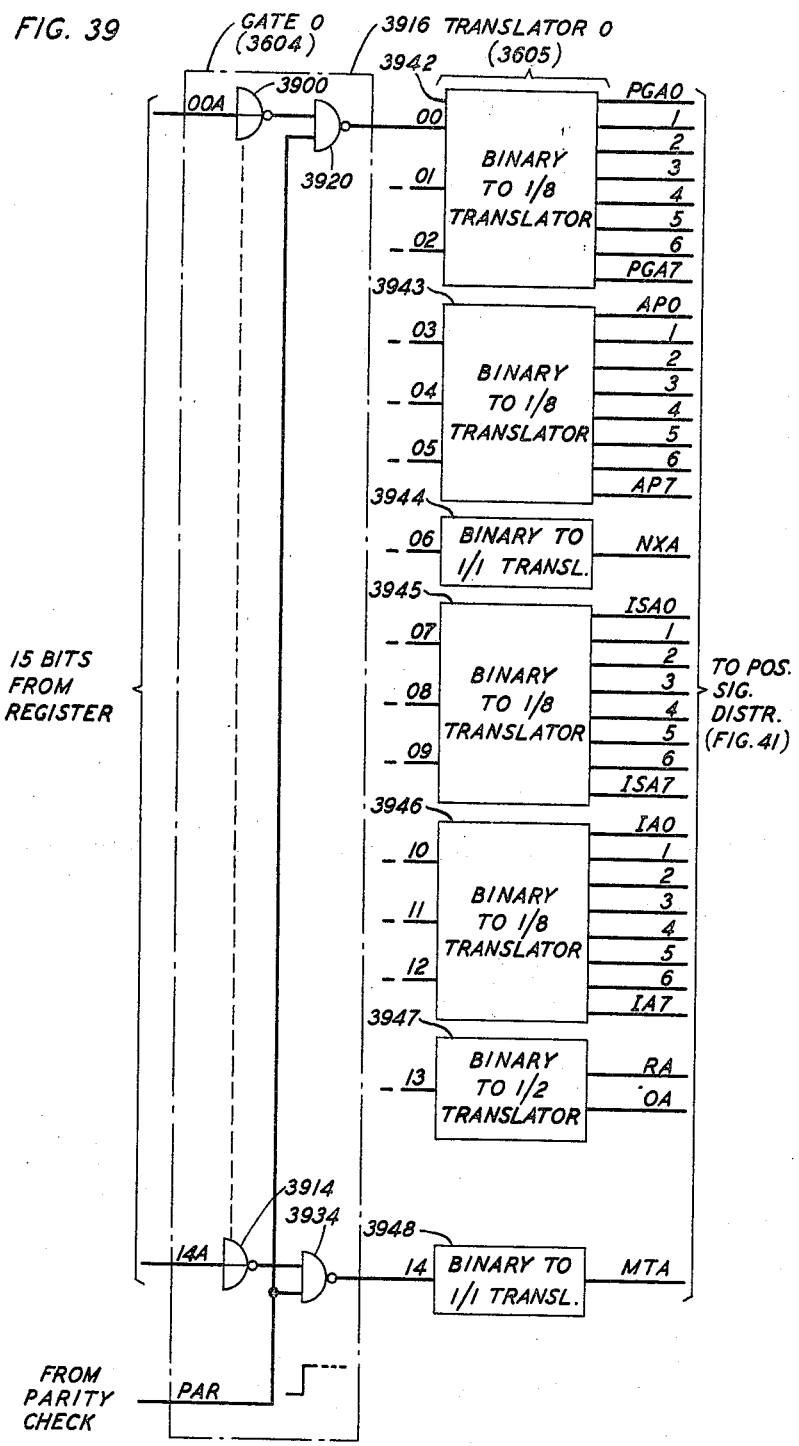

FIG. 39 discloses the details of gate circuits and translators shown on FIG. 36. The two gate circuits are identical to each other, and so are the two translators. Therefore, FIG. 39 discloses only one gate circuit 0 and the translators 0. The input and output conductors on FIG. 39 are designated with the assumption that the specific circuits shown thereon are a part of the A side of the group gate. Accordingly, the input conductors for gate 3916, which represents gate 0 of FIG. 36, are designated 00A through 14A, plus a parity input lead. The input 00A for the gate extends to the output of that portion of the register shown on the upper half of FIG. 37 in detail. The remaining inputs for gate 0 would be connected to corresponding circuits not otherwise shown in detail. The output conductor 00B on FIG. 37 would be connected to the corresponding input of gate 1, whose details are not specifically shown but which are identical to those for gate 0 on FIG. 39.

The output conductor for each register on FIGS. 36 and 37 is high when its associated register order stores a binary 0, and, conversely, is a low for a binary 1. With this arrangement, the input conductors 00A through 14A on FIG. 39 are driven high when their associated register orders store a binary 0 and, conversely, are driven low for binary 1's. Each input conductor is connected to an individual one of OR gates 3900 through 3914. These OR gates are of the inverting type, and thus the outputs of the gates representing binary 1's are high while binary 0's are represented by a low. Each output of these gates extends to the upper input of one of the associated AND gates 3920 through 3935. The AND gates associated with binary 0's have their upper inputs driven low to hold them off at this time. The AND gates associated with binary 1's have their upper input driven high. The parity circuit 3603 provides a positive-going signal at its output if the register data has good parity. The high on the PAR conductor of FIG. 39 extends to the lower input of all of AND gates 3920 through 3934. When this potential is applied from the parity lead, the AND gates associated with binary 1's have both their inputs driven high, and they therefore turn on and drive their outputs low. Conversely, the AND gates associated with binary 0's do not turn on and their outputs remain high. The output of the 15 AND gates 3920 through 3934 are designated 00 through 14 and they extend to the inputs of a plurality of translators of the 1-out-of-N type, designated 3942 through 3949, in the manner shown. The specific mode of translation, in accordance with which each translator operates, is shown by the designation within the rectangle representing the translator. For example, translator 3942 is of the binary to 1-out-of-8 type. It receives the three binary digits 00, 01, and 02 from the output of gate 0 and, upon the receipt of a 3-digit binary word, it produces an output indication on one, and only one, of its eight output leads designated "PGA0" through "PGA7." In a similar manner, each of the remaining translators, 3943 through 3948, receives binary words, and operates upon the receipt thereof to apply an energizing potential to one, and only one, of its output leads at any time.

The translators 3942 through 3948 are of the conventional type well known to those skilled in the art of logical design. Furthermore, these translators, if desired, may be similar to those shown in connection with the communications bus translator in detail on FIGS. 28 through 34.

Figure 41:
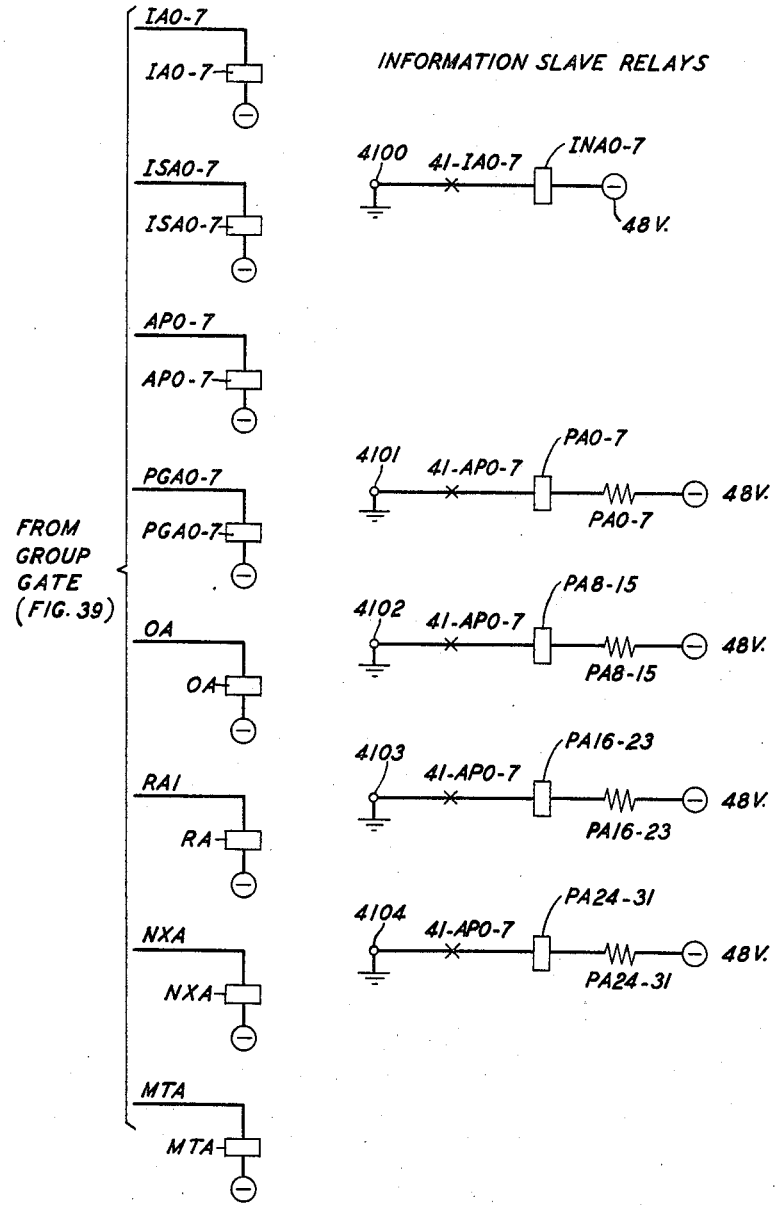

The output conductors for the translators on FIG. 39 extend to the position signal distributor where each conductor is connected to an individual relay on FIG. 41 of the position signal distributor. The application of an energizing potential to a conductor by a translator upon the receipt of a binary word from the gate operates its associated relay in the position signal distributor. The normal mode of operation of the circuit of FIG. 39 is such that an output lead is energized for a plurality of translators simultaneously in order to operate a plurality of input relays of the position signal distributor simultaneously. The particular combination of relays operated within the position signal distributor signifies both a specified operator position buffer circuit as well as a specified relay within the position buffer that is to be either released or operated. Also, the output information from the group gate to the position signal distributor may represent other miscellaneous types of information in the manner subsequently described in detail in connection with those circuits.

Position signal distributor—FIGS. 40–50

The position signal distributor 340 on FIG. 3C is intermediate the group gate 335 and the plurality of position buffer circuits 343 through 344. The function of the position signal distributor is to receive commands from the group gate specifying either the operation or release of relays in the position buffer circuits or specifying the display of numerical data at the operator positions. The commands received from the group gate output comprise a plurality of information bits in 1-out-of-N type code form. These are translated by the position signal distributor and applied as output signals either to the relays that are to be operated or released in the position buffer circuits, or directly to the operator position circuits themselves to control the display of numerical data thereat. Group gate commands requiring the operation or release of a relay must specify the position buffer in which the relay is located, the relay to which the command pertains, and whether the relay is to be operated or released. Group gate commands involving the display of numerical data must indicate the operator position to which the command pertains as well as the digits that are to be displayed.

Figure 40:
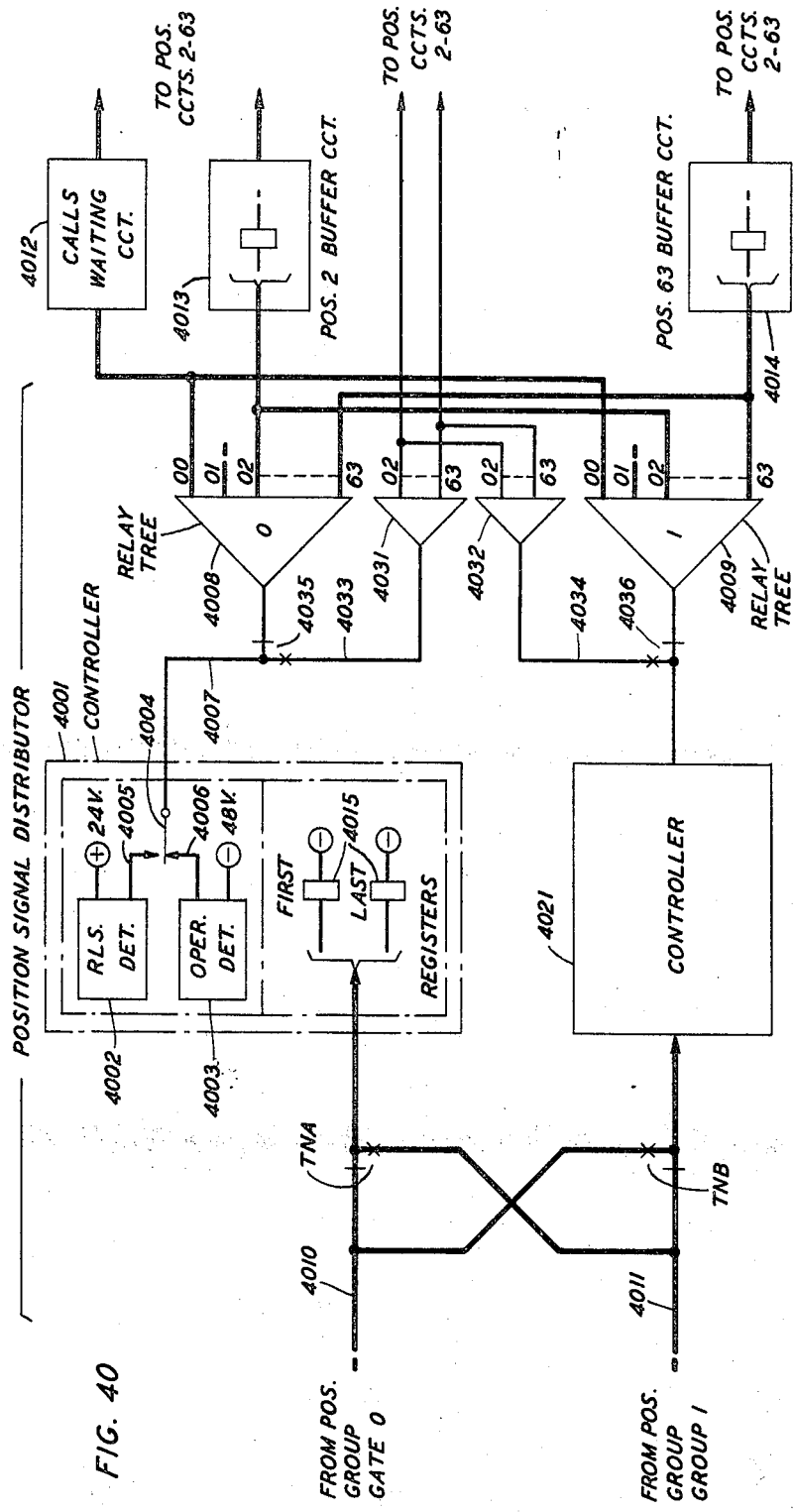
Figure 47:
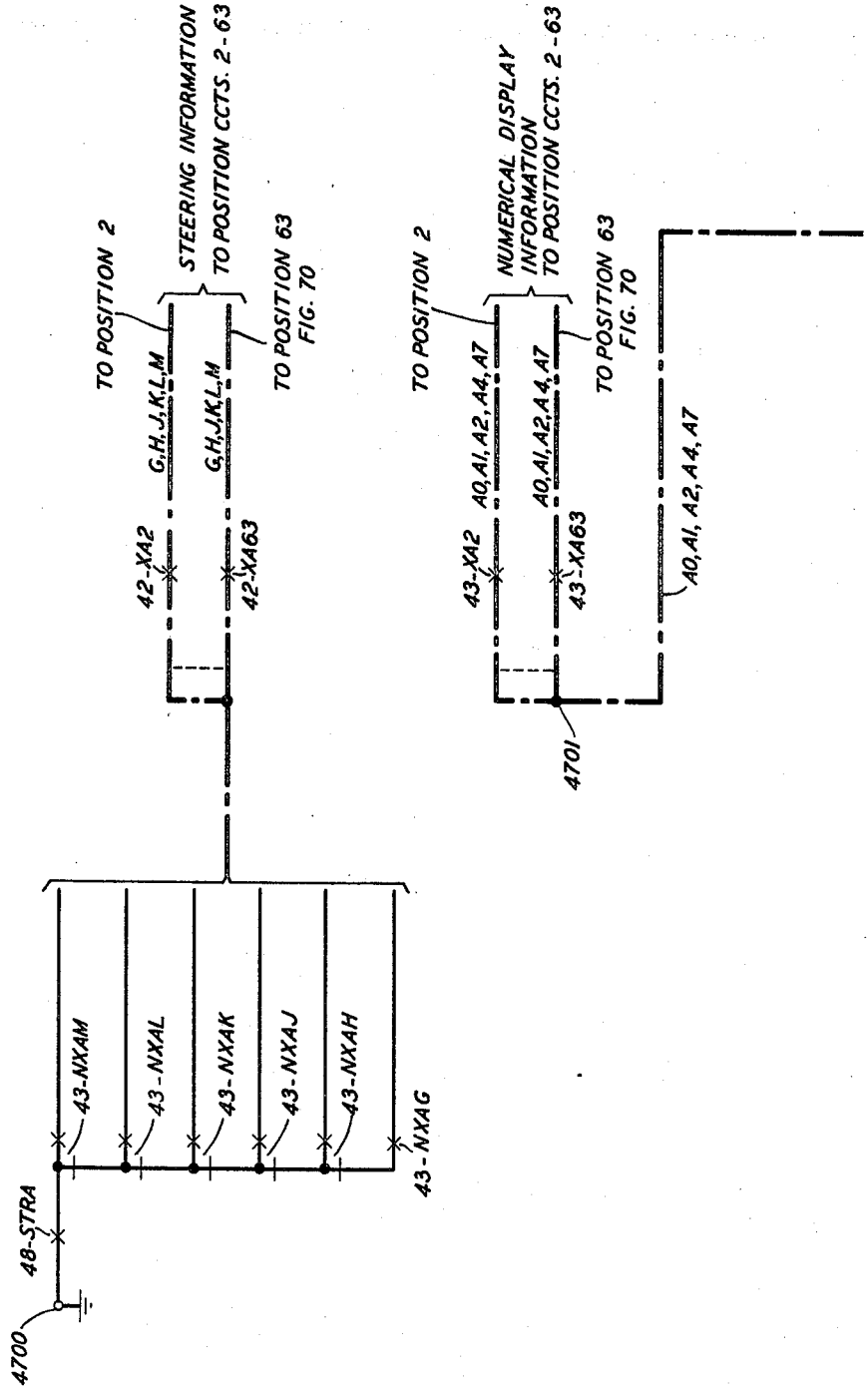
Figure 48:
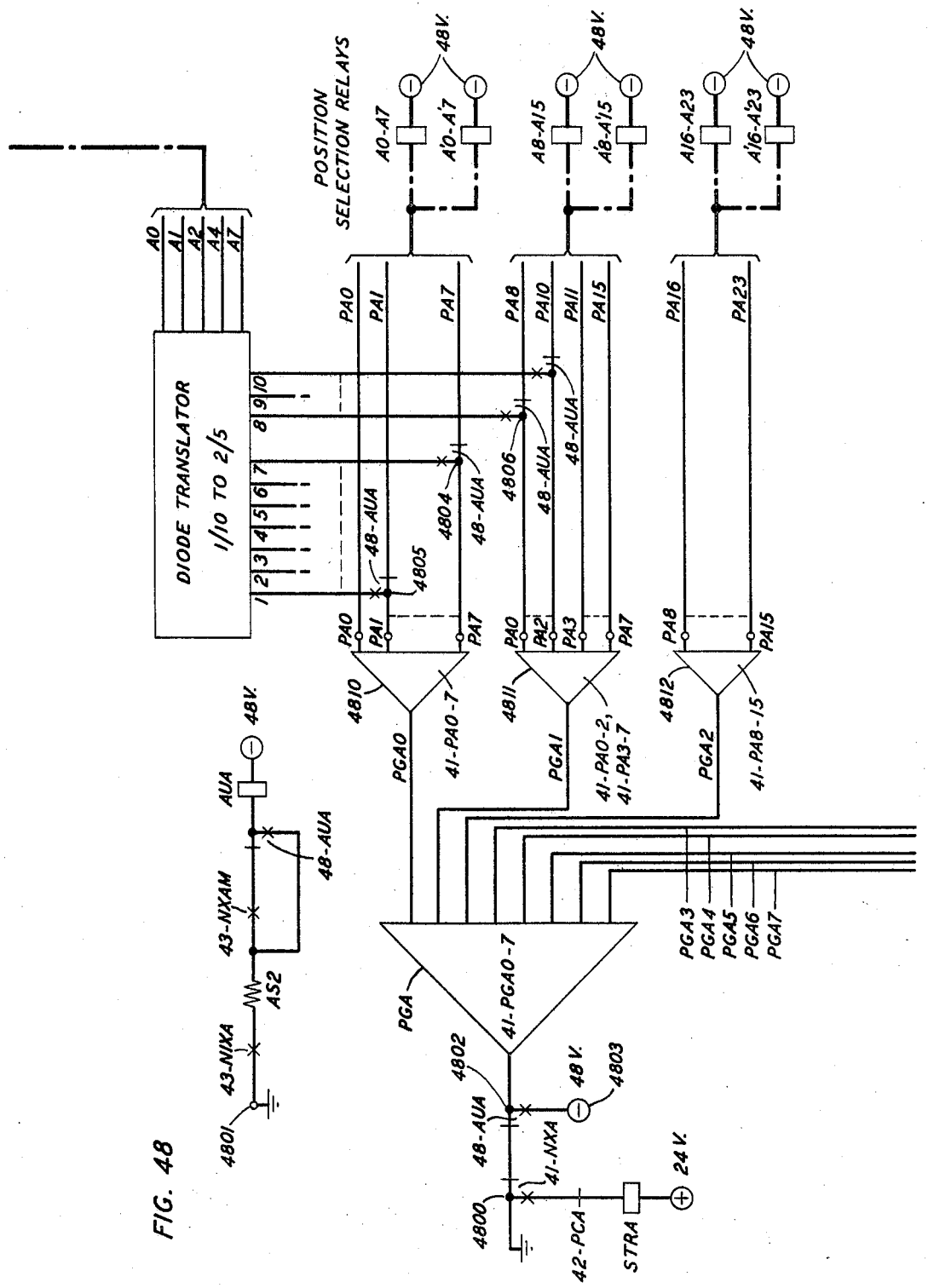
Figures 49, 50:
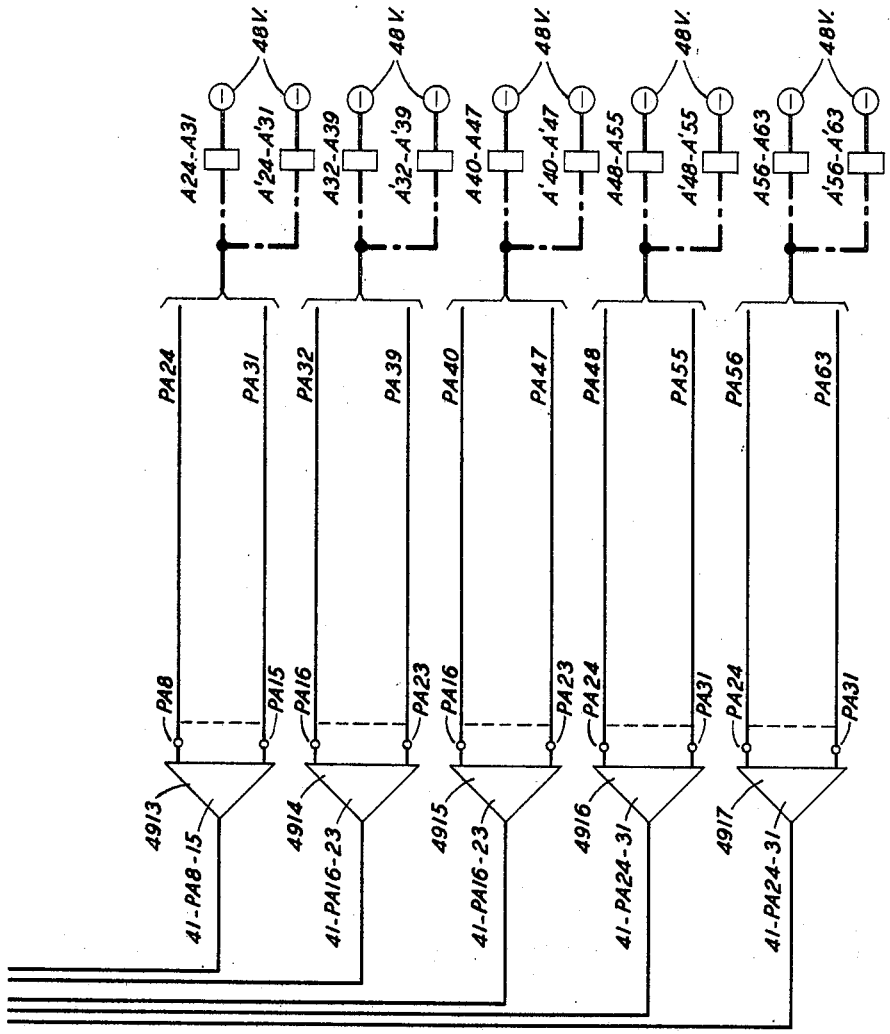

FIG. 40 discloses the position signal distributor in diagrammatic form, while FIGS. 41 through 49, when arranged as shown in FIG. 50, disclose the position signal distributor is complete detail. As shown on FIG. 40, the position signal distributor primarily comprises a pair of controllers 4001 and 4021, together with four relay trees 4008, 4031, 4032 and 4009. The two controllers receive input information from the group gates over conductors 4010 and 4011. The outputs of relay trees 4008 and 4009 are connected to a calls-waiting circuit 4012 as well as the position buffer circuits 4013 through 4014. The outputs of relay trees 4031–4032 are directly connected to the position circuits.

The controller receives the output commands from the group gate and controls its associated relay trees, either to establish a metallic path to a relay in a position buffer circuit or in an operator position. Once the path is completed through the relay tree, the controller either applies a negative or a positive potential to the selected relay in the selected position buffer to operate or release it, as required; or if numerical data is to be displayed, applies the potentials to the leads extending to the operator position to control the numerical display thereat.

The equipment elements comprising the position signal distributor are furnished on a duplicated basis, with one-half of the equipment being normally adapted to receive information from the 0 portion of the group gate and with the other half from the 1 portion of the group gate. Controller 4001 is normally connected by means of break contacts TNA, via cable 4010, to the translator outputs for the 0 portion of the group gate. Similarly, controller 4021 is normally connected by break contacts TNB and cable 4011 to the corresponding outputs of the 1 portion of the group gate. In case of maintenance or other difficulties, the contacts TNA and TNB can be switched, under control of the SPC, by means of equipment not shown, so that either portion of the group gate can transmit information to either of the controllers on FIG. 40.

The controller 4001 comprises a plurality of input relays 4015, a release detector 4002, an operate detector 4003, together with relay contacts 4004 through 4006. The input relays 4015 are operated in a combinational code form upon the reception of each data word from the group gate. For a command concerning position buffer relays, the particular combination of relays operated signifies the position buffer for which the information is intended; secondly, signifies a particular relay; and, thirdly, signifies whether this relay is to be operated or released. The contacts of relays 4015 comprise the relay tree 4008, and their operation, in response to the reception of a data word, establishes a metallic path to the position buffer circuit specified by the data word. This metallic path switches through a plurality of individual conductors between the position signal distributor and the connected position buffer circuit. This is indicated by the cabling extending from the output of the relay trees to the plurality of position buffer circuits. The operation of the input relays also controls the position of transfer contact 4004 so that it either engages break contact 4006, if a relay is to be operated, or contact 4005 if a relay is to be released.

The position signal distributor is able to operate or release only a single relay at a time in a particular position buffer circuit, and thus the circuitry represented generally by the relay trees establishes not only a path to a selected position buffer circuit, but also further establishes a path to connect a selected relay within this buffer circuit to the controller 4001 via path 4007. If the received data word commands the operation of a relay, the input of relay tree 4008 is connected via path 4007 to the operate detector circuit 4003 via contacts 4004 and 4006. This circuit applies a negative 48-volt potential via the relay tree to the selected relay in the selected position. This operates the relay and, since it is of the magnetic latching type, it remains operated once the path within the relay tree is removed. The operate detector 4003 checks that the relay has operated and then causes the path within the relay tree to be removed and the controller restored to normal. As part of its function, the controller transmits a RESET signal to the group gate signifying that the relay in the position buffer has operated. This RESET signal resets group gate to normal and makes it available for the reception of subsequent commands. In a similar manner, if a data word received by the controller commands the release of a relay, the input of the relay tree is connected to the release detector circuit 4002, which applies a positive 24-volt potential to the operated relay in the position buffer to release it. The release of this relay is detected and utilized to return the position distributor to normal, as well as to transmit a RESET signal to the group gate to return it to normal.

If the group gate command concerns the display of numerical data at a position, rather than the operation or release of a position buffer relay, the action of the overall circuit is essentially similar to that already described. However, in this case, the contacts 4035 are operated so that the control circuitry of the controller 4001 is connected to relay tree 4031, rather than 4008. At this time, the contacts of relays 4015 within relay tree 4031 establish the necessary metallic paths to the selected position circuit to transmit to the selected position the numerical data to be displayed.

Positions 00 on both of relay trees 4008 and 4009 may be utilized to establish a path to the calls-waiting circuit 4012. A path is established to this circuit in response to the reception of a special group gate command. The calls-waiting circuit includes relays which may be selectively operated under control of the received group gate word to apply signals to all positions simultaneously concerning the state of the system. One such signal is a calls-waiting signal which indicates to all operator positions that a number of calls in excess of a predetermined number are waiting for service.

FIGS. 41 through 49, when arranged as shown in FIG. 50, disclose the details of the position signal distributor on a nonduplicated basis. In other words, the circuitry shown on these figures may be considered to be the equivalent of that shown on either the upper or the lower half, but not both, of FIG. 40. For the purpose of discussion, it is assumed that the specific circuitry of FIGS. 41 through 49 represents that on the upper half comprising controller 4001 and relay trees 4008 and 4031. Accordingly, the input and output conductors to these equipments are designated in accordance with this assumption.

The input relays to this circuit are shown on FIG. 41, and they comprise four single relays designated "OA," "RA," "NXA," and "MTA," together with four groups of eight relays designated "IA0" through 7, "ISA0" through 7, "AP0" through 7, and "PGA0" through 7. The right side of FIG. 41 contains slave relays of the input relays. One relay in each of the relay groups having eight relays is operated upon the reception of a group gate command. Relay OA is operated to signify that a relay in the position buffer is to be operated, while relay RA is operated to signify that a position buffer relay is to be released. Relay NXA is operated to signify that the accompanying data word represents numerical information that is to be displayed at a position, rather than information commanding the operation or release of a position buffer relay. Relay MTA is operated to signify that the accompanying data word represents a maintenance, rather than a call-serving, command.

Figure 43:
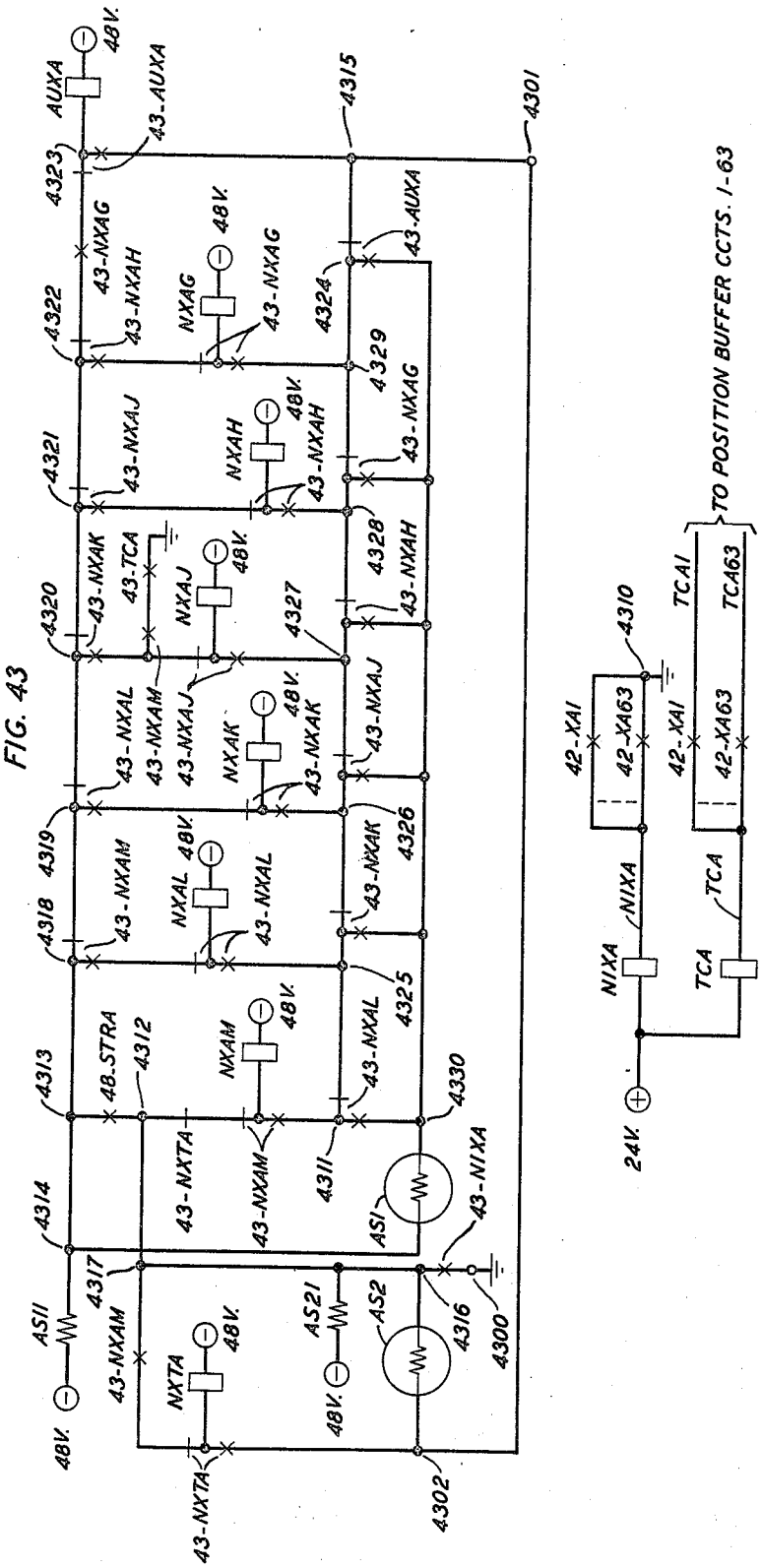
Figure 44:
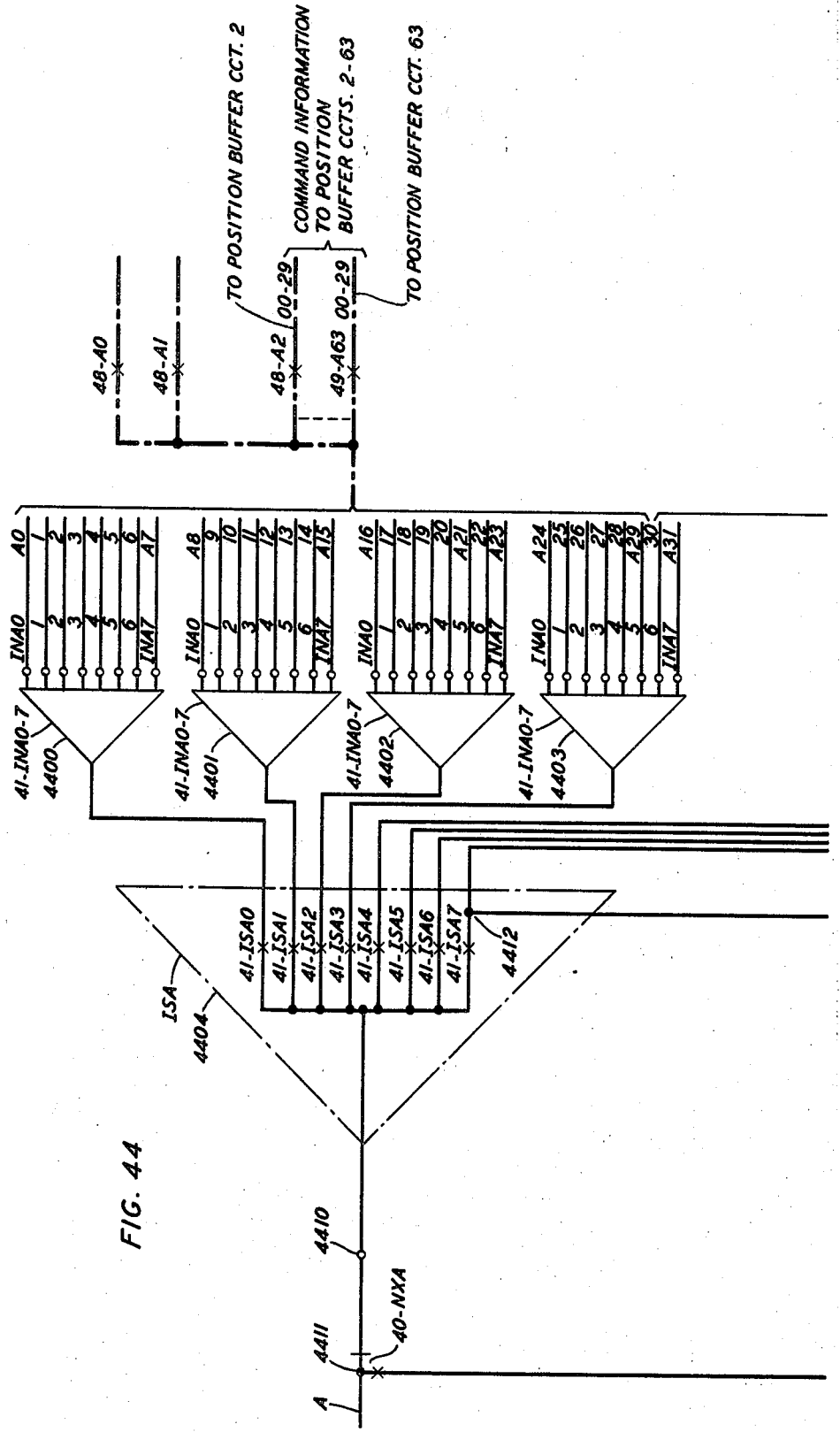
Figure 45:
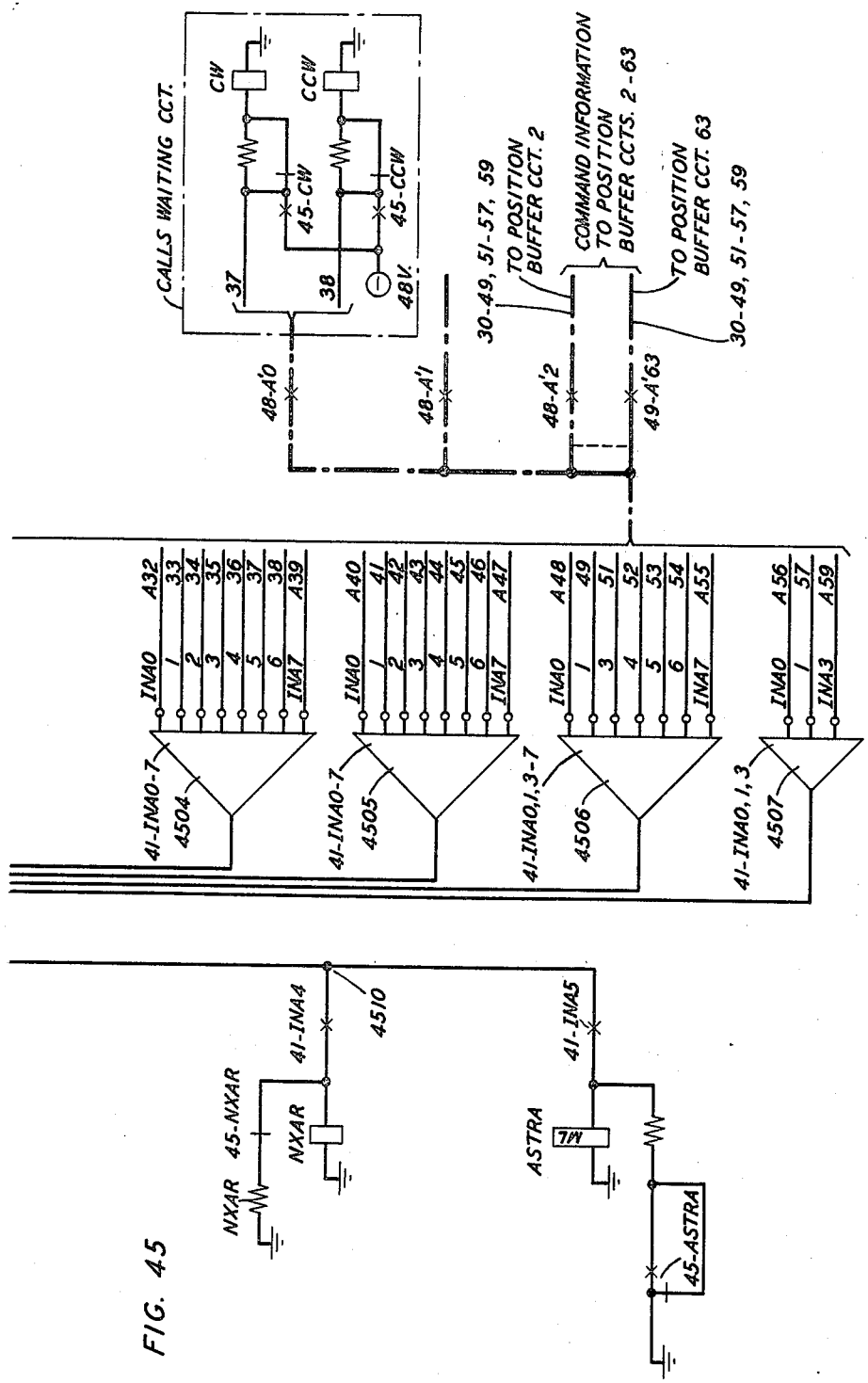
Figure 46:
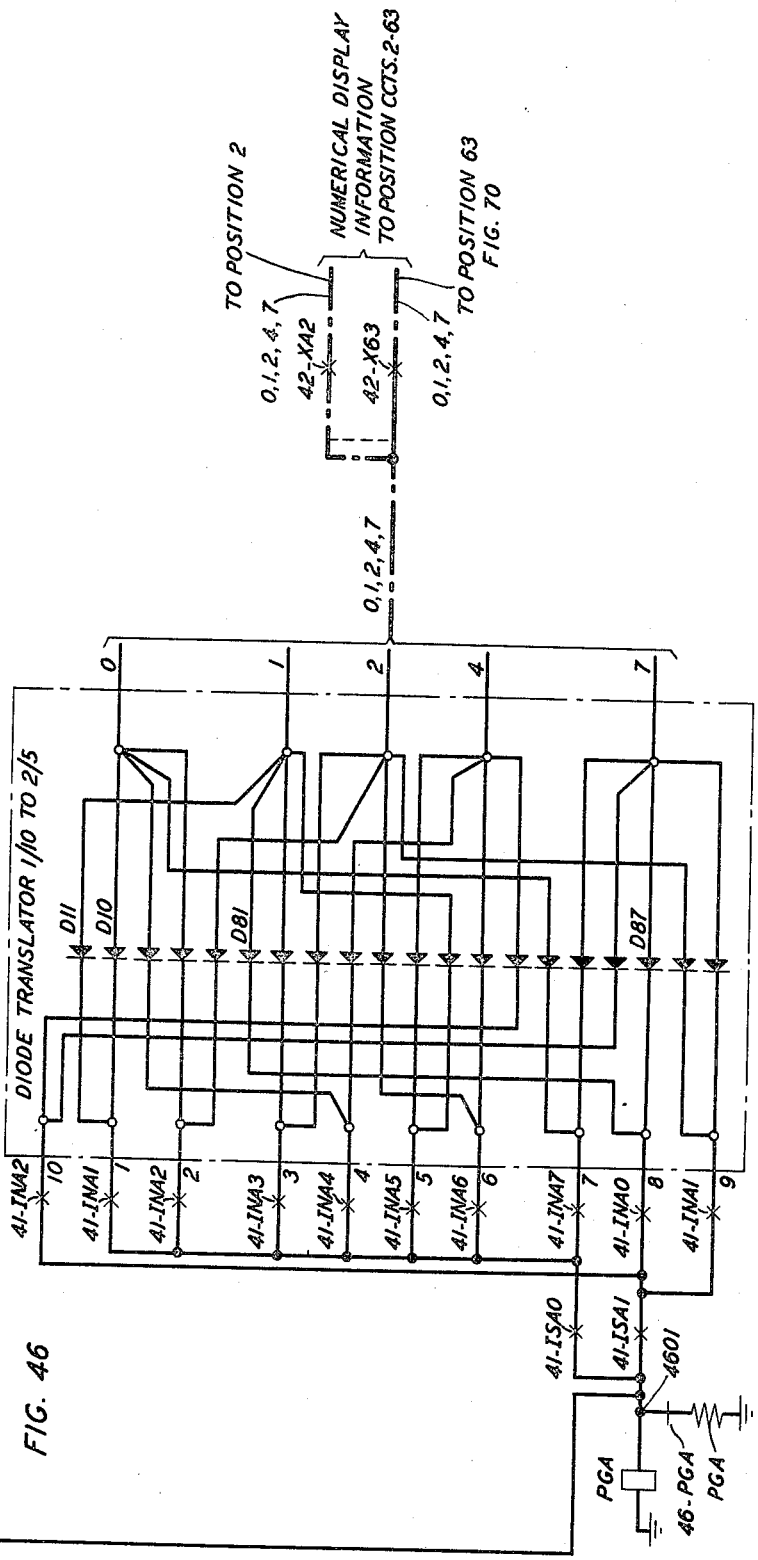

FIGS. 44 and 45 together disclose a relay tree translator which establishes a metallic path to the specified relay in a specified position buffer circuit under control of the received input information. FIGS. 46 and 47 together disclose relay tree translators which transmit signals to the operator positions to effect the display of numerical data thereat. FIGS. 48 and 49 together disclose a relay tree translator which decodes a portion of each command in order to determine the particular position or position buffer for which the information is intended. The output of this translator operates relays whose contacts comprise a portion of the translator of FIGS. 44 and 45. FIG. 43 discloses a steering circuit which, when the position signal distributor is transmitting numerical display information to an operator's position, causes the display thereat to be energized sequentially.

Each data word, or command, received by the position signal distributor which requires the operation or release of a position buffer relay must contain: (1) the address of the position buffer circuit in which the relay is located; (2) the identification of the relay that is to be operated or released; and (3) information signifying whether the relay is to be operated or released.

The reception of each command operates one relay in each of the four relay groups containing eight relays on the upper left-hand portion of FIG. 41. The PGA- and AP- relay groups are used to specify the position address information. One relay is operated in each group for each command, and these two operated relays together provide a 1-out-of-64 (⅛ × ⅛) translation specifying the position address which comprises a series of 2-digit numbers, 00 through 63. The relay groups ISA- and IA- are used to specify the relay in the identified position buffer that is to be operated or released. The relays operated in these two groups together at this time provide a 1-out-of-64 translation to specify the relay that is to be affected. Relay RA operated commands the release of the identified relay, while relay OA, operated, commands its operation.

The relay trees of FIGS. 44 and 45 provide facilities for extending the plurality of conductors designated 00 through 29, 30 through 49, 51 through 57, and 59, to any one of the plurality of position buffer circuits 2 through 63. The cables containing these condutors extend to the position buffers from the right-hand side of FIGS. 44 and 45. The series of relays which determine to which position buffer circuit the pluralities of conductors are to be conneted is controlled by relays A0 through A63 and their slaves, A'0 through A'63. The contacts of these relays on thees two figures extend the outputs of the individual relays trees 4400 through 4507, selectively, to one position buffer circuit at a time. For example, if relay A2 and its slave A'2 are operated, these conductors are extended to position buffer 2. On the other hand, the operation of relay A63 and A′63 extends this plurality of conductors to position buffer circuit 63. Each conductor extending to a position buffer circuit is connected within that circuit to an individual relay, as shown on the drawing figures on which the position buffer is disclosed. The position buffer circuits are numbered 2 through 63, and thus the relays A2 through A63 and A′2 through A′63 are utilized to selectively connect the position signal distributor to a correspondingly numbered position buffer. Relay A1 and A′1 are used for maintenance purposes, as is relay A0. Relay A′0 is utilized to connect only two conductors (37 and 38) to relays within the calls-waiting circuit. The purpose of the calls-waiting circuit is subsequently described in connection with the position circuit description. The input to the relay tree of FIGS. 44 and 45 may be considered to be terminal 4410, immediately to the left of relay tree 4404. Although the A- and A′-relays on the right side of FIGS. 44 and 45 connect through a plurality of conductors to a selected position circuit in response to a received data word for the position group gate, the two-stage relay translator tree comprising trees 4404 and 4400 through 4407 are effective to connect terminal 4410 with only one of the plurality of leads extended to the selected position buffer. The reason for this is that the relay tree of FIGS. 44 and 45 establishes paths to operate only one relay in a position buffer at a time, and therefore terminal 4410, which is the input of this relay tree translator, can be connected with only one of its output conductors at a time extending to a position buffer.

Figure 42:
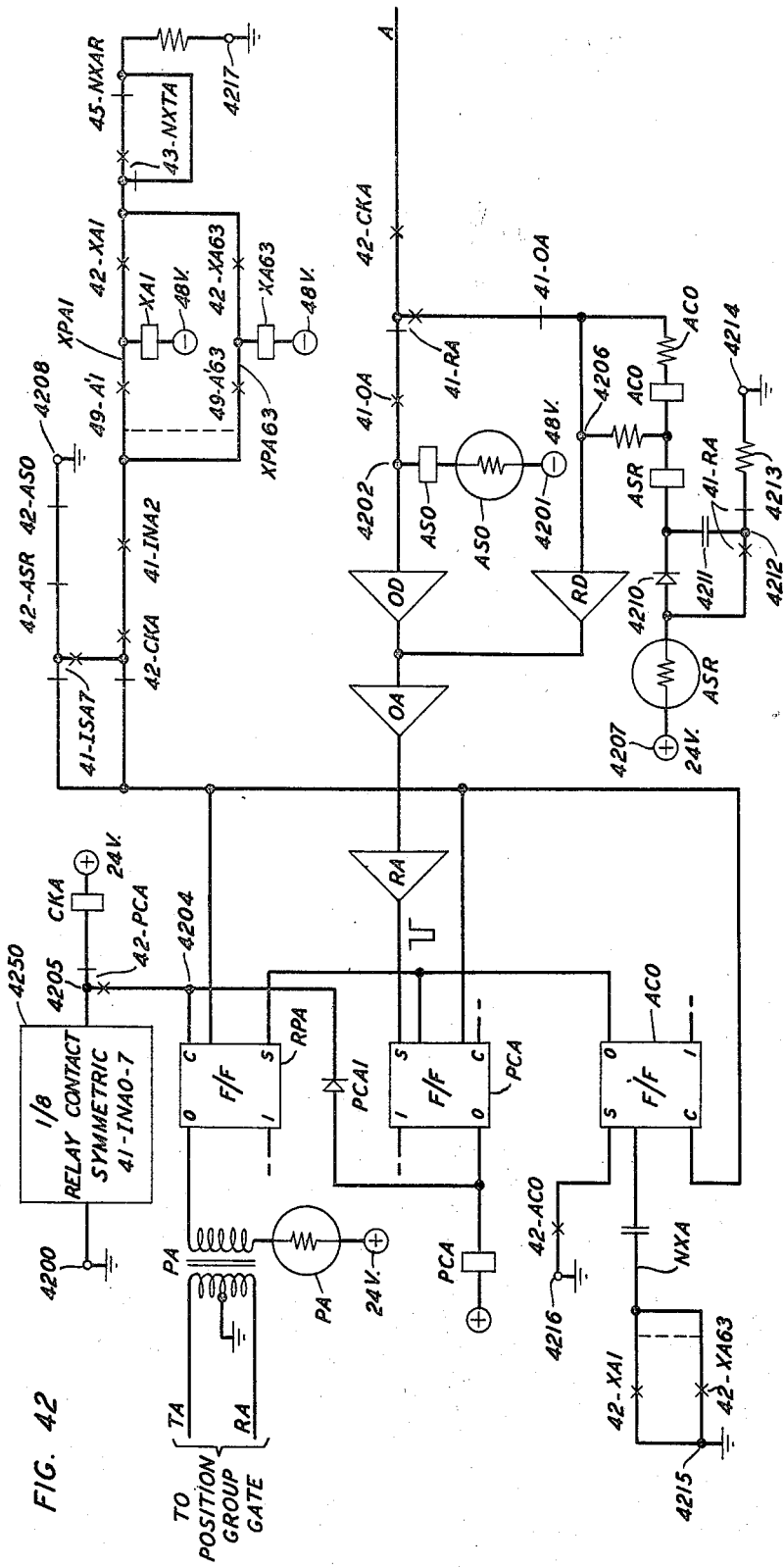

Once a connection is established through the tree translator to the conductor associated with the selected relay in the selected position buffer, the circuit of FIG. 42 applies either a negative or a positive potential to terminal 4410 in order to operate or release the selected relay, respectively. The relays in the position buffer are magnetic latching type, in which a negative potential is momentarily applied to a relay winding to operate it, following which it remains operated until a positive potential is subsequently applied to it momentarily to release it.

In the foregoing described manner, the position signal distributor responds to each command received from the position group gate and, first of all, establishes a metallic path to a specified relay in a specified position buffer circuit and then applies a momentary potential to the specified relay winding to either operate or release it in accordance with the received command. This operation is normally performed in a manner of milliseconds, and the position signal distributor, by operating at this millisecond rate, is able to receive commands sufficiently fast from the group gate to control the operation and release of all relays in all of the position buffer circuits so as to enable the operators associated with these circuits to serve all calls directed to their positions by the system.

In order to better illustrate the function of the position signal distributor, let it be assumed that a command is received from the group gate ordering the operation of the relay connected to input conductor 00 of position buffer 63. The receipt of this command operates the following relays on FIG. 41: AP7, PGA7, ISA0, IA0, and OA. Relays AP7 and PGA7 together, operated, identify position buffer 63 as the circuit for which this command is intended. Relays ISA0 and IA0 together signify that output conductor 00 of the relay tree of FIGS. 44 and 45 is the output conductor that is to be energized by the input of the relay tree. Relay OA, operated, signifies that an operate potential is to be applied to the input of the relay tree at terminal 4410.

The operation of input relay 41–IA0 completes an obvious path to operate its slave relay INA0. The operation of input relay AP7 closes obvious paths through its make contacts on FIG. 41 to operate its slave relays comprising the seventh relay in each of the four groups of relays designated "PA0" through "7," "PA8" through "15," "PAI6" through "23," and "PA24" through "31" on the same figure. Accordingly, at this time, relays PA7, PA15, PA23, and PA31 are operated by the closure of the make contacts of relay AP7.

The operation of relays 41–PGA7 and 41–PA31, together, close the following path to operate relays 49–A63 and 49–A′63: ground on terminal 4800, break contacts 41–NXA, 48–AUA, through make contacts of relay 41–PGA7 in the PGA relay translator, conductor PGA7 extending from FIGS. 48 to 49, through make contacts of relay 41–PA31 in tree 4917, output terminal PA31, conductor PA63, extending to the winding of relay A′63, to operate it as well as to operate relay A63. The operation of relays A63 and A′63 together symbolically indicates the position buffer to which the command from the group gate is directed. Further, the closure of the contacts of these two relays interconnects the plurality of leads extending to position buffer 63 with the plurality of output leads from the relay tree translators 4400 through 4507. The connection of the output of these translators to the conductors extending to position buffer 63 thereby prepares a path whereby the circuit of FIG. 42 may apply an operate potential via one of the leads extending to position buffer 63 to operate the relay therein specified by the command information received from the group gate.

Only relay 41–IA0 in the group of eight relays IA0 to IA7 is operated and, accordingly, only its associated slave relay 41–INA0 is operated. On FIG. 42, the 1-out-of-8 symmetric 4250 checks for the 1-out-of-8 condition of relays 41–INA0–7 and, if the condition is met, extends a ground from terminal 4200 through the symmetric, through break contacts 42–PCA, to relay CKA to operate it. The operation of the CKA relay, together with the operation of relay 41–OA, as already described, closes the following path over which a potential is applied to operate the relay in position buffer 63 specified by the group gate command: negative battery on terminal 4201, resistor AS0, the winding of relay AS0, terminal 4202, make contacts 41–OA, break contacts 41–RA, make contacts 42–CKA, connductor A, extending from FIG. 42 to FIG. 44, break contacts 40–NXA, to terminal 4410. This terminal comprises the input of relay tree translator 4404 comprising make contacts of relays 41–ISA0 through ISA7. Relay 41–ISA0 is operated at this time, and therefore the negative potential on terminal 4410 at the input of the tree may be extended through make contacts 41–ISA0 to the input of tree 4400, comprising contacts of relays 41–INA0 through INA7. Relay 41–INA0 is operated at this time, and therefore the potential on the output of tree 4400 is extended therethrough to its output terminal INA0.

Output conductor A0 is connected to terminal INA0. The contacts on FIG. 44 of relays A1 through A63 are effective to extend output conductors A0 through A29 to the position buffer represented by the A-relay now operated. Similarly, the make contacts of relays A′ through A′63 on FIG. 45 are effective to extend the output conductors A30 through A49, A51 through A58, and A59, to the input conductors of the position buffer associated with the operated A′ relay. Relays A63 and A′63 are now assumed to be operated, and therefore the conductors comprising the output of trees 4400 through 4403 and 4504 through 4507, are now extended, by means of the make contacts of relays A63 and A′63, to the correspondingly designated input conductors of position buffer 63. At this time, only input conductor AO is energized by the INA0 output of tree 4400, and therefore only input conductor 00 of position buffer 63 is energized at this time with a negative potential. This negative potential is effective at this time to operate the relay to which the 00 input conductor of position buffer 63 is connected.

65

The operation of the relay connected to input conductor 00 of position 63 generates a transit which is transmitted back over the operate path of the relay and finally appears on terminal 4202. This transient is then passed through amplifiers OD, OA, and RA, in series and finally appears as a negative pulse on terminal 4203, which is the output of the RA amplifier. The negative pulse appearing at this point signifies that the intended relay successfully operated in position buffer 63. The negative pulse at this point sets both the RPA and the PCA flip-flops and drives their 0 outputs low. The 0 output of the PCA flip-flop going low operates relay 42–PCA. The operation of relay 42–PCA operates its transfer contacts connected to terminal 4205. This causes the terminal 4200 ground through symmetric 4250 to be extended through the PCA1 diode to hold relay 42–PCA operated temporarily. The operation of its transfer contacts also extends the terminal 4200 ground to the C input terminal of the RPA flip-flop to reset it. The resetting of this flip-flop abruptly terminates the current through the winding of transformer PA. The setting and resetting of the RPA flip-flop takes only about 1.5 milliseconds, which is the operate time of the mercury relay 42–PCA. This rapid setting and resetting of the RPA flip-flop generates a RESET pulse in transformer PA which is transmitted over the TA and RA leads to the poistion group gate as a RESET pulse to that circuit to reset its circuitry. Functionally speaking, the reception of the RESET pulse by the group gate signifies to it that the position signal distributor and the relay within the identified position buffer have responded properly to the command transmitted from the group gate. The restoration of the group gate circuit to its normal condition releases the input relays on FIG. 41, thereby restoring them, as well as their slave relays, to normal.

Relay 42–CKA released when the 42–PCA relay operated and operated its transfer contacts connected to terminal 4205. The release of relay CKA opens the path for relay 42–ASO, thereby releasing it. Relay ASO initially operated when the negative potential from terminal 4201 was supplied over the priorly described path to input conductor 00 of position buffer 63. Relay ASO operated at this time since it is in series with the circuit supplying the negative potential to the position buffer relay. The release of relay ASO closes the following path to reset the PCA flip-flop: ground on terminal 4208, break contacts 42–ASO, 42–ASR, and 41–ISA7, to the C input terminal of the PCA flip-flop to reset it. Following the resetting of this flip-flop, relay 42–PCA remains held through the PCA1 diode and its own make contacts and the symmetric 4250, to ground on terminals 4200. Relay PCA remains operated over its locking path to the 4200 terminal ground until the information relays on FIG. 41 are released by the group gate as it, in turn, receives the RESET pulse from the position signal distributor via the TA and RA conductors on FIG. 42 extending to the group gate.

The preceding paragraphs have described the operation of the relay in position buffer 63 that is connected reception of a group gate command ordering the operation of the relay in position buffer 63 that is connected to its 00 input lead. Let it now be assumed, in order to illustrate the operation of the position signal distributor for the reception of a group gate command requiring a relay release, that a group gate command is now received requiring the release of the relay in position buffer 63 that was operated by the reception of the command described in the preceding paragraphs. In other words, let it be assumed that a command is now received from the group gate requiring the application of a relase potential to the input conductor 00 extending to position buffer circuit 63 from the output of the matrix trees on FIGS. 44 and 45. In this case, the same combination of inputs relays on FIGS. 41 as before are operated, except that relay RA, rather than OA, is operated, The operation of the RA relay orders the release of the relay identified by the command. Relay 42–CKA now operates from ground on terminal 4200, through the symmetric 4250, in the same manner as before. The following circuit is now closed on FIG. 42 to apply a positive potential, momentarily, to the 00 input conductor of position buffer 63: positive potential on terminal 4207, the ASR resistance, make contacts RA, capacitor 4211, the winding of relay ASR, the winding of relay ACO, resistor ACO, break contacts 41–OA, make contacts 41–RA, make contacts 42–CKS, break contacts 41–NXA, to terminal 4410 comprising the input of translator 4404. The aforementioned path, including capacitor 4211, comprises a voltage doubler which is effective to apply +48 volts, rather than +24 volts, to the path currently being described to release the relay in position buffer 63. Capacitor 4211 is usually charged to +24 volts between terminal 4207 and ground on terminal 4214, when relay 41–RA is released. The subsequent operation of relay 41–RA for a relay release command inserts capacitor 4211 in series with the 4207 terminal battery supply so that approximately 48 volts is applied to the left-hand winding terminal of relay ASR, and from here through the circuit already described to terminal 4410, which is the input of the translator 4404.

The same information relays are operated as before, with the exception of 41–RA rather than 41–OA, and therefore the positive potential on terminal 4410 is extended through make contacts of relay 41–ISA0, through make contacts of relay 41–INA in the 4400 tree, out on terminal INA0 and conductor AO, through make contacts A63, to the 00 input conductor of position 63. This positive potential causes the release of the relay to which this input conductor position 63 is connected.

Since the relay to be released is a magnetic latching relay, it is necessary that the positive potential be applied to it only for the time required to release it, and no longer. The successful release of the relay generates a pulse which is transmitted back over the operate circuit just described and appears on terminal 4206. This pulse is then passed through the RD, OA, and RA amplifiers to set the PCA and RPA flip-flops in the same manner priorly described. The setting of the PCA flip-flop operates relay 42–PCA, which in turn causes relay 42–CKA to release, thereby releasing relays 42–ASR and 42–ACO, which operated during the time the positive potential from terminal 4207 was applied to relay in the position buffer. The operation of relay PCA causes the RPA flip-flop to be reset from ground on terminal 4200. The release of relays 42–ASR and 42–ACO extends the terminal 4208 to reset flip-flops PCA and RPA. The setting and subsequent resetting of the RPA flip-flop causes a RESET pulse to be transmitted back to the position group gate in the same manner as priorly described.

The magnetic latching relays in the position buffer have the characteristic that, although a positive voltage is used to release them, this voltage must not persist too long or it will be successful in reoperating the relay. Therefore, the present circuit applies the positive 48-bolt potential (24 volts doubled) to the position buffer relay that is to be released for only a brief timed interval. This interval is controlled by the 42–PCA relay which, when it operates from the setting of its flip-flop, releases the 42–CKA relay, which in turn opens the path by means of which the 48–volt release potential is applied to the position buffer relay. This ensures that the positive potential will be applied to the position buffer relay only for the minimum time required to release it.

The sequence of circuit operations which lead to the resetting of both the position signal distributor and the group gate circuit is initiated by the setting of the PCA and RPA flip-flops on FIG. 42. It is normally intended that this reset function will be initiated and controlled by the inductive kick received from the release of the magnetic lateching relay in the position buffer when the release potential of +48 volts is applied to it via the circuit already described. It is desired, however, that if this kick should not be received, due to a circuit malfunction in either the position buffer or the position signal distributor itself, the position signal distributor and the group gate not be held up and thereby delay their serving of other calls. Therefore, an auxiliary reset circuit comprising the comprising the ACO flip-flop is provided on FIG. 42 in order that the PCA and RPA flip-flops will be reset and transmit a RESET pulse to the group gate even if the inductive kick is not received from the magnetic latching relay in the position buffer. Relay 42–ACO operates when the positive 48 volts is applied to the position buffer relay to release it. The operation of the ACO relay closes its make contact to extend ground on terminal 4216 to the S terminal of the ACO flip-flop to set it. This drives its 0 output low and applies a negative pulse to the S terminal of the PCA and RPA flip-flops to set them. Relay 42–ACO is somewhat slow in operating, and therefore, under normal conditions, it is the pulse received from the relay that is to be released that will be successful in setting the PCA and RPA flip-flops. However, if the inductive kick is not received, for some reason, the two flip-flops will be reset by the make contacts of the ACO relay. Once these two flip-flops are set, they are reset in the same manner as priorly described.

The preceding paragraphs have described how the position signal distributor responds to a command requesting the operation of a relay in a position buffer, as well as how it responds to the reception of an order commanding the release of the priorly operated relay. As already mentioned, the position group gate and the position signal distributor work at a sufficiently fast rate so that the operate and release commands are processed at a speed which effects the operation and release of relays in all position buffers as required for the serving of calls by all positions.

The position signal distributor and group gate, in addition to controlling the operation and release of relays within the position buffers, are also used for transmitting signals to the positions which cause numerical information to be displayed thereat. Numerical displays are used to indicate to operators calling and called numbers, as well as charge information for coin calls. The numerical information is displayed by means of the well-known NIXIE tubes manufactured by the Burroughs Corporation of Plainfield, N.J. The commands from the group gate instructing the position signal distributor to transmit numerical display information are referred to as "NIXIE" commands.

The display of numerical data at an operator's position requires the transmission of a series of commands from the group gate to the position signal distributor. These series of commands are referred to, for purposes of discussion, as a "NIXIE display cycle." A NIXIE display cycle is initiated by first transmitting a group gate command which causes the operation of a unique combination of relays in the 41–ISA–, and 41–INA– group to signify the initiation of the NIXIE display cycle. The same command also operates a unique combination of relays to signify the operator position to which the NIXIE display information is to be transmitted. This initial command is referred to as a "NIXIE setup command" since it puts the signal distributor in what is termed a "NIXIE mode of operation." Following the reception of the NIXIE setup command, the group gate transmits a series of commands, each of which causes the illumination of two NIXIE tubes at the operator position. The number of commands in this series obviously depends upon the quantity of numerical data to be displayed. Each of these commands operates relay 41–NXA to signify a NIXIE operation. Each of these commands also operates additional ones of the input relays on FIG. 41 in order to identify the two digits that are to be displayed at the operator's position in response to the transmission of the command. Relay 41–OA is operated for each command. The IA–, ISA–, AP–, and PGA– relays on FIG. 41 are operated in a 1-out-of-8 combinational code manner for each NIXIE command. The operation of these relays closes their contacts in the relay trees in the same manner as for the operation or release of position buffer relays. However, in this case, the circuitry of the position signal distributor has been modified by the prior reception of the NIXIE setup command, so that output signals are not extended to the input of the position buffers to operate relays in them, but instead, are extended to diode translators on FIGS. 46 and 48 whose outputs extend to the NIXIE circuitry within the positions to cause the operation of two NIXIE lamps for each command. In other words, each command contains sufficient information to, first of all, operate relay 41–NXA and, secondly, to operate two NIXIE lamps in the position to which the information is being transmitted. Once the required number of NIXIE display lamps are energized, the position signal distributor is released from the NIXIE mode by the reception of a command which causes the operation of a unique combination of ISA– and INA– relays, together with the operation of the NXAR relay on FIG. 45.

In order to describe the detailed operation of the circuit for the transmission of numerical display information, let it be assumed that it is desired to transmit NIXIE information to position 63, in connection with a call currently handled by an operator at that position. The position signal distributor is ordered into its NIXIE mode by the reception of a command from the group gate, which causes the operation of relays 41–ISA7, 41–IA2, 41–AP7, and 41–PGA7. The operation of relays AP7 and PGA7 together with the operation of the slave relays of AP7 on FIG. 41 cause the relay trees of FIGS. 48 and 49 to operate relays 49–A63 and 49–A'63 in the same manner as already described for the transmission of the relay operate and release information to position buffer 63.

The operation of relays 41–ISA7 and 41–IA2, together with the operation of slave relay 41–INA2 closes the following path to operate relay 42–XA63: ground on terminal 4208, break contacts 42–ASO, 42–ASR, make contacts 41–ISA7, 42–CKA, 41–INA2, 49–A'63, to the winding of relay XA63 to operate it. Relay CKA operates from the ground on terminal 4200 extended through the symmetric in the same manner as already described for the reception of other commands from the group gate. Relay XA63, in operating, closes a holding path for itself, through its own make contacts, and to ground on terminal 4217 through break contacts 43–NXTA. The operation of relay XA63 closes its contacts on FIGS. 46 and 47 to extend a plurality of leads to position 63 from the two circuits which transmit NIXIE numerical information to the position as well as from the circuit which transmits steering information to the position. The NIXIE steering information is transmitted from the circuit on the upper portion of FIG. 47, while the NIXIE numerical information is transmitted to the positions from the diode matrix translators on FIGS. 46 and 48. The NIXIE information is transmitted to the position two digits at a time, in 2-out-of-5 code form. The 2-out-of-5 code information for one digit is transmitted from FIG. 47 over the conductors designated "A0," "A1," "A2," "A4," and "A7:" The 2-out-of-5 code information representing the other digit is transmitted from FIG. 46 via the conductors designated 0, 1, 2, 4, and 7. The steering information is transmitted from FIG. 47 over the conductors designated "G" through "M."

The operation of relay XA63 also closes its contacts on FIG. 42 to extend ground from terminal 4215 through the NXA capacitor to the set lead of flip-flop ACO. This potentional sets the flip-flop, which drives its output low to apply a negative pulse to the S lead of the PCA and RPA flip-flops. Flip-flop PCA, when set, drives its 0 output low to operate relay PCA. Relay PCA closes its transfer contacts connected to terminal 4205. This extends the 4200 terminal ground to the C lead of flip-flop RPA to reset it. The setting and resetting of this flip-flop transmits a RESET pulse back to the group gate which, in turn, releases the information relays of FIG. 41. The release of relay ISA7 at this time closes its break contacts to extend the terminal 4208 ground to the C lead of flip-flop PCA to reset it. The operation of relay XA63 during the reception of the NIXIE setup command indicates that the numerical information received in the subsequent commands is to be directed to operator position 63. The operation of relay XA63 also prepares the steering circuit of FIG. 43 so that steering control potentials will be transmitted to position 63 to steer the display data received in the subsequent commands into appropriate orders of the indicator tubes. The operation of the steering circuit is initiated when relay XA63 closes its contacts on FIG. 43 to extend ground from terminal 4310 to the winding of relay NIXA to operate it. The operation of relay NIXA closes its make contacts to extend the ground on terminal 4300 over the following path to the winding of relay NXAM to operate it: ground on terminal 4300, make contacts 43–NIXA, break contacts 43–NXTA, break contacts 43–NXAM, to the winding of relay NXAM to operate it. Relay NXAM, in operating, closes its make contacts to close a holding path for itself over a path including terminal 4311, the break contacts in series of relays 43NXAL through 43NXAG, break contacts 43–AUXA to terminal 4315, terminal 4301, terminal 4302, resistor AS2, back to the ground on terminal 4316. Relay NXAM, in operating, closes the following path to operate relay NXTA: ground on terminal 4316, terminal 4317, make contacts 43–NXAM, break contacts 43–NXTA, to the winding of relay NXTA to operate it. The relay, in operating, closes a holding path for itself over its own make contacts to ground on terminal 4302, through resistor AS2. Relay NXTA, in operating, opens its break contacts below terminal 4312, thereby opening the path over which relay NXAM originally operated.

Relay NXAM, in operating, prepares a path (shown on FIG. 47), to extend the ground on terminal 4700 over lead M, and, through make contacts 42–XA63, to position buffer circuit 63. The circuit shown on the upper half of FIG. 43 comprises a steering circuit which is operated one step as successive NIXIE commands are received, in order to steer the numerical digits associated with each command into the proper display tubes.

The following summarizes the description of the NIXIE operation described so far. A NIXIE setup command is received from the group gate to condition the position signal distributor for the reception of NIXIE numerical information. This NIXIE setup command contains two items of information. The first is the position number to which the subsequently received NIXIE numerical information is to be directed. This position number information operates the AP– and PGA– information relays on FIG. 41 which, in turn with their slaves, cause the relay tree of FIGS. 48 and 49 to operate the appropriate A– and A′– relay associated with the selected position. It is assumed, for purposes of this discussion, that position 63 is to receive the NIXIE numerical information, and therefore relays 41–PGA7 and 41–PA31 are operated to cause the relay tree to operate relays 49–A–63 and 49–A′–63.

The second item of information contained in the NIXIE setup command is represented by the operation of relays 41–ISA7 and 41–IA2 which, in turn, operate relay 42–XA63 over contacts of various relays, including 49–A′63 and 42–INA2, which is a slave of relay 41–IA2. This command is known as a "58" command because the operation of the ISA7 and INA2 relays would symbolically represent an output lead designated "58" on the relay tree of FIGS. 44 and 45. However, the 58 lead is not provided on this relay tree or extended to the position buffer, since it is utilized exclusively within the position signal distributor to condition the signal distributor for a NIXIE mode of operation whenever the 58 command is received.

The operation of relay 42–XA63 prepares paths on FIGS. 46 and 47 whereby the NIXIE numerical and steering information may be subsequently transmitted to position 63. The operation of relay XA63 also operates relay 43–NIXA, which performs a plurality of control functions in connection with the NIXIE operation, as subsequently described. The operation of relay NIXA conditions the steering circuit on FIG. 43 by operating relays NXAM and NXTA. When conditioned by the operation of these two relays, the steering circuit prepares a path on the upper portion of FIG. 43, so that the information in the first NIXIE numerical command that is subsequently received will be steered to the proper display tubes in position 63.

The operation of relay 42–XA63 also closes a path through its make contact on FIG. 42 to extend the ground on terminal 4215 and through a capacitor to the SET lead of the ACO flip-flop which, in turn, sets the PCA and RPA flip-flops. These latter two flip-flops are subsequently reset in the same manner as priorly described. The setting and resetting of the RPA flip-flop transmits a RESET pulse back to the position group gate, which resets itself and, in turn, releases the information relays on FIG. 41.

Following the reception of the NIXIE setup command, the NIXIE numerical commands are received, with each command containing information identifying it as a NIXIE numerical command, and also containing information signifying digital display information for two NIXIE tubes. The command is identified as a NIXIE numerical command by the operation of information relay 41–NXA. The information relays IA–, ISA–, AP–, and PGA– on FIG. 41 are operated in combination code form to signify the two digits that are to be displayed. The NIXIE tubes are energized sequentially in a right-to-left manner, two digits at a time, on the operator's display panel. Thus, the first numerical command received energizes the rightmost two tubes, representing the units and tens digits of the display. The second NIXIE numerical command energizes the next two display tubes, proceeding right to left, i.e., the tubes representing the hundreds and thousands digits of the display. The operation proceeds in a similar manner for subsequent NIXIE commands until all tubes have been energized, as required, to display the required information.

Let it be assumed, for purposes of discussion, that the first NIXIE numerical command specifies a display of the digit 8 for the units digit and a digit 7 for the tens order. In accordance with this assumption, the reception of the first NIXIE numerical command operates input relays NXA, AP7, PGA0, IA0, and ISA1 on FIG. 41. Slave relays 41–PA7 and 41–INA0 also operate. The operation of relay 43–NIXA in connection with the reception of the NIXIE setup command closes the following path on FIG. 48 to operate relay 48–AUA: ground on terminal 4801, make contacts 43–NIXA, resistor AS2, make contacts 43–NXAM, break contacts 48–AUA, to the winding of relay AUA to operate it. The relay, in operating, closes a holding path for itself over its own make contacts and bypasses the make contacts of relay NXAM. The operation of relay 41–NXA closes a path on FIG. 48 to extend ground from terminal 4800, and through the break contacts 42–PCA, to the winding of relay STRA to operate it. The operation of relay AUA operates its make contacts connected to terminal 4802 so as to transfer the input of the PGA–relay tree from the 4800 terminal ground to the negative 48-volt battery through the make contacts of relay 48–AUA. The operation of relay 41–NXA also closes its make contacts on FIG. 44 to isolate the potential on terminal 4411 from the ISA relay tree and connect it to the circuit of FIG. 46. Relay 42–CKA operates in the same manner as before, provided only one of the INA relays is operated. Information relay 41–OA operates during the reception of each NIXIE numerical command.

The following path is now closed to transmit NIXIE numerical information from FIG. 46 to position 63: negative battery on terminal 4201, resistor AS0, relay AS0, terminal 4202, make contacts 41–OA, break contacts 41–RA, makes contacts 42–CKA, terminal 4411, make contacts 41–NXA, terminal 4601, make contacts 41–ISA1 and 41–INA0, to the 8 input of the diode translator. This transforms the 1-out-of-10 decimal information it receives into 2-out-of-5 coded form. Since the decimal input information currently being applied to it is an "8," the negative potential on the 8 input is extended through diode D81 to output terminal 1, as well as through diode D87 to output terminal 7. The negative potential on output terminals 7 and 1 are extended through make contacts 42–XA63, and over conductors 7 and 1, to the NIXIE input circuitry of position 63.

The following path is now closed to extend additional numerical information to the NIXIE input circuitry of position 63: negative battery on terminal 4803, make contacts 48–AUA, terminal 4802, through make contacts 41–PGA0 of the PGA relay tree, through make contacts 41–PA7 of the relay tree 4810 out on its output terminal 7, terminal 4804, make contacts 48–AUA, to the 7 input of the diode matrix translator, which is also of the 1/10 decimal to 2/5 type, out on its output conductors A0 and A7 (which together symbolize a 7 in 2-out-of-5 code form), terminal 4701 make contacts 42–XA63, and out on conductors A0 and A7 to the NIXIE numerical input circuitry of position 63.

Steering relay 43–XNAM is operated at this time, and therefore the following path is now closed on the upper portion of FIG. 47 to transmit steering information to the NIXIE circuitry of position 63: ground on terminal 4700, make contacts 48–STRA, make contacts 43–NXAM, onto the M lead which extends, through make contacts 42–XA63, to position 63. The potential on the M lead extending to position 63 conditions the steering circuitry of the position so that the numerical data on leads 1 and 7, extending from FIG. 46 to position 63, causes the units display lamp to indicate a digit 8 and so that negative battery on conductors A0 and A7, extending from FIG. 47 to position 63, cause the tens order display lamp to indicate a digit 7.

The operation of relay 48–STRA closes its make contacts of FIG. 43 to operate steering relay 43–NXAL as follows: ground on terminal 4300, make contacts 43–NIXA, terminal 4316, terminal 4317, terminal 4312, make contacts 48–STRA, terminals 4313 and 4318, make contacts 43–NXAM, break contacts 43–NXAL, to the winding of relay NXAL to operate it. This relay, in operating, closes a holding path, over its own make contacts, to ground through the holding chain comprising the break contacts of the subsequent steering relays. The operation of relay NXAL also opens a portion of the holding path for relay XNAM. However, relay NXAM remains operated, for the time being, over the path including terminal 4311, make contacts 43–NXAL, terminal 4330, resistor AS1, terminals 4314 and 4313, to the ground provided by make contacts relay 48–STRA.

The operation of relay 41–NXA also operates relay 46–PGA over the same path that provided negative battery to terminal 4601, as already described. Relay PGA, in operating, opens its break contacts connected to terminal 4601, thereby transmitting a transient back through the OD, OA, and RA amplifiers on FIG. 42, to set and reset the PGA and RPA flip-flops in the manner already described, and, in turn, to cause a reset pulse to be transmitted back to the group gate. The group gate resets itself as it receives this reset pulse and, in turn, causes the information relays of FIG. 41 to release. The release of the information relays, and, in particular, the release of information relay NXA, opens the circuit of relay 48–STRA, to release it. The release of relay STRA opens its make contacts on FIG. 43 to release relay NXAM and leave only steering relay NXAL operated. The release of relay NXAM, together with the continued operation of relay NXAL, advances the steering circuit on FIG. 47 so that the terminal 4700 ground is now transferred from steering output lead M and connected to steering output lead L. The ground on the L lead is extended to position 63, where it advances the steering chain therein and prepares it so that the NIXIE numerical information contained in the next command received by the position signal distributor will cause the energization of the next two numerical display tubes in the position.

The release of the remaining information relays on FIG. 41 prepares the position signal distributor for the reception of the subsequent NIXIE numerical commands. The reception of the next NIXIE numerical command operates information relay 41–NXA, together with the relays on FIG. 41 required for the indication of the NIXIE numerical information. The steering circuit of FIG. 47 is at this time applying ground to the L steering lead extending to position 63. The reception of the second NIXIE numerical command operates the information relays so that their contacts, and the diode matrix translators on FIGS. 46 and 48, transmit the required numerical information to indicate the next two digits to be displayed at position 63.

The operation of relay NXA for each NIXIE numerical command operates relay 48–STRA, which advances the steering circuit relays of FIG. 43 one position. The subsequent release of relay STRA releases the priorly operated steering relay to cause the steering chain of FIG. 47 to advance the terminal 4700 ground to the next steering output lead.

The operation of the position signal distributor continues in the manner described for the reception of additional NIXIE numerical commands so that the NIXIE tubes at position 63 are energized, two at a time, until all the information required by the operator for the call is displayed at her position. The nature and quantity of the information that is to be displayed is controlled by the SPC.

The position signal distributor remains in the NIXIE mode of operation as long as relay 42–XA63 remains locked operated over its holding path on FIG. 42. Once the required quantity of numerical information is transmitted to the operator position, the SPC terminates the NIXIE mode of operation of the signal distributor by causing the position group gate to transmit a NIXIE release command to the position signal distributor. This NIXIE release command causes information relay 41–IA4 and 41–ISA7 to operate. Information relay 41–OA is also operated at this time. The following path is now closed to operate relay NXAR on FIG. 45: negative battery on terminal 4201 of FIG. 42; resistor AS0, the winding of relay AS0, make contacts 41–OA, break contacts 41–RA, relay 42–CKA, break contacts 41–NXA on FIG. 44, terminal 4410, make contacts 41–ISA7 in the tree 4404, terminal 4510, make contacts 41–INA4, to the winding of relay NXAR to operate it. The operation of this relay opens its break contacts on FIG. 42 to open the holding path for relay XA63 by isolating it from the terminal 4217 ground. The release of relay XA63 releases relay 43–NIXA, as well as all the other relays associated with the NIXIE mode of operation, including relay 48–AUA, thereby restoring the position signal distributor to its normal conditions in preparation for the reception of additional commands from the position group gate of either the NIXIE or non-NIXIE type.

Position buffer and position circuits—FIGS. 51–75

FIG. 3C discloses a plurality of position buffers, 2 through 63. each of which is connected to one of operator position circuits 2 through 63. A position buffer circuit and a position circuit function together as a single entity for the serving of calls. Each position circuit comprises keys, lamps, and a talking circuit, while each position buffer circuit comprises relays operated by signals from the position distributor for controlling the illumination of lamps at its associated operator position.

Each position circuit, together with its position buffer circuit, performs a plurality of separate, but inter-related, call functions. First of all, the position circuit interconnects the speech circuits of the operator's headset with the speech circuit of an incoming call, via the operator's cutthrough circuit and the switching network. The position circuit also provides lamp displays indicating the current status of each call extended to the position. This display is controlled by the position buffer relays which, in turn, are operated and released in response to signals emanating within the SPC and transmitted via the position group gate and the position signal distributor.

The position circuit also contains circuitry, controlled by the position keys, for transmitting information to the SPC pertaining to calls served by the position. This information is transmitted to the SPC via the position scanner and the master scanner. The position circuit also contains facilities by means of which numerical information may be transmitted to the position in order to display to the operator information such as calling and called numbers, monetary amounts for coin calls, and other miscellaneous types of information. This numerical information is transmitted directly from the position signal distributor to the position buffer.

The apparatus comprising an operator position circuit is housed in a position console which is manned by an operator in the customary manner. In order that a maximum number of position consoles may be installed in a room in an esthetically pleasing manner, it is desirable that the console size and volume be minimized by including in it only that equipment which is personally required by the operator for the serving of calls, such as for example, the lamps, keys, and transmission circuitry. The provision of both operator positions and position buffer circuits permits us to minimize the size of the position consoles by removing therefrom and putting in the position buffers the relays whose operations are required to control the illumination of the position console lamps. The position buffer circuits are then installed in a room separate from that in which the position consoles are located. This also permits maintenance personnel to trouble-shoot the relay circuits without inconveniencing the operators. If it were not for problems of space and maintenance, the positions and position buffer circuits could be combined by including in each operator position the relay circuits required for the control of the position lamps.

The circuit details of a position buffer are shown on FIGS. 51 through 57, while the details of its associated operator position are shown on FIGS. 58 through 74, when arranged as shown in FIG. 75. The input conductors for the position buffer extend from the left side of FIGS. 51 through 57 to an output of the position signal distributor on FIGS. 44 and 45. It is assumed that the circuits disclosed on these figures represent position buffer and position circuit 63. In accordance with these assumptions, the input conductors to the position buffer extend to the output conductors designated "two-position buffer 63" on FIGS. 44 and 45 of the position signal distributor. The cable designated in this manner on FIG. 44 contains the conductors numbered 00 through 29, while the correspondingly designated cable on FIG. 44 includes the conductors numbered 30 through 49, 51 through 57, and 59.

The input conductors to the position buffer are numbered and arranged in such a manner that conductor 00 is on the top of FIG. 51 and the conductors below it are arranged in ascending numerical order, so that the highest numbered input conductor (44) is on the bottom of FIG. 57. Each input conductor is connected to a relay which operates in response to the application of control potentials to it by the position signal distributor. Some of these relays are magnetic latching and these are also released by position signal distributor pulses. The operation and release of these relays, in turn, controls the illumination of the lamps at the associated operator position.

The position circuit (FIGS. 58 through 74) may be functionally divided, for purposes of discussion, into four parts. The first comprises the speech circuitry of FIG. 58, which permits the operator to converse with the parties with whom she may be connected via the switching network on a call. The second part comprises the key matrix shown on FIGS. 59 through 62. It is this circuit which transmits signals back to the SPC, via the position scanner and the master scanner, whenever the operator presses certain keys at her position. The operation of this matrix is subsequently described in detail. It is sufficient at this point to state that the keys are represented as vertical lines on FIGS. 59 through 62. Each line represents a different key and each key intersects one of the nine horizontal conductors designated "1" through "9" on the left side of FIG. 59. These conductors, together with the conductor designated "SR," comprise the output conductors extending from the position circuit to the position scanner. Each key of the matrix contains three make contacts which, when the key is depressed, connect a 24-volt potential to a unique combination of three of the nine output conductors 1 through 9. The three make contacts of each key within the matrix are represented by three circles, each of which encloses a set of make contacts, and each of which is located at the intersection of the line representing the key and one of the three output conductors to which the 24-volt potential is applied when the key is operated. The potentials applied to these output conductors when the keys are operated are the sole means by which the SPC monitors key operations at the positions.

The third part into which the operator position may be subdivided is shown on FIGS. 63 through 68 and comprises lamps and keys. The lamps furnish information to the operator regarding the status of each call served by the position. The key contacts disclosed on these figures control circuitry internal to the position and are not involved in transmitting signals to the SPC, as are those key contacts in the matrix of FIGS. 59 through 62. Certain of the keys whose contacts are shown on FIGS. 63 through 68 also have contacts in the key matrix of FIGS. 59 through 62. The operation of keys of this type transmits signals back to the SPC and also controls circuitry local to the position. Others of the keys have contacts only on FIGS. 63 through 68. The depression of a key of this type transmits no information back to the SPC. Similarly, certain of the keys have contacts only within the key matrix. The operation of a key of this type transmits information back to the SPC and controls no local circuitry within the position.

The fourth part into which the operator position may be subdivided is shown on FIGS. 69 through 74 and comprises the circuitry which controls the display of numerical indications at the position in response to the receipt of signals from the position signal distributor. The detailed operation of this circuit is subsequently described.

The position buffer circuit (FIGS. 51 through 57) is primarily related to the aforementioned third subdivided portion of the position circuit, namely, that comprising the lamp and key circuitry of FIGS. 63 through 68. The relays within the position buffer are operated in response to signals emanating from the SPC, and the primary purpose of the operation of these relays is to control the lamp indications at the position circuit.

The position buffer and position circuit contain facilities for serving many different types of calls under widely varying call conditions and call situations. Because of this, it is difficult, if not impossible, to describe the entirety of these circuits in a logical sequential order since, for any given type of call and call condition, only a small percentage of the apparatus comprising the circuits would be utilized. Therefore, a two-part format is utilized to describe these circuits in the present specification. The first part describes the lamps that are illuminated and the keys that are depressed for various types of calls and calling conditions. In connection with this first part, Table I lists all keys and lamps on the position circuit, the figure numbers on which each may be found, together with the call function associated with, or represented by, each key and lamp. The second part describes the circuitry associated with each input conductor of the position buffer together with the circuitry within the position console that is controlled or affected when the position buffer relay connected to the described input conductor operates.

TABLE I

LIST OF KEYS

| Key | Function | FIGS |
|---|---|---|
| ACS0 | Access loop 0 | 60 |
| ACS1 | Access loop 1 | 60 |
| ACS2 | Access loop 2 | 60 |
| CA CALL | Cancel call | 61 |
| CAMA CW | CAMA calls waiting | 60 |
| CNL TMG | Cancel timing | 61, 64 |
| COIN COL | Coin collect | 61, 68 |
| DLY | Delayed calls | 61 |
| DIS BILL NO | Display billing number | 61, 64 |
| DIS CLD NO | Display called number | 61, 64 |
| DIS CLG NO | Display calling number | 61, 64 |
| DIS RATE | Display rate | 61, 64 |
| HOLD 0 | Hold loop 0 | 60 |
| HOLD 1 | Hold loop 1 | 60 |
| HOLD 2 | Hold loop 2 | 60 |
| HOTEL GUEST | Hotel guest | 61 |
| KP BACK | Key pulse back | 60, 66 |
| KP BILL | Key pulse bill | 60, 66 |
| KP FWD | Key pulse forward | 60, 65, 66 |
| KP NFY | Key pulse notify | 60, 65, 66 |
| KP RATE | Key pulse rate | 60, 65, 66 |
| KP TRBL | Key pulse trouble | 60, 66 |
| MAKE BUSY | Make busy | 60, 68 |
| OGT0 | Outgoing trunk | 61, 63 |
| OGT1 | do | 61, 63 |
| OGT2 | do | 61, 63 |
| OGT3 | do | 61, 63 |
| OPR TMG | Operator timing | 59, 65, 67 |
| PER COL | Person collect | 59, 65, 66 |
| PER CR CD | Person credit card | 59, 65, 66 |
| PER PD | Person paid | 59, 65, 66 |
| PER 3RD NO | Person third number | 59, 65, 67 |
| POS RLS | Position release | 60 |
| POS TRFR | Position transfer | 60, 68 |
| RING BACK | Ring back | 61, 68 |
| RING FWD | Ring forward | 61, 68 |
| RLS BACK | Release back | 60, 67 |
| RLS FWD | Release forward | 60, 67 |
| SEQ CALL | Sequence calls | 62 |
| ST | Start | 61 |
| STA COL | Station collect | 59, 65 |
| STA CR CD | Station credit card | 59, 65 |
| STA ENT | Station enterprise | 59, 65 |
| STA PD | Station paid | 59, 65 |
| STA 3RD NO | Station third number | 59, 65, 66 |
| ST TMG | Start timing | 61 |
| T&C | Time and charges | 61 |
| 0 | Key set digit key | 62 |
| 1 | do | 62 |
| 2-ABC | do | 62 |
| 3-DEF | do | 62 |
| 4-GHI | do | 62 |
| 5-JKL | do | 62 |
| 6-MNO | do | 62 |
| 7-PRS | do | 62 |
| 8-TUV | do | 62 |
| 9-XYZ | do | 62 |

LIST OF LAMPS

| Lamp | Function | FIGS. |
|---|---|---|
| ACS0 | Access loop 0 | 68 |
| ACS1 | Access loop 1 | 68 |
| ACS2 | Access loop 2 | 68 |
| CA0 | Calling area 0 | 63 |
| CA1 | Calling area 1 | 63 |
| CA2 | Calling area 2 | 63 |
| CA CALL | Cancel call | 46 |
| CAMA CW | CAMA call waiting | 68 |
| CHARGE | Charge | 64 |
| CHG DUE | Charge due | 63 |
| CLD0 | Called loop 0 | 64 |
| CLD1 | Called loop 1 | 64 |
| CLD2 | Called loop 2 | 64 |
| CLG0 | Calling loop 0 | 64 |
| CLG1 | Calling loop 1 | 64 |
| CLG2 | Calling loop 2 | 64 |
| CNL TMG | Cancel timing | 64 |
| COIN COL | Coin collect | 68 |
| COIN DIAL 0 | Coin dial 0 | 63 |
| COIN RET | Coin return | 68 |
| COIN STA | Coin station | 63 |
| COIN SPL TOLL | Coin special toll | 63 |
| CW | Call waiting | 68 |
| DIS BILL NO | Display billing number | 64 |
| DIS CLG NO | Display calling number | 64 |
| DIS CLD NO | Display called number | 64 |
| DLY | Delayed call | 67 |
| HOLD 0 | Hold loop 0 | 68 |
| HOLD 1 | Hold loop 1 | 68 |
| HOLD 2 | Hold loop 2 | 68 |
| HOTEL GUEST | Hotel guest | 64 |
| KEY CLG | Key calling | 64 |
| KP BACK | Key pulse back | 66 |
| KPBILL | Key pulse bill | 66 |
| KPFWD | Key pulse forward | 66 |
| KPNFY | Key pulse notify | 66 |
| KP RATE | Key pulse rate | 66 |
| KP TRBL | Key pulse trouble | 66 |
| MAKE BUSY | Make busy | 68 |
| MINUTES | Minutes | 64 |
| NFY | Notify | 63 |
| NON-COIN DIAL 0 | Noncoin dial 0 | 63 |
| NON-COIN SPL TOLL | Noncoin special toll | 63 |
| NON-COIN STA | Noncoin station | 63 |
| | | (2 lamps) |
| 00 EMER | Emergency | 63 |
| OGT0 | Outgoing trunk 0 | 63 |
| OGT1 | Outgoing trunk 1 | 63 |
| OGT2 | Outgoing trunk 2 | 63 |
| OGT3 | Outgoing trunk 3 | 63 |
| OPR TMG | Operator timing 0 | 67 |
| PER COL | Person collect | 66 |
| PER CR CD | Person credit card | 66 |
| PER PD | Person paid | 66 |
| PER 3RD NO | Person third number | 67 |
| POS RLS | Position release | 63 |
| POS TRFR | Position transfer | 68 |
| RATE | Rate | 64 |
| RING BACK | Ring back | 68 |
| RING FWD | Ring forward | 68 |
| RLS BACK | Release back | 67 |
| RLS FWD | Release forward | 67 |
| STA COL | Station collect | 65 |
| STA CR CD | Station credit card | 65 |
| STA ENT | Station enterprise | 65 |
| STA PD | Station paid | 65 |
| STA 3RD NO | Station third number | 66 |
| ST TMG | Start timing | 64 |
| T&C | Time and charges | 67 |

Each operator position has a portion of its miscellaneous lamp and key circuitry of FIGS. 63 through 68 subdivided into three loops, designated "loop 0," "loop 1," "loop 2." Each loop comprises a lamp CLG– (CLG0 for loop 0) which indicates the on- or off-hook status of the calling party, a lamp CLD– (CLD0 for loop 0) for indicating the on- or off-hook status of the called party, HOLD– (HOLD 0 for loop 0) key and lamp for putting a call into HOLD status and for providing an indication of the HOLD status, and a ACS– (ACS0 for loop 0) key and lamp for signifying that a call is waiting to be served on the loop and for serving the call on HOLD on the loop when the key is depressed by the operator.

The SPC, when extending a call to the position, arbitrarily assigns one of the three loops to the call. By virtue of this assignment, some of the lamp information for the incoming call is displayed by the lamps of the assigned loop, exclusive to the corresponding lamps of the other loops. Also by virtue of this loop assignment, some of the operator key actions required for the serving of the call must take place within the keys of the assigned loop exclusive to the corresponding keys of the other loops. The choice of the loop that is to be utilized for the serving of any call is determined exclusively by the SPC.

The three loops do not represent individual circuitry by means of which an operator can serve more than one call at a time. Rather, each loop comprises a functional subdivision of equipment which enables the operator to put a call currently being served on one loop into a HOLD position in order that she may receive or initiate a call on one of her other loops. When a call is put into a HOLD condition, the switching network operates under control of commands from the SPC to disconnect the operator position from the call. At this time, the operator may perform other functions while the call is on HOLD. Subsequently, when she desires to resume active serving of the call, she depresses the ACS– key for the loop which, in response to a signal from the SPC, causes the switching network to reconnect the incoming connection with the transmission circuit of her position via the operator talking circuit.

Figure 55:
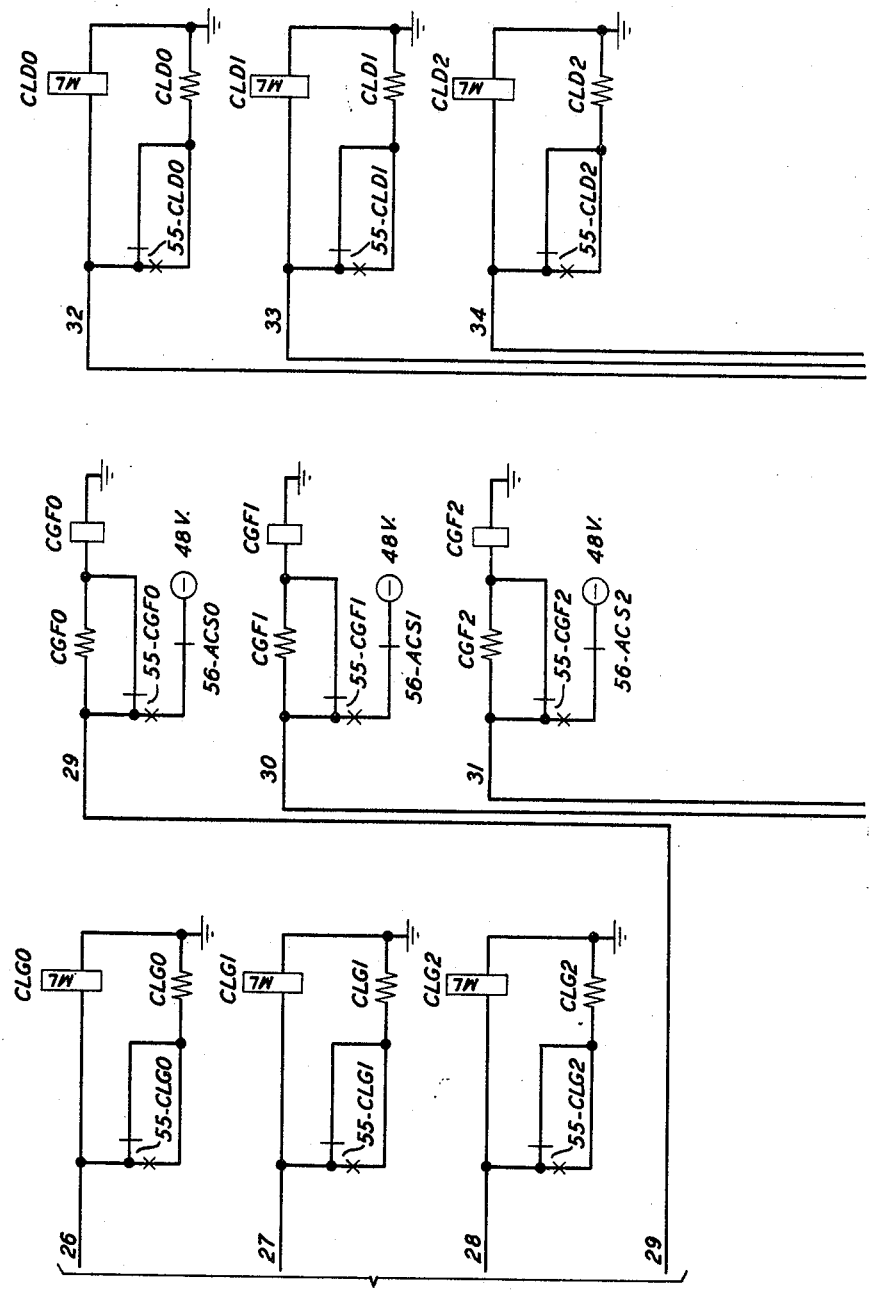
Figure 56:
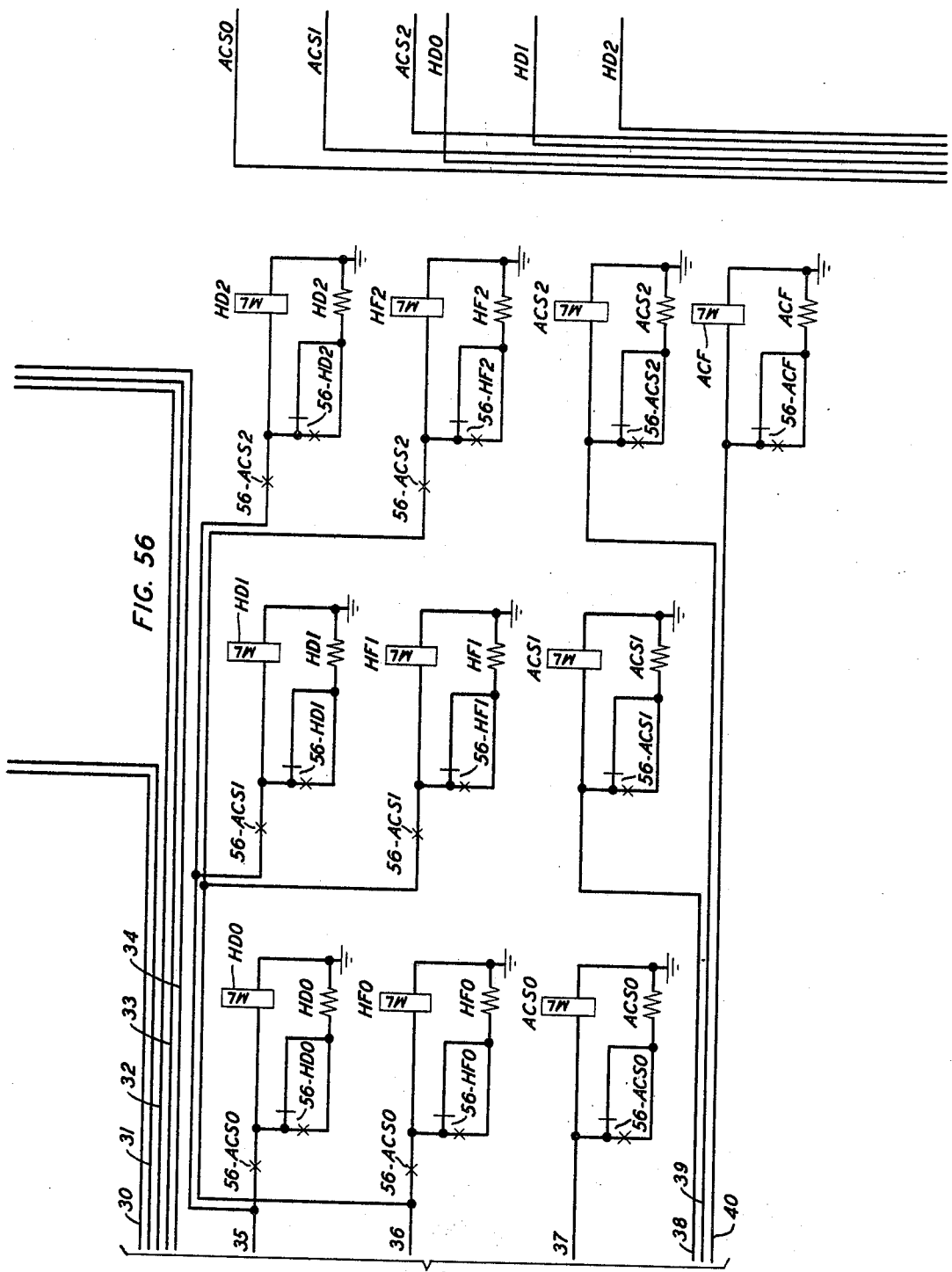
Figure 58:
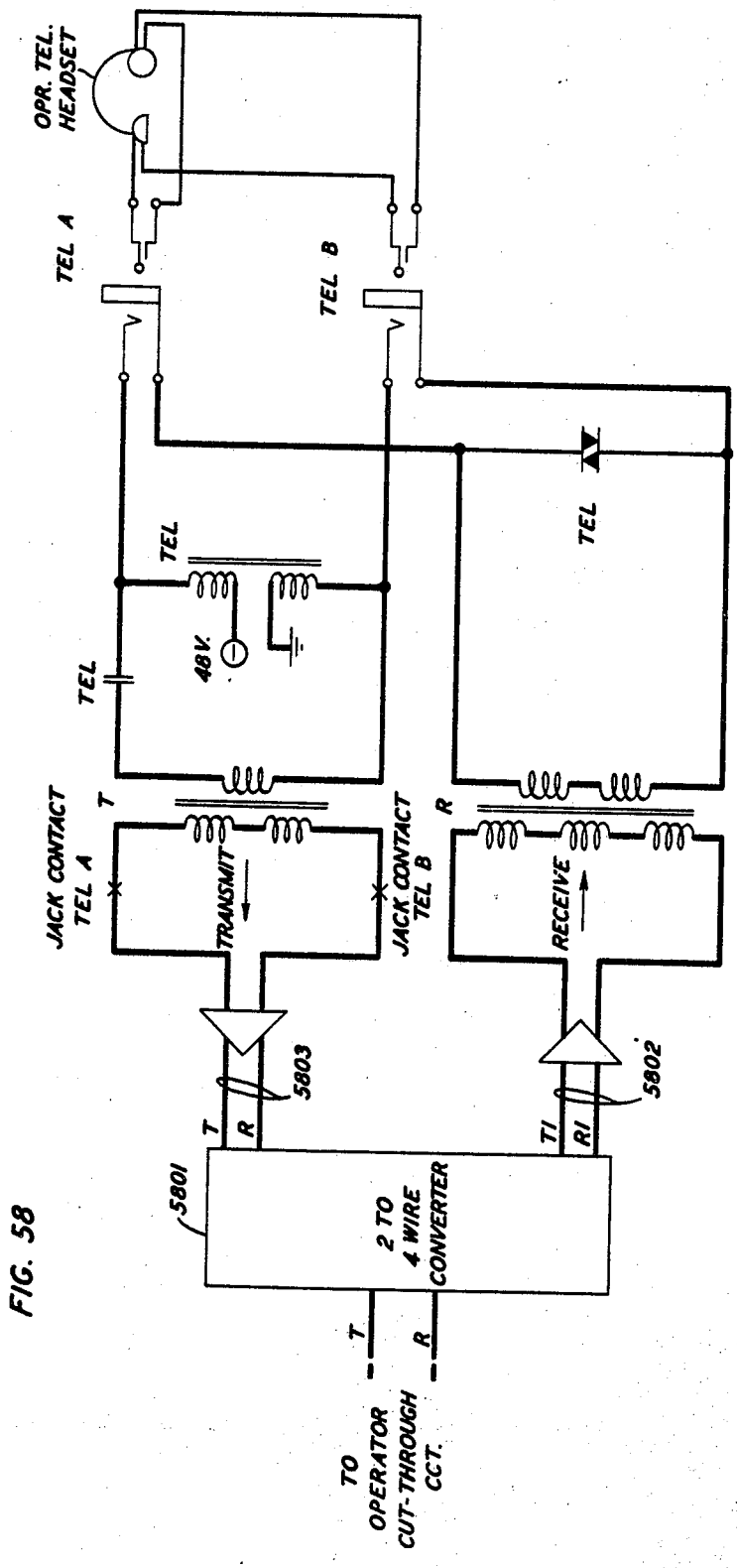

It is to be emphasized that although the operator has three loops, she still has only one transmission circuit, and that is the one shown in FIG. 58. The relays within the position buffer which are associated with the keys and lamps divided into loops are shown in FIGS. 55 and 56. Each relay is designated in such a manner that the terminal character of its designation signifies the loop with which it is associated. The operation of its relay controls its associated lamp within the loop in the position.

The following paragraphs describe the manner in which the lamps are illuminated and the keys operated for some of the different types of calls that may be served by an operator position. The most typical type of call is one of the noncoin special toll type. When this call is initially connected to a position, the lamps that are lit are NC SPL TOLL and the ACS and CLD lamps for the loop to which the call is offered; for example, ACS0, CLD0 for loop 0. The called number is, meantime, automatically outpulsed forward by the system to the called station. The operator, when the call is initially offered to her position, hears an alerting zip tone in her headset and responds by asking the calling party what assistance she may offer. The customer responds and states that the call is a person-collect to a specified individual, for example. The operator then depresses the PER COL key and does nothing further until the called party answers. Once the called station answers, lamp CLD0 goes out and she verifies that the specified individual is available and will accept the charges. At this time, she operates the ST TMG key which controls the making of an initial AMA entry. If all the AMA information is satisfactory, the ST TMG lamp comes on steady and the operator then operates the POS RLS key to release her position from the call. All lamps then go out. If this had been a person-paid call, the operator would just check to see if the specified individual were there and would not have inquired whether he would have also accepted the charges. She then would have operated the PER PD key, rather than the PER COL key.

A noncoin station-to-station type 7- or 10-digit call on which there was no ANI operation would come into the position as follows: The operator would hear a zip tone, the NON-COIN STA lamp would light steady, and the KP BACK lamp would be steady along with the KEY CLG lamp. The operator would then ask the subscriber for the calling number and, once having obtained it, would key it into the system. If the keyed information is acceptable, all the lamps are extinguished and the operator is released from the call after keying the seventh or tenth digit.

There is no ACS– lamp or supervisory lamp lit when a CAMA call is received. A CAMA call can come in on an overlap basis; that is, the operator may be handling any other type of call on one of her three loops, with any combination in HOLD. If she sees the CAMA CW lamp lit, and if she knows that she can handle a short-time holding call, she operates the CAMA CW key. This allows one CAMA call to come into her position, and she handles it in the normal manner. The call that was on the active loop is automatically placed on HOLD, the ACS– lamp for the loop is extinguished, and the HOLD lamp is lit. After the operator keys in the 7-digit calling number for the CAMA call, and if it is acceptable, the HOLD– lamp is extinguished and the ACS– lamp is relit on the active loop.

The following describes the position circuit functions for a station-to-station coin call. The following lamps are lit when the call comes in: COIN STA, ACS– and CLD–. The CHARGE-AND-MINUTES lamps are illuminated along with the charge-and-minutes data display on the NIXIE tubes. The charge information comprises three digits, while the minutes indication comprises two digits. The operator quotes the charge-and-minutes information to the subscriber, who then deposits the initial charge. The operator listens to the tones for the coin deposits and then operates the STA PD key to enter the class-of-charge data into the SPC and to initiate the AMA entry. She then operates the ST TMG key and the POS RLS key to release herself from the call. The coins are automatically collected when the called party answers.

At the end of the initial period, the call is returned to an operator position (not necessarily the same one) and the NFY lamp is lit to indicate to the operator that the initial period is terminated. The call further comes in with the ACS– lamp lit and with the CLG– and CLD– lamps not lit. The CHARGE, MINUTES, and RATE lamps are lit and the charge for one overtime interval, as well as the length of the overtime interval, together with the rate treatment number, is displayed on the NIXIE tubes. The charge and duration of a single overtime period is then quoted to the customer, and the operator then operates the POS RLS key to release from the call. At the termination of the call, the call is connected to an operator position and comes in as a charges-due type call. The ACS– lamp is lit steadily. The state of the CLG– and CLD– lamps depends upon whether their respective stations are on- or off-hook. The number of overtime intervals and the charge therefor are displayed in front of the operator by the NIXIE tubes. She notifies the calling party of this amount, monitors the monetary deposits, and operates the COIN COL and POS RLS keys.

There are three calling area code lamps (CA0, CA1, CA2) for the three calling areas that may be served on an originating basis by any one installation. The CA– lamp is illuminated when the operator requests a NIXIE display of the calling number. The NC, STA, NC SPL TOLL, NC DAIL 0, COIN STA, COIN SPL TOLL, COIN DIAL 0 lamps tell the operator what type of call is incoming to the position. The 00 lamp is illuminated whenever the subscriber dials 00 for an emergency call. The HOTEL GUEST lamp is used for calls made by hotel guests from hotels served by a PBX having access to our system. When the hotel PBX operator indicates the call is being made by a hotel guest, the operator of our system depresses the HOTEL GUEST key, which makes a suitable entry on the AMA tape. The outgoing trunk keys (OGT0-4) are utilized by the operator for assistance, such as rate-and-route information, maintenance desk, or information desk. The RING BACK and RING FWD keys perform the function indicated by their designation.

The KEY CLG lamp indicates to the operator that she must key the calling number into the system. This operation is required for calls on which automatic identification of the calling station is not possible because the originating office is either not supplied with such equipment or because the equipment is inoperative. The RLS FWD and RLS BACK keys perform the functions indicated by their designation. The MAKE-BUSY key is of the locking type and, when depressed, keeps any further calls from coming into the position. The POS TRFR key is of the locking type and permits the operator to transfer her talking path to the operator position immediately adjacent to her. This adjacent operator then serves the remaining calls at the deserted position by reaching over and operating the keys thereat. When the position is reoccupied, the POS TRFR key is released and the headset path is returned to the home position.

The CW lamp goes on steady at all positions to indicate that certain types of calls are waiting to be served. The CAMA CW lamp is illuminated at all positions whenever CAMA calls are waiting to be served. CAMA calls can be handled on an overlap basis.

The STA, PD, STA CR CD, STA COL, STA 3RD NO, and STA ENT keys are class-of-charge keys for AMA recording purposes. The PER PD key is also of this type. The OPR TMG key is depressed on calls which must be manually timed by the operator, rather than by the SPC. An enterprise type call is a special type call for which the charges go to the called party; for example, a call to a department store, for which the customer dials the called number and is then routed to an operator, who then bills the charges for the call to the called department store. The operator, when serving this call, keys in the actual directory number of the department store together with the enterprise designation. The COIN COL and the COIN RET keys perform obvious functions indicated by their designation.

The CNL TMG key and lamp is used whenever there is a change in the class of charge on a cell. For example, if the operator first operated the STA PD key and then, before operating the POS RLS key, the customer indicated that he desired to make the call on a collect basis, the operator would erase the initial AMA entry by operating the CNL TMG key. This extinguishes the ST TMG lamp so that the operator can then operate the STA COL key and lamp, together with the ST TMG key and the POS RLS key. If she desires to change the call class before the ST TMG key is operated, all she does is operate a different call class key, which generates a new signal that overrides the first one. The ST TMG key indicates that the initial entry should be made on the call. If the ST TMG lamp flashes, this indicates that there is something wrong and that the operator should check to see if all required lamps are lit as her position as they should be, such as for example, the class-of-charge lamp.

The CNL CALL key and lamp is used by the operator whenever a call is established forward but, for some reason, can not be completed, such as for example, on a collect call where the charges are refused by the called station. Instead of operating a ST TMG key and POS RLS key in this case, she operates the CNL CALL key and POS RLS key. The POS RLS key releases the position from the call.

The DIS RATE key is used to display the rate treatment code on the NIXIE tubes. The DIS CLG NO key is used to display the calling number, while the same holds true for the DIS CLD NO and DIS BILL NO keys. The DIS BILL NO key is used for credit card calls and charge-to-third-party type calls, where the charges are to be billed to a station that is not involved on a connection.

The following keys are operated prior to digit keying operations: KP TRBL, KP NFY, KP BILL, KP BACK, and KP FWD. The KP TRBL is operated whenever a trouble condition is detected by the operator. The operation is followed by the appropriate digit keys and the ST key. The KP RATE key is used whenever there is a rater failure; in other words, when the SPC does not have the ability to figure out the rate treatment number. In this case, the operator looks it up herself or goes to the rate-and-route operator. Once having obtained it, she depresses the KP rate key and then the 3-digit rate treatment number on the digit keys, followed by the ST key. The KP NFY key is used whenever a customer indicates that he desires to be notified after a specified call duration of one to ten minutes. The operator in this case operates the KP NFY key, followed by the digit 0 to 9, followed by the ST key. The SPC will return the call to an operator position as a notify call, with the NFY lamp lit and the type of call lamp, together with an ACS- lamp, at the end of the notify interval. The KP BILL key is prefixed to the billing number on a credit card or charge-to-third party call. The KP BACK key is used on a CAMA call or on an ANI failure operation, when the calling number must be keyed into the system by the operator. Following the depression of this key, the 7-digit calling number is keyed in, followed by the ST key. The same operation is used on a delayed call where the operator is required to key in the calling number. The KP FWD key is used whenever a number is pulsed forward by the operator, as on a delayed call. The depression of this key is followed by the keying in of the area code, if any, followed by the called station directory number. The ST key is always operated after the keying of any digits, except in the case of a CAMA call, where only seven digits are dialed and no ST key operation is required.

FIG. 58 discloses the speech circuitry at the position. The operator speech signals are received from and transmitted to the switching network via the operator's cut-through circuit on FIG. 79. These signals are received on a 2-wire basis on the left side of FIG. 58. From there, they are extended through a 2- to 4-wire converter 5801, which applies the signals incoming to the position to the receive tip-and-ring pair 5802 and which receives speech signals from the operator position over the transmit tip-and-ring pair 5803. The receive path is extended by means of a transformer R to sleeve conductors of the A and B jacks. The transmit path is connected by transformer T to the tip conductors of the A and B jacks. The operator's headset comprises two plugs (A and B) which, when plugged into the corresponding jacks, apply the received signal to her headset receivers and apply the speech signals from her microphone to the transmit path 5803. The TEL A and TEL B jacks also have the contacts shown on FIGS. 59 and 62 of the key matrix. The contacts on FIG. 59 prevent any service request from being initiated when the operator's headset is not plugged into the TEL A and TEL B jacks. The contacts of these jacks on FIG. 62 signal the SPC in the manner elsewhere described, whether the position is attended or unattended.

The keys in the operator position which, when operated, transmit signals via the key matrix to the SPC, are represented as vertical lines on FIGS. 59 through 62. Each key on these figures has three contacts which, when the key is operated, interconnect the vertical conductor representing the key with a unique combination of three of the nine output leads. The bottom of the conductor representing the key is connected to 24 volts, and thus the depression of a key applies the 24-volt potential to the three of the nine conductors to which the key is interconnectable by its contacts. Each of conductors 1 through 9 is normally connected through resistors SR1 through SR9 to a negative 48-volt potential. The depression of one of the keys applies the positive 24-volt potential to the three of the nine conductors and leaves the remaining six conductors at the negative 48-volt potential. For example, the STA PD key is connectable, by means of its contacts on the left side of FIG. 59, with conductors 1, 3, and 8. The depression of this key applies 24 volts positive to these three conductors and leaves the remaining six conductors at a negative 48-volt potential. The SR conductor on the left side of FIG. 9 is connectable, by means of diodes SD1 through SR9, with all of conductors 1 through 9, and therefore the depression of any key applies a positive 24-volt potential to it.

The signals on conductors 1 through 9 and SR are transmitted to the SPC via the scanner in such a manner that, when a key is depressed, the scanner recognizes the potential on the SR lead as a service request, following which it scans the nine output conductors for this position and transmits an indication of its potentials thereon to the SPC via the scanner. The particular combination of output conductors energized indicates to the SPC the key currently being depressed.

Figure 59:
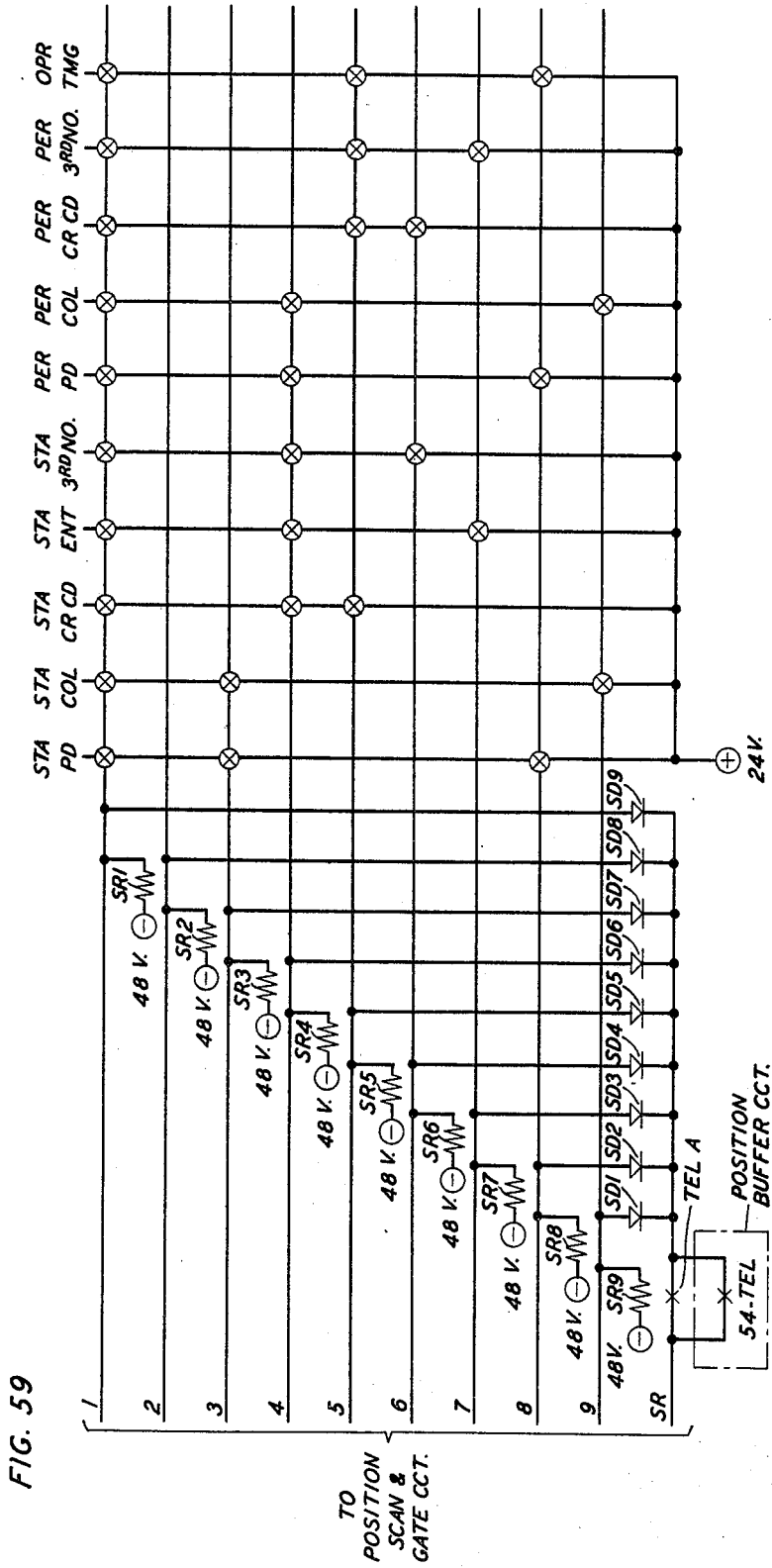
Figure 60:
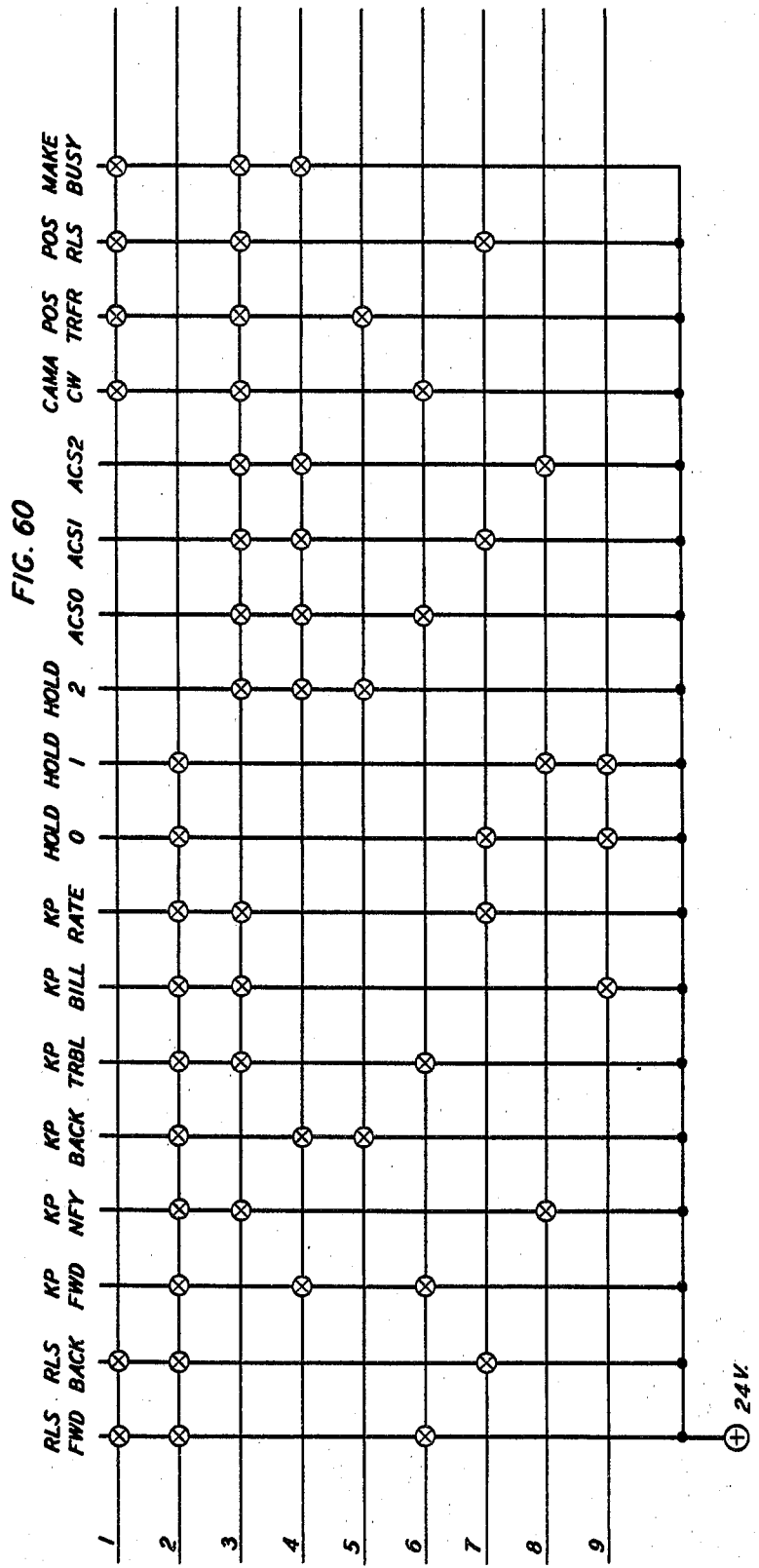
Figure 61:
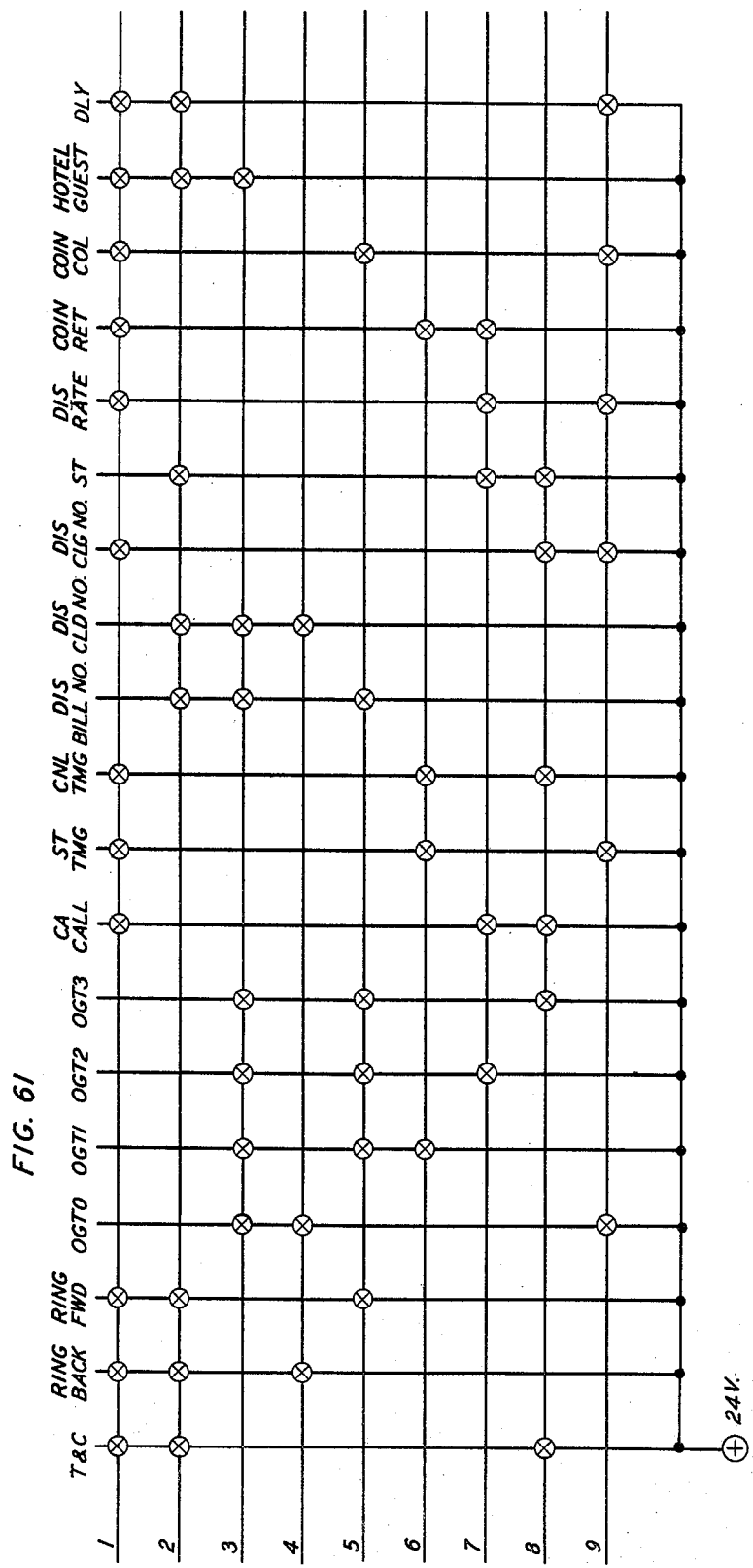
Figure 62:
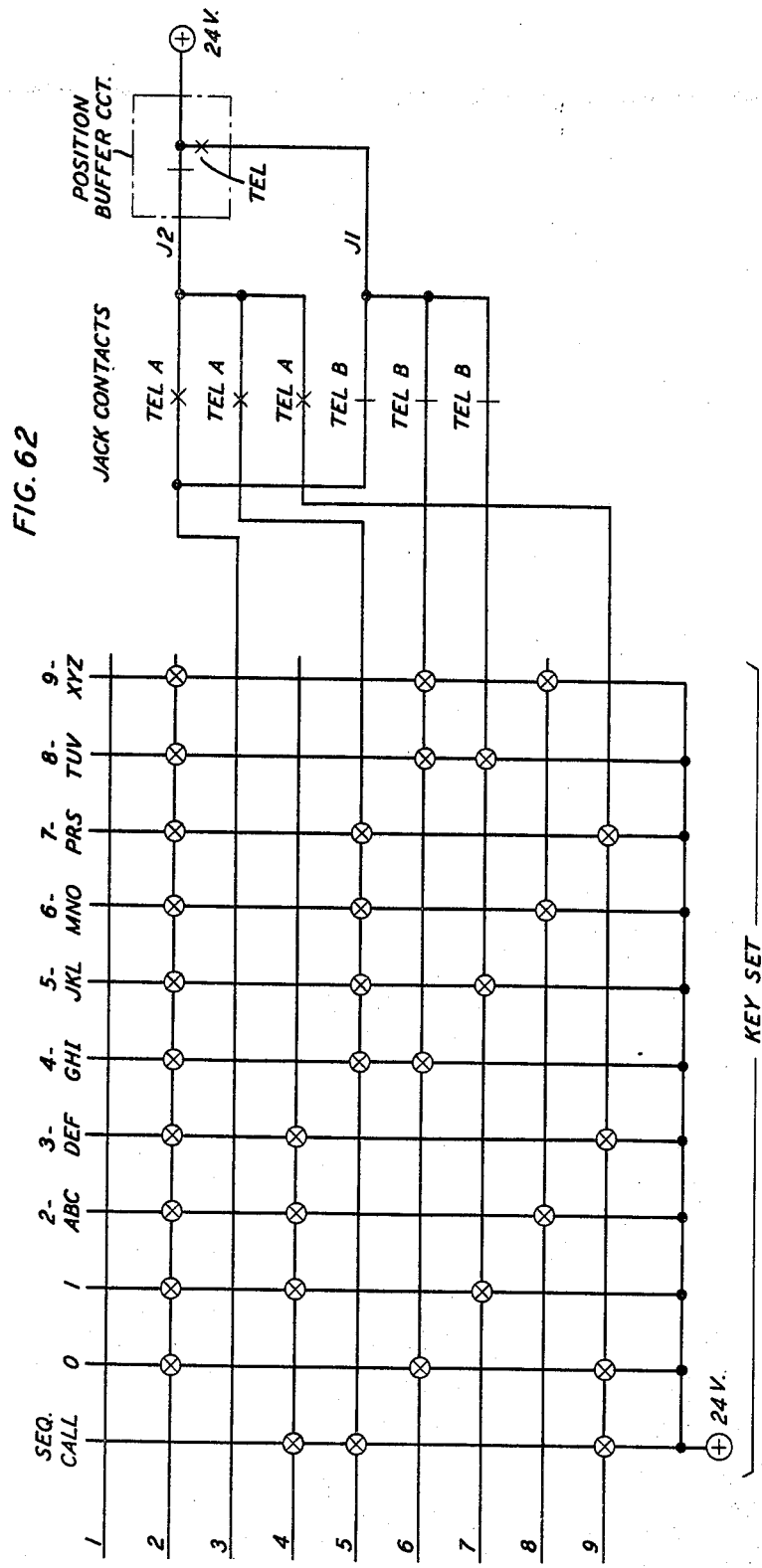

The matrix keys on FIGS. 59, 60, and 61 represent the miscellaneous type keys which are operated in various combinations, depending upon the type of call being served. The matrix keys on FIG. 62 designated "0" through "9," together with alphabetical designations for keys 2 through 9, are analogous to the conventional rotary dial, and these keys, when depressed, transmit digital information to the SPC in the same manner as would a rotary dial.

The following paragraphs describe the numbered input conductors of the position buffer circuit, the relays connected to the input conductors, together with the circuit operations resulting from and associated with each position buffer relay. The description begins with input conductor 00 on FIG. 51 and proceeds sequentially, whereever practicable, in ascending numerical order, in accordance with the input conductor numbering.

Figure 51:
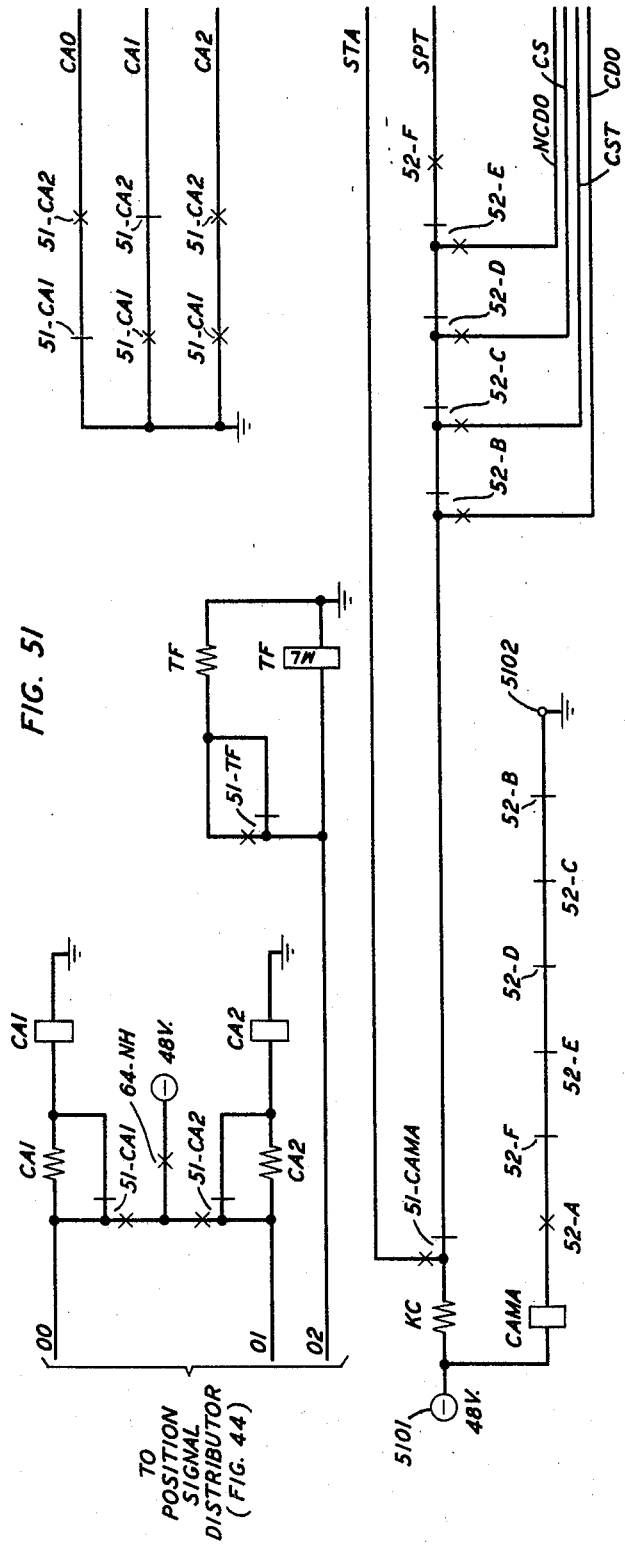

Input conductors 00 and 01 on FIG. 51 are connected through resistors to the windings of relays CA1 and CA2, respectively. These relays are operated, either singly or in combination, to illuminate one of lamps CA0, CA1, and CA2 on FIG. 63 for the calling area code information. These lamps are energized over the circuits comprising the contacts of these relays to ground on terminal 5101. The calling area information is not received automatically on a call. Rather, it is received only when the operater depresses the DIS CLG NO key. The operation of this key causes the DIS CLG NO lamp to light and also grounds conductors 1, 8, and 9 of the key matrix to transmit a request for calling number information to the SPC. When the SPC responds to the command, it operates relays 51–CA1 and CA2, either singly or in combination, to light one of lamps CA0-2. Simultaneously, the SPC transmits commands via the group gate and the position signal distributor to energize the NIXIE display circuitry of FIGS. 69 through 74 to display the calling office number, but not the calling area code. The calling area code is signified by the energized one of lamps CA0, 1 or 2. Each installation of our invention will serve calls on an originating basis from a maximum of three numbering plan areas. Each of lamps CA0, 1 or 2, represents one of the three numbering plan areas served, and thus the lighting of one of these lamps signifies to the operator the identity of the calling area code.

Figure 63:
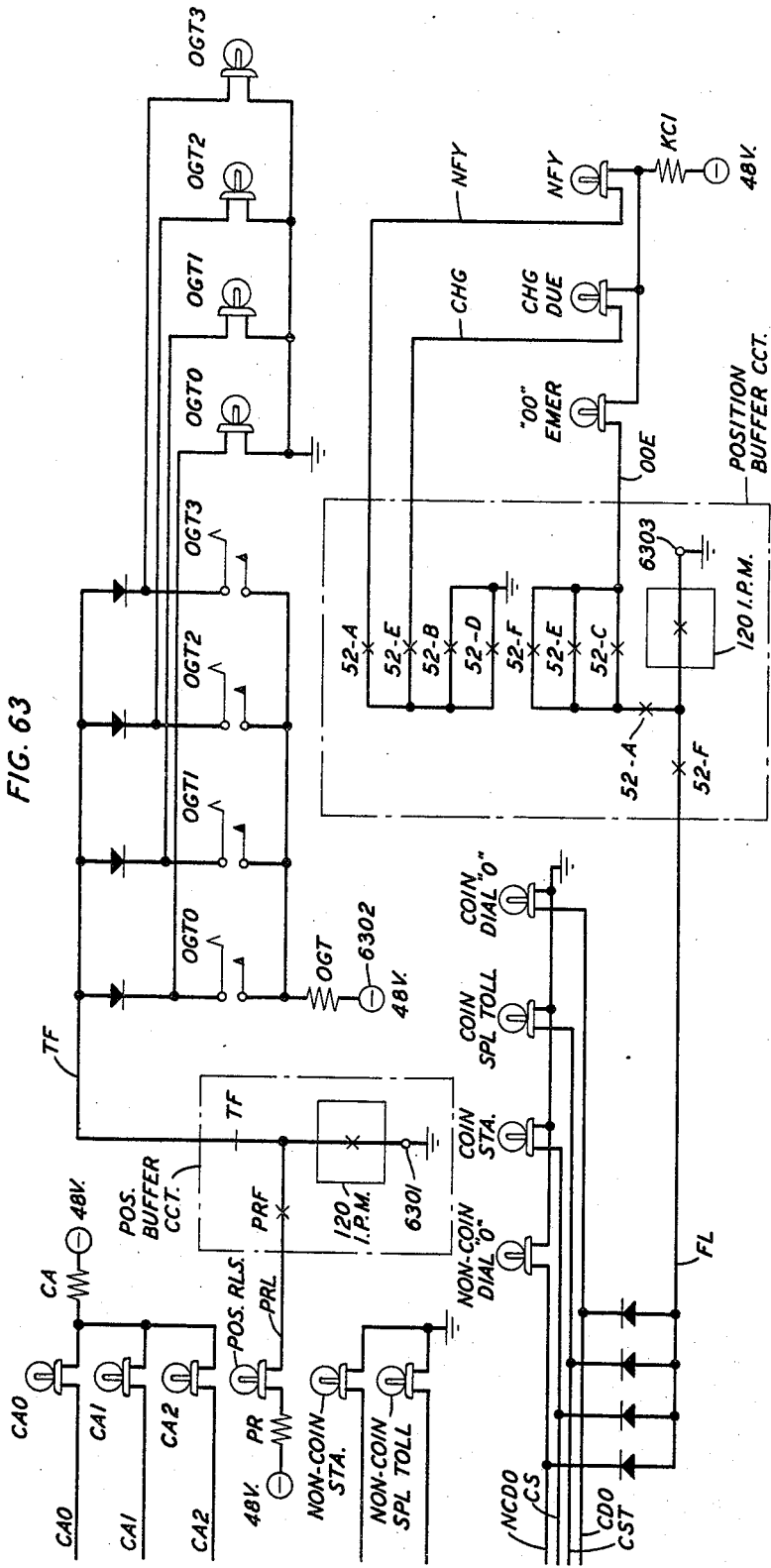

The following description pertains to input conductor 02 of the position buffer, which is connected to the 51–TF relay. The operator may often, when serving calls, wish to connect her position over one of four special trunk circuits to information operators, rate-and-route operators, et cetera. This connection is established by the switching network, under control of the SPC, in response to a request to this effect from the operator. The request for the connection is initiated when the operator depresses one of keys OGT0 through OGT3. Each of these keys represents one of the four special trunks. The operation of the selected key closes its contacts on the key matrix to transmit the service request to the SPC. The operation of the selected key also closes its contacts on FIG. 63 to extend the battery on terminal 6302 through to its associated OGT0 through OGT3 lamp. The circuitry within the dashed rectangle on the upper left-hand portion of FIG. 63 represents circuit elements actually comprising a portion of the position buffer. However, they are shown within the drawings for the position circuit in order to minimize the drawing complexity. The same expedient is used a number of times elsewhere on FIGS. 63 through 68.

At this time, relay 61–TF in the position buffer is in a released condition. Its break contacts within the rectangle on FIG. 63 extend the ground on terminal 6301 through the interruptor contacts and the associated diode to intermittently shunt the resistance battery and energize the OGT– lamps in order to cause it to flash, rather than be illuminated steadily. The SPC ultimately responds to the request transmitted by the key matrix and controls the establishment of a connection from the operator position to the requested outgoing trunk. When this is accomplished, the SPC sends a signal back to the position buffer over its 02 input conductor to operate relay 51–TF. This relay, in operating, opens its break contacts on FIG. 63 to isolate the flashing ground and thereby cause the OGT– lamp to be illuminated steadily. The lamp remains on until the operator releases the OGT– key.

The description in the following paragraphs pertains to input conductors 05 through 10 on FIG. 52, together with the circuitry associated with these conductors. When the SPC presents a call to the position, it operates one of relays A through F on FIG. 52 by energizing its associated input conductor. For some calls, more than one of these relays is operated. The relay that is operated depends upon the type of call being served. For the simplest case, let it be assumed that the call is of the noncoin dial 0 type. In this event, relay E is operated by a signal on conductor 09 and closes its make contacts on FIG. 51, thereby extending negative battery from terminal 5101 through its make contacts to the noncoin dial 0 lamp on FIG. 63 to illuminate it. In a similar manner, others of these relays may be operated to indicate a noncoin station, noncoin special toll, coin station, coin special toll, or a coin dial 0 call. The lamp that is illuminated on FIG. 63 indicates the call type, and its illumination is controlled by the operation of its associated relay on FIG. 52.

Relay 52–A is operated to close its make contacts and operate relay 51–CAMA from ground on terminal 5102. The operation of the CAMA relay closes its make contacts to illuminate the noncoin station lamp on FIG. 63. Noncoin station calls can be of the conventional CAMA type or they can be of the customer-dialed type on which there is an ANI failure.

The operated one of relays A through F locks to negative battery on terminal 5201, via the break contacts of relay PR, whose designation stands for "position release." The noncoin dial 0 lamp, together with the three lamps immediately to the right of it on FIG. 63, can be energized on a flashing, rather than on a steady basis, for a recall operation. This flashing is initiated by the operation of one of relays B, C, D, or E on FIG. 52 to light the appropriate lamp, together with the operation of relay F on FIG. 52, which closes through the 120 i.p.m. flashing ground on terminal 6303 to cause the lamps to flash. A recall situation is one in which the calling customer jiggles his switch hook contacts in order to obtain a connection to an operator position after the call has been established. The SPC recognizes the switch hook flashing and it then controls the establishment of a connection to an operator position. Once this connection is made, the connected operator knows that this is a recall by virtue of the flashing lamp.

There are instances in which the 00 emergency lamp of FIG. 63 may be operated in a flashing manner. This is accomplished by operating one of relays C, E, or F on FIG. 52 in order to prevent the operation of the 51–CAMA relay. Relay A on FIG. 52 is then operated. This closes a path from the 6303 terminal flashing ground through the make contacts of relay A to flash the 00 emergency lamp. At this time, one of the NC SPL TOLL, NC DIAL 0 or COIN SPL TOLL lamps will also be illuminated.

Figure 52:
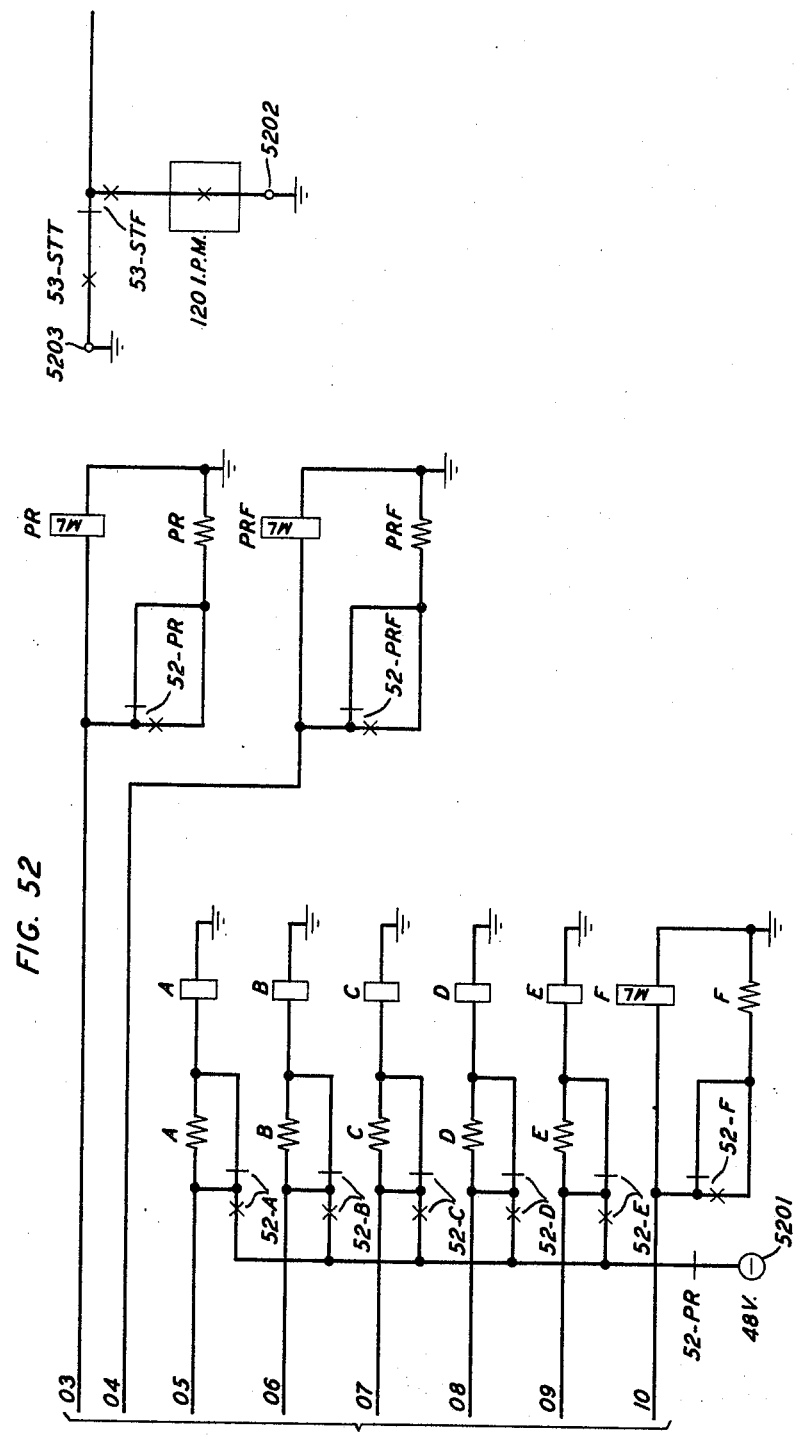
Figure 54:
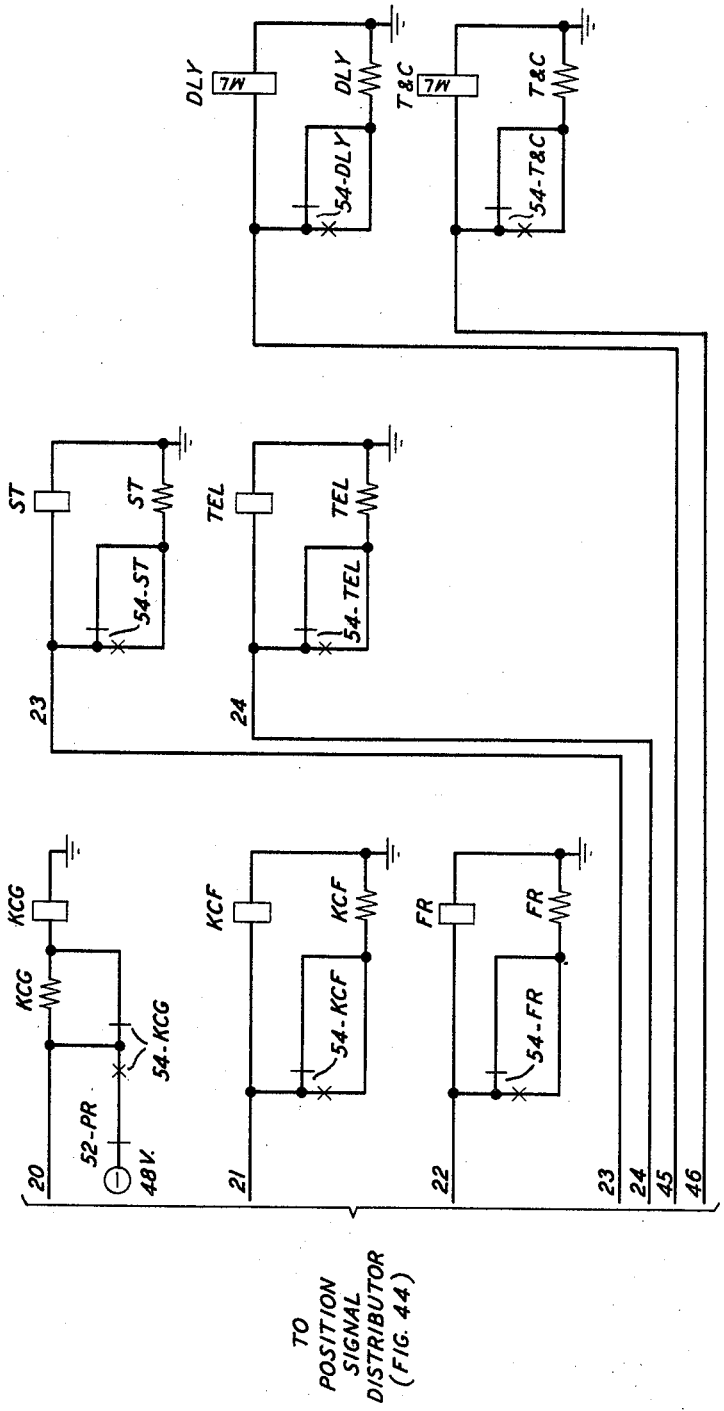

The CHG DUE lamp on FIG. 63 is lit at the end of a coin call, and at this time its lighting is accomplished by the operation of either relay D or B, together with relay E, on FIG. 52. A notify seizure is accomplished by the operation of relay B or D together with relay A. A notify seizure occurs at the end of the initial period, when the operator informs the party that his time is about up on a coin call. There is another type of notify seizure which occurs when a customer, for example, requests that the operator notify him when ten minutes is up for a coin call. In this case, the operator keys ten minutes into the SPC by her key contacts on FIG. 62. The SPC then times the requested duration and causes an operator to be connected at the end of ten minutes, or shortly prior thereto.

The operator can release her position from the call when she has completed her required call functions by operating the POS RLS key whose contacts are only in the key matrix. When the SPC responds to this command, it transmits a signal back over input conductor 03 to operate relay 52–PR. This relay, in operating, opens its break contacts in the holding path for various relays in the position buffer to release them and restore the circuit to normal.

The next description is with reference to input conductor 04 of the position buffer on FIG. 52, which is connected to relay PRF. The operator depresses the POS RLS key to release her position when she has completed the call functions. In some instances, she depresses a HOLD key, for various reasons, and immediately presses the POS RLS key so that her position may serve other calls. If she does not press the POS RLS key, the SPC sends back a command on input conductor 04 to operate relay PRF, which closes a circuit by means of which make contacts on FIG. 63 cause the POS RLS lamp to flash from interrupted ground via terminal 6301. The subsequent depression of the POS RLS key by the operator will then cause the SPC to release relay 52–PRF and terminate the flashing.

Figure 64:
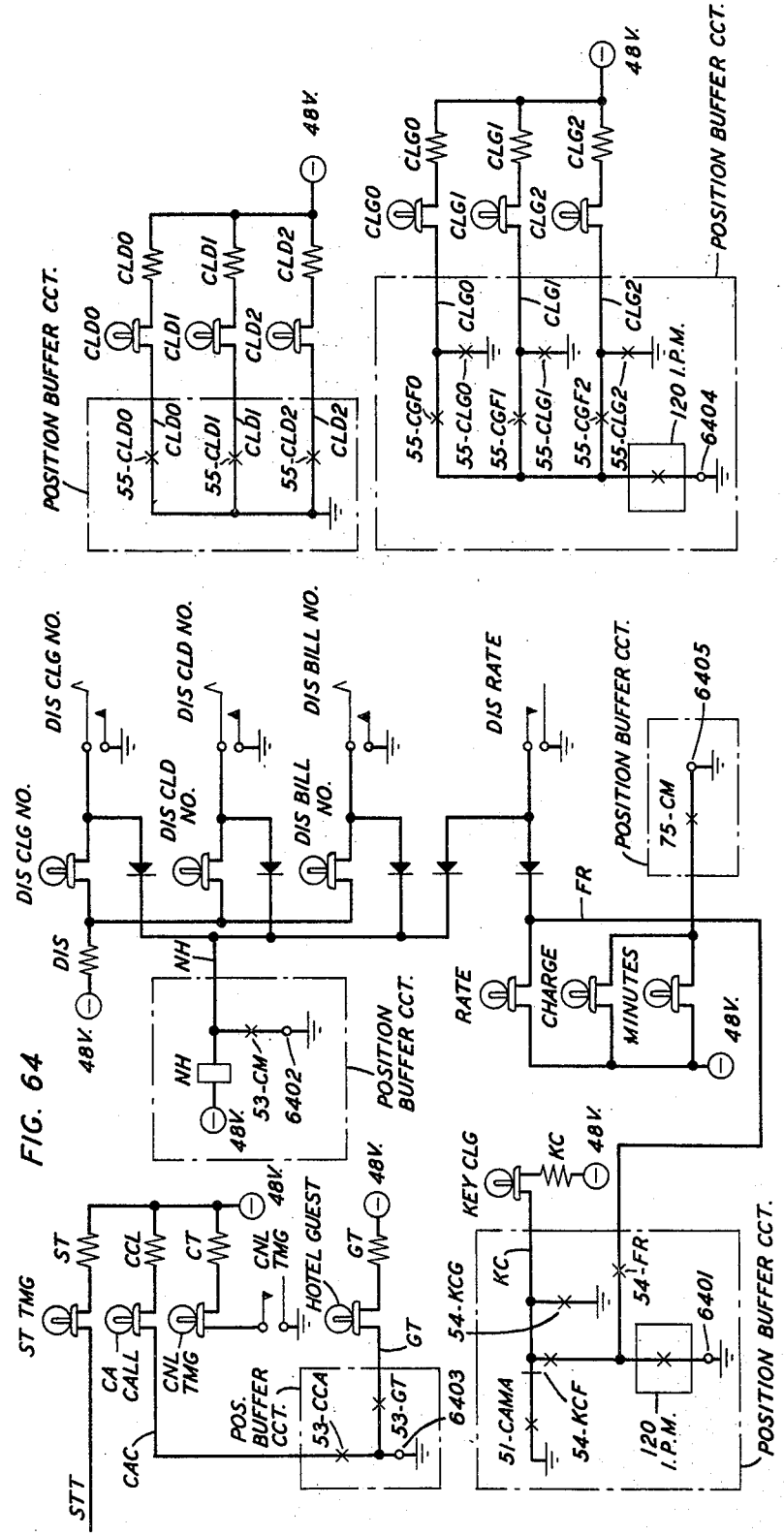

On FIG. 64, the keys designated "DIS CLG NO," "DIS CLD NO," "DIS BILL NO," energize their associated lamps when operated and, in addition, provide a path to operate the NH relay. The purpose of these keys is obvious from their designations. The remainder of the contacts of these keys are in the key matrix, and they transmit 3-out-of-9 type information back to thhe SPC when operated by the operator. The DIS BILL NO key has to do with displaying the number that is to be billed on a credit card or charge-to-third-party type call. The DIS RATE key, when operated, energizes its associated lamp and also operates the NH relay. It also has contacts in the key matrix. There are instances in which the system cannot compute the rate for certain coin calls and, in such cases, the SPC operates the FR relay by means of input conductor 22 to the position buffer on FIG. 54. This relay closes its make contacts on FIG. 64 to extend the flashing ground from terminal 6401 to the RATE lamp to flash it. In this case, the operator has to look up the rate manually and key it into the system. The operation of the DIS RATE key operates the RATE lamp and also the NH relay. The contacts of this relay within the key matrix transmit a signal back to the SPC which causes it to display the applicable rate for the call on the NIXIE tube circuitry of FIGS. 69 through 74. The operation of relay 64–CM serves to hold up the NIXIE display in a manner subsequently described in detail for the NIXIE circuitry.

The CHARGE-AND-MINUTES lamps on FIG. 64 are under control of a make contact 75–CM in the position buffer circuit. The CM relay is operated by the SPC for coin calls whenever the charges and time duration therefor are to be displayed in front of an operator. The RATE, CHARGE, and MINUTES lamps are illuminated at that time along with the NIXIE tubes in order to display the rate, charge, and call duration to the operator. Make contact 53–CM also extends ground from terminal 6402 to hold up the NH relay in order to maintain the NIXIE display. Relay CM, in operating, also closes its make contacts to extend ground from terminal 5301 back to the position signal distributor to operate relay TCA therein, which, in turn, alters the operation of the steering circuit so that a blank space is left between two adjacent displays.

Near the end of her duties on a call, the operator depresses the ST TMG key in order to instruct the SPC to start timing on a call. The contacts of this key are solely in the key matrix, and the depression of it sends the required information back to the SPC. The SPC analyzes the call information that is received from the operator up to this point and, if it has received all the information required, it sends an answer back on input conductor 14 to operate relay 75–STT. This relay, when operated, closes its contacts to energize the ST TMG lamp on FIG. 64. If the SPC has not received sufficient information from the operator, i.e., she has not depressed all the keys required of her, it sends back an answer on input conductor 15 to operate relay 75–STF. This relay closes its make contacts on FIG. 52 to extend the flashing ground from terminals 5202 to the ST TMG lamp to cause it to flash. At this point, the operator checks her activities up to this point on the call and performs the additional duties required of her before the ST TMG lamp can be extinguished.

In the event a call cannot be completed successfully; for example, if the called line is busy or the wanted person on a person-to-person call is not available, the operator depresses the CNL CALL key, which represents "cancel call." The contacts of this key are only in the matrix. The SPC responds to the reception of this information by sending an answer back on input conductor 16 to operate relay CCA on FIG. 53. The operation of this relay then closes its make contacts on FIG. 64 to operate the CNL CALL lamp. Once the operator sees this lamp illuminated, she depresses the POS RLS key to release herself from the connection. She may also set up a new connection if requested by the calling party.

There are a number of instances in which the operator may desire to change the type of billing on a call, such as for example, changing from station to person-to-person, or vice versa. In this case, if the ST TMG key has already been depressed, she must then depress the CNL TMG key on FIG. 64. The depression of this key energizes its associated lamp and, in addition, closes it contacts of the key matrix. The SPC responds to this signal by releasing relay 53–STT over input conductor 14.

Certain calls are made by hotel guests served by the switching network. Once the operator is informed by the PBX operator that this is a hotel guest call, she operates a HOTEL GUEST key which closes its contacts in the key matrix to signal the SPC. The SPC responds to this signal by operating relay 53–GT over input conductor 19. The operation of the relay, in turn, causes the corresponding lamp on FIG. 64 to be illuminated.

There are certain instances in which the operator must key the calling number into the system. The reasons for doing this vary depending upon the type of call, such as for example, ANI failure, et cetera. The SPC notifies the operator of this situation by operating either relay 54–KCG, via input conductor 20, or relay 54–KCF over input conductor 21. The operation of relay KCG energizes the KEY CLG lamp on FIG. 64, while the operation of the KCF relay causes the KEY CLG lamp to flash from ground on terminal 6401. The flashing lamp notifies the operator that this is an ANI failure, rather than a call of the type which normally must have the calling number keyed into it by the operator.

On CAMA calls, the operation of the 52–A relay, via input conductor 05, operates the 51–CAMA relay which, in turn, energizes the KEY CLG lamp. The operation of the CAMA relay also energizes the KP BACK lamp on FIG. 66 from ground on terminal 6601. The illumination of this lamp informs the operator that she does not nave to depress the KP key for a keying operation at this time.

There are certain calls for which the operator, once she depresses the ST TMG key, sees it flash in response to a signal from the SPC. This tells her that she has to time the call manually. In this case, she operates the OPR TMG key on FIG. 67, which operates its associated relay and, in turn, its associated lamp. The contacts of this relay in the key matrix also signal the SPC when the key is depressed. The resistance battery for the OPR TMG lamp comes from the terminal 6501 and break contacts of the 51–CAMA relay shown on the upper left-hand corner of FIG. 65.

There are certain calls for which the SPC tells the operator that she must manually time the call. It does this by operating relay 53–OTF via input conductor 17. The operation of this relay closes its make contacts to apply a flashing ground to the OPR TMG lamp on FIG. 67 from terminal 6701.

Figure 65:
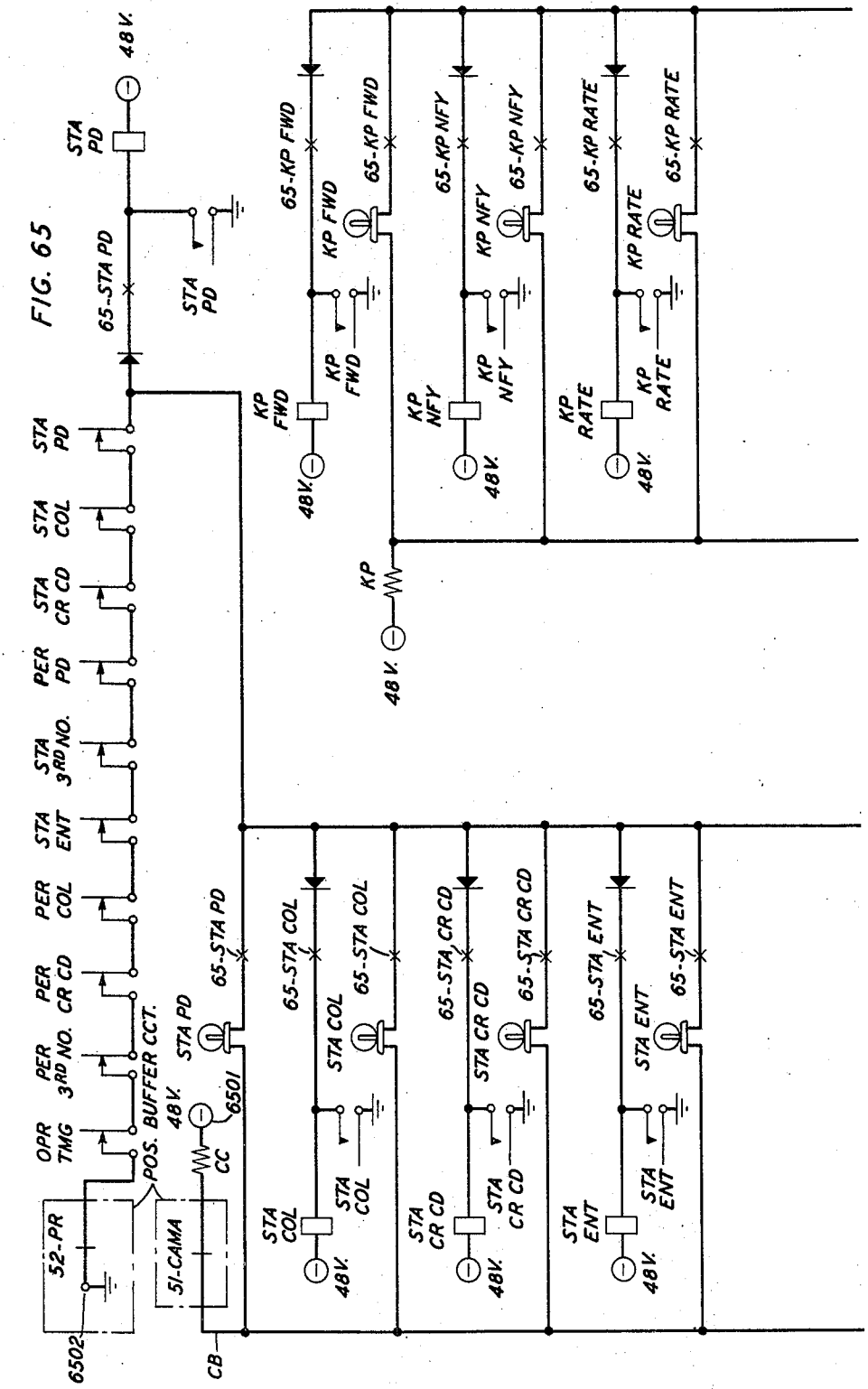

Prior to keying a called number forward, the operator must operate the KP FWD key on FIG. 65. The operation of this key operates its associated relay and, in turn, energizes its associated lamp. Contacts of this key in the key matrix also signal the SPC. If the operator keys improper information, the SPC signals back over input conductor 18 to operate relay KPF which, by means of its contacts on FIG. 67 extend the 6701 terminal flashing ground to FIG. 65 to flash the KP FWD key, it releases the 53–KPF relay.

The KP NFY, the KP RATE, the KP TRBL, the KP BILL, and KP BACK keys are all operated in a manner analogous to that for the KP FWD key and, similarly, they may be caused to flash by the SPC when it operates rleay KPF in the manner already described. The KP BILL key is operated in connection with a keying operation in which the identification of the party to be billed for the call is entered into the system. The KP TRBL key has to do with a special 2-digit code the operator keys into the SPC to inform it of certain trouble conditions. The KP NFY key has to do with the fact that the operator depresses it to inform the SPC that this is a notify type call for which the calling party desires to be notified after a certain time period has elapsed. Following the operation of this key, the operator keys in the time in minutes the calling party wishes to converse before he is notified. Each of the aforementioned KP type keys, when operated to operate their associated relays, permits their relay to lock up over a path to ground, via break contacts 54–ST and 52–PR, to the terminal 6602 ground. This path also includes the back contacts of the KP type keys. A subsequent operation of a KP key, after a first KP type key has been operated, opens the holding path for the first KP type relay to release it.

Figure 66:
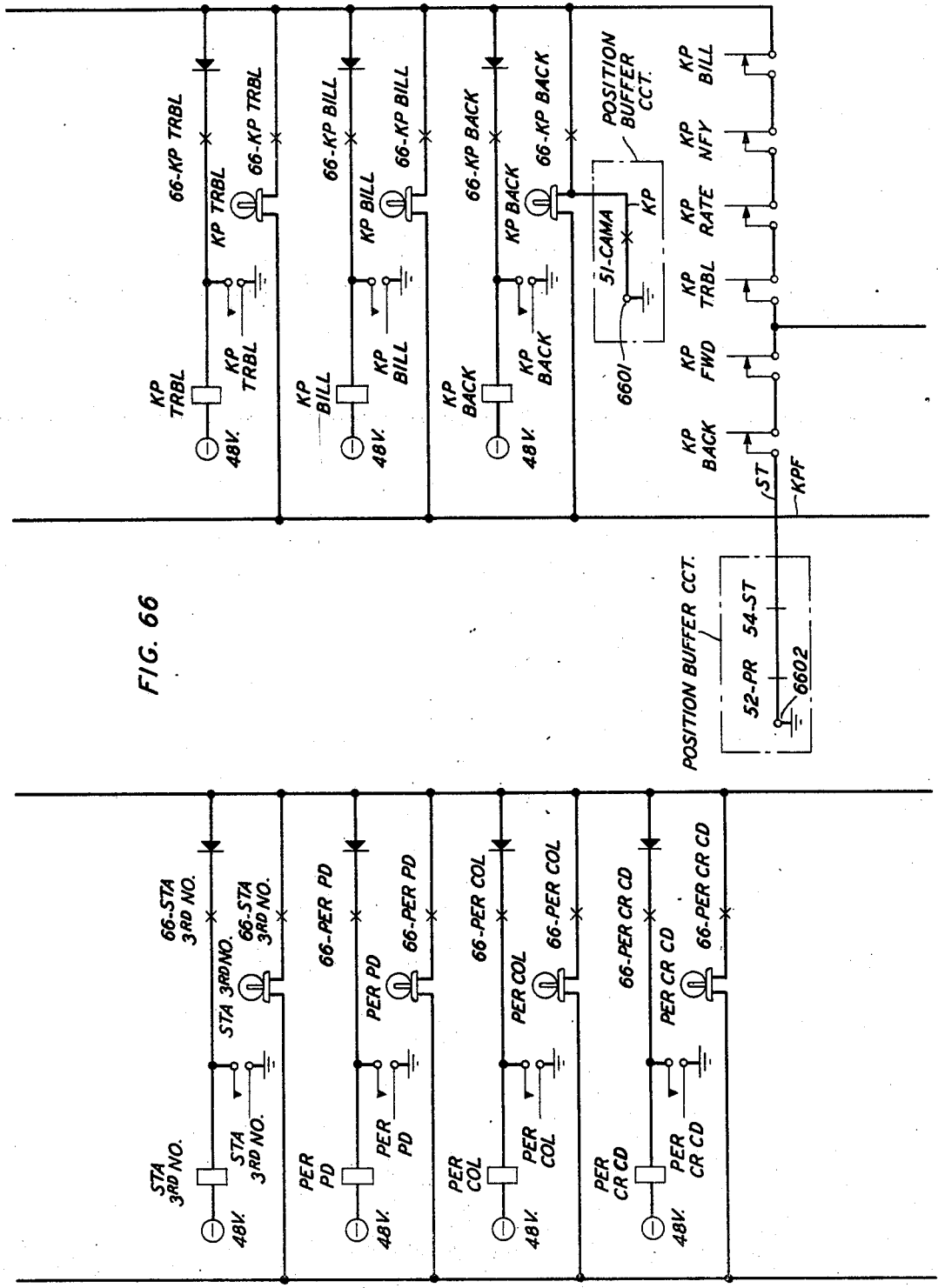
Figure 68:
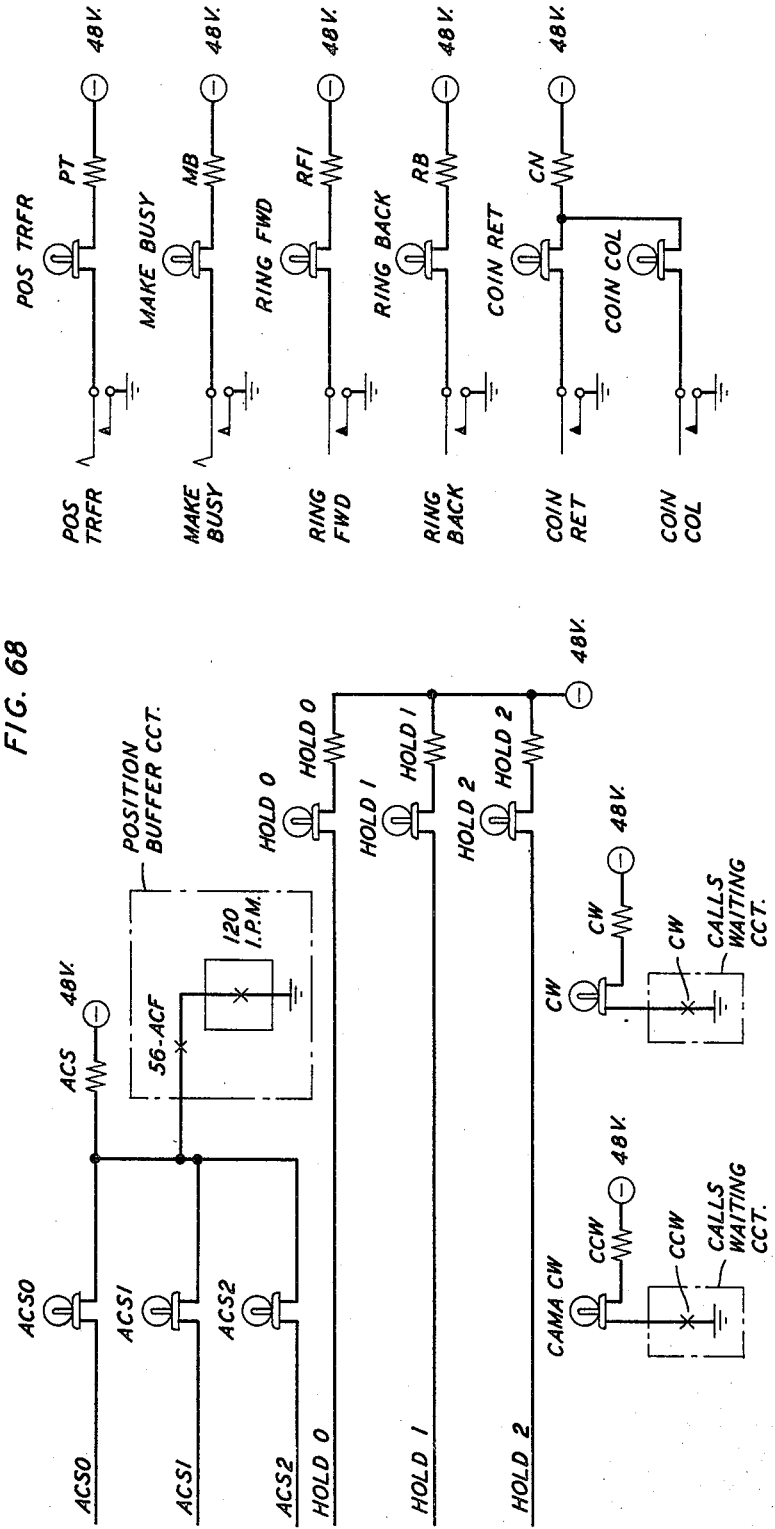

The column of lamps and keys starting on the top left-hand side of FIG. 65, with the designation "STA PD," and going down through FIG. 66 to the top of FIG. 67 and ending with the designation "PER 3RD NO" represent the class-of-charge information applicable to the different types of calls. The operation of a key by an operator operates its associated relay and, in turn, lights its associated lamp. A relay, in operating, locks up over a holding path, including the break contacts of all the keys in series and break contacts of relay 52–PR, to the terminal 6502 ground. These keys also have contacts in the key matrix and, when operated, signal the SPC regarding the type of charge information for the call.

If a CAMA overlap call comes in while the operator is serving another type of call, the relay 51–CAMA operates and, by means of its break contacts on the upper left-hand corner of FIG. 65, extinguishes the energized class-of-charge information lamp. However, the associated relay for the lamp remains held operated to the terminal 6502 ground so that when the CAMA call has been served, the CAMA releases and the lamp goes back on.

On any keying operation, the operator terminates her keying function by operating the ST key, whose contacts are in the key matrix. This signals the SPC, which then returns a signal to operate relay 54–ST by means of input conductor 23. This relay, in operating, removes the holding path for any KP– relay on FIGS. 65 and 66 and thereby causes it to release and de-energize its associated lamp. The two keys entitled "RLS FWD" and "RLS BACK" on FIG. 67 are effective when depressed to operate their associated relays and lamps. Either relay, operated, locks over the break contacts of the KP FWD and KP BACK keys and break contacts of relays 54–ST and 52–PR to the terminals 6602 ground. With this arrangement, either relay releases whenever the KP FWD or KP BACK key is operated, or if the ST or PR relay is operated.

The 54–TEL relay connected to input conductor 24 is operated by the SPC in connection with the TEL A and TEL B jack contacts on the right-hand side of the key matrix. When the operator plugs her headset into the A and B jacks of FIG. 58, the contacts of these jacks close their make contacts on FIG. 62 to energize the indicated combination of three matrix output conductors to signal the SPC that the operator is plugged into her position. Similarly, if the operator unplugs from the position, the break contacts of the TEL B jack on FIG. 62 energizes a different combination of matrix conductors. The transfer contacts of the 54–TEL relay are connected to these TEL A and TEL B jack contacts in order that the SPC may operate the relay as required to remove the signals provided by these jack contacts from the matrix, once it has responded thereto. For example, when an operator first plugs in, the positive 24-volt potential is extended through the TEL break contacts and through the make contacts of the TEL jacks to the indicated three conductors. The SPC then operates the 54–TEL relay so that this 24-volt potential will be removed from these three conductors.

On FIG. 55, the SPC can operate one of the calling lamps and one of the called lamps for a particular loop to inform the operator whether the associated parties are on-hook or off-hook. The lamps associated with the calling and called stations are on the right side of FIG. 64. The designation "CLG0" represents "calling loop 0," while the designation "CLD0" represents "called loop 0." The CGF– relays on FIG. 55 are utilized in situations in which a call has been on HOLD in a particular loop and the calling party for the held call then jiggles his switch hook to notify or attract the attention of the operator. Since, when a call goes on HOLD, the operator is disconnected by the link from the circuit, the SPC, in this instance, detects the switch hook jiggling and operates the associated CGF– relay, which, on the lower right-hand side of FIG. 64, causes the associated calling lamp for the loop to flash. The SPC, in the meantime, has reconnected the call to the operator position. The operator then operates the ACS key for the loop 1, and the SPC, in turn, comes back and operates the associated ACS– relay on FIG. 56. The operation of the ACS– relay then opens its break contacts on FIG. 55 to release the operated CGF– relay. On FIG. 56, the hold relay (HD–) for a loop is operated by the SPC after the operator depresses the HOLD key for the loop whose contacts are only in the key matrix. The call then goes on HOLD, and it is controlled by the SPC. The HOLD lamp on FIG. 68 remains energized as long as its associated HOLD relay remains operated.

The HF0 through HF2 relays on FIG. 56 concern a situation in which an operator is serving a call and then serves a CAMA call on an overlap basis. The SPC, in this case, causes the associated HF– relay to operate, which, by means of its contacts on FIG. 57, causes it associated HOLD lamp on FIG. 68 to flash. This flashing potential is applied from the terminal 5701 ground.

The access relays ACS– for the various loops are operated by the SPC on FIG. 56 when the call is initially offered to the operator position. The access relay, when operated, closes a path to illuminate its associated lamp on FIG. 68. The 56–ACF relay is provided so that the SPC can operate it and cause an ACS lamp on FIG. 68 to flash in order to inform the operator of the trouble condition. The back contact of the 51–CAMA relay on FIG. 57 puts out the ACS lamp for the duration of a CAMA overlap call. On FIG. 68, the POS TRFR (position transfer) key and lamp signal the SPC to transfer the operator's headset to the next adjoining position. The MAKE–BUSY key performs the same function, except that it makes the position busy. The RING FWD key signals the SPC to apply a signal to the forward connection to effect ringing of the called station. The RING BACK key does the same for the back connection. The COIN RET key and COIN COL key signal the SPC to perform the obvious indicated functions.

On FIG. 59, the TEL A jack contact is provided so that no potential will be sent out over the SR lead due to the inadvertent depression of the keys after the operator has abandoned the position and pulled her headset plugs out of the TEL jacks. However, this jack is shunted by a make contact of the 54–TEL relay in the position buffer in order that one service request may go out so that a signal can be sent to the SPC indicating that the operator has left her position and unplugged her headset from the jack. In other words, once the operator abandons her position, it is necessary that the SPC be notified of this via the jack circuitry on the right-hand side of FIG. 62. Relay TEL remains operated at this time, and its make contacts on FIG. 59 allow a signal on the SR lead to be put out for this one function to inform the SPC that the operator is no longer at her position.

The SPC then releases the TEL relay and, from then on, no further signals can be applied to the SR lead until the operator returns to her position.

Figure 69:
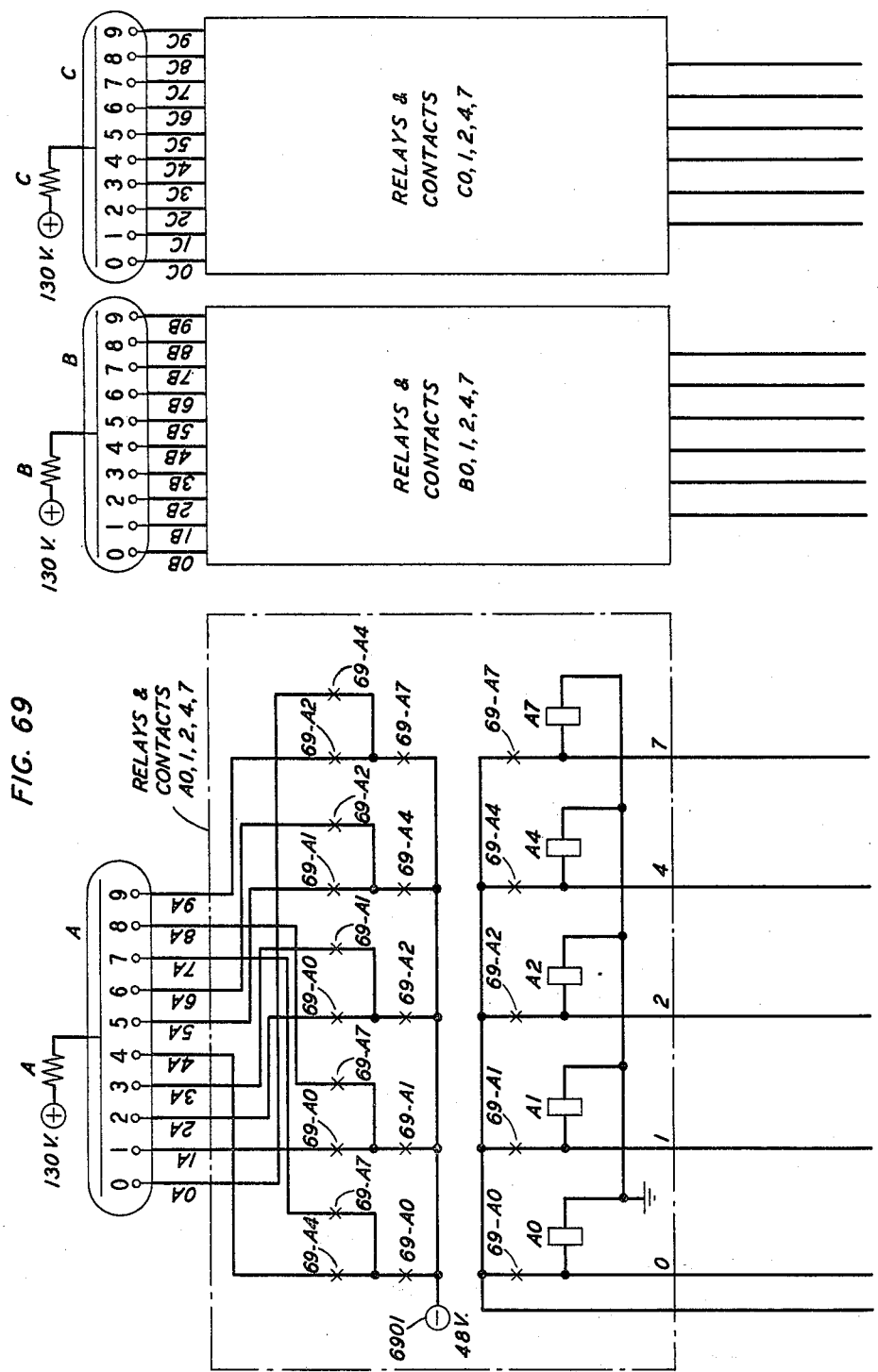
Figure 70:
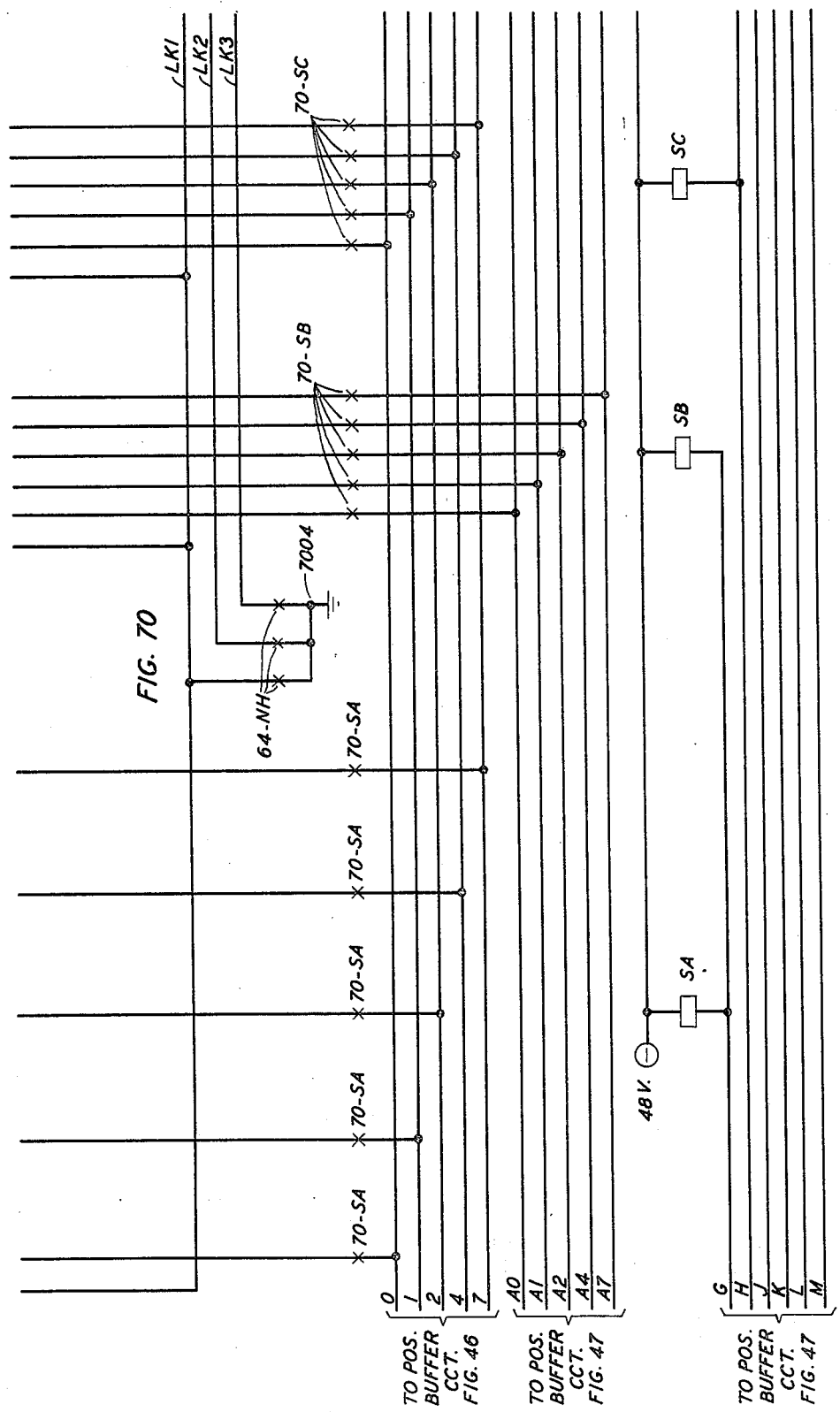
Figure 71:
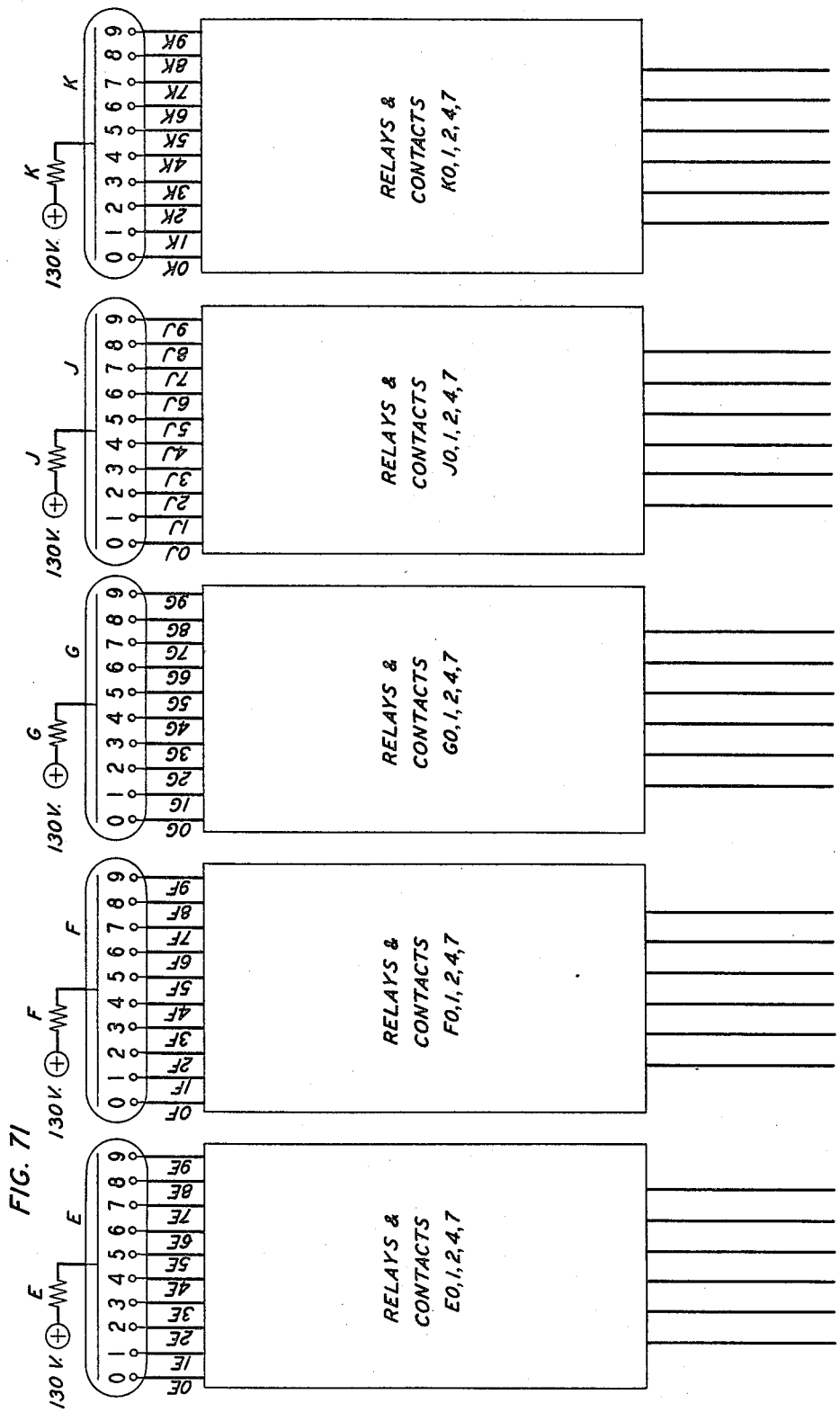
Figure 72:
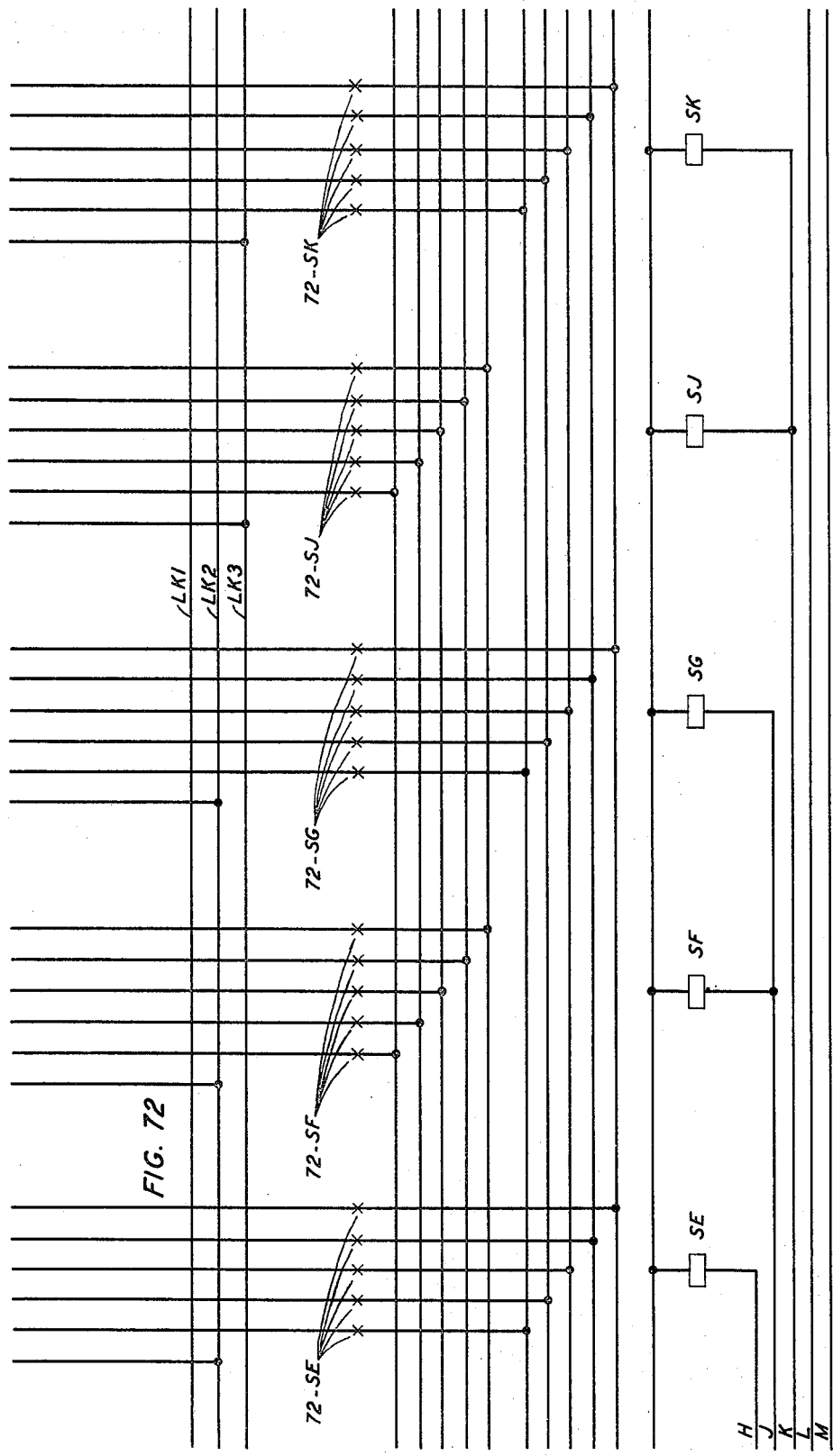
Figure 73:
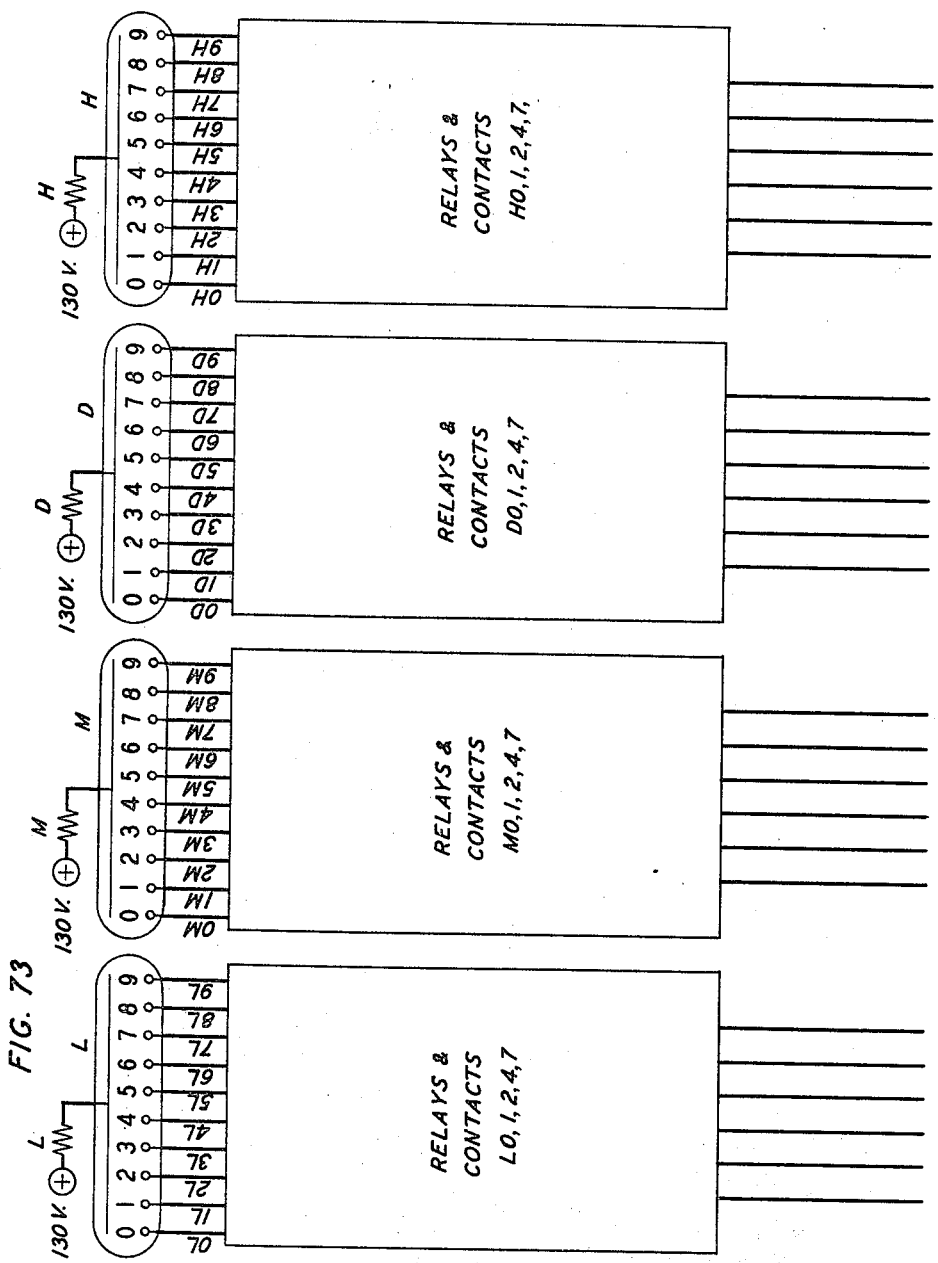
Figure 74:
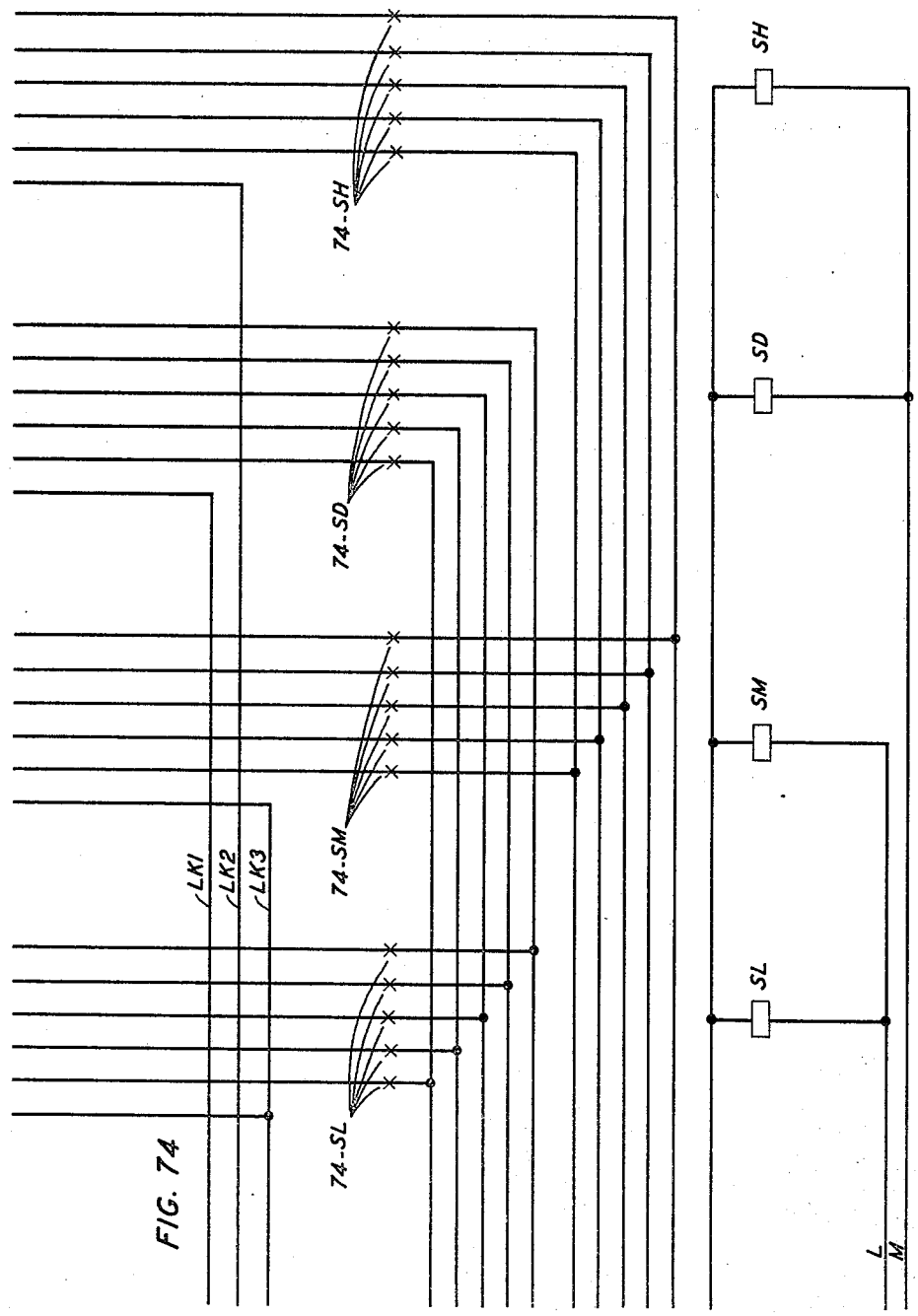

The NIXIE display tube circuitry is shown on FIGS. 69 through 74. FIGS 69, 71 and 73 disclose a plurality of NIXIE display tubes, designated "A" through "H." The control circuitry for these tubes are in the rectangles immediately therebelow, with the control circuitry for the tube A being shown in detail. The circuitry shown on FIGS. 70, 72, and 74 comprises the steering circuit by means of which the output information from the position signal distributor is steered to the proper NIXIE tube.

The NIXIE tubes are energized, two at a time, by the position signal distributor, with the display being initiated with the illumination in the rightmost two NIXIE tubes, i.e., D and H, and with the successive displays advancing leftwards two NIXIE tubes at a time. The numerical output information from the position signal distributor is applied in 2-out-of-5 code form to two sets of conductors, one of which is designated "0, 1, 2, 4, 7" on the left-hand of FIG. 70, and the other set being designated "A0, A1, A2, A7." These conductors extend across the bottom of FIGS. 70, 72, and 74, and are connected to alternate NIXIE tubes by means of the steering relays. The steering relays are designated "SA" and "SB" through "SH," and are connected in pairs to the steering conductors designated "G" through "M" on the bottom of FIGS. 70, 72, and 74. Thus, relays SA and SB are connected to conductor G, relays SE and SF to conductor H, et cetera, with relays SD and SH being connected to steering conductor M. The application of a steering potential to one of these conductors energizes its associated two steering relays whose contacts, in turn, close to interconnect the two groups of digit conductors with the control circuitry of their respective NIXIE tubes. Let it be assumed, for example, that a steering potential is applied to conductor G to steer data to tubes A and B. This operates relay SA and SB. The make contacts of relay SA close and interconnect the control circuit for tube A with the conductor group designated "0, 1, 2, 4, 7." The make contacts of steering relay SB close and interconnect the control circuit of NIXIE tube B with the digit conductor group designated "A0, A1, A4, A7." Each input conductor is connected to the winding of an individual relay, with the relays for NIXIE tube A being designated "A0, A1, A2, A4, A7." The two A– relays now operate in accordance with the two conductors energized at this time by the position signal distributor. In other words, if conductors 1 and 2 are energized to represent a "3," relays A1 and A2 now operate. The contacts of the A– relays are connected to form a 2-out-of-5 to 1-out-of-10 translator in such a manner that the cathode of the NIXIE tube is operated, which represents, in decimal form, the two A– relays operated. Thus, if relays A1 and A2 are operated, the battery on terminal 6901 is extended through make contacts A2 and, in turn, make contacts A1, to the cathode of the tube which, when illuminated, causes the tube to display the digit 3. The A– relays, when operated, lock to the negative battery provided by terminal 7001, so that the display in the tube remains energized when the steering circuit advances to the next tube. The displays in the other NIXIE tubes are operated in a manner identical to that described for tube A. An existing display is erased by the operator when she causes the 64–NH relay to operate and close its make contacts on FIG. 70 to permit the terminal 7004 ground to cancel the resistance battery holding up the A– relays for tube A and the corresponding relays for other NIXIE tubes.

The T and C key, the DLY key and the SEQ CALL key are operated to provide call service of the type elsewhere described in this specification. The DLY lamp and the T and C lamp are lit when a delayed call or time and charge seizure arrives at a position.

Position scanner—FIGS. 76–78

The position scanner is shown on FIGS. 76 and 77, when arranged with respect to each other as shown on FIG. 78. The purpose of this circuit is to transmit signals to the master scanner and, in turn, to the SPC, whenever a key at any operator position is depressed. The transmitted signal identifies both the key that is depressed and the operator position at which the key is located. The position scanner is connected to the output conductors of the key matrix in each operator position and performs its functions of transmitting information to the master scanner solely in response to signals supplied to it by these matrix conductors whenever a position key is depressed.

The information sent to the master scanner from the position scanner is transmitted over cable 7601 on FIG. 76 and over cables 7701 and 7702 on FIG. 77. Cable 7601 contains nine conductors, which transmit signals in a 3-out-of-9 code identifying a depressed key in the same manner as the key information is transmitted to the position scanner from the nine output conductors of each key matrix. Cable 7701 contains seven conductors and, whenever a key is depressed, it transmits signals identifying the address of the operator position at which the depressed key is located.

The nine conductors of cable 7601 and the seven conductors of cable 7701 are each connected to an individual ferrod in the master scanner. The 16 ferrods to which the conductors of these cables are connected are arranged in a single scanner row so that the SPC, by interrogating this scanner row, may determine in one scan the identity of the depressed key as well as the position at which the key is located.

Conductor 7702 comprises a signal-present lead and is connected to a separate ferrod in the master scanner. This conductor and its ferrod are energized whenever any key at any position is being depressed. The SPC and the master scanner operate in such a manner that the ferrod for conductor 7702 is cyclically scanned to determine whether any key at any position is currently depressed. If no key is depressed, no scanning is necessary for the ferrods of cables 7601 and 7701. On the other hand, if the ferrod for conductor 7702 is energized, this signifies that a key is currently being depressed, and the SPC and the master scanner then scan the ferrods for cables 7601 and 7701 to identify the key being depressed as well as the position in which it is located.

The input conductors for the position scanner are shown on the right side of FIG. 76 and comprise the output conductors of the key matrix in each of positions 2 through 63. These conductors are shown in detail for position 63 and comprise the conductors designated "1" through "9" and "SR". As already mentioned in connection with the description of the position circuit, conductor SR is driven from ground to a +24-volt potential when any key at its position is depressed. At the same time, information signifying the identity of the currently depressed key is transmitted, in 3-out-of-9 code form, over the conductors 1 through 9. Each of these nine conductors is normally held at a negative 48-volt potential. However, during the depression of a key, the three conductors associated with the key are driven to a positive 24-volt potential while the remaining six conductors remain at negative 48 volts.

The output conductors 1 through 9 of each position extend into a cable 7606 individual to each position, with the cable for position 63 being designated "7606–63." The SR conductor from each key matrix extends into circuitry comprising a service-request generator 7607 for each position, with the service-request generator for position 63 being shown in detail and being designated "7607–63."

Each cable 7606 extends from the key matrix of its position to the input of an AND gate 7604, with cable 7606–63 being connected to the upper input of the AND gate 7604–63. Each AND gate 7604 actually comprises nine AND gates, in accordance with the shorthand notation priorly described with reference to FIG. 10. In other words, since cable 7606–63, extending into the upper input of AND gate 7604–63, contains nine separate conductors, AND gate 7604–63 represents nine AND gates, each of which has as its input an individual one of the nine conductors in cable 7606–63. The lower input of the nine AND gates 7604–63 are multipled together and connected to the output of inverting OR gate 7605–63.

Each cable 7610, such as cable 7610–63 for gates 7604–63, contains nine conductors which interconnect the outputs of the nine gates 7604–63 with one input of each of the nine OR gates 7602, which are represented as a single OR gate on FIG. 76, in accordance with the shorthand notation described with reference to FIG. 10. The output of the nine OR gates 7602 extend into cable 7601, whose other end terminates on nine ferrods of the master scanner.

The depression of a key at a position energizes three of its nine output conductors, as already discussed, and thereby energizes three of the conductors in its associated cable 7606. This, in turn, applies a positive potential to the upper input of three of its associated nine AND gates 7604. Each AND gate 7604 is normally turned off by virtue of a low on its lower input from the output of gate 7605. Therefore, the application of a positive potential to the upper input of any AND gate 7604 does not turn it on.

The SR output conductor from the key matrix of each position is connected to an individual service-request generator in the series designated "7607–2" through "7607–63." Each service-request generator has three inputs. The upper input of each is connected via conductor 7608 to the output of monostable pulse generator 7611. The output of this generator is normally low. The SR conductor extends to the middle input of each service-request generator and is normally low, except when one of the keys in its matrix is being depressed. At this time, the potential of the SR conductor changes from ground to +24 volts. The bottom input conductor of each service-request generator is connected to one of leads EN2 through EN63. These leads extend, via cable 7609, to the correspondingly designated outputs of translator 7705. This translator functions in connection with the rest of the circuitry on FIG. 77 to apply a positive scanning potential to leads EN2 through EN63 sequentially, one lead at a time, in the manner subsequently described. Each EN– lead remains at a ground potential when it is not momentarily driven positive by the output of the translator.

The circuitry of FIG. 77 provides the control and timing signals so that the plurality of position circuits may be scanned sequentially and continuously to determine whether any keys are currently being depressed. The heart of this control circuitry is the 40-kc. oscillator 7703. This oscillator is normally free-running and provides an output signal to the 6-order binary counter 7704. Each order of this counter is connected over an individual conductor to the binary to 1-out-of-64 translator 7705. The outputs of this translator are designated "EN2" through "EN63" and each extends to the lower input of an individual one of the service-request generators 7607. The 6-order binary counter counts 64 ($2^6$) input pulses before returning to initiate a new cycle. This permits it to apply 64 different combinations of output potentials to the six conductors extending to the input of translator 7705. Each different potential combination may be considered to comprise a 6-bit binary word. Each 6-bit binary word received by the translator is decoded into a 1-out-of-64 indication in such a manner that conductors EN2 through EN63 are energized sequentially with a positive 24-volt potential as the 40-kc. oscillator drives the binary counter.

Each service-request generator 7607 contains an AND gate, such as gate 7614 for service-request generator 7607–63, which is normally off and which must be turned on before key matrix information may be transmitted over its associated cable 7606 and through its associated AND gate 7604 to the master scanner ferrods via OR gate 7602. Each service-request generator also comprises a flip-flop comparable to flip-flop 7613 for service-request generator 7607–63. Flip-flop 7613 is normallly in a reset condition, in which its 0 output is high. The high on the 0 output is extended to the upper input of AND gate 7614. The middle input of this AND gate is connected via resistor R2 to the SR output conductor of position 63. As already mentioned, this conductor is normally at ground potential but is driven to +24 volts whenever any key at position 63 is depressed. The lower input of the AND gate is connected via conductor EN63 to the EN63 output of translator 7705. This conductor is normally low, but is driven high by the output of the translator whenever position 63 is scanned.

It may be seen, with respect to the foregoing arrangement, that all three inputs of this AND gate can be in a high condition simultaneously only when flip-flop 7613 is reset, provided that, at the same time, a key is being depressed at position 63 and provided that the translator drives conductor EN63 high. The condition in which conductor EN63 is driven high is said to be the "scan" condition of the position since, at that time, a depression of a key thereat will drive its conductor SR high and thereby permit AND gate 7614 to turn off, provided its associated flip-flop is reset.

Let it be assumed, for the purposes of this discussion, that a key at position 63 is depressed when the position is scanned by the circuit of FIG. 77. The depression of the key causes conductor SR to go high and thereby make all inputs of AND gate 7614 high to turn it on. The turn-on of the gate at this time drives its output conductors 7621 low, extending to the input of inverter gate 7605–63. The turn-on of gate 7614 also drives conductor 7622–63 low, extending to the lower input of noninverting OR gate 7711. The low on this latter conductor is extended through the gate to the inhibit terminal 7720 of oscillator 7703. The low on the inhibit terminal stops the oscillator and the counter in its position, which signifies the identity of the position circuit currently scanned. The low from the output of gate 7711 is also applied via 7721, through gates 7708 and 7710 and conductor 7702, to the master scanner to inform the SPC that a key is currently being depressed in one of the operator positions. The low on this conductor is termed a "signal-present" condition since it instructs the SPC to scan the ferrod row to which cables 7601 and 7701 are attached in order that the identity of the position and the key thereat currently being depressed may be determined.

The low on the input of gate 7605–63 is inverted and applied to the lower input of the nine AND gates 7604–63. Since the present discussion assumes a key is currently being depressed at position 63, the upper input of three of the nine AND gates 7604–63 is currently driven high by the key matrix. Both inputs of these three AND gates are currently high, and therefore they turn on at this time and apply a low to their associated three OR gates in the series of nine OR gates 7602. These OR gates are of the noninverting type, and therefore the low on their inputs is propagated therethrough and over cable 7601 to their associated ferrods in the master scanner. This low changes the magnetic state of three of the nine ferrods to which the conductors of cable 7601 are connected and, in turn, signifies an identification of the key currently being depressed.

The current position of binary counter 7704 represents the address of the position circuit being scanned. The binary word comprising the output of this counter at this time is applied over conductors 7722 and 7713 and cable 7712 back to the master scanner ferrods via the series of AND gates 7709. There is an individual AND gate 7709 for each conductor in cable 7712. The upper input of each of these AND gates is positive at this time because of the low provided by the output of OR gate 7711. Each output of the binary counter representing a binary 1 is assumed to be in a high positive potential state, while each output signifying a binary 0 is assumed to be in a low or ground potential condition. This arrangement permits the AND gates 7709 which are associated with binary 1's to turn on and drive their outputs low. The AND gates associated with binary 0's do not turn on at this time.

The output of the binary counter is also applied over conductors 7723 to the parity generator 7706, which generates a parity OK check signal if the parity is good. This signal is applied via cable 7712 back to the master scanner along with the position address information from conductor 7713. Thus, the information transmitted over cable 7701 comprises seven bits, of which six represent the position address in binary form, while the seventh represents an odds 1 parity bit. The seven ferrods to which the conductors of this cable are connected are located in the same scanner row as are the nine ferrods to which the conductors of cable 7601 are connected. This permits the SPC to interrogate a single scanner row to simultaneously identify a key being depressed, as well as the address of the position in which the key is situated.

It has already been mentioned that the 40-kc. oscillator stops in response to the application of an inhibit potential to its terminal 7720 whenever a key in a scanned position is in a depressed condition. This, in turn, stops the operation of binary counter 7704 and thereby holds a positive potential on the EN– translator output connected to the scanned position. There are many keys and many operator positions in our system. Also, there are many instances in which a key remains depressed only for approximately 50 milliseconds as the operators perform their many functions in connection with the serving of calls. Because of this, it is necessary that the position circuits be scanned at microsecond rates in order that each and every key depression will be detected and the information represented thereby be transmitted via the position scanner to the master scanner. It is also necessary that no key depressions be lost or ignored because of the inhibited state of the oscillator as a consequence of its current scanning of a position having a depressed key thereat. The circuitry of FIG. 77 contains provisions whereby no key depression will be lost. This is accomplished by providing circuitry which ensures that the scanner will not wait indefinitely while an operator inadvertently maintains a key depressed beyond the time required for the SPC to receive the information associated with the depressed key.

Once the SPC has received from the scanner the information for a depressed key at a position currently being scanned, it transmits a "clear" signal via the CPD to monopulse generator 7611 over conductor 7623. This "clear" signal drives the 7608 output of the generator high extending to all of service-request generators 7607–2 through 7607–63. This signal is applied to the upper input of an AND gate corresponding to gate 7612 in each service-request generator. The lower input of this gate is currently high since it is assumed that position 63 is currently being scanned, and therefore conductor EN63 is high from the output of the translator. Since both of its inputs are high, AND gate 7612 turns on and drives its output low to set flip-flop 7613. This drives the 0 output of the flip-flop low which, in turn, turns off AND gate 7614 and drives its output high.

The high on the output of gate 7614 removes the inhibit potential on the 40-kc. oscillator via the noninverting OR gate 7711. This permits the oscillator and the rest of the circuit on FIG. 77 to resume its scanning operation in order to determine the state of keys in other positions. The turn-off of AND gate 7614 drives the input high to gate 7605–63. This turns off AND gate 7604–63 so that the key information from position 63 can no longer be applied back to the master scanner even though the key remains depressed. Also, as long as the key at position 63 remains depressed, flip-flop 7613 remains in its SET position and AND gate 7614 cannot be turned on. This prevents the same key information from being transmitted to the scanner the next time conductor EN63 is driven high by scanner translator 7705. However, once the operator removes her hand from the key, the positive potential is removed from conductor SR. This applies a negative 48-volt potential to the R input of the flip-flop to reset it. This restores the circuit 7607–63 to normal for subsequent key service requests from position 63.

Operator cut-through circuit—FIG. 79

The function of the operator cut-through circuit shown diagrammatically on FIG. 3A is to interconnect the switching network with the talking circuit portion of its associated operator position. Each operator cut-through circuit is individual to a different operator position circuit, and an operator cut-through circuit is provided for each operator position circuit. The details of a typical operator cut-through circuit are shown on FIG. 79. It is assumed, for the purpose of discussion, that the cut-through circuit shown thereon is individual to operator position 63.

The T and R conductors on the left side of FIG. 79 extend to the network appearance on FIG. 80 assigned to operator position 63. The T and R conductors on the right side of FIG. 79 extend to operator position circuit 63 and, in particular, to the transmission portion of this circuit on FIG. 58. In the idle condition of the cut-through circuit, the left and right portions of the T and R conductor path are disconnected by the make contacts of relay A, which is normally unoperated. During the serving of a call requiring operator assistance, the SPC controls the extension of the calling connection through the network to the link appearance of the T and R conductors of this circuit, assuming the call is to be served by operator position 63. Simultaneously therewith, the SPC commands the signal distributor to operate relay A of this circuit. This relay, in operating, closes its make contacts to interconnect the T and R conductors from the link with those extending to position circuit 63. Relay A also opens its break contacts to remove the tip-and-ring shunt comprising resistor R8 and capacitor C2.

Tone circuit 7902 is provided in order that it may be momentarily connected to the tip-and-ring path to provide a short burst of tone to an incoming connection at the time a call is extended to an operator position. The purpose of this tone is to notify the operator that a call has been extended to her position and also to indicate to the calling subscriber that his call is being served by the system. Timing circuit 7904 momentarily operates relay B immediately upon the operation of relay A and connects the tone cricuit to the calling connection as long as relay B remains operated. The tone is removed upon the release of relay B and the parties may then converse.

Transistor Q1 is normally on and Q2 is normally off during the idle condition of the circuit. Transistor Q1 is held on by the base drive provided by resistor R3. Transistor Q2 is held off by the voltage drop across resistor R6 which keeps the collector of Q1 at ground potential. The operation of relay A by the signal distributor closes its make contacts and grounds one side of capacitor C1. This action momentarily lowers the potential of terminal 7905 to that of ground and cuts off the base drive from transistor Q1 to cause it to turn off and, in turn, to turn transistor Q2 on and operate relay B. The plate of capacitor C1 connected to terminal 7905 immediately starts to charge to a positive potential through resistor R3. When the capacitor has charged a predetermined amount, base current once again flows into transistor Q1 to turn it on. This turns off transistor Q2 and releases relay B. The release of relay B removes tone circuit 7902 from the connection and leaves the calling party and the operator free to converse.

Switching network—FIG. 80

The function of the switching network 301 (FIG. 3A) is to interconnect the trunks and other circuits on its left side with position circuits (via operator cut-through circuits) and other circuits on its right side. This interconnection is accomplished under control of the SPC via the central pulse distributor. The SPC is assisted in its function by the reception of information from the master scanner signifying the current state of the available paths within the switching network.

Switching network 301 is shown in further detail, although still diagrammatically, on FIG. 80. As shown thereon, each link comprises link switches and a controller, with the trunk link 303 having link switches 8001 and controller 8002. The position link 305 comprises link switches 8007 and controller 8008. Each controller may be further subdivided into the elements shown in detail for controller 8002. These elements comprise input registers 8005, path selection circuit 8004, and pulse circuit 8003, together with miscellaneous control circuit 8006.

Switching network 301 is one of the circuits connected to the 1-out-of-N address bus system shown on FIG. 3. In the same manner as do the other peripheral circuits connected to this bus, the switching network responds to commands on the bus only when its input circuitry is unlocked by enable pulses from the CPD. These pulses are received via path 8009 for the trunk link and path 8010 for the position link. When the SPC desires to interconnect a left side switching network circuit with a right side circuit, it ascertains the current availability of paths within the network and then determines and preselects the path that is to be used for the connection that is to be established. It commands the CPD to transmit an enable pulse to one side of the network to unlock its input circuitry and, at the same time, commands the CBT to gate onto the address bus system the command to which the one side of the network is to respond in setting up the desired connection. The network receives the enable signal and the address bus command and, in response thereto, establishes the path commanded by the SPC. A CPD pulse and a command is then sent to the other side of the network to establish the desired connection within it.

The input registers 8005 are unlocked by enable pulses over circuit 8009 to register the information currently on the 1-out-of-N address bus system 8011. This input circuitry may be furnished on a duplicated basis so that the information on either address bus may be registered, as already described in detail for other circuits, such as for example, the group gate circuit. The registered information is subsequently used to control the path selection circuit 8004 to prepare for the network establishment of a path between the left and right side link appearances specified by the command received from the address bus. The link switches utilized in our switching network may be of the well-known ferreed type, which require a pulse to close the contacts of the ferreed switches utilized in establishing a connection. The contacts remain closed, due to the inherent characteristics of the ferreed devices themselves, and subsequently release to open an established connection in response to the receipt of a release pulse by the windings of the associated ferreed switches. Once the path selection circuit completes its function, the pulse circuit 8003 generates the surge of current required to effect the closing of the ferreed crosspoints over the prepared path. The control circuit 8006 performs miscellaneous functions, such as for example, checking for the validity of the received data, etc.

The switching network is not shown further in detail in this specification since it may, if desired, be identical to that disclosed in the aforementioned Doblmaier et al. specification as well as that disclosed in detail in the Dunlap et al. specification, Ser. No. 295,458, filed July 16, 1963, now Patent No. 3,281,539. Similar types of switching networks are also shown in the applications of T. N. Lowry Ser. No. 205,920, filed June 28, 1962, now Patent No. 3,231,679; and A. Feiner, Ser. No. 253,083, filed Jan. 22, 1963, now Patent No. 3,257,513. The switching network of Doblmaier et al. and Dunlap et al. is also shown in the aforementioned issue of the Bell System Technical Journal, pages 2193 through 2254.

The switching network on FIG. 80 is connected on its left-hand side to MF trunk circuits over conductors 8020, to DP trunk circuits over conductors 8021, to CAMA position trunk circuits over conductors 8022, to service trunk circuits over conductors 8024, and to miscellaneous other types of trunk circuits over conductors 8023. The connections to each MF, DP, and CAMA trunk circuit include two conductor pairs, one of which is designated "T," "R," and the other of which is designated "T1," "R1." The T and R conductors are connected to the incoming side of the trunk, while the T1 and R1 conductors are connected to the outgoing side.

The conductors connected to the right side of the position link include 8025 extending to the operator cut-through circuits, 8026 extending to the outpulsers, 8027 extending to miscellaneous position side circuits, 8028 extending to the coin-control and ringback circuits, 8029 extending to the DP receivers, and 8030 extending to the MF receivers. The conductors designated "T," "R" or "T1," "R1" for the position link are interconnected via the switching network with correspondingly designated conductors of the various trunk side circuits during the serving of calls.

MF receiver—FIG. 81

The purpose of the MF receiver shown on FIGS. 3 is to receive and decode the information outpulsed from the preceding offices on MF calls. The MF receiver is connected by the switching network to the incoming side of the MF trunks via their T and R conductors. The information received by the MF receivers is applied to the scanner which, in turn, transmits it, upon request, to the SPC.

The MF receiver is shown in detail on FIG. 81 and comprises relays A, B, and C, which are controlled by the signal distributor; relay D, which is locally controlled; a switching network comprising the contacts of these relays for selectively applying different potential conditions to the T and R conductors; and an MF filter and frequency. detector 8105, which energizes various combinations of master scanner ferrods in response to the reception of the MF signaling frequencies.

Relay D is normally operated over an obvious path from ground on terminal 8101 and break contacts of relays A and B. The A relay is operated by the signal distributor when a call is first extended to the MF receiver. This starts the slow release of relay D. Following the operation of relay A, and up until the time relay D releases, a loop is closed from the incoming T1 and R1 conductors through the make contacts of relay D, through the break contacts of relays C, B, and A, through windings 8102 and 8103 of transformer T1, to battery and ground via the windings of ferrod F0 in hte master scanner. This potential condition lasts about 100 milliseconds and ends when relay D releases.

When the call initially comes into the TSPS center, the battery and ground potentials are supplied to the incoming connection by the incoming trunk circuit. Subsequently, when the link connects the MF receiver to the connection, the polarity condition supplied to ferrod F0 prior to the release of relay D obviously must match that supplied by the trunk. The trunk potential source is disconnected from the T and R conductors when the MF receiver is attached and, at the termination of the aforementioned 100-millisecond interval, only the MF receiver supplies potentials to the tip-and-ring conductors of the incoming connection. When relay D releases, this potential condition is reversed so that battery is then supplied to the ring lead R while ground is supplied to the tip conductor T. This polarity reversal signals the outpulser in the originating office that the TSPS center is ready to receive digits. At this time, a loop is closed for the T1 and R1 conductors and comprises the break contacts of relays D, C, and B, in that order, the make contacts of relay A, and the windings of transformer T1, to the F0 ferrod.

The originating office now outpulses MF call information to the TSPS center, which, in turn, applies it via the switching network to the T and R conductors of the MF receiver. These received frequencies are extended via the windings of transformer T1, through capacitors C7 and C8, to the input of the filter and frequency detector network 8105. This circuit filters the received MF signals into their component frequencies and applies each filtered frequency to a detector individual thereto. The output of each frequency detector is connected to one of output conductors $f1$ through $f6$ within the conductor group 8120. Each detector operates in such a manner that it reduces the output current to its ferrod in response to the reception of its associated frequency. This, in turn, changes the magnetic condition of its ferrod from a saturated to a nonsaturated state.

The terminal 8110 output of the MF filter and frequency detector 8105 applies a signal, when MF frequencies are received, to conductor 8109 extending to the frequency check circuit. This circuit checks that the signals currently received by circuit 8105 comprise at least two of the basic six MF frequencies and, if the check condition is met, an output signal is applied from this circuit to the input of the 20-millisecond delay circuit 8107 whose output is connected to the FC ferrod. To prevent voice simulation of MF digits, the response of the FC ferrod to the reception of a valid MF digit is delayed for 20 milliseconds. Once the FC ferrod is switched, it is held in that state for 20 milliseconds after the two frequencies cease. This is done to prevent the FC ferrod from following any noise pulses which may affect the frequency detector output and causing the SPC to recognize these pulses as the start of new digits. The SPC does not scan ferrods F1 through F6 until it first detects that the FC ferrod has switched, which switching occurs 20 milliseconds following the reception of a valid signal. Once the SPC determines that the FC ferrod has switched, it then scans ferrods F1 through F6 to identify the MF digit currently received. These six ferrods are not scanned again by the SPC until it detects that the FC ferrod has restored to its normal condition (20 milliseconds after the digit reception has ceased), and then, in response to the reception of the next MF digit, has once again reverted to the magnetic state it assumes during the receipt of a valid MF signal.

This mode of operation, wherein the SPC scans the FC ferrod prior to scanning the six ferrods associated with the MF frequencies, is used to detect the beginning and end of a valid MF digit. It also prevents the SPC from receiving false information as a consequence of two of ferrods F1 through F6 being momentarily switched because of noise for a few milliseconds. It also prevents false information from being received during a condition in which valid MF information is received but, due to noise, the magnetic state of the frequency ferrods is momentarily switched to an idle condition and then returned to a signal-present condition. If it were not for the manner in which the FC ferrod is repeatedly scanned, the SPC might construe such a condition to represent the reception of two successive MF digits, rather than the continued reception of a single digit.

The SPC keeps track of the digits received for the called number, including the area code, if any; and when the START signal is received for the called number, it operates relay B to apply another polarity reversal from ferrod F0 back to the originating office to signal it to proceed with the ANI outpulsing. Next, the ANI digits are received, and following this the A relay is released by the signal distributor. At that time, audible tone is provided back to the originating office from tone circuit 8106. The SPC then restores the MF receiver to normal by releasing the B relay to reoperate the D relay.

The circuit works in the following manner for the reception of a dial pulse-ANI call. On calls of this type, the MF receiver is utilized only to receive the ANI information for the calling office. Relays C and then A are operated by the signal distributor when the calling connection is extended through the switching network to the T and R conductors of this circuit. Relays A and C provided ground on the tip and battery on the ring from ferrod F0. This matches the TSPS trunk polarity. The trunk is then bypassed and relay B is operated to reverse trunk polarity as a signal to start outpulsing in the originating office. Following the outpulsing operation, relay A is released to provide audible tone back, and finally relays B and C are released to restore the circuit to normal and operate relay D.

MF outpulser—FIGS. 82–85

The purpose of the outpulsers shown on FIG. 3A is to transmit forward to the next office the information it requires for serving calls. The outpulsing operation is controlled by the SPC, which transmits commands to the signal distributor and the CPD to cause those circuits together to control the operation of the outpulser so that the required called station information is outpulsed. The called station information to be outpulsed is received by the SPC from the digit receivers via an outpulsing operation from the preceding office, or, on dial 0 type calls, is received from the position circuits via the position scanner as the operator orally determines the called number and keys it into the system. Once received, this information is stored by the SPC and subsequently utilized to control the operation of the outpulser, with the assistance of the CPD and the signal distributors.

Figure 82:
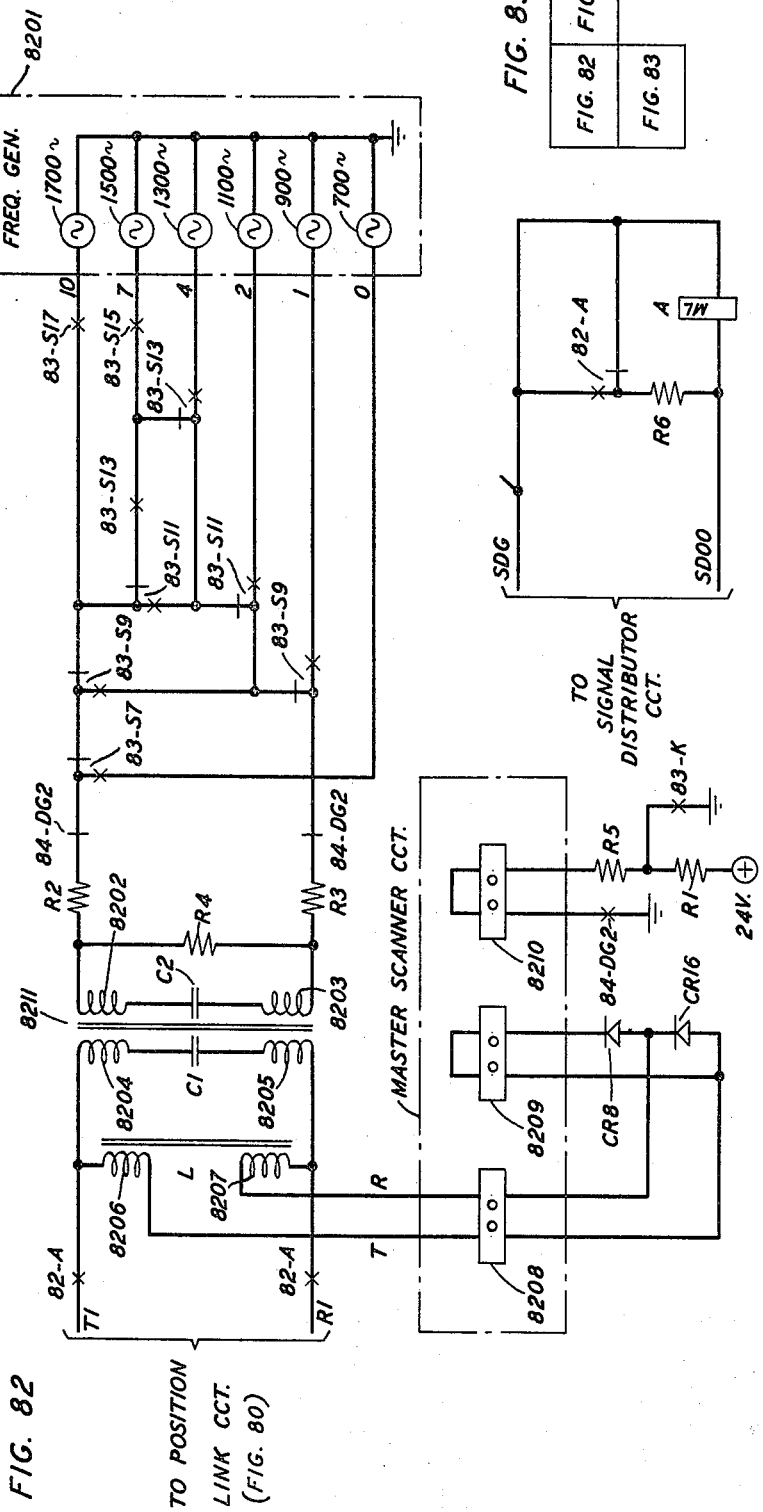
Figure 83:
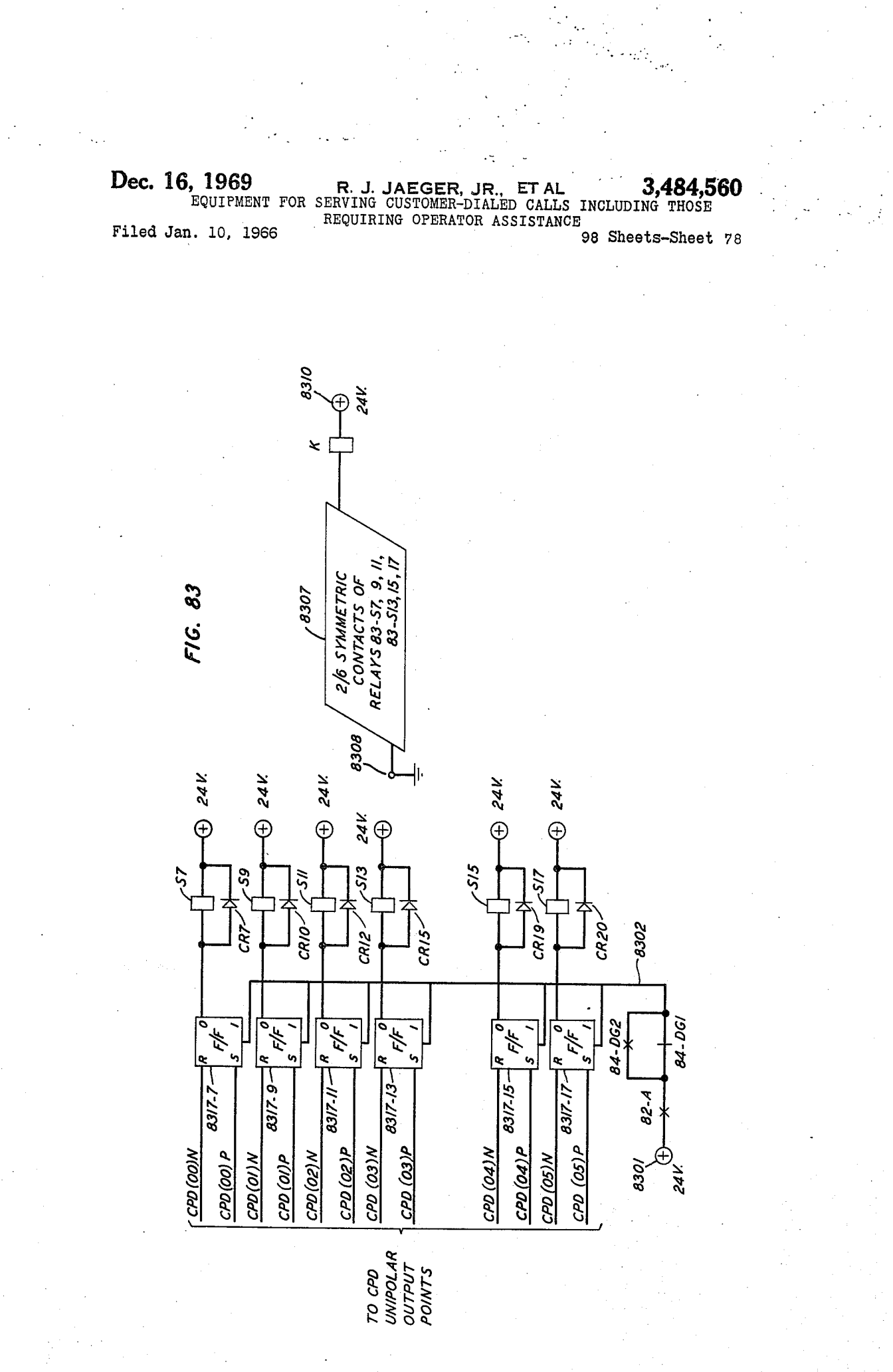
Figure 84:
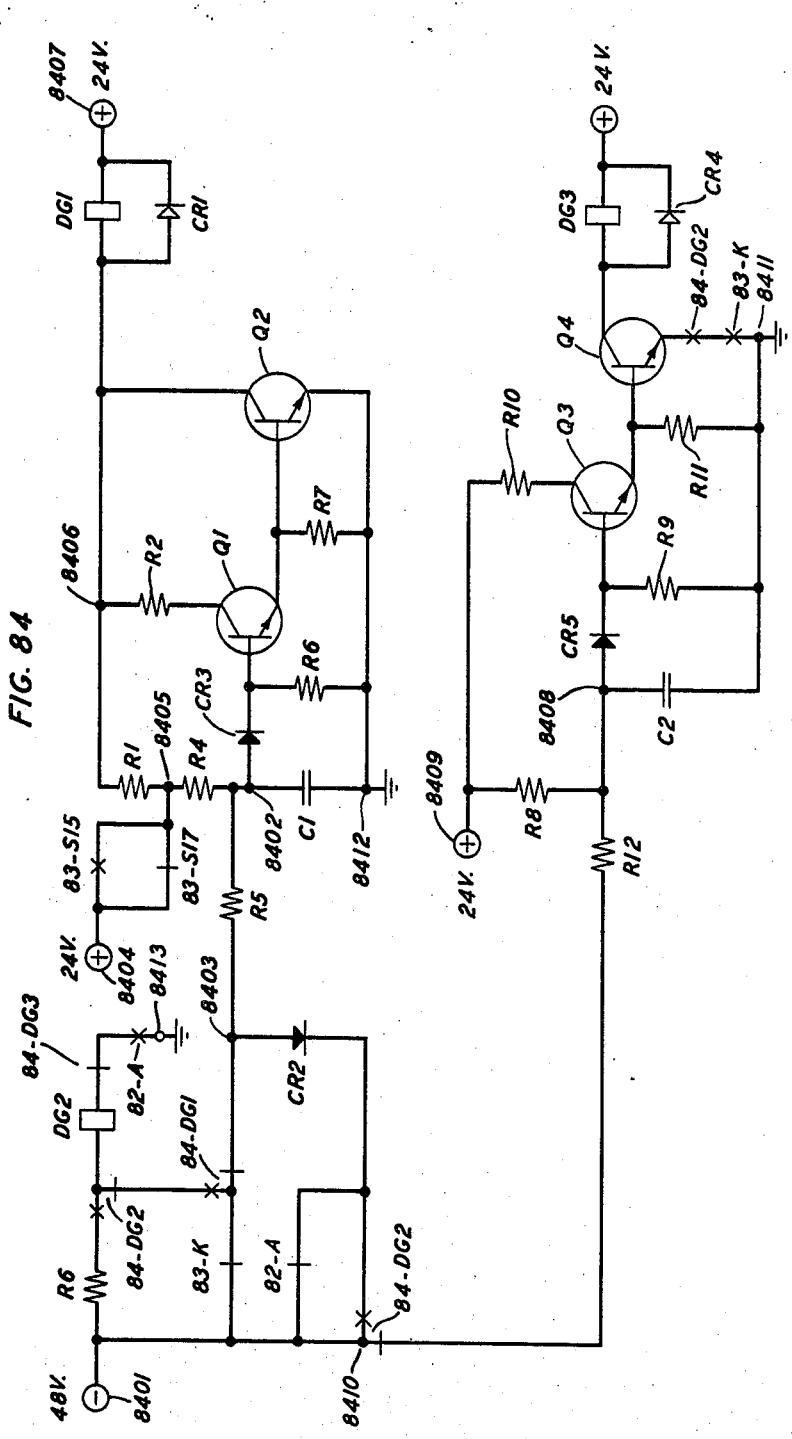

FIGS. 82 through 84, when arranged as shown in FIG. 85, disclose the circuit details of an outpulser of the MF type. As its name implies, this circuit transmits called station information forward to the next office by utilizing MF signaling, with each digit being represented by the simultaneous transmission of a unique pair of frequencies. The MF outpulser shown on these figures may be broadly and functionally subdivided into (1) the circuitry of FIG. 82 which discloses the MF frequency generators and the means by which two out of six frequencies at a time may be applied via the switching network to the outgoing connections, (2) the circuitry of FIG. 83 which comprises flip-flops for receiving signals from the CPD indicating the frequencies to be outpulsed for each digit and which also comprises the relays operated by the flip-flops for controlling the circuitry of FIG. 82 so that the appropriate MF frequencies are applied to the outgoing connection for each digit, and (3) the circuitry of FIG. 84 which times the duration the MF signals representing a digit are applied and which also times the interdigital intervals.

The individually indicated frequency sources within frequency generator 8201 generate the plurality of frequencies required for MF signaling. These frequencies are applied selectively, two at a time, via the contacts of the S– relays, to the T1 and R1 conductors, via the winding of transformer T1. The T1 and R1 conductors, in turn, are connected, via the switching network and the outgoing portion of the trunk serving the call, to the forward connection extending to the next office. Ferrods 8208 and 8209 monitor the polarity of the potentials applied to the T1 and R1 conductors. Ferrod 8210 provides an indication of the current status of the circuitry local to the outpulser.

The signals indicating the frequencies to be outpulsed for each digit are received from the CPD by the plurality of flip-flops 8317–. These flip-flops may, if desired, be identical to those shown on FIG. 37 of the position group gate, and hence they are shown only diagrammatically on FIG. 83. Briefly, each flip-flop is normally in a RESET state, in which its 0 output is high (+24 volts) and its 0 and its 1 outputs low (ground). The 0 output of each flip-flop is connected to a relay individual to the flip-flop. The other side of each relay winding is connected to 24 volts. With this arrangement, a relay is normal when its flip-flop is in a RESET state and is operated when a flip-flop is set, since at that time the 0 output of the flip-flop to which the relay is connected is at ground. Each flip-flop and, in turn, each relay connected to a flip-flop, is individually associated with one of the basic MF frequencies within the frequency generator 8201. The flip-flops, the relays, and the individual frequency sources within 8201 are designated in a manner so as to facilitate an appreciation of the correspondence between each. Thus, flip-flop 8317–7 is individual to relay S7, and both of these, in turn, are individual to frequency source 700 within the frequency generator 8201. The remaining flip-flops and the remaining S– relays of FIG. 83 are individual to the remaining frequency sources in a similarly designated manner. The setting of a flip-flop operates its S– relay, which, in turn, closes contacts of the relay on FIG. 82 to connect its individual frequency source to either the T1 or R1 conductors. Thus, the setting of flip-flop 8317–7 operates relay S7, which closes its make contacts to apply the 700-cycle frequency source to the T1 conductor via the winding of transformer 8211. Similarly, the setting of flip-flop 8317–9 operates relay S9, which closes its make contacts to apply the 900-cycle frequency source, via the windings of transformer 8211, to conductor R1.

When the SPC determines that an outpulsing operation is required, it selects the outpulser that is to be utilized and, assuming the outpulser of FIGS. 82 through 85 to be used, it commands the signal distributor to apply a signal to the SDG and SD00 conductors of FIG. 85 to operate relay A and, at the same time, commands the switching network to close a path to interconnect the T1 and R1 conductors on FIG. 82 with the correspondingly designated conductors of the trunk serving the call. Relay A is magnetic latching and remains operated in response to the signal received from the signal distributor. The polarity of the potentials applied to the T1 and R1 conductors at this time is such that negative battery is applied to conductor R1 and positive ground is applied to conductor T1. This polarity condition energizes ferrod 8208 through windings 8206 and 8207 and diode CR16. Subsequently, the tandem office reverses the polarity applied to these conductors when its MF receiver is attached to the connection. At this time, ground is on the ring conductor R1 and negative battery is applied to tip conductor T1. This change of polarities also energizes ferrod 8209, via diode CR8. This reverse polarity condition constitutes a GO signal indicating that the tandem office is read to receive data.

The SPC, with the assistance of the scanner, monitors the state of ferrods 8208 and 8209 and, when it determines that the START signal has been received, it transmits commands to the CPD, instructing it to set the 8317– flip-flops, two at a time, to operate their associated S– relays, two at a time. This, in turn, applies the various MF frequencies from frequency generator 8201, two at a time, to the T1 and R1 conductors to transmit the called information forward to the tandem office.

The first signal that is sent out on any outpulsing operation does not comprise one of the digits of the called office or its area code, but instead, comprises what is known in the art as a KP pulse. The KP pulse comprises frequencies 1700 and 1100, and its function is to prepare the MF receiver within the tandem office for the reception of the information about to be outpulsed. The CPD commands for the KP signal comprise signals which set flip-flops 8317–17 and 8317–11. This operates relays S17 and S11 to apply the 1700- and 1100-cycle frequencies to the T1 and R1 conductors.

The circuitry comprising transistors Q5, Q6, Q7 and Q8 check that two, and only two, of the S– relays operate for each outpulsing operation, and the 83–K relay operates in the event that the input information checks good.

Relay 83–K is operated from ground on terminal 8308 via the 2/6 check circuit 8307 whenever the input information is good, i.e., in 2/6 form. Check circuit 8307 may comprise a 2/6 symmetric composed of the contacts of relays S– on FIG. 83. The K relay, in operating, opens its break contacts connected to battery terminal 8401 to remove battery from the left side of resistor R5 at terminal 8403. Relay S17, in operating, opens its break contacts to isolate terminal 8405 from terminal 8404 positive 24-volt potential. The operated state of both relays K and S17 at this time, by virtue of their break contacts, permits the upper plate of capacitors C1 at terminal 8402 to start charging positive to the 24-volt potential at terminal 8407 through resistors R4 and R1. The potential on the upper plate of capacitor C1 rises sufficiently positive after approximately 60 milliseconds to turn transistors Q1 and Q2 on and, in turn, operate relay DG1.

The operation of relay DG1 opens its break contacts on FIG. 83 to remove the positive 24-volt potential at terminal 8301 from the plurality of flip-flops 8317, thereby resetting the two flip-flops that are currently set (in this case, flip-flops 8317–11 and 8317–17) and, in turn, releasing their associated relays S11 and S17. The release of these two relays destroys the 2-out-of-6 check and releases relay 83–K. The release of this relay closes a path to operate relay 84–DG2 through the make contacts of relay DG1. The operation of relay DG2 terminates the application of the MF signals to conductors T1 and R1 by opening its break contacts on FIG. 82 to isolate the resistors R2 and R3 from the frequency sources within frequency generator 8201. The operation of this relay also closes its make contacts on FIG. 82 to close a path to energize ferrod 8210 as a signal to the SPC that the KP signal has been outpulsed and that the information for the next digit to be outpulsed may now be received. Simultaneously, the operation of relay DG2 closes its make contacts on FIG. 83 to reconnect the battery supply 8301 to all of the flip-flops 8313, thereby preparing them for the receipt of additional information from the CPD.

Relay DG2, in operating, also closes a path through its make contacts connected to terminal 8410 to charge the top plate of capacitor C1 negatively via resistor R5 and diode CR2. This turns transistors Q1 and Q2 off and releases relay DG1. The operation of relay DG1 also opens its break contacts connected to terminal 8410 to remove negative battery on terminal 8401 from the left side of resistor R12 to permit the top plate of capacitor C2 to start charging in a positive direction through resistor R8 to the terminal 8409 24-volt potential. After a predetermined time, the charge on capacitor C2 becomes sufficient to turn transistor Q3 on, which, in turn, attempts to turn on transistor Q4. However, transistor Q4 cannot turn on until its emitter is connected to the terminal 8411 ground. The circuit for connecting its emitter to ground includes make contacts of relays DG2 and relay K. Relay DG2 is operated at this time. However, the make contacts of relay K are open, since relay K does not operate until the 2-out-of-6 check has taken place, when the signal for the next digit to be outpulsed is received from the CPD. Thus, this make contact of relay K prevents transistors Q3 and Q4 from turning on and, in turn, prevents relay DG3 from operating until the flip-flops have received the data for the next digit and, in turn, have operated two of the S- relays which, in turn, permits relay K to operate. The operation of relay K at this time closes its make contacts to permit transistors Q3 and Q4 to turn on and operate relay DG3. The operation of relay DG3 opens its break contacts to release relay DG2, which, in turn, closes its break contacts on FIG. 82 to permit the MF generator to apply the appropriate frequencies forward to the next office. The operation of relay K closes its make contacts on FIG. 82 to short out resistor R1, thereby de-energizing ferrod 8210 as a signal that a valid digit has been received.

Relay DG2, in releasing, closes its break contacts connected to terminal 8410 to restore a negative charge to the top plate of capacitor C2 to turn off transistors Q3 and Q4 and, in turn, release relay DG3. The make contacts of relay DG2 in the emitter circuit of transistor Q4 now release and speed up the release of relay DG3. The operation of relay K starts the operation of the top half of the timer on FIG. 84, as already described for the reception of the KP signal.

The signal distributor releases relay A on FIG. 85 when the outpulser has completed its function on a call. The release of this relay places the negative 48-volt potential from terminal 8401 on the top plate of capacitor C1, via diode CR2 in resistor R5. This turns off transistors Q1 and Q2 and releases relay DG1. The release of relay A also opens its make contacts to remove ground from the right side of the winding of relay DG2 to release it. This restores the entire circuit to normal.

The timing requirements within the MF receiver of the tandem office are such that the KP signal must be received for approxmately 100 milliseconds, while the other signals need be received for only 67 milliseconds. This change in timing is controlled by charging capacitor C1 on FIG. 84 to a positive 24 volts, either through resistors R1 and R4 in series or just through resistor R4. The longer timing is provided when the capacitor charges through both resistors. This occurs when relay S17 is operated and opens its make contacts to isolate the terminal 8404 potential from terminal 8405. Relay S17 is operated for the transmission of the KP signal and, at that time, it removes the terminal 8404 potential and forces the capacitor to charge through both resistors R1 and R4. The make contacts of relay S15 connected to terminal 8404 are provided to provide for a shorter timing interval for the START signal which utilizes both relays S17 and S15.

In summary, regarding the nature of the timing function provided by the upper half of the circuit of FIG. 84, the timing starts when relay K operates as two of the S- relays operate. At this time, the MF signal is applied forward. Timing then proceeds and the MF signal remains applied for the required duration determined by either resistor R1 and/or resistor R4 on FIG. 84. Once capacitor C1 charges to the required potential, it turns on transistors Q1 and Q2 to operate relay DG1. Relay DG1 removes battery from the flip-flops to release the two S- relays which, in turn, release and remove the MF transmission forward.

CAMA position trunk circuit—FIGS. 86-89

The function of the CAMA trunk circuits on FIG. 3A is to interconnect the TSPS center with CAMA type offices in order that the TSPS operators may substitute for and function as CAMA operators during periods when the traffic in the CAMA offices is insufficient to justify the presence of operators thereat, as wall as during peak periods when the traffic level exceeds that which can be served by the available operators. This arrangement permits a more economical and efficient utilization of the operators at the CAMA offices since they do not have to be provided during periods of light load and since increased numbers of them do not have to be provided during temporary periods of peak loads. The function of the TSPS operator when serving a call incoming on a CAMA trunk circuit is the same as that of the regular CAMA operator, namely, to orally obtain the calling number and key it into the system for charge data recording purposes. The information keyed by the TSPS operator is transmitted back via the CAMA trunk circuit to the CAMA office, where it is recorded.

The switching of the connection through to the called station on these CAMA calls is controlled entirely by the CAMA office and the offices subsequent thereto in the same manner as if the CAMA operator functions were performed within the CAMA office. The only function of the TSPS center on CAMA calls of this type is to perform the same functions for the CAMA office that are normally provided by its own CAMA opeartors.

Each CAMA office that may be served by the TSPS center, via the CAMA position trunk circuits, functions as an independent entity whenever a sufficient number of CAMA operators are present thereat to serve the CAMA traffic through the office. During these times, no CAMA calls will be extended via the CAMA position trunk circuits to our system. However, the control equipment within the CAMA office is controllable so that calls requiring CAMA service will be automatically extended to our system whenever the traffic within the CAMA office exceeds that which may be served by the number of CAMA operators, if any, currently provided thereat.

The periods during which the TSPS center will be available for serving CAMA traffic of this type may be controlled by programming of the SPC so that it transmits an availability signal to the CAMA office via the CAMA position trunk circuits whenever the TSPS center is to be made available for the serving of CAMA traffic. The control circuitry within the CAMA office responds to the availability signal and offers CAMA traffic to the TSPS center in the same manner as it normally offers it to its CAMA operator positions. Alternatively, the absence of the availability signal from the TSPS center causes the control circuitry within the CAMA offices to withhold CAMA traffic from the TSPS center. In this manner, the programming of the SPC permits the TSPS center to automatically receive CAMA traffic during certain predetermined periods of time, such as for example, in the late evening or the early morning hours. Alternatively, the periods during which CAMA traffic may be accepted by the TSPS center may be made more flexible by arranging the CAMA offices so that they transmit an overload signal to the TSPS center whenever the level of CAMA traffic exceeds that which can be served by the available operators currently stationed in these offices. The reception of the overload signal at the TSPS center is then transmitted to the SPC which, in response thereto, commands the CAMA position trunk circuits to transmit an availability signal to the CAMA offices thereby making these trunk circuits and, in turn, the TSPS center currently available for the serving of CAMA traffic.

When a CAMA call is extended to the TSPS center, the switching network establishes a path interconnecting the T and R conductors of the CAMA trunk with the transmission circuit of an operator position selected by the SPC. The extension of a call from this CAMA trunk circuit to the selected position is accompanied by the illumination of lamps at the position to indicate the call type to the operator. In the same manner as does the CAMA operator, the TSPS operator orally ascertains the number of the calling station and keys it into the system. The SPC receives this number and commands the switching network to release the position and to establish a path interconnecting the T1 and R1 conductors of the CAMA trunk circuit with the corresponding conductors of an MF outpulser. Once this connection is established, the outpulser transmits the calling station digits over the leads designated "KPT" and "KPR" back to the CAMA office. This information is registered in the AMA equipment within the CAMA office, and the call then proceeds in that office to completion in the same manner as if the CAMA operator functions were performed within the office.

The details of the CAMA position trunk are shown on FIGS. 86 through 88, when arranged as shown in FIG. 89. The SPC is programmed to control the periods during which CAMA service is to be provided by our system. At the beginning of each rush period, the SPC commands the signal distributor to operate relay 87–PO over conductor SD00. This relay is of the magnetic latching type and remains operated until subsequently released by the reception of a pulse of the opposite polarity from the signal distributor. The operation of relay PO closes its make contacts on FIG. 86 to extend an obvious path from ground on terminal 8601 to ground conductor PO extending to the CAMA office. Ground on this conductor constitutes a signal to the preference circuitry within the CAMA office that this CAMA position trunk circuit within our system is now ready to receive CAMA calls.

The CAMA office grounds conductors OH and L on FIG. 86 when offering a call to this trunk circuit. The grounding of conductor OH operates relay ON, which prepares circuit paths for subsequent relay and supervisory operations. The grounding of conductor L operates relay PS. This closes a path to energize scanner ferrod O over a circuit including make contacts 86–PS and 87–PO. The energization of this scanner ferrod signals the SPC that a CAMA call has been offered to this trunk circuit. The SPC next originates a command to operate relay 87–PB over conductor SD01 from the signal distributor. The operation of this relay cuts through transmission conductors T and R, signaling conductors KPT and KPR, and prepares circuit paths for subsequent relay and supervisory operations. The SPC next commands the switching network to cut through a path interconnecting the T and R conductors on FIG. 86 with the transmission circuit of a selected operator position via the associated operator cut-through circuit. At this time, ferrods 2 and 3 monitor the polarity of the potentials applied to the T and R conductors by the CAMA office. A polarity condition on these conductors to energize ferrod 2 indicates to the system that there is an ANI failure associated with the incoming CAMA call. However, a polarity condition to energize ferrod 3 indicates to the system that the incoming CAMA call must be operator identified.

The TSP operator converses with the calling party, obtains the calling station number, and keys it into the system. This information is transmitted to the SPC, which registers it and then commands the switching network to release the position and to establish an interconnection between conductors T1 and R1 on the right side of FIG. 86 and the correspondingly designated conductors of an MF outpulser. Once this connection is established, the outpulser transmits the calling number to the CAMA office in MF form. This information is registered and utilized by that office in the same manner as if it were provided by a local CAMA operator. The remainder of the call is then served within the CAMA office in the normal manner and the CAMA office releases the CAMA position trunk by removing the ground from the leads OH and L of FIG. 86. At the same time, it opens the T and R lead to de-energize ferrods 2 or 3. The removal of ground from the L lead releases relay PS and, in turn, starts a release function. The release of relays OH and PS de-energizes ferrod 0. The de-energization of this ferrod is recognized by the SPC as a release signal, following which it commands the signal distributor to release relay PB.

There are certain instances in which the release of the CAMA position trunk may be delay within the CAMA office. In such instances, the TSPS operator has provisions for speeding up the release of her position from the call by depressing her position release key in the manner described in connection with the description of the position circuit. The operation of this key ultimately causes the operation of relay PD, which grounds conductor PD on FIG. 86 extending to the CAMA office in order to speed up the release of the connection.

There are certain calls in which a reorder is necessary because the improper calling station number is keyed back to the CAMA office. The CAMA office recognizes that the wrong number was keyed by the operator and attaches a pulsing ground to the L lead. The first interruption of the ground on this lead releases relay PS and operates slow-release relay PS1. The operation of relay PS1 closes an obvious path on FIG. 87 to operate the reorder relay RO when PS reoperates to the pulsing ground. This energizes ferrod 1, which is recognized by the SPC as a reorder signal. The SPC then transmits reorder lamp indications to the TSP operator, who transmits a RESET signal to terminate the reorder condition.

The reapplication of steady state ground to conductor L operates relay PS. The relay remains operated when the CAMA equipment removes the reorder signal. Following this, the relay PS1 releases and, in turn, releases relay RO to de-energize ferrod 1 and terminate the reorder condition. The TSP operator then keys in the calling station number once again and, assuming that the information now keyed in is correct, the call proceeds in the usual manner.

FIG. 88 pictorially discloses the plurality of circuit tates the trunk may assume, in accordance with the principles set forth in the article entitled The Map Method for Synthesis of Combinational Logic Circuits, by M. Karnaugh, in the American Institute of Electrical Engineers Transactions volume 72, pages 593–599, of November 1953. Briefly, each rectangle has a designation therein indicating the different states of the circuit. The brackets external to the blocks each represents the operated state of a relay and each rectangle signifying a circuit state is functionally bracketed by all of the relays that are operated when the trunk is in the state represented by the rectangle. Thus, the Position Disconnect rectangle (No. 7) is associated with the operated condition of relays PO, PB, and PD. Similarly, the TSP Accepting CAMA Traffic rectangle (No. 1) is associated with only the operated condition of relay PO. Rectangles designated "NU" represent unused circuit states.

TSPS trunk circuits—FIGS. 90–93

The function of each TSPS trunk circuit on FIG. 3A is to extend a call from its local office appearance to its toll office appearance and, at the same time, to temporarily bridge circuits within the TSPS center onto the calling connection in order that certain call service may be more efficiently provided at the TSPS center than it may be at either the local or toll offices. Once this call service is provided, the TSPS circuits are disconnected from the calling connection, while the calling and called stations remain connected in the normal manner. However, the TSPS center monitors the status of the call until its completion, at which time the trunk is restored to an idle condition. The nature and quantity of the call service provided differs greatly, depending upon many factors, one of which is the call type and another of which is the nature of the facilities provided at the originating office.

The circuit details of the TSPS trunk diagrammatically disclosed on FIG. 3A depend upon a number of factors, including the type of signaling used to outpulse information from the local office to the TSPS center. The two most common types of signaling currently in use are MF (multifrequency) and DP (dial pulse). The present drawing discloses TSPS trunks of the MF and DP types.

MF trunk circuit—FIGS. 90 and 91

FIG. 90 discloses the circuit details of a TSPS trunk arranged for MF signaling from the local office. FIG. 91 pictorially illustrates all the states of this trunk circuit in accordance with the principles set forth in the articles entitled The Map Method for Synthesis of Combinational Logic Circuits, by M. Karnaugh, in the American Institute of Electrical Engineers Transactions, vol. 72, pp. 593–599, of November 1953. Each individual rectangle on FIG. 91 is designated in a manner which indicates the functional state of the trunk circuit at the time the relays are operated whose brackets encompass the individual rectangle. For example, the box numbered "7" and entitled "Coin Control and Ringback" indicates the state of the trunk circuit at the time relays A, B, and C are operated.

The MF trunk circuit on FIG. 90 is connected by means of its T and R conducotrs on its left side to the outgoing portion of the originating office 9002. On its right side, the trunk circuit is connected by means of its T and R conductors to the toll office 9003. Its T and R conductors, together with its T1 and R1 conductors in the conductor group 9004, extend to the trunk link on FIG. 80, and more particularly to one set of the correspondingly designated conductors within the conductor group numbered 8020 on that figure. Conductors T and R extending to the trunk link provide means whereby the position side circuits of the switching network may be connected to the incoming portion of a calling connection. The T1 and R1 conductors extending to the trunk link provide means whereby the position side circuits may be connected to the outgoing portion of a calling connection. The conductor group 9005 provides means whereby the trunk frame scanner ferrods L and R may be connected to the appropriate portions of the trunk cricuit in order to monitor the potential states of the incoming and outgoing loops. The conductor group 9006 provides means whereby the signal distributor may apply appropriate pulses to the magnetic latching relays, A, B, and C to selectively operate and release them as required.

It is not practicable to describe the detailed circuit operations of the MF trunk for each and every type of call that may be served by it together with each type of calling condition that may be encountered during the serving of such calls. In the following paragraphs, the detailed operation of this circuit is described for the simplest type of call and calling conditions, namely, a noncoin call. This description is with reference to the numbered circuit states on FIG. 91.

The trunk is in an idle condition prior to its seizure by the originating office. This circuit state is numbered "0" and designated "idle" on FIG. 91. The trunk circuit assumes its state 4 when its appearance in the originating office is seized as the office attempts to extend a call forward. The seizure of the tip-and-ring conductors of this circuit energizes scanner ferrod L to transmit a seizure signal to the SPC, which then commands the signal distributor to operate relay C over conductor SD2.

Next, the SPC commands the switching network to connect the T and R conductors of this circuit with the corresponding conductors of an MF receiver via conductor group 9004. Once this connection is established, the SPC operates relay B to put the trunk circuit into state 6. The called and/or calling station to the MF receiver in the manner described in connection with that circuit. When the outpulsing operation is terminated, the trunk assumes its circuit state 4, in which relay B is released, leaving only the operation of relay C. An MF outpulser is attached to the T1 and R1 conductors of the trunk via the switching network at this time, and it outpulses forward to the toll office the information required by it. Following the outpulsing operation, relay A is operated to put the trunk circuit in its state 5, which is designated "cut-through." The incoming and outgoing portions of the trunk are now connected and the calling and called stations may converse.

Following the termination of the call, when the called station hangs up, the trunk assumes circuit state 4, entitled "release forward." Relay A releases at this time, leaving only relay C operated. Finally, when the calling station hangs up, the termination of current in the incoming loop terminates the current in ferrod R. The SPC receives an indication of this from the scanner and then releases relay C to restore the trunk circuit to its idle condition, numbeerd "0."

This trunk may also serve coin calls of varying types. In the serving of a coin call which does not enter overtime, the trunk circuit would undergo the following numbered change of circuit states, with reference to FIG. 91: 0, 4, 6, 4, 5, 4, 6, 4, 0. The operation of the trunk for the portion of the call involving the sequence 0, 4, 6, 4, 5, 4, is the same as already described with reference to the noncoin call. However, following the last occurrence of state 4, the trunk assumes its state 6, in which relay B is operated automatically by the SPC to initiate a coin control operation to collect the initial period deposit. Following circuit state 6, the trunk enters circuit state 4 as relay B is released. Circuit state 4 comprises the termination of the coin control operation on a disconnect. The circuit next enters circuit state 0 as it is restored to an idle condition.

The trunk circuit would undergo the following numerical states during the serving of a coin call with overtime: 0, 4, 6, 4, 5, 7, 5, 4, 6, 4, 0. This sequence is essentially the same as for a coin call, with no overtime except for the circuit state 7, to which the trunk enters from a circuit state 5. Following state 7, the trunk returns to state 5. State 7 comprises the coin control or ringback state, in which the operator collects the monetary deposits for the initial period before permitting the call to enter overtime.

Dial pulse trunk circuit—FIGS. 92 and 92

The dial pulse trunk circuit shown on FIG. 92 provides a path from the originating office to the TSPS center over the T and R conductors on its left side and provides a path from the TSPS center to the toll office over its T and R conductors on its right side. This circuit is termed a "dial pulse trunk circuit" since it serves calls extending from offices which outpulse called station information, including area code, if any, in dial pulse form. However, even though the called information is outpulsed in this manner, the originating offices served by this trunk may nevertheless outpulse calling station information in MF form, provided, of course, that they are equipped with the necessary automatic number identification equipment, hereinafter referred to as "ANI." The conductors of this trunk circuit designated T, R, T1, R1, within the group 9204 extend to the trunk link circuit of FIG. 80 and, in particular, to the conductor group 8021 thereon. The extension of these conductors to the trunk link circuit permits the switching network to interconnect its position side circuits with the incoming side of the trunk via conductors T and R, and with the outgoing portion of the trunk via conductors T1 and R1. The conductors within the group 9205 extend to ferrods L and R in the trunk frame scanner, which permits the SPC to monitor the current circuit state of the trunk circuit. The conductors within the group 9215 extend to the signal distributor in order that the magnetic latching relays A, B and C may be selectively operated and released by that circuit.

This DP trunk circuit contains provisions for counting up to the first two pulses of the first digit outpulsed to the TSPS center following its seizure by the originating office. The trunk contains this pulse-counting feature in order that no pulses will be lost in the event that a dial pulse receiver is not attached to the calling connection prior to the initiation of outpulsing within the originating office. This precaution is necessary for DP trunks, though not for MF trunks, since the TSPS center has no control over the time outpulsing begins on a DP call. Conversely, outpulsing for MF calls only begins in response to a START signal transmitted back from the TSPS MF receiver to the local office. Because of this, fast dialing by a calling subscriber may, in certain conditions of heavy traffic, cause one or more pulses to be transmitted to the DP trunk before the SPC and the switching network have had time to interconnect a DP receiver to the T and R conductors within the conductor group 9204.

The incoming loop of the DP trunk circuit on FIG. 92 is monitored by the windings of relay L. This relay operates when the trunk is seized by the originating office, and it also follows the dial pulses outpulsed from the originating office to the TSPS center. The contacts of the L relay within the 2-pulse counter 9206 control the operation of relays D, E, and F so that they count either 0 pulses, 1 pulses, or 2 pulses received by the trunk prior to the attachment of the DP receiver. When the DP receiver is attached to the T1 and R1 conductors of the trunk via the switching network, a potential is transmitted over conductor R1, whose magnitude and polarity indicate whether 0 pulses, 1 pulse, or 2 pulses have already been received on the call by the trunk. Following this, the contacts of relay L connected to terminal 9207 transmit ground pulses over the T1 conductor to the DP receiver in order to enable it to count the pulses subsequently received by the trunk. It is not necessary to describe in any further detail at this time the operation of the trunk circuit or the DP receiver with reference to the dial pulse counting operation, since this is already fully described in the application to J. A. Hackett and C. A. Sepulveda, Ser. No. 402,532, filed Oct. 8, 1964. This application describes in complete detail the manner in which the DP trunk circuit of FIG. 92 cooperates with a dial pulse receiver to count the pulses signifying called station information on DP calls.

FIG. 93 pictorially discloses the plurality of circuit states the trunk circuit may assume. The manner in which this circuit state diagram is to be interpreted has already been described with reference to the MF trunk circuit.

The following paragraphs describe the general operation of the DP trunk circuit during the serving of some of the more typical types of calls that may be encountered. The seizure of the T and R conductors of this trunk circuit by the originating office operates relay L which, in turn, operates relay D and energizes the scanner ferrod L to transmit a seizure signal to the SPC. The SPC responds to this signal and commands the switching network to interconnect the T1 and R1 conductors of the trunk with a DP receiver. The DP receiver, when connected, counts the pulses outpulsed from the originating office and presents an indication signifying the numerical value of each outpulsed digit to the SPC via the master scanner. When the outpulsing is terminated, the SPC disconnects the DP receiver and, assuming that the originating office is equipped for ANI operation, the SPC commands the switching network to connect an MF receiver to the T and R conductors of the trunk via the switching network. The MF receiver, when connected, receives and registers the calling station information and transmits it to the SPC via the master scanner. The SPC then commands the switching network to disconnect the MF receiver and connect an operator position to the T and R conductors of the trunk and an MF outpulser to its T1 and R1 conductors. The MF receiver outpulses the called station information forward under control of the SPC and, simultaneously, the operator converses with the calling party to ascertain the service required by him on the call. She then furnishes this service and disconnects from the call. The MF receiver is disconnected from the call immediately upon the completion of its function.

The DP trunk circuit of FIG. 92 assumes the following numbered sequence of circuit states during the serving of a noncoin call: 0, 2, 6, 4, 5, 4, 0. During the serving of a coin call which does not require overtime, the following numbered sequence of states is assumed: 0, 2, 6, 4, 5, 4, 6, 4, 0. During the serving of a coin call with overtime, the following numbered sequence of states is assumed: 0, 2, 6, 4, 5, 7, 5, 4, 6, 4, 0. A further description of the function of this trunk circuit during each of the above-identified numbered states is not believed necessary at this time, since it is analogous to that already described for the MF trunk circuit.

Coin-control trunk circuit—FIGS. 94–96

The purpose of the coin-control trunk circuit shown as element 346 on FIG. 3A is to transmit back to an originating office the signals it requires on coin calls to perform coin-collect, coin-return, and ringback functions. The ringback signal is also used on noncoin calls. The control signals generated by this circuit may be either of the AC or DC type, depending upon the requirements of the originating office. For AC signaling, a unique combination of frequencies representing the function to be performed is generated and transmitted back to the originating office. A unique combination of DC potentials is applied for each DC control signal.

The coin-control trunk circuit is connected to a call by the switching network under control of the SPC. The SPC determines when the connection is to be made, either automatically or in response to the reception of a signal from the operator position currently connected to the call. Thus, a coin-collect, coin-return, or ringback function may be initiated automatically by the SPC, or alternatively, it may be initiated by the SPC in response to a signal to this effect from an operator position. Once the coin-control trunk circuit is connected to a call, the circuit operations within it which are necessary for the generation of the required control signals are controlled by the signal distributor operating under control of the SPC. Various circuit points within the coin control trunk are connected to master scanner ferrods in order that information regarding its circuit state may be available to the SPC.

The details of a coin-control trunk circuit are shown on FIGS. 94 and 95 when arranged as shown in FIG. 96. The T and R conductors on the upper left portion of FIG. 94 extend to position link circuit on FIG. 80, which is operable under control of the SPC to extend these conductors through to those of a calling trunk circuit. Frequency generator 9403 generates three signals of different frequencies, and the AC control signals required on a call are obtained by selectively connecting two of the three frequency sources to the T and R conductors. The plus 130-volt potential at terminal 9404, the negative 48-volt potential at terminal 9405, and the ground potential at terminal 9407 comprise the potential sources utilized when DC signals are required by an originating office. The relays A, B, C, and D in FIG. 95 are of the magnetic latching type, and they operate and release in response to signals from the signal distributor. Relays A, B, and C may also be released by means of locally generated signals originating at the plus 24-volt potential on terminal 9504. Relays T, CT, T1, RB1, and RB2 operate and release by means of circuit paths internal to the trunk.

When the trunk is initially connected by the switching network to a call, none of its relays are operated and no potentials are applied over the T and R conductors to the calling circuit. Thus, for a brief time, the TSPS trunk circuit remains in control of the connection. The coin trunk remains in this condition until one of relays A, B, C, or D is operated. Relay A is operated to initiate a coin-collect operation; relay B is operated to initiate a coin-return operation, while relay C is operated to initiate a ringback operation. Relay B is operated for a DC signaling operation together with one of relays A, B, or C. Relay D is not operated for an AC signaling operation.

Let it first be assumed that the circuit is to perform a coin-collect operation by AC signaling. This requires the operation of relay A. Relay A is operated by the signal distributor subsequent to the connection of the coin trunk to the calling trunk circuit. The signal distributor operates relay A by applying a negative pulse to conductor SD00 and a ground pulse to conductor SDG. The operation of relay A closes its make contacts on FIG. 94 to connect the windings of ferrod F0 in the master scanner to the T and R conductors. This circuit path includes break contacts of relay D connected to terminals 9401 and 9402, make contacts of relay A, two windings of the L inductance, the windings of ferrod F0 to ground on its left winding, and to negative battery on its right winding. This path applies negative 48 volts to the T conductor and ground to the R conductor. The SPC now removes the TSPS trunk circuit supervision, and the potentials applied by the coin control trunk circuit constitute the supervision of the call for the time being.

Relay A, operated, operates relay CT from the terminal 9501 ground in series with the break contacts of relay T. Relay CT, operated, operates relay T, which in turn opens the path for relay CT, which now begins a slow-release operation that occupies roughly 200 milliseconds. Relay T, in operating, also extends the terminal 9406 ground through the break contacts of relay T1 to energize ferrod F1.

When relay CT releases, its break contacts extend the terminal 9406 ground to operate relay RB2. Relay RB2, in operating, closes its make contacts on FIG. 94 to complete the connection between the T and R conductors and the frequency generator 9403. At this time, the following circuit is closed to connect the 1100-cycle frequency to the T conductor: terminal 9401, break contacts of relay D, make contacts of relay A, terminal 9422, make contacts of relay RB2, capacitor C1, break contacts of relay C, make contacts of relay A, to the 1100-cycle generator. The following circuit is also closed at this time to apply a 700-cycle signal to the R conductor: terminal 9402, break contacts of relay D, makes contacts of relay A, terminal 9423, make contacts of relay RB2, capacitor C2, break contacts of relay B, make contacts of relay A, to the 700-cycle generator.

The application of 700 cycles and 1100 cycles to the T and R conductors at this time effects a coin-collect operation in the originating office. The energization of ferrod F1 when relay T operated constituted a signal to the SPC that the coin-collect signal would be transmitted back to the originating office after a delay of 200 milliseconds, as required for the release of relay CT and the subsequent operation of relay RB2. The operation of relay T at that time also extends the terminal 9508 negative battery through make contacts of relay T to the terminal 9509 input of the timer 9511. The timer operates in response to the reception of this negative potential and, after a delay of one second, operates relay T1, whose break contacts open the circuit for ferrod F1. The de-energization of this ferrod constitutes a signal to the SPC that the coin-collect signal has been transmitted.

This completes the function of the coin-control trunk on this call, and the SPC, once it gets the signal that ferrod F1 has been de-energized, commands the signal distributor to release relay A by applying a positive pulse to conductor SD00 in a ground pulse to conductor SDG. At the same time, the SPC commands the switching network to break down the connection between the calling TSPS trunk circuit and the coin-control trunk circuit of FIGS. 94 and 95. The release of relay A restores this circuit to normal.

The preceding has described the operation of the coin-control trunk circuit, and, in particular, the manner in which it generates a coin-collect signal by means of AC signaling. It functions in a similar manner to generate coin-return signals when relay B is operated and to generate a ringback signal when relay C is operated. These signals are generated in a manner identical to that already described for a coin-collect operation in connection with the operation of relay A. The only difference is that a coin-return signal requires the operation of relay B and applies 1100 cycles to the T conductor and 1700 cycles to the R conductor. Similarly, a ringback function with relay C operated applies 1700 cycles to the T conductor and 700 cycles to the R conductor.

The following describes the manner in which this circuit operates to send back DC control signals to the originating office. As was the case for AC signaling, no relays are operated at the time the coin-control trunk is connected to a call, and thus the supervision of the call remains momentarily under control of the calling TSPS trunk circuit. Subsequently, the signal distributor operates relay D whenever DC signaling is to be used and then time operates one of relays A, B, or C, depending upon the specific control signal that is to be supplied. Let it be assumed in this case that relay B is operated for a coin-return function. The operation of relay D operates its transfer contacts connected to terminals 9401 and 9402 so that a path is closed to interconnect the T and R conductors with the potentials as supplied by the windings of ferrod F0. This path includes make contacts of relay D, break contacts of relay CT, windings of the L inductance, and windings of ferrod F0. Negative battery is applied to the T conductor and ground to the R conductor at this time in the same manner as already described for AC signaling.

The operation of relay B for a coin-return function operates relay CT from the terminal 9501 ground. The operated condition of relays D and CT closes a path through their make contacts to energize the F1 ferrod with the terminal 9406 ground. The energization of this ferrod constitutes a signal to the SPC that the coin-return signal is about to be generated and applied back to the originating office. The operated state of relays D and CT also closes another path through their make contacts to apply a negative battery to terminal 9509 of the timer 9511. This timer operates in response to this signal and, after a delay of one second, operates relay T1. The DC signaling potentials are applied to the T and R conductors during the interval whose beginning is signified by the operation of relay CT and whose termination is signified by the operation of relay T1 which, in operating, closes a path over its make contacts to apply plus 24 volts from terminal 9504 to the winding of relay B to release it. During this interval, the potentials applied to the T and R conductors are plus 130 volts on the R conductor and negative 48 volts on the T conductor. The path for the R conductor is as follows: terminal 9402, make contacts of relay D, make contacts of relay CT, break contacts of relay C, make contacts of relay B, break contacts of relay A, resistor R7, to the plus 130 volts on terminal 9404. The circuit for the T conductor is as follows: terminal 9401, make contacts of relays D and CT in series, terminal 9412, break contacts of relay C, make contacts of relay B break contacts of relay A, terminal 9418, resistor R6A, to the negative 48 volts on terminal 9405. This combination of potentials is transmitted back to the originating office, which performs a coin-return function in response thereto.

As already mentioned, the operation of relay T1 releases relay B, which in turn removes the DC control potentials from the T and R conductors. The release of relay B also releases relay CT, and the reclosure of their break contacts connect the potentials on the windings of ferrod F0 to the T and R conductors. The release of relay CT also opens its make contacts to de-energize ferrod F1 as a signal to the SPC that the coin-return signal has been generated and transmitted to the originating office. The SPC then restores the circuit to normal by commanding the signal distributor to release relay D.

The following describes the manner in which this circuit operates to generate a DC ringback signal. The circuit is in its idle condition when initially connected to the call in the same manner as priorly described. Relay D is operated to connect the windings of ferrod F0 to the T and R conductors to permit this circuit to assume supervision of the connection. This applies negative 48 volts to the T conductor and ground to the R conductor. Subsequently, relays D and C are operated to generate the ringback signal. The operation of relay C operates relay CT by means of its make contacts from the terminal 9501 ground. At this time, neither relay A nor B is operated, and therefore the terminal 9505 ground is not applied to input terminal 9510 of the timer. This causes its timing interval to be increased from one to two seconds. Make contacts of relays D and CT, in series, at this time connect the terminal 9508 negative battery to input terminal 9509 of the timer to cause it to begin a two-second timing operation, at the end of which it operates relay T1. The operated state of relays D and C closes a path through the make contacts of both to apply the terminal 9503 ground through the break contacts of relay RB2 to the winding of relay RB1 to operate it. The operation of this relay closes a path to extend the ground on terminal 9512 through its own make contacts to the winding of relay RB2 to operate it. This relay, in operating, opens the path of relay RB1, which then releases and in turn releases RB2. This alternate operation and release of relays RB1 and RB2 continue for the duration of the interval timed by the timer 9511. At the end of the timing interval, relay T1 operates and, by means of its make contacts, applies a positive 24-volt potential to the left winding terminal of relay C to release it. The release of relay C releases relay CT and opens the path of relay RB1 to stop the alternate operation and release of relays RB1 and RB2.

During the two-second timing interval during which the ringback potentials are applied to the T and R conductors, the condition of the circuit is such that the R conductor may be extended through make contacts of relays D, CT, and C in series, to the terminal 9414, while the T conductor may be extended through make contacts of relays D, CT, and C, in series, to the terminal 9417. Terminal 9414, and in turn the R conductor, is connected to the terminal 9407 ground whenever one or more of relays RB1 and RB2 are relased, and alternately is connected through resistors R6 and R6A to the negative 48-volt potential on terminal 9405 whenever both of relays RB1 and RB2 are operated. Similarly, the terminal 9417 and, in turn, the T conductor, are alternately connected between the terminal 9407 ground (when both relays RB1 and RB2 are operated) and the negative 48-volt potential on terminal 9405 (whenever one or more of these two relays are released). The transmission of these flashing reversals of polarities back to the originating office for the two-second period causes it to perform a ring-back function of the calling line. The ring-back signal is terminated when relay T1 operates to release relay C and, in turn, relay CT. The release of relay CT reconnects the windings of ferrod F0 to the T and R conductors as a supervisory potential.

Ferrod F1 is energized when relays D and CT are operated, as a signal to the SPC that the circuit is about to generate its required control signal. Subsequently, the release of the relay CT, in response to the release of relay C, de-energizes the ferrod as a signal to the SPC that the circuit has performed its intended function. The SPC then commands the signal distributor to release relay D and restore the circuit to its idle state. At this time, the SPC simultaneously commands the switching network to disconnect the coin-control trunk from the call.

Information trunk circuit—FIG. 98

The information trunk circuits, 323 on FIG. 3A, interconnect the trunk link with trunks extending to information desks, rate-and-route desks, and the like. These trunk circuits are required in order that an operation position may obtain the information that is required for the serving of certain calls. For example, these circuits would be used to obtain rate-and-route information on calls to infrequently called destinations, the information pertaining to which cannot be economically inserted into the SPC for handling on an automatic or semiautomatic basis. For convenience in discussion, both information operators and rate-and-route operators are referred to generically as "information operators" in the following paragraphs. Also, the positions at which these operators are stationed are referred to as "information desks."

A TSP operator serving a call may obtain a connection to an information desk by two different procedures. First of all, she may put the incoming call on HOLD and then depress a key to establish a network connection between the information trunk circuit and her position. Putting the call on HOLD also causes the switching network to break down the link connection between the calling trunk circuit and the operator position. This leaves only the TSP operator and the information operator connected speechwise at this time by the network. Alternatively, the TSPS operator may leave the incoming call connected to her position and, at the same time, she may depress a key to interconnect her position via the switching network with the information trunk circuit. This is a 3-way talking connection between the calling party, the information operator, and the TSP position serving the call.

For the first alternative, the operator depresses the HOLD key for the calling loop and then depresses one of keys OGT0 through OGT3 on FIG. 61, each of which is associated with a different information trunk circuit. The depression of the HOLD key transmits a signal to the SPC, which commands the network to break down the path between the calling trunk circuit and the TSP operator position. The depression of key OGT0, for examples causes the SPC to control the establishment of a link connection between one of information trunk circuits 323 and the TSP operator position serving the call. Once this connection is established, the TSP operator converses with the operator at the information desk connected to the other side of the service trunk circuit. When she has obtained the required information, she releases key OGT0 and reoperates the access key for the loop currently in the HOLD condition. The release of key OGT0 breaks down the link connection between the TSP operator position and the information trunk circuit. The depression of the access key causes the network to reconnect her position with the calling TSPS trunk circuit.

In accordance with the second procedure, the TSP operator leaves the call connected to her position and operates key OGT0, for example. This connects her position with the information trunk circuit and she may then communicate with the information operator connected to the other side of this circuit while the calling party remains on the connection. Key OGT0 is subsequently released when the TSP operator has received the required information. This breaks down the network connection between the information trunk circuit and the TSP operator position.

The details of the information trunk circuit are shown on FIG. 98. The right-hand T and R conductor pair extends to an individual appearance on the trunk link while the left-hand T and R conductor pair extends to an information operator desk or a rate-and-route operator. The relays of this circuit are of the magnetic latching type, and they operate and release from pulses supplied by the signal distributor in the same manner as already described for other trunk circuits. The state of the incoming side of this circuit is monitored by the L ferrod which is in the scanner and is indivdual to this trunk circuit.

A TSP operator position serving a call obtains a connection to this trunk circuit by depressing the key OGT- of her position individual to this circuit. The depression of this key, such as for example, key OGT0, sends a signal to this SPC, which causes a network path to be completed between the trunk link appearance of this circuit and the position link appearance of the TSP position serving the call. At the same time, the SPC commands the signal distributor to operate relay 98–A. The operation of this relay closes its make contacts on FIG. 98 to shunt the ferrod L in the scanner across the incoming T and R conductors. This D-C shunt operates a relay in the information desk which, in turn, closes contacts which apply an additional shunt across the T and R conductors, thereby altering the D-C state of the circuit and changing the current through the L ferrod. This change of current is detected by the scanner and transmitted to the SPC as a signal that the distant circuit has responded to its seizure.

The break contacts of relay B, capacitor C1, and resistor R1, which are in series between terminals 9805 and 9806, provide a network which supplies a proper impedandance termination to the T and R conductors. If the TSP operator leaves the calling party connected to her position while she converses with the information operator, relay B is operated by the signal distributor to remove the network in order to provide the impedance required for a 3-way connection. On the other hand, if the calling party is placed on HOLD while the TSPS operator converses with the information operator, relay B is not operated and the network provides the impedance match required for a two-way connection.

The TSP operator may converse with the information operator as soon as seizure of that circuit has been accomplished. This trunk circuit is released in response to the TSP operator's release of her key OGT0. The SPC receives this signal and commands the signal distributor to release relay A, as well as relay B, if operated. The release of relay A removes the L ferrod from the left-hand T and R conductor pair. This removes the D-C shunt from these conductors and releases the distant board.

Delayed call trunk circuit—FIG. 99

The purpose of the delayed call trunk circuit, element 350 on FIG. 3A, is to permit an operator at a position to establish a connection between two priorly selected stations. In the normal case, a delayed call is made because a priorly attempted call could not be successfully completed, such as for example, because the called station was busy or did not answer. In this case, the calling party on the unsuccessful call requests the operator to attempt to call at a later time and, in so doing, he gives the operator his own number as well as that of the station he is attempting to reach. Later, at the specified time, the operator attempts to complete the call by seizing a delayed call outgoing trunk circuit and by keying the calling and called numbers into the system. The SPC responds to the receipt of the calling number, establishes a link connection between an outpulser and the delayed call trunk circuit, and then controls the outpulser to transmit the calling number forward to one of the two incoming toll trunk circuits individual to the delayed call trunk circuit. The toll office receives this information and, in the customary manner, controls the extension of a connection to the calling party. The SPC next commands the outpulser to transmit the called- number to the other incoming toll trunk circuit associated with the delayed call trunk circuit. The toll office receives this information and controls the extension of a connection to the called station. The SPC also commands the network to establish a connection between a TSP operator position and the delayed call trunk number. This permits the operator to converse with the calling party prior to the time the called station answers. If the call is of the person-to-person or collect type, the operator may, before releasing, perform the appropriate services at the time the called station answers. If the call is of the station-to-station type, the operator releases when the called station answers.

The system of our invention also contains facilities which permit delayed calls of the foregoing type to be set up automatically at a later time in response to information keyed into the system by the operator at the time the call was first attempted and could not be completed. At this time, the operator determines the time at which the calling party subsequently desires the call to be attempted and keys this time information into the system along with the calling and called numbers. The operator position is then released from the connection and is made available to serve other calls. The clock within the SPC times the interval of delay following which the call is to be reattempted and, once this interval has transpired, seizes a delayed call trunk circuit, establishes a link connection between the delayed call trunk circuit and an outpulser, controls the outpulser to transmit the calling station information forward to the first toll office incoming trunk circuit associated with the delayed call trunk circuit, controls the outpulser to transmit the called information to the second toll incoming trunk circuit associated with the delayed call trunk circuit, and, upon the termination of the outpulsing of the calling number, controls the network to establish a connection between the delayed call trunk circuit and an operator position. Once this connection is established, the SPC transmits via the group gate and the position signal distributor the information required at the position to apprise the operator regarding the type of call she is now serving. Once connected, the operator converses with the callying party, informs him that the call is now being attempted in accordance with his earlier request, and then provides whatever call assistance, if any, is required before releasing from the connection.

The details of the delayed call trunk circuit are shown on FIG. 99. The relays of this circuit are of the magnetic latching type and they operate and release in response to pulses received from the signal distributor. The state of this trunk circuit is monitored at two points by the L and R ferrods individual to this circuit within the trunk scanner. The L ferrod monitors the D-C state of the T and R conductor pair after the A relay is operated on a call. Similarly, the R ferrod monitors the D-C state of the T1, R1 conductor pair after the C relay is operated. The T1, R1 conductor pair on the upper right side of FIG. 99 extends to the toll office incoming trunk circuit functionally associated with called stations, while the T and R conductor pair on the upper left side of the figure extends to the toll office incoming trunk circuit functionally associated with calling stations. The T1 and R1 conductor pair 9902 extends to a first appearance on the trunk link, while the T and R conductor pair 9901 extends to a second appearance on the trunk link circuit.

During the serving of calls, the operator position is connected by the network to this trunk circuit by means of the T and R conductor pair 9901. The outpulser is connected by means of the T1 and R1 conductor pair 9902. The T and R conductor pair 9901 extends to the upper T and R conductors at terminals 9917 and 9918. This arrangement permits the operator to converse with the calling party whenever the make contacts of relay A are closed to interconnect these terminals with the T and R conductors extending to the toll office. Similarly, the T and R conductors from the operator position may be extended speechwise through capacitors C1 and C2, and through the make contacts of relay C, to the called station whenever relay C is operated. The T1 and R1 conductor pair 9902, to which the outpulser is connected during the serving of calls, may be extended through break contacts of relay B at terminals 9913 and 9914, and from there through break contacts of relay A to the T and R conductors extending to the calling station. Also, the T1 and R1 conductors at terminals 9913 and 9914 may be extended through make contacts of relay B and break contacts of relay C to the T1 and R1 conductor pair extending to the called station.

The foregoing circuit arrangement permits our system to complete delayed calls by either outpulsing the calling number first, followed by the called number, or alternatively, by outpulsing the caleld number first, followed by the calling number. Similarly, the same circuit arrangement permits the operator position to be in communication speechwise with either the calling or the called station first, depending upon which number is outpulsed first by the system.

The following circuit description describes the sequence of relay operations for a call for which the calling party is called first and for which the called party releases first. The normal state of the circuit in its idle condition is that none of its relays are operated. If a delayed call is set up manually by an operator, the operator depresses one of the access keys at her position. This transmits a service request signal to the SPC which, in turn, controls the interconnection of the position with an idle delayed call trunk circuit, such as for example, that shown in detail on FIG. 99. If, on the other hand, the delayed call is to be set up automatically at the end of a period which is timed by the SPC, the operator position that is to serve the call is not connected to the delayed call trunk circuit until the outpulsing of the calling station information has taken place. Regardless of the manner in which the call is set up, an outpulser is attached to the trunk circuit at the T1 and R1 conductor pair 9902. This connection is extended to break contacts of relays B and A to the T and R conductors at terminals 9915 and 9916. These conductors extend to the toll office incoming trunk circuit functionally associated with the calling party. At this time, the SPC causes the outpulser to transmit the calling station digits to the toll office which, in response thereto, initiates the establishment of a connection extending to the calling office. The SPC controls the connection of an operator position to the T and R conductor pair 9901 at this time in the event the call is of the type that is set up automatically. Once the calling station answers, the operator informs him that the call is now being attempted in accordance with his earlier request.

The SPC commands the operation of relay A on the termination of the calling station outpulsing operation. The break contacts of relay A open at this time and disconnect the outpulser from the T and R conductors at terminals 9915 and 9916. The make contacts of relay A, in operating, place the winding of scanner ferrod L across the T and R conductor pair so that the SPC may monitor this side of the trunk circuit.

Next, the SPC commands the operation of relay B, which closes its make contacts and connects the outpulser at terminals 9911 and 9912 to the T1 and R1 conductors which extend to the toll office incoming trunk circuit functionally associated with called stations. The SPC now commands the outpulser to transmit the called station information to the toll office which, in response thereto, effects the establishment of a connection to the called station. The SPC operates relay C upon the termination of this outpulsing operation.

The operation of relay C closes, it makes contact to complete a cut-through, speechwise, between the T and R conductors extending to the calling station and the T1 and R1 conductors extending to the called station. The SPC commands the switching network to disconnect the outpulser from the conductor pair 9902 on the completion of the second outpulsing operation. When the C relay is operated subsequent to the second outpulsing operation, the operator and the calling party both hear the ringing current applied to the called line. The operator may now release from the connection when the called station answers if the call is of the station-to-station type. If further assistance is required, she may remain on the connection until the call is completed in the manner requested by the calling party.

The circuit remains in the state in which relays A, B and C are all operated for the duration of the call until the called station releases. At this time, relay B releases followed by the release of relays B and C. The R ferrod provides a D-C termination for the T1 and R1 conductor pair, once relay C is operated, and the current through this ferrod permits the SPC to supervise the called end of the connection.

Automatic message accounting equipment (AMA)—
FIG. 97

The function of the AMA equipment (element 337 on FIG. 3C) is to record the call charge data required for billing purposes. The data that is to be recorded is transmitted from the memory of the SPC to the AMA equipment, where it is recorded on magnetic tape. The magnetic tapes are collected periodically and transported to data processing centers, where the recorded information thereon is reprocessed, the call charges computed, collated, and transferred to the account of each calling subscriber.

The AMA equipment utilized in the system of our invention may be identical, if desired, to that disclosed in detail on pages 2306 through 2319 of the aforementioned Bell System Technical Journal. Therefore, this equipment is disclosed, for the most part, diagrammatically in the present specification. FIG. 97 discloses the basic elements comprising the AMA equipment, and a brief discussion of the operation of this equipment with respect to FIG. 97 will be sufficient for the purposes of this specification.

The call data that is to be recorded is transmitted from the memory of the SPC to the AMA via the binary address bus system. As is the case with other peripheral circuits, the input circuits of the AMA equipment register address bus commands only in the even that an enable pulse is coincidentally received from the CPD. The registered information is checked for parity, translated, and then recorded on magnetic tape.

On FIG. 97, address bus commands are transmitted to the AMA equipment by means of the binary address bus system which comprises binary address bus 0 and binary address bus 1. The conductors of the buses which are utilized for transmitting AMA data bits are threaded through cable receiver 9701 in the same manner as already described for other peripheral circuits. The CPD enable pulses are applied to sequence control circuit 9702 by conductors EN01, EN00, EN11, and EN10. The cable receivers 9701, the input registers 9704, and translators 9709, may be furnished on a duplicated basis, as in other peripheral circuits. The four enable leads togethed with the binary address buses permit either half of the receiving equipment to be commanded by the SPC and the CPD to receive and register commands from either binary address bus 0 or binary address bus 1.

The pulses applied to the enable leads are received by the sequence control circuit and applied over enable circuit 9703 to cable receiver 9701, which contains circuitry similar to that shown in FIGS. 7 and 8. The coincidental reception of a pulse on the selected one of the four enable conductors, together with a command on the binary address bus system, permits the cable receivers to pick off a command from either bus and apply it to either half of input registers 9704.

The information stored in the register is transmitted over path 9705 to parity check circuit 9706 which, if the parity checks good, transmits an unlocking signal to translator 9709 over path 9707. The reception of this signal unlocks the translator and permits it to receive the information stored in register 9704. A parity check signal is also transmitted over path 9708 to cable drivers 9710 for transmission back to the SPC, over bus 9719, as an indication that the command applied to the binary address bus has been stored with good parity.

In addition to its usual function of generating enable pulses, the CPD also transmits to the AMA the signals it needs to control the tape recording operation, including the starting and stopping of the tape recorder motors, etc. These pulses are transmitted from the CPD and applied to the sequence control circuit 9702, via conductor group 9720.

A recording operation is initiated, following the registration of a command in register 9704, when the CPD transmits a signal over path 9720 to cause sequence control circuit 9702 to transmit a motor START signal over conductor 9714 to the tape unit 9711. This signal energizes the recorder motors so that they move the tape at the speed required for a recording operation. The CPD next transmits a character-WRITE command over path 9713 to translator 9709. The receipt of this signal causes the translator to translate the information stored in the register into the code required by the recorder and to apply the translated information to the recording circuitry of the tape unit 9711. The information stored in the register may comprise a plurality of characters to be recorded, and therefore the translator, in response to the receipt of the character-WRITE command, transmits the information to the tape unit, character by character.

With reference to the foregoing, the aforementioned Bell System Technical Journal article describes how the registered information may comprise 20 information bits, together with a parity bit, for a total of 21 bits. It also describes how the 20 information bits represent five 4-bit characters, which are to be recorded successively by the tape unit on five trans, with the fifth track being used for parity. This being the case, the translator, in response to a WRITE command, translates the information in the register sequentially, four bits at a time and applies the translated information, character by character, to the tape unit. Thus, since each 20-bit command represents five characters, the receipt of a command by the register causes the translator to transmit five 4-bit words sequentially to the tape unit.

The SPC may continue the recording operation in an uninterrupted manner, if desired, by sequentially transmitting a plurality of successive address commands to the two halves of the register so that the information representing the next command is entered into a second portion of the register while that in the first half is currently being translated and recorded. Following this, the information in the second half may be translatsed and recorded while the first half of the register receives a new command from the bus system. Finally, when the quantity of information determined by the SPC has been recorded, the CPD transmits a signal to the sequence control unit which, in turn, transmits a motor STOP pulse over conductors 9714 to the tape unit.

The sequence control unit also operates, under CPD control, to transmit RESET pulses to the registers over path 9712.

Conductor paths 9716 and 9721 connect master scanner ferrods to the internal circuit points within the sequence control and the tape unit in order that their circuit state may be monitored. Cable drivers 9710 apply signals to bus 9719 so that the information represented by these signals may be immediately available to the SPC. Conductors 9708 apply informtaion signifying the parity of the registered information to the cable drivers. Conductors 9718 supply information regarding the state of the tape units. Conductors 9715 supply information regarding the state of the sequence control circuit. Conductors 9722 connect an output of the master scanner to the cable driver. A signal is transmitted over this path to the SPC whenever any of the master scanner ferrods connected to the AMA unit change state. The SPC, in response to the receipt of this signal from the scanner, immediately commands the scanner to interrogate the ferrod row serving the AMA in order that it may analyze the status of the AMA circuitry without delay.

Stored program controller (SPC)—FIGS. 100, 101, 102A–102E, 103

The SPC, shown as element 330 on FIG. B, comprises a stored program machine having a processor 330A and a memory 330B. The memory stores both programmed instructions and data. All instructions, and some data, are stored on a relatively permanent basis and are changed only infrequently from time to time. Other of the data is relatively temporary in nature, since it may be entered into memory, modified, and erased during the serving of a call. The programmed instructions form the entirety of the vocabulary of the computer, and they provide the intelligence necessary to instruct the processor in the many functions required of it under any of the many call situations the SPC may encounter. The processor monitors and controls peripheral equipment by performing logical and/or arithmetic operations on data temporarily stored in registers within it under control of a sequence of programmed instructions and by transmitting to the peripheral equipment output information or commands generated while performing these operations. Although the computer may perform many different functions, it is capable of executing only one instruction at a time under control of the programmed memory.

The SPC, in performing its functions, either directly or indirectly, controls the operation of every circuit in our system. All commands specifying an operation in another circuit originate within the SPC and all answers signifying the existing operational state of many circuit points within the systems are returned to the SPC. Certain instructions result in actions which are entirely confined within the SPC. For example, an instruction or series of instructions may command the SPC to perform logical and/or arithmetic operations on the data currently contained within it. Other instructions may cause the SPC to command a peripheral circuit to perform an operation which results in an answer being transmitted back to the SPC via the scanner. An instruction, for example, may result in a command being sent to the scanner to read or interrogate a specified row of ferrods. The result of the interrogation is transmitted over the scanner answer bus back to the SPC, where the information is stored temporarily either in memory or in index registers within the processor until it can be later utilized.

The SPC communicates primarily with the CBT's (communication bus translators), the CPD's (central pulse distributors), and the scanners. The output signals of the SPC are commonly referred to as "commands" since they cause the circuit receiving them to perform the operation specified by the command. The commands transmitted to the CBT's are applied over circuit paths 347 and 348, and they instruct the CBT's to apply their own output commands to the address buses which, in turn, transmit them to the peripheral circuits to which they are connected. The SPC output commands are received by the CPD's over circuit paths 310 and 312, and they instruct the CPD's to unlock the receiving portion of a specified peripheral circuit in order that it, and only it, may receive and register the command currently on the address bus to which the specified peripheral circuit is connected.

The scanner answer signals are transmitted over the scanner answer bus 340 back to the SPC. The information repersented by these signals signifies the current state of many circuit points within our system. Each such circuit point is associated with an individual ferrod in the scanner, and the plurality of ferrods within a scanner are divided into rows. When the SPC desires to obtain information regarding the state of a specified circuit point, it causes commands to be transmitted to the scanner, which instructs it to scan the ferrod row containing the ferrod individual to the specified circuit point. The scanner answer transmitted to the SPC as the result of this interrogation represents the existing state of the specified circuit point as well as all of the other circuit points individual to the remainder of the ferrods in the interrogated ferrod row.

Figure 100:
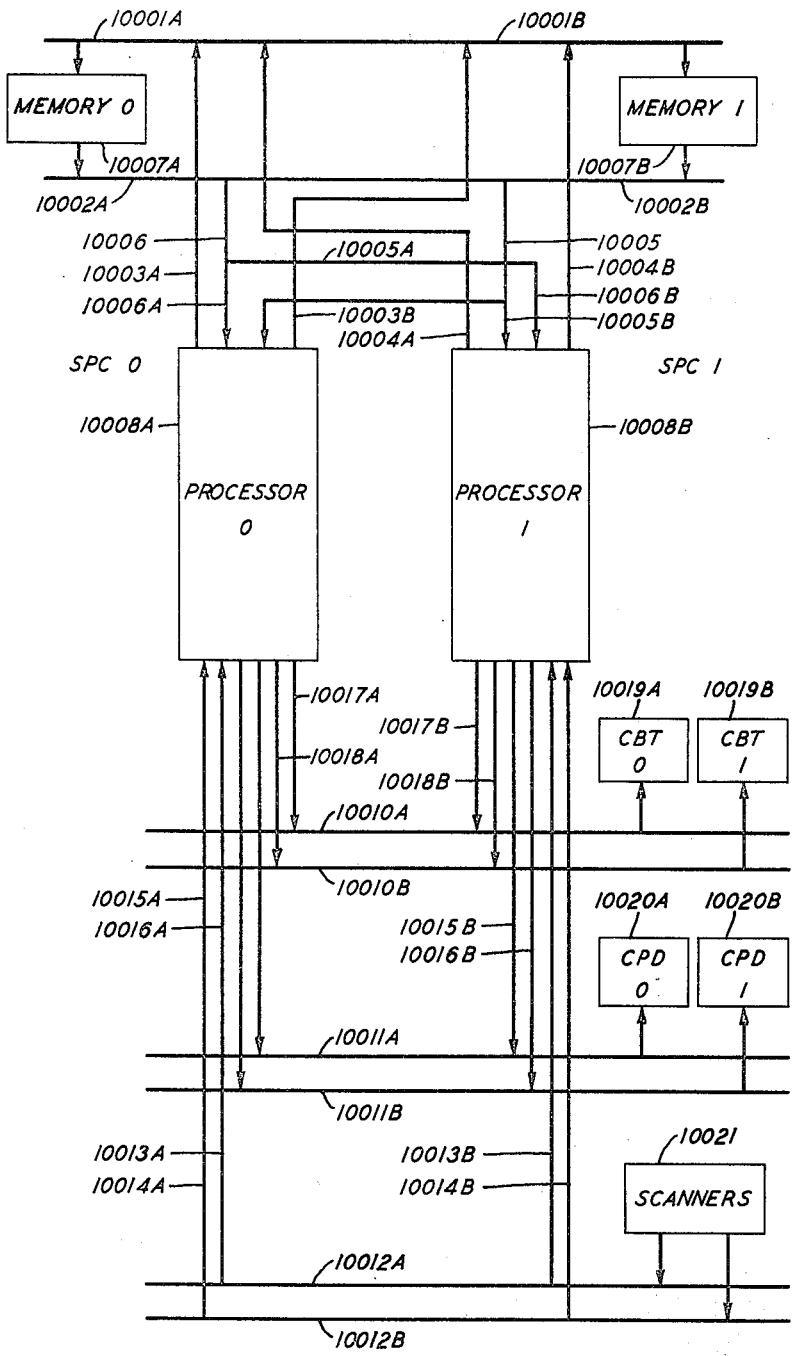

FIG. 100 discloses in greater detail the relationship between a pair of SPC's and the circuits with which they communicate. SPC 0 comprises processor 0 and memory O. These are elements 10008A and 10007A, respectively. The SPC comprises processor 1 and memory 1, which are elements 10008B and 10007B, respectively. Each processor retrieves either data or instructions from its associated memory by a read operation and enters information into its memory by means of a write operation. The input bus for memory 0 is element 10001A, while the input bus for memory 1 is element 10001B. The output bus for memory 0 is element 10002A, while the output bus for memory 1 is element 10002B. Each processor normally communicates only with its own memory. However, if required, either processor may communicate with either memory. Thus, processor 0 writes into memory 0 by means of path 10003A and into memory 1 by means of path 10003B. Similarly, processor 1 may write into memories 0 and 1, respectively, by means of paths 10004A and 10004B, respectively. Processor 0 may read from memory 0 by path 10006A and from memory 1 by path 10005A. Processor 1 may read from memory 0 over path 10006B and from memory 1 by means of path 10005B.

The lower portion of FIG. 100 discloses two CBT's (10019A and 10019B), two CPD's (elements 10020A and 10020B), and a plurality of scanners which are represented generally as the element 10021. Either processor may transmit commands to either CBT over buses 10010A and 10010B and to either CPD over buses 10011A and 10011B. The input and output circuitry of each scanner is arranged on a duplicated basis within each scanner so that each scanner may transmit its answer information to either SPC by either bus 10012A or 10012B.

Figure 101:
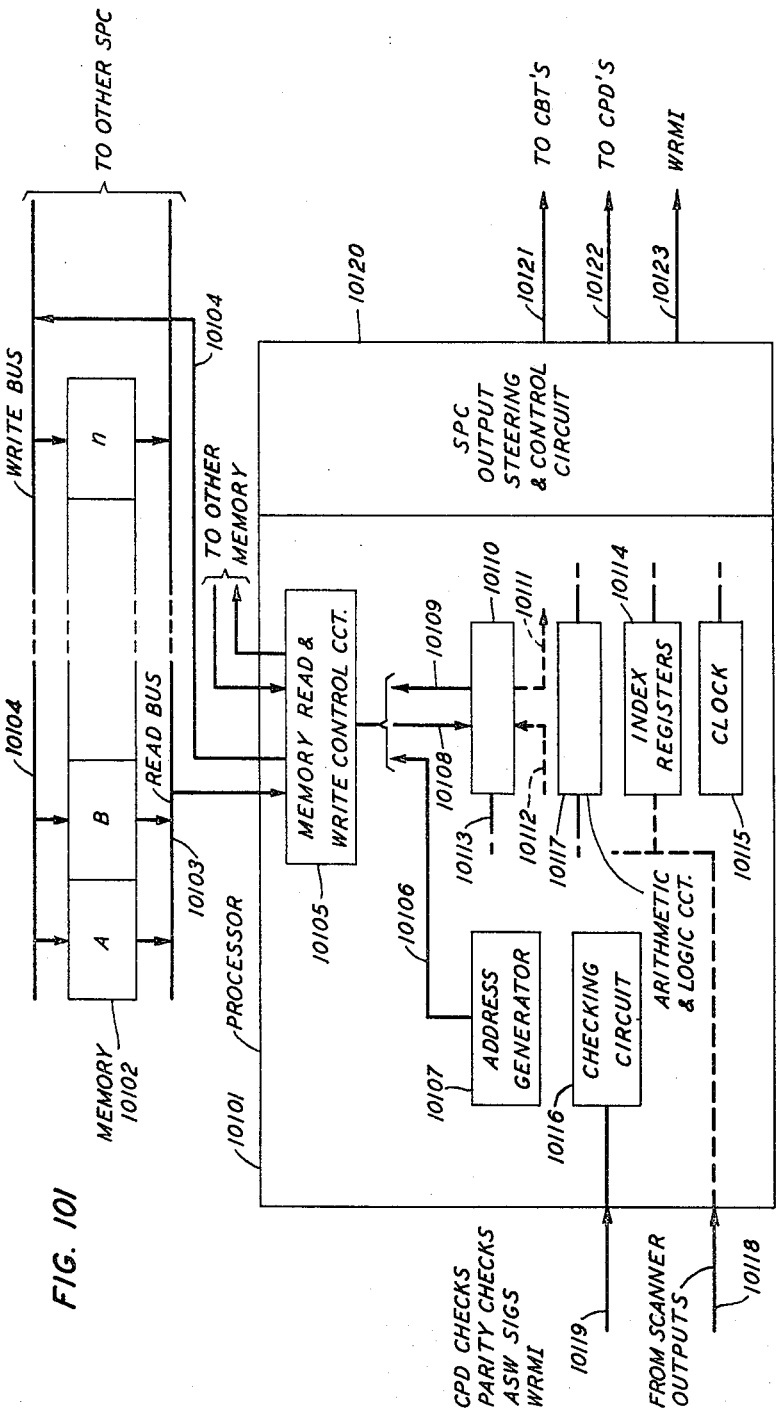

Additional details of a single SPC of a pair are shown on FIG. 101. This figure discloses a processor 10101, a memory 10102, the circuit paths interconnecting these two elements, as well as the circuit paths interconnecting the processor with circuits external to the SPC.

Memory 10102 is functionally subdivided into a plurality of portions designated A, B . . . n, each of which stores the program and data required to enable the SPC to perform a separate function in connection with the operation of our system. The Memory Read and Write Control Circuit 10105 within the processor controls the operations required to read data and instructions out of and enter data into memory. The information to be written into memory is applied to it over bus 10104 from the output of the circuit 10105. Similarly, the information that is read from memory is applied by means of bus 10103 to the circuit 10105. Each portion of memory is represented by an address, as is typical in stored program computers, and therefore in performing each read and write function, circuit 10105 obtains the address of the pertinent portion of the memory from address generator 10107 over path 10106. The memory access register MAR, shown as element 10110, transmits to circuit 10105 the information that is to be entered into memory on write operations, and on read operations it receives from circuit 10105 the information extracted from memory. The information that the MAR receives from memory on a read operation is transmitted to other elements (not shown) within the processor over path 10111. Similarly, the MAR receives from these other elements the data that is to be entered into memory on a write operation over path 10112.

Since the details of the processor comprise no part of the present invention, many of the elements with which the MAR communicates are shown only functionally. However, included in the processor is the circuitry required to operate upon and manipulate the data stored within it in order that both logical and arithmetic operations may be performed. This circuit is represented generally by the box entitled "Arithmetic and Logic Circuit" and shown as element 10117.

The index registers 10114 cooperate with the arithmetic and logic circuit to perform arithmetic and logical operations upon the data received by the processor, both from memory and from circuits external to the SPC. The index registers are also used to receive and register temporarily the scanner answer information. This information is received over path 10118 and, once received, it is stored within the index registers until it may be acted upon and then either entered into memory, utilized for other purposes, or discarded. Checking circuit 10116 receives the various check signals, parity signals, all-seems-well signals, and WRMI signals which must be received by the SPC in response to the various commands it transmits to other circuits before it proceeds with another command. The output commands generated by the SPC are applied to external circuits by the circuit entitled "SPC output steering and control circuit" and designated as element 10120. Cable 10121 transmits commands from the SPC to the CBT's; cable 10122 transmits commands from the SPC to the CPD's; and cable 10123 transmits WRMI pulses to the circuits requiring them.

The SPC is shown primarily in diagrammatic form on the present drawing figures, including FIGS. 3B, 100, 101 and 102, since its details comprise no portion of the present invention and since stored program controllers suitable for use in our invention are disclosed elsewhere. For example, the aforementioned Doblmaier et al. application discloses in complete detail a stored program controller which may be utilized to generate the control signals required to operate the circuits of our invention. The Doblmaier et al. stored program controller is further described in complete detail in the aforementioned Bell System Technical Journal of September 1964, which issue is devoted in its entirety to an electronic switching system and with approximately 50 percent or more of this issue being devoted to details of the stored program controller. Also, if desired, a stored program controller whose processor is shown in Kettley et al. application, Ser. No. 422,313, filed Dec. 30, 1964, may be utilized instead of the one shown in detail in Doblmaier et al. Since the details of stored program controllers suitable for use to generate the signals required by our system are shown in detail in the prior art, the disclosure of the present specification has been simplified by disclosing only those details of an SPC as are required for an understanding of our invention.

On FIG. 101, the SPC memory 10102 is divided into a plurality of elements designated A, B, . . . through n, each of which stores the data or information pertaining to a different operation the SPC may perform. Each memory element is connected by a separate path to a write bus 10104 positioned atop the memory and to a read bus 10103 positioned underneath the memory. The processor effects a write operation by simultaneously gating onto the write bus the address of the portion of memory that is to be written into, together with the information that is to be written. Similarly, the processor effects a read operation by gating onto the read bus a read command together with the address of the portion of memory that is to be read.

Figure 102A:
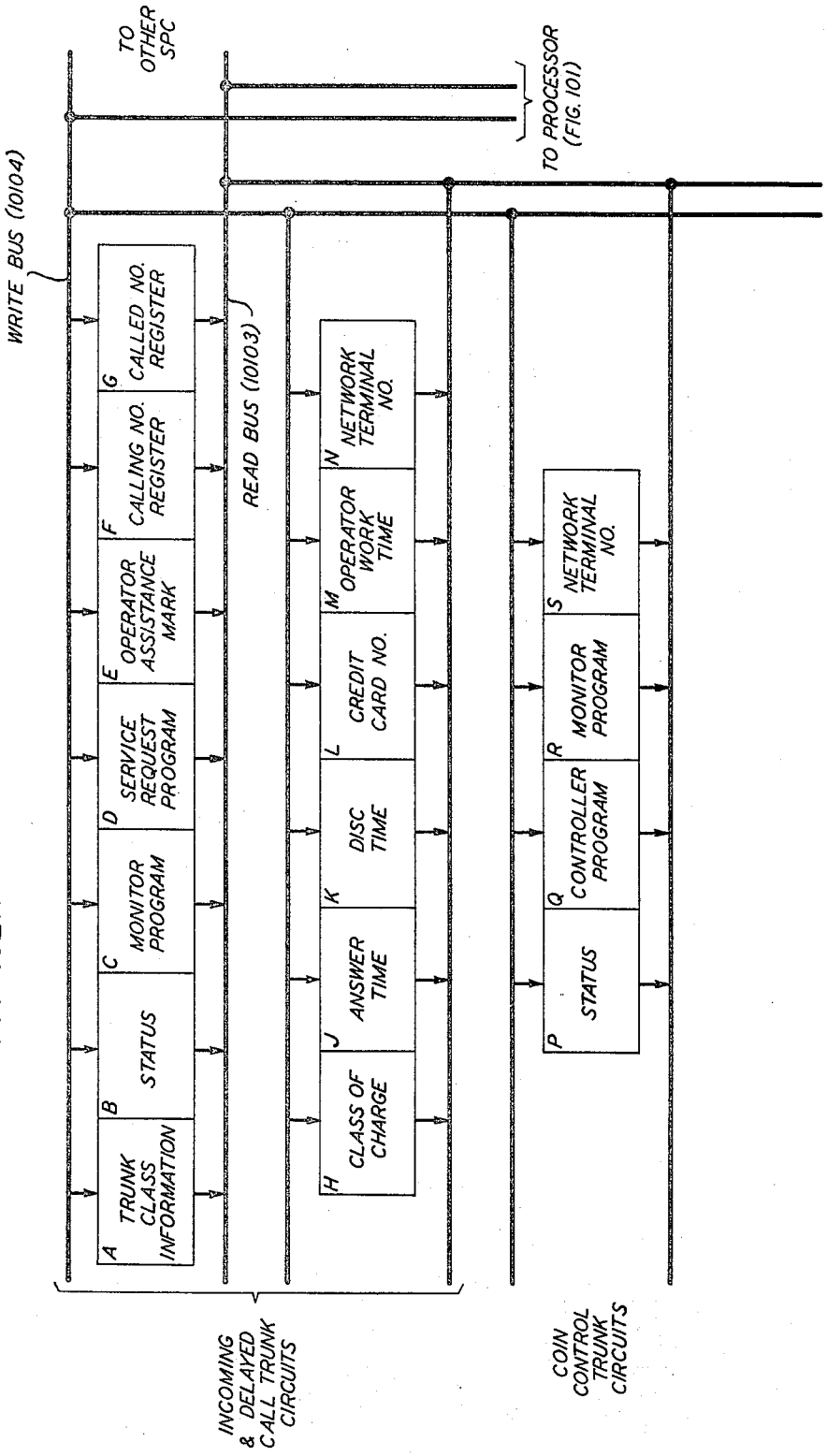
Figure 102D:
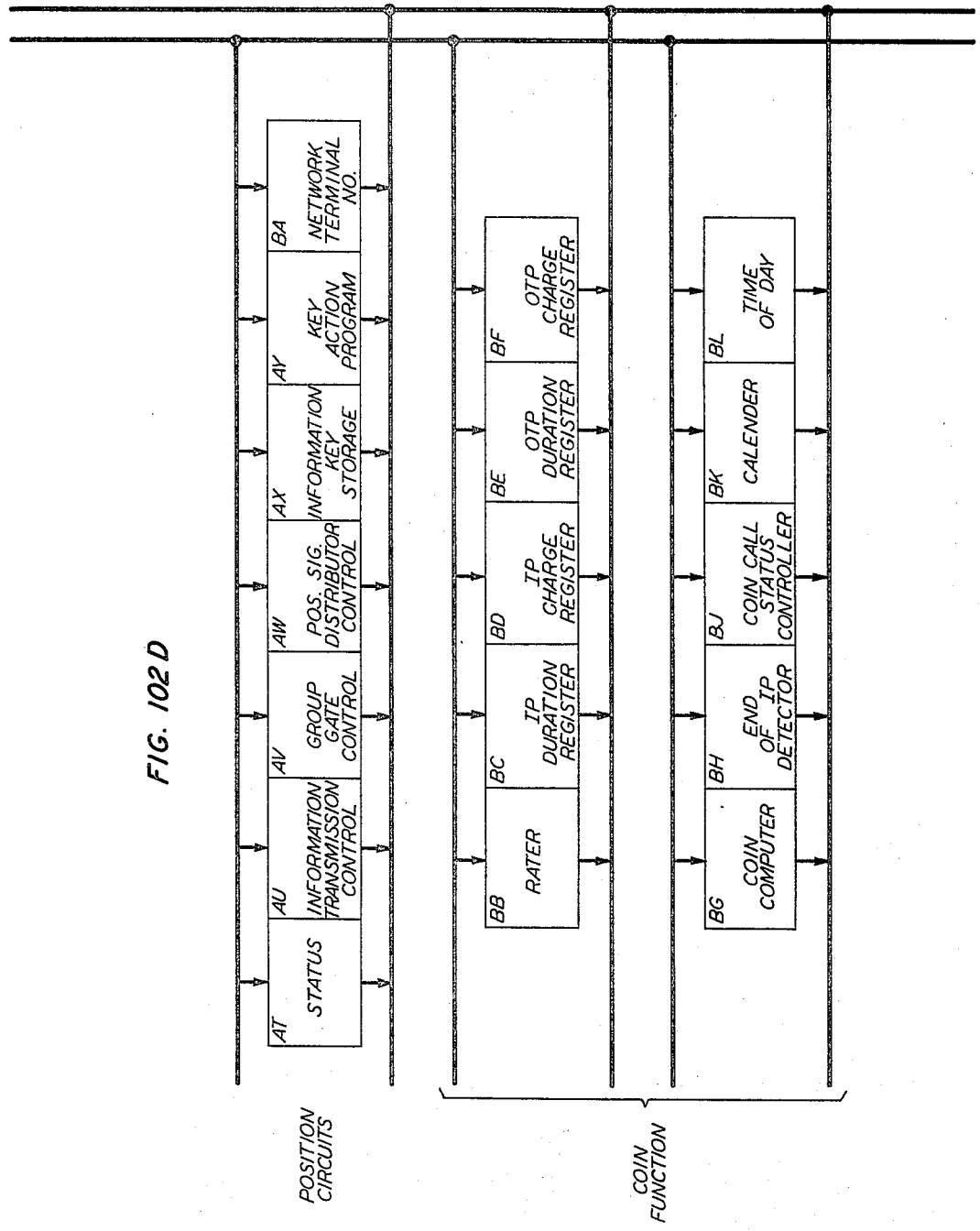
Figure 102E:
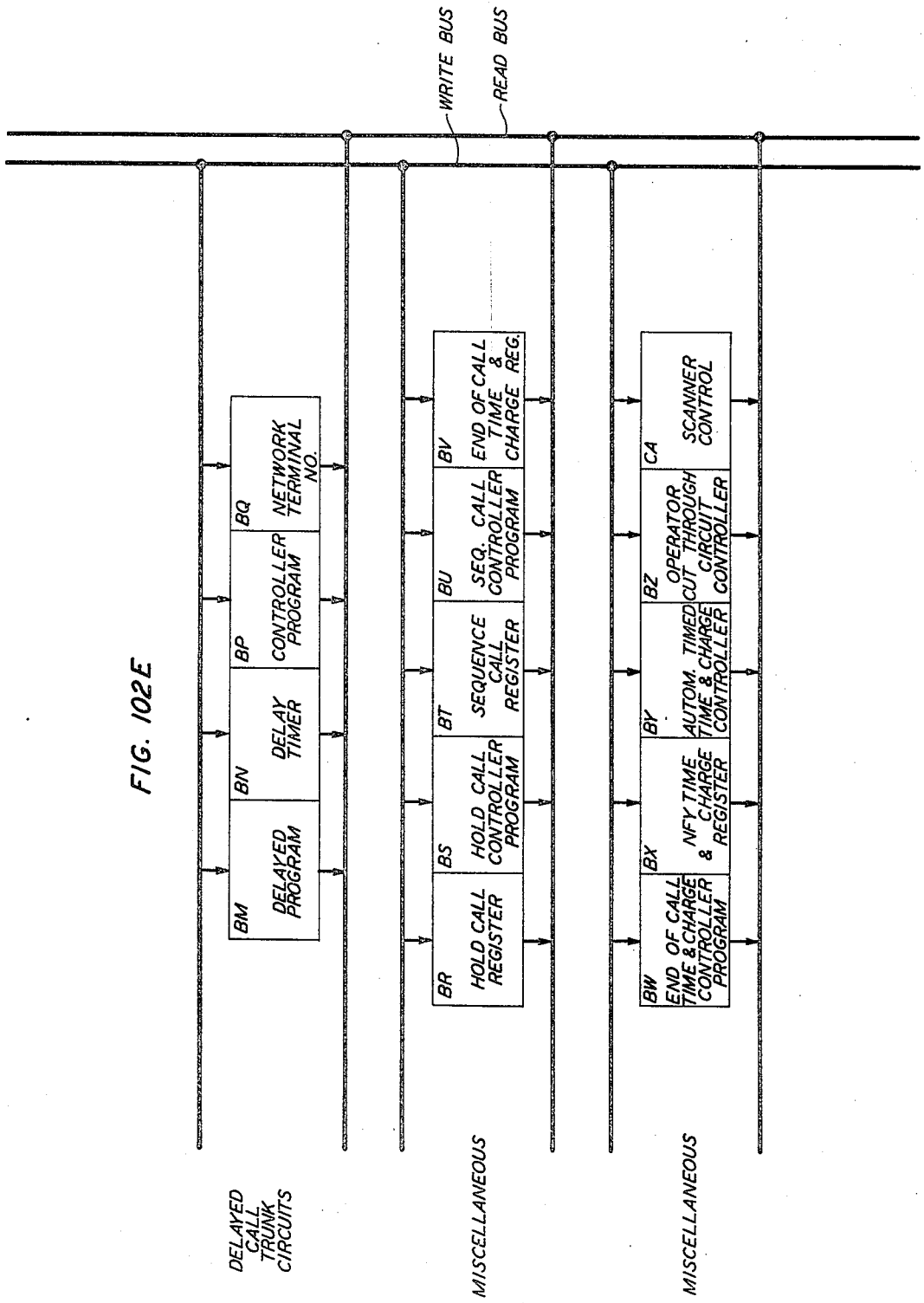

FIGS. 102A through 102B, when arranged as shown on FIG. 103, disclose additional details regarding the manner in which the memory may be subdivided by its call-serving functions. The memory elements are arranged into a plurality of rows on FIG. 102. Write bus 10104 and read bus 10103 extend vertically on the right side of these figures. A branch of the write bus extends horizontally atop each memory row, and each such branch is connected by the indicated arrowed paths to each section of memory in its row. Similarly, a branch of the read bus extends horizontally beneath each row, and each branch is connected by the indicated arrowed paths to each memory section in its row. These interconnections permit the processor to read and write into any portion of memory in the same manner as described in connection with FIG. 101. The connections to the processor and to the other SPC are shown in the upper right-hand corner of FIG. 102A.

The top row represents the memory elements associated with the TSPS trunk circuits and their control. Element A is entitled "trunk class information" and stores the many parameters pertaining to each trunk circuit, including the class of calls served thereby. Element B is entitled "status" and registers information signifying the status, i.e., busy or idle, of each trunk circuit. Element C comprises the trunk monitor program and governs the operation of the SPC in controlling the trunk circuits. The service request program D enables the SPC to determine the initiation and termination of service requests by the trunk. Memory E stores a mark indicating whether or not operator assistance is required on calls served by each trunk circuit. Element F comprises the calling number register for each trunk circuit, while element G comprises the called number registers. Memory element H stores class-of-charge information. Element J stores the answer time and element K stores the disconnect time for each trunk circuit. Element L stores the credit card number for credit card calls. Element M stores the operator work time. The operator work time is subtracted from the total time of the call in order to derive the true chargeable time. Element N stores a number indicating the network appearance of each trunk circuit on the switching network.

Element P is the first of the elements pertaining to the coin control trunk circuits and stores information representing the status of each such circuit. Element Q comprises the controller program and element R comprises the monitor program for these circuits. Element S stores information signifying the appearance of each such circuit on the switching network. Element T is the first of the elements pertaining to the CAMA trunk circuits and stores status information. Element U comprises the controller program, while element V comprises the monitor program. Element W stores information pertaining to service request initiations and terminations, while element X stores information signifying the appearance of each such circuit on the switching network. Element Y is the first of the memory elements pertaining to the information trunk circuits, and element Y itself stores the status information for each such circuit. Element Z comprises the controller program, while element AA stores the network appearance of each circuit.

Element AB is the first portion of the memory pertaining to the switching network and stores the network map. Element AC stores path memory information, i.e., information pertaining to established connections in the network. Element AD stores the overall control program for the network. Element AE comprises the beginning o the portions of memory pertaining to the AMA equipment, and element AE stores AMA status information. Element AF stores the data accumulation program, while element AG stores the data transfer program which is utilized when data is transmitted to the AMA circuitry. Element AH comprises the data accumulation register, and it is this portion of memory which stores the data that is ultimately transmitted to and recorded on AMA tape.

Element AJ is the beginning of the portions of memory pertaining to the outpulsers and it stores outpulser status information. Element AK comprises the controller program, while AL comprises the digit translation program. Element AM determines the specific digits that are to be outpulsed on any call. Element AN stores information signifying the network appearances of each such circuit. Element AP stores status information for the digit receivers, element AQ comprises the controller program of the digit receivers, element AR comprises a program which translates the digits received into binary form suitable for storing in memory, and element AS stores information signifying the network appearance of each digit receiver.

Element AT comprises the first of the sections of memory pertaining to the operation of the position circuits, and element AT stores status information for each position. Element AU comprises a program which controls the manner in which information is transmitted to each position. Element AV is a program which controls the operation of a group gate circuit; element AW stores information pertaining to the position signal distributor circuit. Element AX stores information signifying the keys that have been depressed by each operator position, while element AY is a key action program which determines what action should be taken by the system as a consequence of each key depression. Element BA stores information pertaining to the network appearance of the operator's cut-through circuit associated with each position circuit.

Element BB comprises the beginning of the portions of memory pertaining to the operation of the system when serving coin calls. Element BB controls the operation of the SPC on rating operations, element BC stores the initial period duration information, element BD stores the initial period charge information, element BE stores the overtime period duration, element BF comprises the overtime period charge register, element BG controls the operation of the SPC on coin computations, element BH detects the end of the initial period, element BJ comprises the coin call status controller program, element BK comprises the calendar which determines whether rates are to be figured on a Sunday, holiday, or normal basis, while element BL comprises a time-of-day indicator.

Element BM comprises the control program for delayed call trunk circuits, element BN comprises the portion of memory which stores the information signifying the time at which delayed calls are to be completed on an automatic basis, while element BP comprises the program which controls the delayed call trunk circuits. Element BQ stores information signifying the network appearance of each delayed call trunk circuit. Elements BM through BQ comprise the additional portions of memory required for delayed call trunk circuits. In addition, each delayed call trunk circuit is partially controlled in its operation by memory elements A through N in the same manner as are the incoming TSPS trunk circuits.

Element BR comprises the beginning of the various portions of the memory which control other miscellaneous operations in addition to those already discussed. Element BR stores information signifying whether a call is currently in a HOLD condition, element BS comprises a HOLD call controller program, element BT comprises a sequence call register which is utilized to store the plurality of called numbers which a customer desires to be connected with in sequence, element BU comprises a sequence call control program, element BY comprises an end-of-call time and charge register, element BW comprises the end-of-call time and charge control program, element BX comprises the notify time and charge register, while element BY comprises the automatic time and charge control program.

Element BZ comprises the operator cut-through circuit controller program, element CA comprises the portions of memory which control the operation of the scanner, element CB stores information pertaining to the communications bus translators, element CC stores information pertaining to the CPD's, element CD stores information pertaining to the signal distributors, element CE analyzes the scanner answer information, element CF permits the SPC to perform the necessary checks on the input information it receives from various circuits, element CG comprises the portion of memory which controls the operation of the teletypewriter equipment, while element CH comprises a clock which generates the necessary timing signals required by the SPC and by the various circuits of the system.

The indicated subdivided portions of memory discussed represent only a relatively few of the many thousands of items of information and instruction that must be entered into the memory in order for the SPC to perform its required functions. The nature of these functions and their specific detail comprise no portion of the present invention and are described in detail in the aforementioned Doblmaier et al. application and the aforementioned issue of the Bell System Technical Journal pertaining exclusively to an electronically controlled switching system.

Detailed operation of system during serving of calls

This portion of the specification describes the sequence of circuit operations that occur in our system as it serves various types of calls. The preceding portions of the specification have described certain aspects of the operation of each circuit. Also, earlier portions of the specification have described, with reference to the block diagram drawing figures, the sequence in which the various circuits operate, together with the functions performed thereby, during the serving of calls. Therefore, this portion of the specification is primarily limited to a description of circuit operations and circuit functions that have not already been described elsewhere.

The following portions of this specification describe the manner in which our system operates for serving various types of coin and noncoin calls, including those of the 0+ (person-to-person) type, the dial 0 type, as well as those of the 1+ (station-to-station) type. These calls may originate from offices equipped for ANI operation, as well as offices which are not so equipped, and they may arrive on either trunk circuits equipped for MF (multifrequency) signaling or on trunk circuits equipped for DP (dial Pulse) signaling. The TSPS center knows whether each call is of the MF or DP type by the trunk circuit on which it appears. It is also necessary that the TSPS center be able to determine whether each call is coin or noncoin is of the 1+ or 0+ type, as well as whether or not the originating office is equipped for ANI type operation. The determination of the parameters associated with each call may be made in a variety of ways. One possible way is to route each type of traffic over separate trunk groups from the originating office to the TSPS center. The SPC can then automatically determine the call parameters from the trunk group in which the calling trunk circuit appears. Another possible way in which a determination of the call parameters can be made is limited to originating offices equipped for MF outpulsing of either the calling or called number. This second method comprises the utilization of KP pulses of different frequencies, with the KP pulse for each combination of call parameters being composed of a unique combination of MF frequencies.

Noncoin calls serve by MF trunk circuits

This section describes the sequence in which the TSPS system serves the various types of noncoin calls that may arrive at the TSPS center via the MF trunk circuit shown on FIGS. 90 and 91. The operation of this trunk circuit, per se, has already been described in detail in connection with the portion of the specification pertaining to it.

The noncoin calls serve by MF trunk circuits may be either of the 1+ station-to-station or of the 0+ person-to-person type. In accordance with present-day toll practice, it is contemplated that a prefix digit of "1" is dialed for 1+ calls to obtain station-to-station service, while a prefix digit of "0" is dialed for 0+ calls to obtain person-to-person type service. The customary seven or ten digits are then dialed following the prefix digit. Dial 0 calls are described in a separate portion of the specification.

Noncoin–MF–ANI 0+ calls

Let it be assumed that the specific MF trunk circuit that is to serve this call is the one whose details are shown on FIGS. 90 and 91. This trunk circuit is seized when the originating office 9002 places a low impedance shunt across the T and R conductors of the trunk circuit in response to a dialing operation at the calling station. This shunt closes the incoming loop of the trunk in the customary manner and, in so doing, completes a path over which current can flow through scanner ferrod L0. This path includes battery and ground through resistance lamp 9020, the diodes RV10 and RV20, the windings of ferrod L0, the windings of inductance LB, break contacts 90–C, to the T and R conductors. The polarities applied over this path at the current time are such that ground is applied to the T conductor of the tip, while negative battery is applied to the R conductor (the ring conductor).

The loop current now flowing in the windings of ferrod L0 changes the magnetic state of the ferrod as the beginning of a trunk seizure signal to the SPC. The scanner continuously operates under control of the SPC and cyclically scans the ferrods for all trunk circuits comparable to ferrod L0 for the trunk circuit of FIG. 90. When the L0 ferrod is scanned, the signals are transmitted back over the scanner bus system to the SPC, informing it that the ferrod has switched its magnetic state. The same ferrod is subsequently scanned a number of times and, once the SPC determines that this is a true seizure signal, rather than a momentarily transient, it transmits appropriate commands to the signal distributor to effect the operation of trunk relay 90–C. These commands are transmitted to the signal distributor by way of the CBT and the central pulse distributor, as priorly described in connection with the detailed description of those circuits. Thus, the central pulse distributor now transmits a .5 microsecond enable pulse to the signal distributor to unlock its input circuit. The CBT, under control of the SPC, applies to the 1-out-of-N address bus the command to which the signal distributor is to respond. The application of the enable pulse and the address command to the signal distributor causes it to register the information now on the address bus. This, in turn, ultimately causes the signal distributor to transmit the necessary pulse to magnetic latching relay 90–C to operate it. The operation of this relay opens its break contacts and closes its make contacts connected to terminals 9023 and 9024 to reverse the tip-and-ring polarities back to the originating office. This reversal constitutes an acknowledgement to the originating office that the TSPS center has recognized its seizure signal. The polarity condition now existing is such that battery is on the tip and ground is on the ring.

It should be mentioned at this point that a single change in the magnetic state of ferrod L0 does not necessarily constitute a newly arrived seizure signal for the SPC. The SPC, by means of its built-in programmed memory, keeps track of the previous state of each trunk ferrod, as well as many other ferrods, for a predetermined number of scans in order that it may detect a newly arrived change of state in a ferrod as well as determine the significance of the change. By this means, the SPC is able to recognize newly arrived seizure signals as distinguished from priorly arrived seizure signals which have already been served, momentary signals caused by hits on the T and R conductors, and between signals signifying other miscellaneous conditions which do not constitute trunk seizure signals and which do not require immediate action on the part of the SPC. The SPC is able to distinguish between the various calling conditions of each trunk by keeping track of the ferrods in each trunk for a predetermined number of scans and by also storing within its temporary memory the state of each call currently being served by the system.

In partial summary of the MF call currently being described, the SPC has responded to the seizure signal and, in cooperation with the CBT and the CPD, has commanded the signal distributor to operate trunk relay 90–C. The operation of this relay, in turn, transmits a polarity reversal back to the originating office as an acknowledgment of its request for service.

At the same time that the SPC determines that the magnetic state of ferrod L0 constitutes a valid newly arrived seizure signal, it determines that this is an MF trunk circuit and that an MF receiver should be attached to the calling connection at this time to receive the information that is about to be outpulsed from the originating office. Accordingly, the SPC examines its memory to determine whether an MF receiver is available and, if one is, whether an idle path exists within the switching network between the available MF receiver and the switching network appearances for the calling trunk circuit of FIG. 90. Let it be assumed that both an MF receiver and a network path is available. In this case, the SPC utilizes the CBT and the CPD to transmit the necessary commands to the trunk link and the position link of the switching network to cause them to interconnect the selected MF receiver with the trunk link appearance of the calling MF trunk circuit. This interconnection extends from the trunk T and R conductors extending from conductor group 9004 on FIG. 90 to one of the T and R conductor pairs within the conductor group 8020 on FIG. 80. The trunk link and position link extend this connection therethrough to one of the T and R conductor pairs for group 8030 on the right side of the same figure. Let it be assumed that the MF receiver selected for the serving of this call is the one whose details are shown on FIG. 81. In this case, the T and R conductor pair on the right side of FIG. 80 may be further extended to the T and R conductors on FIG. 81.

Trunk relay 90–C is in an operated state when the trunk T and R conductors are extended by the switching network to the MF receiver. The trunk at this time continues to apply battery to the tip conductor and ground to the ring conductor via the make contacts of relay 90–C. At the same time the SPC causes the MF receiver to be attached, it commands the operation of receiver relay 81–A, which opens the path over which the normally operated slow-release relay 81–D is held. During the release time of relay D, the polarities applied to the T and R conductors by the MF receiver match that currently applied to the conductors by the trunk circuit. Specifically, the R conductor on FIG. 81 is extended at this time through make contacts 81–D, since relay D is slow-releasing at this time, break contacts 81–C and 81–B, make contacts 81–A, and through the windings of the T1 transformer to ground through the windings of scanner ferrod F0. Similarly, the T conductor may be extended over a similar path to negative battery on the other winding of the F0 ferrod. This potential condition matches that supplied by the trunk and lasts for the release time of relay D, which is in the order of 100 milliseconds. During this 100-millisecond interval, the SPC commands the operation of trunk relay 90–B. The operation of this relay opens its break contacts connected to terminals 9025 and 9026 to disconnect the path by means of which the trunk circuit applies monitoring potentials to the T and R conductors. This effectively leaves the potentials applied to the T and R conductors under the sole control of the MF receiver.

Receiver relay 81–D releases at the end of its 100-millisecond slow-release interval and reverses the polarity of the potentials applied to the T and R conductors from the F0 ferrod via the windings of its transformer T1. The potential condition with the 81–D relay released is such that ground is on the tip and battery is on the ring. This polarity reversal is transmitted back to the originating office, where it constitutes a signal that the TSPS MF receiver is ready to receive called information. The originating office now responds and outpulses the called information in MF form via the T and R conductors, the trunk circuit of FIG. 90, and the switching network, to the MF receiver of FIG. 81. The MF receiver detects the outpulsed digits and transmits them, by means of the scanner, to the SPC.

Each MF outpulsing operation is preceded by a pair of frequencies comprising a KP signal and is terminated by the transmission of a pair of frequencies termed an "ST" or "START" signal. The SPC keeps track of the digits it receives and, when it detects the START signal, it commands the operation of receiver relay 81–B to apply another polarity reversal to the T and R conductors. The potentials now applied to these conductors are such that battery is on the tip while ground is on the ring. This polarity reversal is transmitted back to the originating office which, in response thereto, outpulses the calling station information, provided that it is equipped for ANI operation. The ANI digits are transmitted to the MF receiver, which detects them and transmits them via the scanner to the SPC. The SPC recognizes the termination of the ANI outpulsing when it receives the START signal. At this time, it commands the release of receiver relay 81–A. The release of this relay maintains the same polarities on the T and R conductors and, at the same time, connects these conductors to the audible tone source 8106. The application of this tone to the incoming connection via the T and R leads informs the calling subscriber that his call is being actively served.

At this point, the call requires that the MF receiver be disconnected from the T and R trunk circuit conductors and that an MF outpulser be attached via the switching network to the T1 and R1 trunk conductors for outpulsing the called information forward to the next office. Also, since the call is of the person-to-person type, an operator position must be attached by the switching network to the T and R conductors to provide the call service required by the calling party. Although the attachment of an MF outpulser for an outpulsing operation and the attachment of an operator position may occur concurrently, the circuit operation associated with the attachment of an operator position is first described.

The SPC maintains the calling connection to the tone circuit within the MF receiver only until it is able to find an operator position that is idle for the serving of the call. Normally, this delay will not exceed one or two seconds. When the SPC finds an idle position, as well as a switching network path, available for interconnecting the position with the calling trunk, it first of all releases trunk relay 90–B to reconnect the L0 ferrod to the T and R conductors, thereby restoring trunk supervision of the calling connection. At this time, the trunk C relay is still operated, and thus battery is on the tip while ground is on the ring conductor. This matches the potentials currently applied by the MF receiver, which the SPC then removes from the call by commanding the switching network to break down the connection between the receiver and the calling trunk. Receiver relay 81–B is released at this time to operate receiver relay 81–D, thereby restoring the circuit to a normal condition.

The SPC commands the switching network to establish a path interconnecting the T and R conductors of the calling trunk circuit with the corresponding conductors of the operator position selected by the SPC to serve the call, once the link connection to the MF receiver has been removed. The connection to the operator position is established via the operator cut-through circuit with which the selected position is associated. This connection by the switching network extends from the T and R conductors within the group 9004 on FIG. 90 to the group 8020 on the left side of FIG. 80, through the switching network, to the group 8025 extending over a T and R conductor pair to the operator cut-through circuit associated with the selected operator position. Let it be assumed that the operator cut-through circuit that is to serve this call is the one shown in detail on FIG. 79 and that, in turn, the position circuit selected for serving this call is position 63, together with position buffer 63, all of whose details are shown on FIGS. 51 through 74.

The SPC commands the operation of relay 79–A of the cut-through circuit at this time. This relay operates and closes its make contacts to extend the calling connection over its T and R conductors to the operator speech circuit on FIG. 58. Relay 79–B is momentarily operated at this time to apply a brief burst of tone from source 7902 to the talking connection to inform the operator that a call has been extended to her position and to inform the calling party that his call is actively being served.

The SPC has, by this time, determined from its programmed memory the type of call requiring service on the trunk circuit of FIG. 90. It has also received calling and called information pertaining to the call from the originating office. The SPC utilizes the information it now has to determine the digits that are to be outpulsed to the next office, as well as to determine the lamp display required at the operator position selected for serving the call. As soon as the call is extended to this position, the SPC controls the transmission of the required commands to the group gate to effect the required lamp display at the position. The group gate operates in the manner priorly described to transmit the lamp display information via the position signal distributor and position buffer circuit 63 to operate the required lamps at position 63. The operation of the group gate, the position signal distributor, and the position buffer circuit for the transmission of this information is not described at this point since the operation of each of these circuits has been described in detail in earlier portions of the specification.

The data transmitted from the SPC to the position buffer now effects the illumination of the NONCOIN SPL TOLL lamp on FIG. 63, the ACS- lamp for the loop to which the call is offered, and the CLD-lamp for the loop to which the call is offered. Let it be assumed that the call is offered to loop 0; and, in this event, the ACS0 and the CLD0 lamps are now illuminated. The illumination of the NONCOIN SPL TOLL lamp informs the operator of the type of call; the illumination of the ACS0 lamp signals the operator that a call has been extended to loop 0 of her position; the illumination of the CLD0 lamp signifies that the called station has not answered.

The foregoing lamp display informs the operator that the call is of the special toll type and that the calling party therefore requires her services above and beyond completing the connection through to the called station. She also knows that the called party has not yet answered, since the lamp CLD0 remains on. The SPC controls both the time at which the operator is connected to the call and the time at which outpulsing occurs. Therefore, the programming of the SPC permits the operator to be connected to the call ahead of the termination of the outpulsing operation a sufficient time to enable her to converse with the calling party and determine the call service required. This is desirable in order that the operator may converse with the calling party prior to the time ringing and then answer occurs at the called station.

The SPC controls the digits that are to be outpulsed forward, as well as the stage of the call at which the outpulsing is to occur. It is normally desirable that the outpulsing occur at a time so that the forward connection is being rung when the calling connection is extended to the operator position. This is desirable so that both parties will not be conversing on the call when the operator is connected through it. Accordingly, subsequent to the reception of the called information from the originating office, but prior to the extension of the call to the selected operator position, the SPC commands the switching network to interconnect the T1 and R1 conductors of the trunk on FIG. 90 with an idle outpulser. This connection extends from the T1 and R1 conductors of FIG. 90 to a similarly designated conductor pair within the conductor group 8020 on FIG. 80, through the established path within the trunk link and the position links, to the T1 and R1 conductors extending to an outpulser within the conductor group 8026 on the right side of FIG. 80. Let it be assumed that the outpulser selected for the serving of this call is the MF outpulser whose details are shown on FIGS. 80 through 85. In this case, the T1 and R1 conductors within the group 8026 are extended to the T1 and R1 conductors on FIG. 82.

The SPC commands the operation of relay 82–A at the same time, and therefore the path for the T1 and R1 conductors is further extended through the make contacts of this relay, through windings 8206 and 8207, to ferrods 8208 and 8209 within the master scanner. The state of these two ferods enables the SPC to determine when the connection has been established through to the outpulser, and the SPC then transmits commands to the central pulse distributor representing the digits that are to be outpulsed forward to the next office. The central pulse distributor, in turn, transmits this data to the input conductors of the MF outpulser on FIG. 83 to cause that circuit to outpulse the required digits. The outpulser responds to this information and outpulses the called information in the manner already described in detail in connection with the portion of the specification directed to the outpulser. The SPC monitors the outpulsing operation and commands the switching network to release the outpulser from the forward connection when the called information has been outpulsed.

As already mentioned, the outpulsing operation takes place in the proper time sequence so that the called station is not rung until the operator has had sufficient time to converse with the calling party and determine the type of service he requires. The SPC commanded the operation of trunk relay 90–A when the outpulsing was terminated and the outpulser disconnected. The operation of relay A cuts through a talking connection between the T and R conductors on the left side of FIG. 90 and the similarly designated conductors on the right side extending to the next office. The operator's talking circuit at this time remains connected to the T and R conductors extending to the trunk link from the right side of FIG. 90. At this time, the operator hears the ringing tone at the called end and, once the called station answers, she proceeds to furnish whatever service is requested by the calling party.

Let it be assumed that the call is of the person-collect type. In this event, the calling party furnishes the operator with the name of the individual with whom he desires to speak and also tells the operator that he wishes to reverse the charges. The operator then depresses the PER COL key, whose contacts are shown in FIG. 66 and FIG. 59. The contacts of the key on FIG. 66 operates the PER COL relay, which closes a holding path for itself to the terminal 6502 ground when the key releases. The closure of the contacts of this key on FIG. 59 applies a positive 24-volt potential to matrix conductors 1, 4, and 9. Diodes SD1, SD4, and SD9 on FIG. 59 also apply the same posittive 24-volt potential through the TEL A jacks, since the position is now occupied, to the SR conductor. The 24-volt potential on conductors, 1, 4 and 9, together with conductor SR, is transmitted to the position scanner shown on FIGS. 76 through 78. This circuit now operates in the manner priorly described to transmit a signal back to the SPC via the scanner that the call is to be billed on a person-collect basis.

Master scanner ferrod L1 on FIG. 90 monitors the outgoing loop and, in turn, the on- or off-hook condition of the called station. The magnetic state of this ferrod switches when the called station goes from on- to off-hook, since at that time the forward office transmits a polarity reversal back to the outgoing T and R conductors of FIG. 90. This polarity reversal is recognized by the SPC, via the scanner, as an indication that the called station has answered. The SPC then transmits a command, via the position group gate and the position signal distributor, to effect the release of relay 55–CLD0 which, in turn, extinguishes lamp CLD0 on FIG. 64 as an indication to the operator that the called station has answered the call.

The operator now converses with the called station, ascertains the availability of the party specified by the calling station, and further ascertains that the called station will accept the call charges. If the specified individual is available and if the called station is willing to accept the charges, the operator depresses the ST TMG key on FIG. 61. The depression of this key transmits an indictaion, via the position scanner and the master scanner, to the SPC that charging for the call may now begin. The SPC analyzes the information it has received from the operator and, if it has all the information required for billing purposes, it commands the position buffer to close a circuit on FIG. 52 to energize the ST TMG lamp on FIG. 64. The illumination of this lamp signals the operator that the required billing information is now contained within the SPC and that she may release from the call. The operator next operates the POS RLS key on FIG. 60, which transmits a signal to this effect back to the SPC. Upon the reception of this signal, the SPC then commands the switching network to disconnect the operator position from the call. At the same time, the SPC commands the release of relay 79–A of the operator cut-through circuit and, at this time, position 63 and its associated circuitry is idle and available for the serving of other calls.

The SPC, with the assistance of the scanner, monitors the call by means of the L0 and L1 ferrods for the trunk of FIG. 90. These ferrods are repetitively scanned; and as long as their magnetic state does not switch, the SPC knows that the call is still in progress. A subsequent on-hook condition at either the calling or called station effects a change in the magnetic state of a ferrod monitoring the loop, and this change of state is detected during the next scanning cycle. If this change of state persists for a predetermined time, the SPC knows that the call has been completed; and it then commands the release of relays 90–A and 90–C, thereby restoring the trunk circuit to normal.

The SPC times the call as it monitors the trunk ferrods and retains within its temporary memory all the call data required for billing and charging purposes. Finally, when the SPC determines that the call is terminated, it transmits call data it has accumulated via the CPD, the CBT, and the binary bus system, to the AMA circuitry to enable it to record on magnetic tape the charge data required for billing purposes.

The preceding has described the sequence in which the circuits of our system operate to serve a noncoin MF–ANI call of the person-collect type. If this had been a person-paid, rather than a person-collect call, it would have been handled in essentially the same manner. The only difference is that, once the call is extended to the position, the operator, after having ascertained that it is a person-paid call, would have checked merely to see that the specified individual is available at the called station and would then have operated the PER PD key. This would illuminate the PER PD lamp, rather than the PER COL lamp. The remainder of the key and lamp operations at the position would be the same as described for the person-collect call.

Noncoin MF–ANI–1+ calls

The preceding has described the operation of our system for noncoin MF–ANI calls on which TSPS operator assistance is required. It is also contemplated that our system will serve noncoin calls of the MF–ANI type on which no operator assistance is required. These calls are functionally designated as "1+" calls, since they will be initiated by the calling subscriber by the dialing of the digit "1," followed by the dialing of the normal seven or ten digits.

One-plus type calls may be served in various manners by a telephone network which includes our TSPS center as one of its elements. The manner in which each call of this type is served depends primarily upon the location of the facilities that are to record the call charge data. If the originating office has the recording facilities, the charge data is then recorded at the local office and the call is routed directly from the originating office to either a toll or tandem office. The TSPS center is not normally used in this case. Similarly, there may be insances in which a tandem or toll office is equipped to record charge data. In this case, the tandem or toll charge recording facilities are utilized and the call is routed directly from the originating office to the toll or tandem office, thereby bypassing the TSPS center. In either of the foregoing two situations, there would be no necessity for routing such calls through the TSPS center, since operator assistance is not required on 1+ calls and since the charge data recording is performed in either the originating or the toll office.

One-plus calls of this type would normally be served by the TSPS center only when neither the originating nor the toll or tandem office is equipped with recording facilities. In such cases, the calls would be routed from the originating office to the toll office, via the TSPS center, whose primary function would be to time the call and record the necessary billing data therefor. In this case, the call would be served by the MF trunk, the switching network, the MF receiver, and the MF outpulser in the same manner as already described in connection with the 0+ noncoin MF–ANI calls. The only difference would be that the call would not be extended to an operator position. Other than this, the call would be served in an identical manner and the SPC would monitor and time the call, as well as control the recording of the necessary billing data.

Noncoin MF–NonANI–1+ and 0+ calls

These calls may be of either the 1+ or 0+ type. Both 1+ and 0+ calls require operator assistance to identify the calling number and key it into the system for billing purposes. A 0+ call additionally requires operator assistance to furnish the person-to-person type service requested by the calling party.

Calls of this type are served by the MF trunk circuit of FIGS. 90 and 91 in a manner similar to that already described for MF–ANI calls, up to and including the attachment of an MF receiver and the recording by it of the called information outpulsed from the originating office. As described for the ANI type call, the MF receiver operates its B relay at the termination of the called information outpulsing from the originating office and, at that time, battery is on the tip and ground is on the ring conductor. This polarity reversal effects the initiation of the ANI outpulsing operation in originating offices which are so equipped. However, in offices which do not have ANI equipment, this polarity reversal serves no useful function; it does prepare the TSPS MF receiver so that the supervisory potentials applied to the T and R conductors by it will match that supplied by the MF trunk at the time its 90–B relay is released when it resumes supervision of the connection.

The SPC determines that no ANI information is to be forthcoming, once it receives the called information from the originating office. This determination by the SPC may be made either by means of its programmed memory or by monitoring the MF receiver for a period sufficiently long to determine that no ANI information has been received. The lack of ANI information may be due to the fact that the originating office is not equipped for such an operation, or alternatively, it may be due to the inoperative condition of the ANI equipment in offices equipped for such operation. In either event, once the SPC determines that no ANI information is available, it disconnects the MF receiver from the call and releases the trunk relay 90–B to enable the trunk to resume call supervision in the manner described for MF–ANI calls.

The SPC next proceeds to control the connection of an outpulser to the call for an outpulsing operation and to extend the calling connection to an idle operator position in the same manner as for the ANI type calls. However, the operator has an additional function to perform on the nonANI calls, and therefore the lamp information transmitted by the SPC to the selected position differs somewhat from that submitted to her for ANI type calls.

Let it be assumed that the calls is of the person-collect type and that it is extended to loop 0 of position 63. The NONCOIN SPL TOLL, the ACS0, CLD0, and PER COL lamps will be illuminated as they were for the corresponding ANI call, as well as for the same reasons. However, at this time, the KEY CLG lamp on FIG. 64 and the KP BACK lamp on FIG. 66 will be illuminated, in response to the SPC commands, as a signal to the operator that she must key the calling number into the system. The operator hears a zip tone in her subset and converses with the calling party to determine his directory number, and she then keys it into the system by means of her keyset, whose contacts are shown on FIG. 62. The KP and START signal mode of operation is utilized in connection with this keying operation.

The operator remains on the connection until the called party answers. Once this occurs, she ascertains that the specified individual is available and that the called station will accept the call charges. The PER COL, ST TMG, and POS RLS keys are then operated in the same manner as described for the ANI type call. The PER COL and ST TMG lamps are illuminated when their correspondingly designated keys are depressed. The SPC then commands the switching network to release the operator position from the calling trunk, and the duration of the call is monitored and timed by the SPC, as described for the ANI type calls.

Noncoin–nonANI–MF calls of the 1+ type are routed via the TSPS center in order that an operator may be momentarily extended to the connection for orally ascertaining the calling number and keying it into the system for billing purposes. The SPC times and monitors calls of this type and records the charges therefor in the manner described for other calls. These calls are served by the MF trunk circuit, the MF receiver, the MF outpulser, as well as the rest of the system, in the same manner as already described for nonANI–MF calls of the 0+ type, except for the differences discussed in the following paragraphs.

A call of the 1+ type is extended under the control of an SPC to an operator position when the MF receiver has received the called information from the preceding office. The lamp information transmitted by the SPC to the position at this time energizes the NONCOIN STA lamp on FIG. 63 as an indication to the operator that the call is of the station-to-station noncoin type. If the call is extended to loop 0 of the position, the ASC0 and CLD0 lamps are energized in the same manner and at the same time as priorly described for the MF–nonANI 0+ call. The KP BACK lamp on FIG. 66 and the KEY CLG lamp on FIG. 64 are both energized as an indication to the operator that she must now determine and key the calling number into the system.

The operator depresses the STA PD key on FIGS. 59 and 65 to illuminate the STA PD lamp on FIG. 65 and to transmit an indication of the call type back to the SPC for billing purposes. The operator then, as for the nonANI 0+ call, keys the calling station number into the system after she obtains it from the calling subscriber. She then operates the ST TMG and POS RLS keys to release from the connection. The ST TMG lamp operates at the same time and in the same manner as on 0+ calls.

Noncoin calls served by dial pulse trunk circuits

The immediately preceding sections of this specification have described the sequence in which the circuits of our TSPS system work during the serving of various types of noncoin calls incoming on the MF trunk circuits. This section describes the sequence in which the TSPS system serves the various types of noncoin calls that may be served by the DP trunk circuits shown on FIGS. 92 and 93. The operation of this trunk circuit, per se, has already been described in detail in connection with the portion of the specification pertaining to it.

The noncoin calls served by DP trunk circuits of this type may be of either the 1+ station-to-station or the 0+ person-to-person type. In the same manner as for MF calls, it is contemplated that the calling party will dial a prefix digit 1 for station-to-station calls and a prefix digit 0 for person-to-person type calls. The normal seven or ten digits are then dialed immediately after the prefix digit. The following paragraphs describe both 1+ and 0+ type DP calls from offices equipped for ANI operation as well as from offices that are not so equipped. It is assumed, in connection with the following discussion, that the DP trunk circuit that serves each of these call types is identical to that shown in detail on FIG. 92.

Noncoin DP–ANI–0+ calls

Calls of this type are initiated when the local office subscriber dials whatever directing digits may be necessary within the office, followed by the prefix 0, followed by the normal seven or ten digits of the called station. This dialing action causes the local office to establish a connection therethrough to the outgoing termination of the T and R conductors shown on the left side of FIG. 92. This results in a closure within the originating office which shunts the T and R conductors to operate trunk circuit relay 92–L. This relay, in operating, in turn operates the magnetic latching relay 92–B. The windings of relay L apply ground to the tip conductor and negative battery to the ring conductor at this time.

The seven or ten digits dialed by the calling party are repeated by the local office and applied to the T and R conductors and, in turn, to the 92–L relay which follows the pulses in the conventional manner. The initial operation of the L relay when the trunk is seized energizes scanner ferrod L0 as a signal to the SPC via the scanner. The SPC utilizes this signal in the same manner as described for MF trunks and ultimately determines that it constitutes a newly arrived trunk seizure signal. The SPC then commands the switching network to establish a path interconnecting a DP receiver with the T1 and R1 conductors of the trunk circuit of FIG. 92. The establishment of this connection extends the T1 and R1 trunk conductors to a similarly designated conductor pair within the group 8021 on the left side of FIG. 80, through the trunk link and position link switches, to a T1 and R1 conductor pair within the group 8029 on the right side of FIG. 80. The connection may then be further extended to the DP receiver selected for the serving of the call.

It cannot be readily determined in advance at which stage of the dialing operation the DP receiver will be available and attached via the switching network to the trunk circuit. Therefore, the 2-pulse counter within the trunk circuit counts 0, 1, or 2 pulses of the first dialed digit, and then, depending upon the speed with which the DP receiver is attached, transmits an indication of the number of pulses it has counted by the time the receiver is attached. The receiver then counts the subsequent pulses for the first digit, together with all pulses of all subsequently dialed digits.

The digits counted by the receiver are transmitted via the scanner to the SPC, which disconnects the receiver from the trunk when all digits have been received and counted. The SPC next, by means of its programmed memory, determines that the call is incoming from an office equipped for ANI operation and that, therefore, an MF receiver must now be attached to the calling connection to receive the ANI information that is about to be outpulsed. It accordingly commands the switching network to establish a connection between the T and R conductors within the conductor group 9204 and the corresponding conductors of an available MF receiver. The establishment of this connection extends the T and R conductors within the group 9204 to a correspondingly designated conductor pair within the group 8021 on the left side of FIG. 80 through the trunk link and position link switches to the T and R conductor pair within the group 8030 extending to the MF receiver selected by the SPC for serving the call. Let it be assumed that this receiver is the one whose details are shown on FIG. 81.

The polarities applied to the T and R conductors by the MF receiver at the time of its attachment to the connection must match that currently provided by the trunk, which is ground on the tip and battery on the ring. Therefore, to effect this, the SPC commands the operation of relay 81-C and 81-A at the time the receiver is attached. This combination of relays operated, together with relay D, which remains operated, provides ground to the tip and battery to the ring to match the polarities applied by the trunk. Next, the SPC commands the operation of trunk relay 92-C, which, by means of its transfer contacts, removes the trunk L relay from the T and R conductors and provides a path through resistor R20 to hold the L relay up. This leaves the MF receiver as the sole source of supervision for the connection.

The SPC next commands the operation of relay 81-B to reverse the T and R lead polarities and thereby place battery on the tip and ground on the ring. This constitutes a START signal to the originating office, which now outpulses the calling station ANI information. The ANI information is detected by the MF receiver and transmitted to the SPC via the scanner in the same manner as described for MF type calls. The SPC commands the release of relays 81-A upon the termination of the ANI operation. This returns audible tone from source 8106 back to the calling party. Relays 81-B and 81-C are subsequently released by the SPC when the MF receiver is disconnected by the switching network from the connection. At this time, trunk relay 92-B is released to restore the supervision of the call to the T and R trunk circuit conductors. Relay C remains operated in the trunk, and therefore battery remains on the tip and ground on the ring.

The call has now progressed within the TSPS center to the point where the SPC has received the called information from the DP receiver in response to the calling party's dialing operation and has received the calling station information from the MF receiver as a consequence of an ANI operation. At this time, trunk relays 92-L and 92-C remain operated.

The SPC next commands the attachment of an NF outpulser to the trunk for the outpulsing of the called information required by the next office. The SPC also commands the attachment of an idle operator position to the calling trunk circuit. Both of these operations are performed in the same manner as described in detail for the MF-ANI-0+ type call.

Relay 92-A of the trunk circuit is operated by the SPC subsequent to the outpulsing operation to complete the talking connection between the calling station, the operator position selected by the SPC, and the called station. The operator serves the call in a manner identical to that already described for the noncoin MF-ANI-0+ call. It should be noticed, in this connection, that it makes no difference whatsoever to the operator whether a call is served by an MF or a DP trunk. Therefore, the lamp indications at the operator position and the keys that must be depressed by the operator for this call are identical to those for the corresponding type of MF call. The operator now provides the call service requested by the calling party and then disconnects her position from the call, thereby leaving the calling and called parties free to converse.

The SPC monitors the call by means of the L0 and R0 ferrods on FIG. 92. Ferrod R0 monitors the outgoing loop and switches its magnetic state when the called station disconnects upon termination of the call. The SPC detects this change and, in response thereto, commands the release of trunk relay 92-A. Subsequently, when the calling party hangs up, the SPC commands the release of trunk relay 92-C, thereby restoring the circuit to normal. The charge data recording operation at this time is controlled by the SPC in the same manner as for MF calls.

Noncoin-DP-ANI-1+ calls

Calls of this type are the routine customer-dialed station-to-station type and do not require operator assistance. They normally would not be routed through the TSPS center if either the originating or the tandem office serving the call is equipped with charge-recording facilities. The charge data for these calls in such instances would be recorded at either the local or the toll office, and therefore the call would be routed directly from the originating office to the toll office. Calls of this type would be routed through the TSPS center only in the event that neither the local nor the toll office was equipped with charge-recording facilities. In this case, the calls would be routed through our system solely for a charge data recording operation. The call would be served within the TSPS center in the same manner as just described for the DP-ANI-0+ call, except that an operator would not be attached to the incoming connection upon the termination of the ANI outpulsing operation. Instead, the calling and called parties would be connected as soon as the called station answers. The SPC, in cooperation with the scanner, would monitor and record the charge data for the call in the same manner as for person-to-person type DP calls.

Noncoin-DP-NonANI-0+ calls

These calls are of the person-to-person type from offices which do not have ANI facilities. The operator duties on such calls is to furnish the person-to-person type service requested by the calling party, as well as to obtain the calling station number from the calling subscriber and to key it into the system. These calls are served in a manner analogous to that of the noncoin-DP-ANI-0+ type, with the exception that the MF receiver is not attached to the calling trunk upon the completion of the calling party's dialing operation. Instead, the SPC immediately attaches an idle operator to the connection at the time the DP receiver is disconnected. Then, in the same manner as described for nonANI-1+ type calls from MF trunk circuits, the operator determines and keys the calling station number into the system and then furnishes the person-to-person type service requested by the calling party. The same lamps are lit and the same keys are depressed for calls of this type as for the priorly described comparable type calls served by MF trunk circuits.

Noncoin–DP–NonANI–1+ Calls

These calls are of the station-to-station type and are routed to an operator solely in order that she may determine and key the calling station number into the system. These calls are served in a manner identical to nonANI–0+ type calls from DP trunks, except that the operator is not required to furnish person-to-person type service. The same lamps are lit and the same keys are depressed by the operator at this time as is the case for the priorly described nonANI–1+ type calls from MF trunk circuits.

Noncoin–dial 0 calls

Our system can also serve noncoin dial 0 calls incoming on MF, as well as DP trunk circuits from offices of either the ANI or nonANI type. On calls of this type, the calling subscriber dials only the initial digit 0 in order to obtain a connection to an operator who will assist him in completing the call as well as in providing any additional requested call service. These calls may be detected and distinguished from other type calls in a plurality of manners depending upon the trunking arrangements between the TSPS center and the originating offices. One possible method is to utilize a separate trunk group for this type of traffic. In accordance with this method, the originating office detects the dialing of only the prefix digit 0 and then, when no further digits are dialed, it routes the call to the TSPS center over the trunk group exclusive to dial 0 type traffic. The SPC, by means of its programmed memory, determines the type of call when the incoming trunk has seized by the originating office. Another method of serving dial 0 type traffic is to route the calls to the TSPS center over the same trunk group utilized for 0+ or 1+ traffic and then let the TSPS center identify the call type by a time-out operation when no called station information is outpulsed from the originating office. Either mode of operation may be utilized to detect dial 0 traffic, depending upon the trunking arrangement available, as well as the traffic requirements within the originating office. The following description assumes, for purposes of discussion, that the dial 0 traffic is extended over trunk group serving both 0+ and 1+ traffic. and that therefore the presence of a dial 0 call is detected by a time-out within the TSPS center.

Noncoin dial 0 calls may be served by both MF and DP trunk circuits, and they may also be of either the ANI or the nonANI type. With these criteria, each dial 0 call incoming over a combined trunk group is served in a manner identical to that in which a 1+ or 0+ call of the same type is served by the same trunk, except that no called station information is outpulsed by the originating office in response to the polarity reversals applied to the T and R conductors by the digit receivers. Once the SPC determines that this is a dial 0 call, it further determines whether the call is of the ANI or nonANI type; and if it is of the ANI type, it proceeds to obtain the ANI information by causing the MF receiver to be attached to the call and to apply the necessary polarity reversals to the line, as previously described for other calls. The call is then connected to an operator in the same manner as already described, except that the lamp information at this time signifies the call to be of the dial 0 type. The lamps that are lit at this time at the position are the NON-COIN DIAL 0 and the ACS-lamp for the loop serving the call. The illumination of the NON-COIN DIAL 0 lamp informs the operator that she must obtain and key the called station number into the system, and that she must additionally ascertain and provide the type of call service requested by the calling party. The operator converses with the calling party to obtain this information and then depresses the class-of-charge key, such as for example, PER PD or STA COL. She also depresses the KP FWD key and then keys the called station number into the system. If the call is of the station-to-station type, she immediately depresses the ST TMG and the POS RLS keys to release from the call. On the other hand, if person-to-person type service is required, she waits until the called station answers, provides the requested person-to-person service, and then depresses the ST TMG key, followed by the POS RLS key to release from the call.

Dial 0 calls from nonANI offices are served in a similar manner, except that the SPC immediately routes the call to an operator and dispenses with the connection to an MF receiver. The position lamps that are illuminated at this time are the same as already described for the dial 0 ANI calls, except that, in addition, the KEY CLG and KP BACK lamps are illuminated. The operator at this time performs all the duties and functions already described for the dial 0 ANI type calls and, in addition, orally obtains and keys into the system the calling number.

Coin calls—In General

This portion of the specification describes in detail the sequence in which the TSPS circuits operate to serve different types of coin calls. Many of these circuit operations are similar or identical to those already described in connection with the serving of noncoin calls. Therefore, this portion of the specification is primarily concerned with the details of the circuit operations which are unique to the serving of coin calls.

Coin calls may be of the 0+, 1+, or dial 0 type and may originate in offices equipped for ANI operation, as well as in offices which are not so equipped. It is necessary that the TSPS center receive information indicating whether each incoming call is of the coin or noncoin type; whether 0+, 1+, or dial 0 service is required, and whether or not the originating office is equipped for ANI operation. This information may be presented to the TSPS center and, in turn, to the SPC by the procedures priorly discussed, namely, by the utilization of separate trunk groups for each possible type of call and call parameters, or alternatively, by the utilization of KP pulses which are encoded into distinctive frequency combinations which identify the call type.

Coin calls served by MF trunk circuits

Coin calls incoming on MF trunk circuits, regardless of their type, are served in a manner identical to that for the corresponding type of noncoin MF calls, up to and including the point at which the operator position is attached, if required. Certain types of noncoin calls served by the TSPS center do not require the attachment of an operator position. Such is not the case for coin calls since, irrespective of its other parameters, each coin call served by the TSPS center requires the services of an operator for coin collection purposes.

The operator position lamp display for coin calls is similar to that for the corresponding type of noncoin call, except that the coin, rather than the noncoin, call type lamp is lit. In other words, if the call is of the 0+ type, i.e., person-to-person, the COIN SPL TOLL, rather than the NON-COIN SPL TOLL lamp, is lit. The same is true with respect to the COIN and NON-COIN STA and DIAL "0" lamps. The information transmitted from the SPC to the position at this time also controls the operation of the numerical display tubes of FIGS. 69 through 73, so that they display the initial period deposit required for the call, together with the duration of the initial period. The operator reads the information on the tubes and informs the calling party of the initial period duration as well as the amount that must be deposited for the initial period. The operator then monitors the deposits of this amount, performs the operator service, if any, required on the corresponding type of noncoin call, and then releases from the connection in the customary manner by depressing the ST TMG and POS RLS keys.

No additional operator attachment is required for MF coin calls which do not enter overtime. Immediately prior to the termination of such calls, and prior to the hang-up by either party, the MF trunk circuit is in a cut-through condition with its relays A and C operated (FIG. 90). Trunk relay A is subsequently released by the SPC in response to the hang-up of the called station. This leaves only trunk relay C operated. This represents state 4 of the trunk circuit, as shown on FIG. 91. Next, instead of reverting to a state 0 idle condition as it does for noncoin calls, the trunk goes through the circuit state sequence 6, 4, and then to 0, under control of the SPC, in order to apply the proper sequence of potentials to the T and R conductors to collect the initial period deposit.

Relay 90–B is operated by the SPC to cause the trunk to assume its circuit state 6. This opens the break contacts of relay B to disconnect the T and R conductors from the supervisory potentials provided by the trunk circuit and the scanner ferrod. The scanner ferrod is put into a HOLD condition.

The SPC, at the same time it commanded the release of trunk relay 90–A, commanded the switching network to interconnect the T and R conductors of the trunk circuit with the corresponding conductors of a coin control trunk circuit, as shown on FIGS. 3. The coin control trunk circuit is attached to the connection at this time, since it is the circuit which controls the transmission of the necessary signals back to the originating office to collect the monetary deposits. The supervisory potential applied by the coin collection circuit upon its attachment to the trunk now matches that provided by the trunk circuit itself through scanner ferrod L0.

The SPC next commands the operation of trunk relay 90–B to cause the trunk to assume its circuit state 6. The opening of the break contacts of relay 90–B at this time removes the supervisory potentials applied to the T and R conductors by the trunk circuit, and thereby leaves the coin collection trunk circuit in supervisory control of the connection. At this time, the coin control trunk circuit applies the necessary potentials back to the originating office to control the coin collection operation at the calling station. Once this is finished, the SPC releases relay 90–B and, at the same time, commands the switching network to break down the connection between the coin control trunk circuit and the MF trunk circuit of FIG. 90. This leaves the MF trunk circuit in supervisory control of the connection once again. The SPC finally commands the release of trunk relay 90–C, thereby restoring the MF trunk circuit to its idle state. This constitutes the termination of the call for the SPC, and the SPC at that time transmits the necessary call charge date to the AMA facilities, where it is recorded for subsequent use.

The immediately preceding paragraphs of this section have described the operation of the system during the serving of calls which do not enter overtime. The MF trunk circuit of FIG. 90 will also serve many coin calls which do extend into overtime. Additional operator services are required on calls of this type. An operator position it attached to the calling connection when a call of this type is about to enter overtime at the termination of the initial period. The function of the operator at this time is merely to inform the calling parties that the initial period is up and that their call is entering overtime. This connection is under control of the SPC, which times the call and then, at the appropriate time, commands the switching network to connect the call with an idle operator position. This connection is then established in the manner already described and, assuming loop 0 at the position is to serve the call, the lamps that are lit are ACS0, NFY, together with the call type lamp, such as for example, the COIN STA lamp for a station-to-station type of call. The operator hears the zip tone in her subset as the call is extended to her position and, at the same time, hears the parties conversing. She reads the lamp display and then informs the parties that their call is entering overtime. She then depresses the POS RLS key to break the connection between her position and the calling trunk circuit.

An additional connection to an operator must be made subsequently for coin calls involving overtime for the purpose of controlling the collection of the overtime charges. The overtime charges may be collected either in a single operation at the call termination or piecemeal, from time to time, as the call continues into overtime. The coin collection function is handled in essentially the same manner as for coin calls which do not enter overtime. The SPC detects either the end of the call, or the end of a predetermined number of overtime periods, and commands the switching network to establish a connection between the calling trunk circuit and an idle operator position. The lamps that are to be displayed at the position at this time are the call type, such as for example, COIN STA, CHG DUE, and the ACS lamp for the loop to which the call is extended, such as for example, ACS0 for loop 0. The NIXIE tube circuitry is also operated by the SPC at this time to cause a display of the overtime charges and the overtime duration. The operator communicates this information to the calling party and requests that he deposit the overtime charges. She monitors the deposit of these charges and then depresses the POS RLS key to release herself from the connection. If this is an end of the call seizure, the coin collection function is then automatically controlled by the SPC. However, if this is an overtime seizure prior to the termination of the call, the operator also, prior to the depression of the POS RLS key, depresses the COIN COL key in order to signal the SPC to initiate a coin collection operation.

The circuit operations pertaining to an overtime coin collection operation prior to the end of the call are first discussed. The MF trunk circuit is in its cut-through state 5, with relays A and C operated, prior to the coin collection operation. When the SPC initiates a coin collection operation, in response to a signal from the operator position, trunk relay B is operated to put the trunk in its state 7. Immediately prior to the operation of relay B, the SPC commands the switching network to connect the coin control trunk with the T and R conductors of the MF trunk circuit. The supervisory potential now applied by the coin collection trunk matches that provided by the MF trunk circuit. Then, when the trunk circuit enters its state 7, in which relay B is operated, the supervisory control by the MF trunk circuit is removed, and this leaves the coin control trunk in control of the connection. This trunk then transmits the necessary signals back to the originating office to control the collection of the coins at the calling station. Following this, the MF trunk circuit is restored to its state 5, in which relay B is released and, at the same time, the SPC commands the switching network to disconnect the coin control trunk. This, once again, leaves the MF trunk under full control of the connection. The parties are now free to continue their conversations on the call, and nothing further happens until either or both parties hangs up at the call termination. This is detected by the SPC, which then switches the trunk circuit from its cut-through state 5 to its state 4 by releasing relay A. An operator position is once again attached to the MF trunk circuit when it enters its state 4 at this time, for the purpose of notifying the calling party of the charges now due and for monitoring their deposit. A ringback sequence may be required if the calling party hangs up or abandons with receiver off-hook. The lamps that are up at this time are the call type lamp, the NFY lamp, and the ACS lamp for the loop serving the call. The operator monitors the deposit of the required charges at this time and then depresses the POS RLS key to disconnect herself from the call. The SPC next controls the attachment of a coin control trunk by the switching network to the MF trunk and then operates trunk relay B to put the trunk circuit in its state 6. This leaves the supervision of the connection under control of the coin control trunk. This circuit performs a coin collection operation, following which it is disconnected from the call and the MF trunk circuit is switched back to its state 4 and its relay B is released. The SPC next releases the C relay of the trunk to put it in its idle state 0 and thereby terminate the call. At this time, the SPC transmits the necessary data to the AMA facilities for a billing data recording operation.

The circuit operations for coin calls for which the overtime charges are to be collected only at the termination of the call are identical to those described in the preceding paragraphs, with the exception that the trunk circuit does not enter its state 7 and no operator attachment is required during the overtime portion until the termination of the call. At this time, the operator is attached for the purpose of collecting the entirety of the overtime call charges.

Coin calls served by dial pulse trunk circuits

The dial pulse trunk circuit shown on FIGS. 92 and 93 may also serve coin calls of the 0+, 1+ or dial 0 type, from office equipped with ANI facilities as well as for offices that are not so equipped. With the exception of 1+ ANI type calls, the circuits comprising the TSPS system function in an identical manner for the serving of coin type calls from the DP trunks as they do for the serving of noncoin type calls, whose operation has already been described in detail. The serving of the 1+ ANI coin type calls is different only to the extent that these calls are routed to an operator position for the collection of coins, whereas for the noncoin situation, no operator position attachment was required. It makes no difference whatsoever to an operator, or to her position, whether a call is incoming on an MF or DP type trunk. As a consequence, the lamp display at a position and the keys which must be operated thereat for the serving of DP calls is identical with respect to that described in the preceding section for the various types of coin calls incoming on MF trunks. Therefore, since the serving of DP coin calls is similar in many respects to operations which have already been described, the following paragraphs pertain primarily to circuit operations which are unique to the serving of coin calls by the DP trunks and which have not already been described.

Many of the DP coin calls will not extend into overtime. The only operator attachment required on these is the one which occurs at the beginning of the call when, in addition to her other duties, if any, the operator informs the calling party of the amount to be deposited and monitors the deposit before releasing from the connection. The amount that is deposited on these calls is collected automatically at the end of the call. Immediately prior to the end of the call, the trunk is in its circuit state 5, which is a cut-through condition with its relays A and C operated (FIG. 92). Subsequently, the called party releases at the end of the call and the SPC commands the release of relay 92–A as it detects the on-hook condition of the called station. The release of the A relay puts the trunk in circuit state 4 and leaves only relay C operated. The SPC at this time commands the switching network to interconnect the T and R conductors of the trunk circuit on FIG. 92 with a coin control trunk in the manner described for MF calls, and then puts the DP trunk in circuit state 6 by operating its relay 92–B. This removes the DP trunk supervision from the connection and puts supervision under control of the coin control trunk. This trunk then performs the necessary circuit operations to collect the initial period deposit, following which it is released from the connection and the DP trunk is caused to assume its circuit state 4 as the SPC commands the release of relay 92–B. This leaves only relay C operated. The SPC next releases trunk relay C to terminate the call and put the trunk in its circuit state 0. As it did for MF type calls, the SPC then transmits the billing data to the AMA recording equipment.

The DP trunk circuit of FIGS. 92 and 93 may also serve coin calls involving overtime. On all such calls, a notify seizure of an operator position is required upon the expiration of the initial period in order to notify the calling party that the initial period is up and that the call is entering overtime. The circuit operations required at this time have already been described in connection with the coin calls served by the MF trunk circuits.

As already described for the coin calls incoming on MF trunk circuits, the overtime charges for coin calls incoming on DP trunk circuits may be collected either at the termination of the call, or alternatively, at the termination of the call as well as from time to time during the duration of the overtime interval. The duties performed by the operator in accordance with each of these procedures and the lamp displays at her position are the same for each procedure, as already described for MF coin calls.

The sequence of circuit states for the DP trunk when serving coin calls involving overtime, for which an operator is attached and the overtime charges are collected from time to time as the call progresses, is 0, 2, 6, 4, 5, 7, 5, 4, 6, 4, 0. The circuit states 0 through the first condition of state 5 are identical to the sequence involved and already described for the comparable type of noncoin DP call. State 5 constitutes the operated condition of relays A and C and the cut-through condition of the circuit, at which time both parties are connected speechwise. The SPC monitors and times the call and, when it is determined that the overtime charges have reached a predetermined amount, it connects an operator to the T and R conductors of the trunk circuti. The lamp indications presented to the operator at the attached position include the overtime charges now due. As was the case for MF calls, the operator informs the calling party of the deposit now required, monitors the deposit of this amount, depresses the COIN COL key, and then releases from the connection by depressing the POS RLS key. The SPC receives the coin-collect signal from the operator, releases her from the connection, and causes a coin control trunk to be attached to the T and R conductors of the DP trunk. The SPC then operates trunk relay B to put the DP trunk in its state 7. This transfers the supervision of the call from the DP trunk circuit to the coin control circuit. The coin control trunk circuit now performs a coin-collect operation in the manner already described. At the end of this operation, the coin control trunk is disconnected from the call and relay B of the DP trunk circuit is released to restore the trunk circuit to a cut-through condition in which the parties may resume their conversation.

The preceding paragraphs describe the operation of the circuit for a collection of overtime charges during the progress of the call, which is unique to the mode of operation in which overtime charges are collected when they equal or exceed a predetermined amount. This mode of operation is not always utilized, since many telephone companies prefer to delay the collection of overtime charges until the termination of the call. When the DP trunk circuit in the TSPS center is operated in this manner, the state 7 intermediate the two state 5's is not utilized and the DP trunk remains in state 5 of the duration of the overtime interval as long as the call continues.

The SPC detects the termination of the call as either station goes on-hook and causes the DP trunk to go through the operational sequence 4, 6, 4, 0, at that time. The DP trunk is in state 5, with relays A and C operated, until the end of the call. At that time, the on-hook condition of one of the stations is detected and trunk relay A is released to put the trunk into state 4 with only relay C remaining operated. An operator is then attached to the connection to inform the calling party of the charges due, monitor the deposit of these charges, and then release from the connection. When this occurs, the SPC disconnects the operator position and attaches a coin control trunk to the T and R conductors of the DP trunk. Once this connection is made, relay B of the DP trunk is operated to put it in its circuit state 6 and to transfer supervision of the call from the DP trunk to the coin control trunk. This trunk then performs a coin collection operation, following which it is disconnected from the call and relay B of the DP trunk is released, leaving it in its circuit state 2, and the C relay is released to put the trunk circuit in its state 0 and terminate the call. The SPC then transmits billing data to the AMA recording equipment.

Miscellaneous calls

This section of the specification describes miscellaneous types of calls and call services that may be provided by our system in addition to those elsewhere discussed in this specification.

FIG. 60 discloses three HOLD keys designated HOLD 0, HOLD 1, and HOLD 2, each of which is individual to loops 0, 1, and 2, respectively, of a position. These keys are provided in order that an operator may temporarily disconnect from a call for various reasons. Let it be assumed, for example, that a call is extended to a position on loop 0 and that the operator desires to temporarily disconnect from the call. The operator depresses the HOLD 0 key on FIG. 60, which transmits a signal to the SPC signifying the HOLD request. The SPC receives this signal and commands the switching network to disconnect the calling TSPS trunk from the position. When the operator depresses the access key for loop 0, the SPC re-establishes the link connection between the calling TSPS trunk circuit and the TSPS operator position serving the call.

Our system also has provisions for serving delayed calls. They may be established either manually by the operator or, ultimately, automatically by the SPC. Delayed calls are served by the delayed call trunk circuit of FIG. 99, whose operation is described in detail in the portion of the specification pertaining to it. This circuit is connected by two separate trunks to two separate incoming trunk circuits at the toll office, and a delay call is initiated by the TSPS by outpulsing the calling station number to one of these two toll office incoming trunk circuits and by outpulsing the called station number to the other toll office incoming trunk circuit.

A delayed call trunk circuit may be initiated manually by the operator upon the depression of the access key for an idle one of her three loops. The depression of this key sends a signal to the SPC, which commands the network to establish a link connection between the operator position and the T and R conductor pair 9901 on FIG. 99 of the delayed call trunk circuit. The operator then keys the calling and called numbers into the system, along with charge information, in the conventional manner. The SPC receives this information and commands the switching network to seize an idle outpulser and to connect the seized outpulser to the T1 and R1 conductor pair 9902 of FIG. 99. Once this connection is established, the SPC controls the outpulsing of the calling and called numbers to the toll office in the manner described in detail in the portion of the specification pertaining to FIG. 99. The operator releases from the connection after she has determined that the call has been established in the manner requested by the calling party.

A delayed call may be initiated automatically by the SPC in response to information priorly keyed into the system at the time an attempted call could not be completed. At this time, the operator asks the calling party whether he wishes the call to be tried at a later time, and, if so, at what time. Let it be assumed, for example, that the calling party desires the call to be retried in 20 minutes. In this case, the operator depresses the delay (DLY) key on FIG. 61 and then keys the digits 20, representing 20 minutes, followed by the calling and called numbers together with charge information. This information is received and stored by the SPC. The operator finally depresses the POS RLS key to release from the connection and make her position available for serving other calls.

The SPC times the 20-minute interval and, upon its expiration, commands the switching network to connect an outpulser to the T1 and R1 conductor pair 9902 of the delayed call trunk circuit of FIG. 99. Once this connection is established, the outpulser outpulses the calling and called numbers forward to the toll office in the manner described in detail in connection with FIG. 99. At this time, the SPC commands the switching network to connect the T and R conductor pair 9901 with any idle operator position immediately after the first calling number is outpulsed. The SPC also commands the group gate to transmit sufficient information to the operator position to display the details of the call now being served by the position. This information includes the illumination of the DLY lamp on FIG. 67 to signify that a delayed call has been extended to her position. The operator converses with the calling party when he answers and furnishes whatever services, if any, are required before releasing from the connection.

Our system also contains facilities which permit a calling station to be connected sequentially with a plurality of called stations, one at a time on a station-to-station basis, with operator service being required only for the keying in of the plurality of called station numbers specified by a calling station at the initiation of the calling sequence. Let it be assumed, for example, that a calling party desires to be connected, one at a time, with five different stations. This being the case, he dials the digit 0 to obtain a connection to the TSPS operator in the conventional manner, tells her the type of service he requires, and gives her the area code and station numbers for the five stations with which he desires to converse. The operator at this time depresses the sequence calling key, SEQ call on FIG. 62, and keys in the five called numbers specified by the calling party. She then depresses the SEQ call key once again to signify that all of the called numbers have been entered into the system. She also keys in charge information and finally depresses the POS RLS key to release from the connection.

The SPC controls the connection of the calling TSPS trunk circuit to an outpulser, which outpulses the digits of the first called station to the toll office. This call is completed in a typical manner and monitored by the SPC. Upon its termination, the SPC reconnects the outpulser to the calling TSPS trunk and causes the digits of the second called station to be transmitted to the toll office. This call is established in the conventional manner and monitored. As this and each subsequent call is finished, the SPC detects the call termination and causes the next call to be set up by outpulsing the required digits forward to the toll office.

Our system also contains facilities which permit calling parties to be notified regarding the time and charges for a call upon its termination. This service is requested at the time a call is connected to an operator position, and at this time the calling party informs the operator that he would like to be notified regarding the chargeable time of the call and its cost upon the call termination. The operator at this time depresses the time-and-charge key, T & C on FIG. 61, which transmits a time-and-charge signal to the SPC. The operator serves the rest of the call in the conventional manner and finally depresses the POS RLS key to release from the connection. The call is monitored by the SPC and, upon its termination, the SPC determines that time-and-charge service is requested and commands the switching network to connect the calling TSPS trunk circuit with an idle operator position. At the same time, the SPC commands the group gate to transmit call information to the selected position. This call information includes the lighting of the T & C lamp on FIG. 67 as well as a display on the numerical indicator tubes signifying the call time and charges. The operator communicates this information to the calling party and then releases from the connection by depressing the POS RLS key.

Our system also contains facilities which permit a calling party to be notified that a specified number of chargeable minutes has transpired on the call. This type of service is provided when a calling party informs the operator that he would like to be advised when a specified number of minutes (say, for example, five) has elapsed. The operator depresses the KP notify (KP NFY) key and keys in the digit 5. The rest of the call is served in the conventional manner by the operator, depending upon its other characteristics, and she releases from the call by depressing the POS RLS key.

The SPC times the interval specified by the calling party. In this case, upon the expiration of five chargeable minutes, the SPC selects an idle operator position and commands the switching network to establish a link connection between the calling TSPS trunk circuit and the selected position. At the same time, the group gate is commanded to transmit to the selected position the signals required to illuminate the notify (NFY) lamp on FIG. 63 and to display a "5" on the numerical display tube as an indication that the caller desires to be notified at the expiration of five minutes. The operator now informs the calling party that five minutes has transpired and depresses the POS RLS key to disconnect her position from the call.

Our system may also provide sequence call service of the delayed type. This service is requested when a calling party obtains a connection to a TSPS operator and requests that sequence calling service be provided at a specified later time. The operator then depresses the delay (DLY) key and the sequence calling key and keys into the system the plurality of called station numbers with which the calling party desires to converse. After also keying in the necessary charge information, she depresses the position release (POS RLS) key to disconnect her position from the call. The SPC times the period of delay and, upon its expiration initiates the sequence calling sequence in the same manner as already described for sequence calls which are not of the delayed type.

It is to be understood that the above-described arrangements are but illustrative of the application of the principles of the invention. Numerous other arrangements may be devised by those skilled in the art without departing from the spirit and scope of the invention.

What is claimed is:

1. In a call service center, a service trunk circuit having a first end permanently connected to an outgoing trunk circuit at a local office and a second end permanently connected to an incoming trunk circuit at a toll office, means responsive to the receipt by said service trunk circuit over its first end of a call from said local office for extending said call via said second end to said toll office, a branch of said service trunk circuit, an operator position, and means additionally responsive to the receipt of said call for connecting said call via said branch to said position for the furnishing of operator call assistance, said connecting means being subsequently effective for disconnecting said position from said call.

2. The invention of claim 1 in combination with means responsive to the receipt of said call for receiving and registering call information transmitted to said service trunk circuit from said local office.

3. The invention of claim 2 wherein said means for extending includes means for outpulsing call information forward via said second end of said service trunk circuit to said toll office.

4. The invention of claim 3 in combination with means effective upon the connection of said operator position for transmitting call information to said position.

5. The invention of claim 4 in combination with charge data recording facilities, call monitoring means, and means including said call monitoring means responsive to an on-hook condition at either the calling or called station upon the call termination for transmitting call data to said recording facilities.

6. The invention of claim 4 wherein said call information transmitted to said operator position includes means for transmitting the monetary deposits required on customer-dialed coin calls in order that the operator thereat may monitor the collection of said deposits.

7. The invention of claim 5 in which said monitoring means includes call timing means effective upon the call termination for transmitting the chargeable time of said call to said recording facilities.

8. The invention of claim 1 wherein said operator assistance includes the monitoring of the deposit of initial period charges on customer-dialed coin calls, and wherein said invention further comprises additional operator positions, and call timing means operative during the serving of a customer dialed coin call for timing the duration of the initial period and effective upon the termination of the initial period for effecting the connection of any one of said positions to said branch for the furnishing of call assistance, said connecting means being subsequently effective for disconnecting said any one position from said call.

9. The invention of claim 8 in combination with call monitoring means operative upon the call termination for effecting the connection of any one of said positions to said branch, and means including said timing means responsive to said call termination for transmitting overtime duration and charge information to said last connected position in order that the operator thereat may relay this information to the calling subscriber, said connecting means being subsequently effective for releasing said last connected position from said branch.

10. The invention of claim 9 in combination with call data recording facilities, and means effective upon the release of said last named position for transmitting time and charge information for the entirety of said call to said recording facilities.

11. In combination, a plurality of local offices each having a plurality of outgoing trunk circuits, a toll office having a plurality of incoming trunk circuits, a service center having a plurality of service trunk circuits each of which has a first end permanently connected to an individual one of said local office outgoing trunk circuits, each of said service trunk circuits also having a second end that is permanently connected to an individual one of said incoming trunk circuits at said toll office, means responsive to the receipt by any one of said service trunk circuits of a call at its first end from the local office to which its first end is connected for extending said call over its second end to the incoming trunk circuit to which it is connected at said toll offices, a plurality of operator positions at said center, a branch on each of said service trunk ciruits, and means additionally responsive to the receipt of a call for interconnecting the branch of the service trunk circuit receiving said call with one of said positions for the furnishing of operator assistance to said call, said connecting means being subsequently effective for disconnecting said position from said branch.

12. The invention of claim 11 in combination with means responsive to the receipt of said call by any one of said service trunk circuits for receiving and registering call information transmitted forward to said service center from said local office.

13. The invention of claim 12 wherein said means for extending includes means for outpulsing call information forward via said second end of said service trunk circuit serving said call to said toll office.

14. The invention of claim 13 in combination with charge data recording facilities, call monitoring means, and means including said call monitoring means responsive to an on-hook condition at either the calling or called station upon the call termination for transmitting call data to said recording facilities.

15. In combination, a plurality of local offices having outgoing trunk circuits, a plurality of toll offices having incoming trunk circuits, a plurality of communication paths each of which interconnects an individual one of said outgoing trunk circuits at one of said local offices with an individual one of said incoming trunk circuits at one of said toll offices, characterized in that each of said paths includes a service center common to all of said paths and situated intermediate said offices for furnishing service on calls extended forward via said paths from said local offices with said service center comprising: a plurality of service trunk circuits each of which is individual to one of said paths, lack of said service trunk circuits having an incoming end permanently connected over its path to the local office outgoing trunk circuit to which its path is connected, each of said service trunk circuits further having an outgoing end permanently connected over its path to the toll office incoming trunk circuit to which its path is connected, means including means common to all of said paths and responsive to the receipt by one of said service trunk circuits of a call from the local office to which it is connected for extending said call over its outgoing end to the toll office to which it is connected, an operator position at said center, means common to all of said paths and additionally responsive to the receipt of said call for interconnecting the incoming end of said service trunk circuit that receives said call with said operator position for the furnishing of operator call assistance, and means subsequently effective for controlling the disconnecting of said position from said incoming end.

16. The invention of claim 15 in combination with means common to all of said service trunk circuits and responsive to the receipt of said call by said service center for receiving and registering call information transmitted thereto from said local office over said path that is connected to said one service trunk circuit.

17. The invention of claim 16 wherein said means for extending includess means common to all of said service trunk circuits for outpulsing call information forward to said toll office over said path that is connected to said one service trunk circuit.

18. The invention of claim 16 in combination with means effective upon the connection of said operator position for transmitting call information to said position.

19. The invention of claim 18 in combination with charge data recording facilities, call monitoring means, and means including said call monitoring means responsive to an on-hook condition at either the calling or called station upon the call termination for transmitting call data to said recording facilities.

20. In a call service center, service trunk circuits each having a first end permanently and individually connected to a different outgoing trunk circuit at a local office, each of said service trunk circuits also having a second end permanently and individually connected to a different incoming trunk circuit at a toll office, means responsive to the receipt by the first end of one of said service trunk circuits of a call from said local office for extending said call via the second end of said one service trunk circuit to said toll office, a branch on each of said service trunk circuits, operator positions, a selectively controlled switching network, and means including said means responsive to the receipt of said call for controlling said network to establish a network path between said branch of said one service trunk circuit and any one of said positions for the furnishing of operator call assistance, said network being subsequently effective for disconnecting said position from said branch.

21. The invention of claim 20 in combination with a digit receiver, means responsive to the receipt of said call for connecting said receiver via said network to said branch of said one service trunk circuit for the reception of call information outpulsed to said first end of said one service trunk circuit by said local office, registration means, and means controlled by said receiver for storing said information outpulsed from said local office in said registration means, said network being effective for disconnecting said receiver from said call upon the termination of said local office outpulsing.

22. The invention of claim 21 wherein said means for extending includes an outpulser in combination with means for controlling the connecting of said outpulser via said switching network to said branch of said one service trunk circuit, and means responsive to the reception of said information by said registration means for controlling said outpulser to transmit call data forward via network and said second end of said one service trunk circuit to said toll office, said network being subsequently effective for disconnecting said outpulsing means from said call.

23. The invention of claim 22 in combination with means effective subsequent to said connection of said operator position for transmitting call data to said position, a call controller, and means at said operator position operable under operator control for transmitting additional call data to said controller, said controller being subsequently effective for controlling the disconnection of said operator position from said call.

24. The invention of claim 23 in combination with data channels independent of said network, and means for transmitting said call data to and from said position and said controller by means of said data channels.

25. The invention of claim 23 in combination with charge data recording facilities common to all of said service trunk circuits, call monitoring means common to all of said service trunk circuits, and means including said call monitoring means responsive to an on-hook condition at either the calling or called station upon the call termination for transmitting call data to said recording facilities.

26. The invention of claim 25 in which said monitoring means includes timing means effective upon the call termination for transmitting data signifying the chargeable time of said call to said recording facilities.

27. The invention of claim 22 in combination with means effective upon the storage of said outpulsed call data in said registration means during the serving of a customer-dialed coin call for computing the deposit then required at the calling station, means operative upon said connection of said operator position for transmitting call data including the computed required monetary deposits to said position in order that the operator thereat may monitor the collection of said deposits, a call controller, and means at said operator position operable under operator control for transmitting call information to said controller, said controller being effective upon the receipt of said information for controlling the disconnection of said operator position from said call.

28. The inventin of claim 27 in combination with a coin-collect key at said position, a coin-control trunk circuit, means responsive to the depression of said coin-collect key for controlling the connection of said branch of said one service trunk circuit and said coin-control trunk circuit via said network, and means responsive to said last connection for causing said coin-control trunk circuit to transmit a coin-collect signal via said first end of said one service trunk circuit to said local office, said network being subsequently effective for disconnecting said coin-control trunk circuit from said second end.

29. The invention of claim 27 in combination with data channels independent of said network, and means for transmitting data to and from said position and said controller by means of said data channel.

30. The invention of claim 29 in combination with charge data recording facilities, call monitoring means, and means including said call monitoring means responsive to an on-hook condition at either the calling or called station upon the call termination for transmitting call data to said recording facilities.

31. The invention of claim 30 in which said monitoring means includes timing means effective upon the call termination for transmitting the chargeable time of said call to said recording facilities.

32. The invention of claim 22 in combination with means effective upon the storage of said outpulsed call data in said registration means during the serving of a customer-dialed coin call for computing the duration and charge for the initial period as well as for a single overtime period, means operative upon said connection of said operator position for transmitting call data thereto including the computed initial period charge and time duration information in order that the operator thereat may monitor the collection of the initial period charge, a call controller, and means at said operator position operable under operator control for transmitting call information to said controller, said controller being effective upon the receipt of said information for controlling the disconnection of said operator position from said call via said network.

33. The invention of claim 32 in combination with timing means effective upon the end of said initial period portion of said call for initiating the establishment of a network connection between said branch of said one service trunk circuit and any one of said operator positions, and means responsive to the connection of said last named position for transmitting call data thereto including the charge and duration of a single call overtime period in order that the operator thereat may convey the information to the calling station, said network being subsequently effective for disconnecting said last named position from the call.

34. The invention of claim 33 in combination with means effective upon the call termination for computing the overtime duration and overtime charges, additional means operative upon the call termination for controlling the connection of any one of said positions via said switching network with said branch of said one service trunk circuit, and means responsive to said connection for transmitting said duration and charge information to said operator position in order that the operator thereat may monitor the deposit of the overtime charges at the calling station, said network being subsequently effective for disconnecting said position from said branch of said one service trunk circuit.

35. The invention of claim 34 wherein said call data is transmitted to and from said positions and said controller by means of data channels common to all positions and independent of said network.

36. The invention of claim 35 in combination with charge data recording facilities, and means including said call monitoring means responsive to the disconnection of said third operator position upon the call termination for transmitting call data representing the entirety of said call to said recording facilities.

37. A service trunk circuit having a first end connected to a local office outgoing trunk circuit and a second end connected to a toll office incoming trunk circuit, a switching network connected to a branch of said service trunk circuit, impulsing and outpulsing circuits, an operator position circuit, means responsive to the receipt of a call from said local office by said first end of said service trunk circuit for controlling the connection of one of said inpulsing circuits via said network to said branch, said inpulsing circuit being operative to receive and register call information outpulsed to said service trunk circuit from said local office, said network being effective upon the receipt of said outpulsed digits for disconnecting said inpulsing circuit and for connecting an outpulsing circuit via said network to said third branch, means including said outpulsing circuit operative in response to said registration for outpulsing call information forward via said second end to said toll office, and means simultaneously effective for connecting one of said operator positions via said network to said branch, said network being subsequently effective for disconnecting said position and said outpulsing circuit from said branch.

38. In a call service center, a service trunk circuit having a first end connected to an outgoing trunk circuit at a local office and a second end connected to an incoming trunk circuit at a toll office, a branch of said service trunk circuit, an information receiver, a selectively controlled switching network, means responsive to receipt of a customer-dialed coin call by said first end for controlling said network to establish a path between said receiver and said branch of said service trunk circuit for the reception of call information outpulsed by said local office to said first end, registration means, means controlled by said receiver for transmitting information outpulsed from said local office to said registration means, said network being subsequently effective for disconnecting said receiver from said branch upon the termination of said local office outpulsing, means responsive to the registration of said call information for extending said call via said second end to said toll office, additional means responsive to the registration of said call information outpulsed from said local office for deriving further call information including the initial period charge and duration as well as the charge and duration for a single overtime period, a plurality of operator positions, additional means responsive to the receipt of said call for connecting one of said positions to said branch via said network, and means effective upon the connection of said one operator position for transmitting call information to said position with said transmitted information including the initial period charge and duration in order that the operator at said position may provide call assistance including monitoring the deposit of the initial period charge, said network being subsequently effective for disconnecting said position from said call.

39. The invention of claim 38 wherein said means for extending includes an outpulser in combination with means for controlling the connecting of said outpulser via said switching network to said branch, and means responsive to said registration for controlling said outpulser to transmit call data forward via network and said second end to said toll office, said network being subsequently effective for disconnecting said outpulsing means from said call.

40. The invention of claim 39 in combination with call timing means effective upon the termination of said initial period for controlling the connection of said branch to any one of said operator positions via said network, means effective in response to said connection for transmitting call information to said any one position with said information including the charge and duration for a single call overtime period in order that the operator thereat may convey this information to the calling customer, said network being effective for subsequently disconnecting said position from said call, said call timing means being operable upon said disconnection for timing the overtime portion of said call, call monitoring means responsive to an on-hook condition at either the calling or called station upon the call termination for controlling the connection of any one of said operator positions to said branch via said network, and means responsive to said connection for transmitting call data to said last named position including the call overtime duration and charges in order that the operator thereat may monitor the deposit of said charges, said network being subsequently effective for disconnecting said position from said call.

41. The invention of claim 40 in combination with charge recording facilities, and means effective upon the call termination for transmitting data representing the entirety of said call to said recording facilities.

42. In a call service center, a service trunk circuit having a first end permanently connected to an outgoing trunk circuit at a local office and a second end permanently connected to an incoming trunk circuit at a toll office, a branch of said service trunk circuit, a plurality of operator positions, means responsive to the receipt by said service trunk circuit of a coin call over its first end from said local office for connecting any one of said operator positions to said branch, registration means, means at said operator position for transmitting call information to said registration means, means responsive to the registration of said call information received from said position for extending said call via said second end to said toll office, additional means responsive to the registration of said call information for deriving and transmitting to said position further call information including the initial period charge and duration as well as the charge and duration for a single overtime period, and means at said position for enabling the operator thereat to provide call assistance including the monitoring of deposit of the initial period charge, said connecting means being subsequently effective for disconnecting said position from said branch.

43. The invention of claim 42 in combination with call timing means effective upon the termination of the call initial period for connecting said branch to any one of said operator positions, means effective in response to said connection for transmitting call information to said one position with said information including the charge and duration for a single call overtime period in order that the operator thereat may orally convey this information to the calling customer, means effective for subsequently disconnecting said one position from said branch, said call timing means being operable upon said disconnection for timing the overtime portion of said call, call monitoring means responsive to an on-hook condition at either the calling or called station upon the call termination for connecting any one of said operator positions to said call, and means including said timing means responsive to said connection for transmitting call data to said last named position including the call overtime duration and charges in order that the operator thereat may monitor the deposit of said charges, said connecting means being subsequently effective for disconnecting said position from said call.

44. The invention of claim 43 in combination with charge recording facilities, and means effective upon the termination of said call for transmitting call data to said recording facilities.

45. In a call service center, service trunk circuits each having a first end permanently connected to a different outgoing trunk circuit at a first office and a second end permanently connected to a different incoming trunk circuit at a second office, means responsive to the receipt by said first end of one of said service trunk circuits of a call from said first office for extending said call via its second end to said second office, charge data recording facilities common to all of said service trunk circuits, and apparatus common to all of said service trunk circuits and responsive to a call termination signal for said call for transmitting call data to said recording facilities with said data including the chargeable time of said call.

46. The invention of claim 45 in which said means responsive to the receipt of said call includes means for registering call information transmitted to said first end of said one service trunk circuit from said first office.

47. The invention of claim 46 wherein said means for extending includes means for outpulsing call information forward via said second end of said one service trunk circuit to said second office.

48. The invention of claim 47 in combination with a branch on each of said service trunk circuits, a selectively controllable switching network connected on its one side to each of said branches and connected on its other side to said registering means and to said outpulsing means, means effective upon the receipt of a call by said first end for controlling said network to establish a network path between said branch of said one service trunk circuit and said registering means, said network being subsequently effective to disconnect said registering means, and additional means effective upon the receipt of a call by said first end of said one service trunk circuit for controlling said network to establish a network path between the branch of said one service trunk circuit and one of said outpulsing means, said network being subsequently effective for disconnecting said outpulsing means from said branch.

49. In a switching system, a CAMA (Centralized Automatic Message Accounting) office having facilities for the serving of customer-dialed calls requiring an oral identification of the calling station number as well as the transmission of said number to recording facilities, characterized in that said system further includes a call service center comprising: a switching network, a service trunk circuit having a first end connected to said CAMA office and having a second end connected to said switching network, a plurality of operator positions, said CAMA office being responsive to the reception of a CAMA call for extending said call to said first end of said service trunk circuit, means responsive to the reception of said call by said service trunk circuit for controlling said network to establish a network path between said second trunk circuit end and one of said positions in order that an operator thereat may obtain the calling station number from the calling subscriber, and means at said position for transmitting said calling number back over said first service trunk circuit end to said CAMA office and the recording facilities thereat, said network being subsequently effective for disconnecting said position from said service trunk circuit.

50. The invention of claim 49 wherein said means for transmitting said calling number back over said first service trunk circuit end to said CAMA offices comprises: registration means, means at said position operable under operator control for transmitting said calling number to said registration means, an outpulser, means responsive to said registration for controlling said network to establish a network path between said outpulser and said second end, and means including said registration means for controlling said outpulser to transmit said calling number back over said first service trunk circuit.

51. In a call service center, a service trunk circuit having a first end permanently connected to an outgoing trunk circuit at a local office and a second end parmanently connected to an incoming trunk circuit at a toll office, a branch of said service trunk circuit, operator positions, means responsive to the receipt by said service trunk circuit over its first end of a call from said local office for connecting said call via said branch to any one of said positions for the furnishing of operator call assistance, a call controller, means controlled by the operator at said one position for transmitting call information including a called station number to said call controller, and outpulsing means operable by said call controller in response to the receipt of said called number for transmitting said called number forward via said second end of said service trunk circuit to said toll office, said connecting means being subsequently effective for disconnecting said one position from said call.

52. The invention of claim 51 in combination with charge data recording facilities, call monitoring and timing means, and means including said monitoring and timing means responsive to an on-hook at either the calling or called station upon the call termination for transmitting call data including the called and calling numbers and the chargeable time to said recording facilities.

53. The invention of claim 51 in combination with a selectively controllable switching network connected on its one side to the branch of said service trunk circuit and connected on its other side to said operator positions and to said outpulsing means, and means effective upon the receipt of a call by said first end for controlling said network to establish a network path between said branch and one of said positions, and means responsive to the receipt of said called number by said call controller for establishing a network path between said branch and said outpulsing means.

54. In a telephone system comprising a local and a toll office, a first path interconnecting a first outgoing trunk circuit at said local office with a first incoming trunk circuit at said toll office, a second path interconnecting a second outgoing trunk circuit of said local office with a second incoming trunk circuit at said toll office, said local office being effective to route originating calls requiring no operator assistance over said first path to said first incoming trunk circuit at said toll office and to route calls requiring operator assistance over said second path to said second incoming trunk circuit at said toll office, characterized in that said second path comprises: a service center including a service trunk circuit having an incoming end permanently connected to said second local office outgoing trunk circuit and an outgoing and permanently connected to said second toll office incoming trunk circuit, an operator position at said service center, means responsive to the receipt of a call by said service center from said local office for interconnecting said operator position with said incoming end, said interconnecting means being subsequently effective upon the completion of the furnishing of operator assistance for disconnecting said position from said incoming end, and additional means responsive to the receipt of said call by said service center for extending said call forward over said outgoing end to said second incoming trunk circuit at said toll office.

55. The invention of claim 54 in combination with charge data recording facilities, call monitoring means, and means including said call monitoring means responsive to the termination of each call served by said center for transmitting call data to said recording facilities.

56. In a telephone switching system having a local and toll office together with a communication path interconnecting outgoing trunk circuits at said local office with incoming trunk circuits at said toll office, each outgoing trunk circuit being individual to one of said incoming trunk circuits and effective upon its usage on a call for extending the call forward over said path only to its related incoming toll trunk circuit, said local office being effective upon the serving of each call originating therein for transmitting forward over said path a signal indicating whether or not the call requires operator assistance, characterized in that said path comprises: a service center including service trunk circuits each of which has an incoming end permanently connected to a different one of said local office outgoing trunk circuits and an outgoing end permanently connected to a different one of said toll office incoming trunk circuits, means responsive to the receipt of a call over said path by said service center from one of said local office outgoing trunk circuits for extending said call via said path to the toll office incoming trunk circuit individual to said one outgoing trunk circuit, means for registering the signal from said local office indicating whether or not operator assistance is required, an operator position, and means responsive to the receipt of a signal indicating that operator assistance is required on a call for connecting one of said operator positions with said call at the incoming end of the service trunk circuit serving said call, said connecting means being subsequently effective for disconnecting said operator position when the required assistance has been furnished.

57. The invention of claim 56 in combination with means at said service center responsive to the receipt of said call for receiving and registering call information outpulsed over said path from said local office.

58. The invention of claim 57 wherein said means for extending includes means for outpulsing call information forward via said path to said toll office.

59. The invention of claim 56 in combination with charge data recording facilities, call monitoring means, and means including said call monitoring means responsive to an on-hook condition at either the calling or called station upon the call termination for transmitting call data to said recording facilities.

60. In a call service center, a service trunk circuit having a first end connected to an outgoing trunk circuit at a local office and a second end connected to an incoming trunk circuit at a toll office, a switching network, a branch of said service trunk circuit having two separate appearances on one side of said network, a plurality of operator positions, a scanner connected to said trunk circuit, a call controller, means including said scanner responsive to the receipt of a call by said service trunk circuit over its first end from said local office for transmitting a trunk service request signal to said controller, a plurality of digit receivers, means responsive to the receipt of said call service request signal for controlling said switching network to interconnect a first appearance of said branch and one of said digit receivers for the reception of call information outpulsed from said local office, means including said digit receiver for transmitting the information received from said local office to said call controller via said scanner, said network being effective for disconnecting said receiver from said branch upon the termination of said local office outpulsing, means in said controller responsive to the disconnection of said receiver for controlling said network to interconnect one of said operator positions with a first appearance of said branch, a plurality of outpulsers, means responsive to the registration of said information within said controller for controlling said switching network to connect one of said outpulsers via said network to a second appearance of said branch, a central pulse distributor effective upon said connection for controlling said outpulser to outpulse information forward via said branch and second trunk end to said toll office, said network being subsequently effective for controlling the release of said outpulser from said service trunk circuit, a data channel interconnecting said call controller and said operator positions, means responsive to the connection of said selected position to said branch for transmitting call data to said operator position, a second data channel interconnecting said call controller and said positions, means at each position operable for transmitting call information back to said controller, and means subsequently effective for disconnecting said operator position from said service trunk circuit.

61. In a call service center, a service trunk circuit having a first end connected to an outgoing trunk circuit at a local office and a second end connected to an incoming trunk circuit at a toll office, a switching network, a branch of said service trunk circuit having two separate appearnces on one side of said network, a scanner connected to said trunk circuit, a call controller, means including said scanner responsive to the receipt of a call by said service trunk circuit over its first end from said local office for transmitting a trunk service request signal to said controller, a plurality of digit receivers; means responsive to the receipt of said call service request signal for controlling said switching network to interconnect a first appearance of said branch and one of said digit receivers for the reception of call information outpulsed from said local office, means including said digit receiver for transmitting the information received from said local office to said call controller via said scanner, said network being effective for disconnecting said receiver from said branch upon the termination of said local office outpulsing, a plurality of outpulsers, means responsive to the reception of said information by said controller for controlling said switching network to connect one of said outpulsers via said network to a second appearance of said branch, and a central pulse distributor effective upon said connection for controlling said outpulser to outpulse information forward via said branch and said second trunk ends to said toll office, said network being subsequently effective for controlling the release of said outpulser from said service trunk circuit.

62. The invention of claim 61 in combination with monitoring means including said scanner for monitoring said call station duration, means including said monitoring means for detecting the termination of said call upon an on-hook condition at either the calling or called station, a recorder, and means responsive to said call termination for transmitting call data to said recorder.

63. In a call service center, a service trunk circuit having a first end connected to a first incoming trunk circuit at a toll office and a second end connected speechwise to said first end and connected to a second incoming trunk circuit at said toll office, a selectively controllable switching network, a branch of said service trunk circuit connected to a first side of said network, a plurality of operator positions each having an individual appearance on a second side of said network, a call controller, means at said position operable for transmitting to said controller information signifying a call that is to be established, an outpulser, means including said controller effective upon the receipt of said call information for controlling said network to establish a network path between said outpulser and said branch, means responsive to the establishment of said outpulser connection for controlling said outpulser to transmit information to said toll office over said first end for the establishment of a connection extending to a calling station, means operable subsequently for controlling said outpulser to outpulse information to said toll office over said second end for the establishment of a connection extending to a called station, and means for controlling the connection via said network of said operator position to said branch, said network being subsequently effective for disconnecting said outpulser and said operator position from said branch.

64. In a call service center, a service trunk circuit having a first end connected to a first incoming trunk circuit at a toll office and a second end connected speechwise to said first end and connected to a second incoming trunk circuit at said toll office, a selectively controllable switching network, a branch of said service trunk circuit connected to a first side of said network, a plurality of operator positions each having an individual appearance on a second side of said network, a call controller, means at said position operable for transmitting to said controller information signifying a call that is to be subsequently established as well as the time at which said call is to be established, an outpulser, means within said controller effective upon the arrival of said time for controlling said network to establish a network path between said outpulser and said branch, means responsive to the establishment of said outpulser connection for controlling said outpulser to transmit information to said toll office over said first end for the establishment of a connection extending to a calling station on a priorly attempted call, means operable subsequently for controlling said outpulser to outpulse information to said toll office over said second end for the establishment of a connection extending to a called office, and means for controlling the connection via said network of said operator position to said branch, said network being subsequently effective for disconnecting said outpulser and said operator position from said branch.

65. In a call service center, a service trunk circuit having a first end permanently connected to an outgoing trunk circuit at a first office and a second end permanently connected to an incoming trunk circuit at a second office, a call controller, means including said controller responsive to the receipt by said service trunk circuit over its first end of a call from said first office for extending said call via said second end to said second office, a branch of said service trunk circuit, an operator position, a selectively controlled switching network, and means including said controller additionally responsive to the receipt of said call for controlling said network to establish a network path between said branch and said position for the furnishing of operator call assistance, said network being subsequently effective for disconnecting said position from said third end.

66. The invention of claim 65 in combination with a key at said position operable for transmitting a HOLD signal to said controller, means for monitoring said call following its disconnection from said position, and means including said monitoring means and said controller effective subsequent to the receipt of said HOLD signal for controlling the establishment of a network connection between said position and said branch upon the detection of an off-hook condition at either the calling or called station.

67. The invention of claim 65 in combination with means operable at said position for transmitting to said controller information signifying that the calling party desires notification after the expiration of a specified call duration, means for timing the call following its disconnection from said position, and means responsive to the expiration of said specified call duration for controlling the connection between said branch and said operator positions via said network.

68. The invention of claim 65 in combination with means operable at said position for transmitting an indication to said controller signifying that the calling party desires to be reconnected to an operator position upon the call termination for time and charge information, means for monitoring said call, means effective upon the call termination for controlling said network to establish a connection between said branch and any one of said operator positions, and means effective upon the establishment of said connection for transmitting time-and-charge information to said operator position.

69. The invention of claim 65 in combination with an information trunk circuit having a first end extending to an information board and having a second end extending to an appearance on one side of said network, means operable at said position for transmitting an information request signal to said controller, and means responsive thereto for controlling the establishment of a network connection between said position and said information trunk circuit while said position remains connected to the branch of said service trunk circuit, said network being subsequently effective for disconnecting said information trunk circuit from said position prior to the disconnection of said position from said third end.

70. In a call service center, a service trunk circuit having a first end connected to a first incoming trunk circuit at a toll office and a second end connected to a second incoming trunk circuit at said toll office, a selectively controllable switching network, a branch of said service trunk circuit connected to a first side of said network, an operator position having an appearance on a second side of said network, a call controller, means at said positioon operable for transmitting to said controller information signifying a plurality of calls that are to be subsequently established sequentially, one at a time, between a specified calling station and a plurality of called stations, means at said position operable for transmitting to said controller information signifying a period of delay following which the first of said calls is to be attempted, an outpulser, means within said controller effective upon the arrival of said time for controlling said network to establish a network path between said outpulser and said branch, means responsive to said connection for controlling said controller to outpulse to said toll office information representing the first called station with which the calling station is to be connected, said network being subsequently effective for disconnecting said outpulser from said branch, call monitoring means for detecting call terminations, means including said monitoring means effective upon a call termination for controlling the reconnection of said outpulser to said branch via said network, and means effective upon said reconnection for controlling said outpulser to transmit to said toll office information signifying the next call station with which the calling station is to be connected, said network being subsequently effective for controlling the disconnection of said controller from said branch, said monitoring means and said controller and said outpulsing means together being effective for monitoring each call and effective upon its termination for outpulsing information to said toll office signifying the called station with which the calling station is to be next connected.

71. In a call service center, a service trunk circuit having a first end connected to an outgoing trunk circuit at a local office and a second end connected to an incoming trunk circuit at a toll office, a branch of said service trunk circuit, operator positions, means responsive to the receipt by said service trunk circuit over its first end of a call from said local office for connecting said call via said branch to one of said positions, a call controller, means operable at said position for transmitting to said controller information signifying a plurality of called stations with which the calling station is to be connected sequentially one at a time, said network being subsequently effective for disconnecting said position from said branch, means for controlling the establishment of a network connection between said outpulser and said branch, means responsive to said connection for controlling said controller to outpulse to said toll office information representing the first called station with which the calling station is to be connected, said network being subsequently effective for disconnecting said outpulser from said branch, call monitoring means for detecting call terminations, means including said monitoring means effective upon a call termination for controlling the reconnection of said outpulser to said branch via said network, and means effective upon said reconnection for controlling said outpulser to transmit to said toll office information signifying the next called station with which the calling station is to be connected, said network being subsequently effective for controlling the disconnection of said controller from said branch, said monitoring means and said controller and said outpulsing means together being effective for monitoring each call and effective upon its termination for outpulsing information to said toll office signifying the called station with which the calling station is to be next connected.

References Cited

UNITED STATES PATENTS 3,218,392    11/1965    Blashfield.
3,133,153    5/1964    Bonanno.

WILLIAM C. COOPER, Primary Examiner